(12) United States Patent
Dannoux et al.

(10) Patent No.: US 11,789,214 B2
(45) Date of Patent: *Oct. 17, 2023

(54) MULTIPORTS AND OTHER DEVICES HAVING KEYED CONNECTION PORTS AND SECURING FEATURES AND METHODS OF MAKING THE SAME

(71) Applicant: Corning Research & Development Corporation, Corning, NY (US)

(72) Inventors: Thierry Luc Alain Dannoux, Avon (FR); Robert Bruce Elkins, II, Hickory, NC (US); Joel Christopher Rosson, Hickory, NC (US); Dayne Wilcox, El Cerrito, CA (US); Michael Wimmer, Berlin (DE); Shane C. Woody, Mooresville, NC (US); Zhiye Zhang, Hickory, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 166 days.

This patent is subject to a terminal disclaimer.

(21) Appl. No.: 16/664,198

(22) Filed: Oct. 25, 2019

(65) Prior Publication Data
US 2020/0057205 A1    Feb. 20, 2020

Related U.S. Application Data

(63) Continuation of application No. PCT/US2017/064095, filed on Nov. 30, 2017.
(Continued)

(51) Int. Cl.
*G02B 6/38* (2006.01)
*G02B 6/44* (2006.01)
*G02B 6/42* (2006.01)

(52) U.S. Cl.
CPC .......... *G02B 6/3879* (2013.01); *G02B 6/387* (2013.01); *G02B 6/3825* (2013.01);
(Continued)

(58) Field of Classification Search
CPC .. G02B 6/3879; G02B 6/3825; G02B 6/3826; G02B 6/3831; G02B 6/3851;
(Continued)

(56) References Cited

U.S. PATENT DOCUMENTS 3,792,284 A    2/1974   Kaelin
3,912,362 A   10/1975   Hudson
(Continued)

FOREIGN PATENT DOCUMENTS

AU    2006232206 A1   10/2006
CN       1060911 A     5/1992
(Continued)

OTHER PUBLICATIONS

Faulkner et al. "Optical networks for local lopp applications," J. Lightwave Technol.0733-8724 7(11), 17411751 (1989).
(Continued)

*Primary Examiner* — Jerry M Blevins
(74) *Attorney, Agent, or Firm* — Michael E. Carroll, Jr.

(57) ABSTRACT

Devices such as multiports comprising connection ports with associated securing features and methods for making the same are disclosed. In one embodiment, the device comprises a shell, at least one connection port, at least one securing feature passageway, and at least one securing feature. The at least one connection port is disposed on the multiport with the at least one connection port comprising an optical connector opening extending from an outer surface of the multiport to a cavity of the multiport and defining a connection port passageway. The connection port passageway defines a keying portion. The at least one securing
(Continued)

feature is associated with the connection port passageway, and the at least one securing feature is disposed within a portion of the at least one securing feature passageway.

61 Claims, 85 Drawing Sheets

Related U.S. Application Data

(60) Provisional application No. 62/526,195, filed on Jun. 28, 2017, provisional application No. 62/526,018, filed on Jun. 28, 2017, provisional application No. 62/526,011, filed on Jun. 28, 2017.

(52) U.S. Cl.
CPC ......... *G02B 6/3826* (2013.01); *G02B 6/3831* (2013.01); *G02B 6/3851* (2013.01); *G02B 6/3869* (2013.01); *G02B 6/3873* (2013.01); *G02B 6/3885* (2013.01); *G02B 6/381* (2013.01); *G02B 6/389* (2013.01); *G02B 6/3821* (2013.01); *G02B 6/3837* (2013.01); *G02B 6/3841* (2013.01); *G02B 6/3843* (2013.01); *G02B 6/3849* (2013.01); *G02B 6/3871* (2013.01); *G02B 6/3887* (2013.01); *G02B 6/3889* (2013.01); *G02B 6/3893* (2013.01); *G02B 6/3895* (2013.01); *G02B 6/3897* (2013.01); *G02B 6/4262* (2013.01); *G02B 6/4401* (2013.01); *G02B 6/4446* (2013.01); *G02B 6/4471* (2013.01); *G02B 6/4472* (2013.01); *G02B 6/4477* (2013.01); *G02B 6/4479* (2013.01)

(58) Field of Classification Search
CPC .... G02B 6/3869; G02B 6/387; G02B 6/3873; G02B 6/3885; G02B 6/3887; G02B 6/381; G02B 6/3821; G02B 6/3837; G02B 6/3841; G02B 6/3843; G02B 6/3849; G02B 6/3871; G02B 6/3889; G02B 6/389; G02B 6/3893; G02B 6/3895; G02B 6/3897; G02B 6/4262; G02B 6/4401; G02B 6/4446; G02B 6/4471; G02B 6/4472; G02B 6/4477; G02B 6/4479
USPC ........................................................ 385/135
See application file for complete search history.

(56) References Cited

U.S. PATENT DOCUMENTS

| | | |
|---|---|---|
| 4,148,557 A | 4/1979 | Garvey |
| 4,167,303 A | 9/1979 | Bowen et al. |
| 4,168,109 A | 9/1979 | Dumire |
| 4,336,977 A | 6/1982 | Monaghan et al. |
| 4,373,777 A | 2/1983 | Borsuk et al. |
| 4,413,880 A | 11/1983 | Forrest et al. |
| 4,423,922 A | 1/1984 | Porter |
| 4,440,471 A | 4/1984 | Knowles |
| 4,461,537 A | 7/1984 | Raymer et al. |
| 4,547,937 A | 10/1985 | Collins |
| 4,615,581 A | 10/1986 | Morimoto |
| 4,634,858 A | 1/1987 | Gerdt et al. |
| 4,688,200 A | 8/1987 | Poorman et al. |
| 4,690,563 A | 9/1987 | Barton et al. |
| 4,711,752 A | 12/1987 | Deacon et al. |
| 4,723,827 A | 2/1988 | Shaw et al. |
| 4,741,590 A | 5/1988 | Caron |
| 4,842,363 A | 6/1989 | Margolin et al. |
| 4,844,570 A | 7/1989 | Tanabe |
| 4,877,303 A | 10/1989 | Caldwell et al. |
| 4,944,568 A | 7/1990 | Bach et al. |
| 4,979,792 A | 12/1990 | Weber et al. |
| 5,007,860 A | 4/1991 | Robinson et al. |
| 5,067,783 A | 11/1991 | Lampert |
| 5,073,042 A | 12/1991 | Mulholland et al. |
| 5,076,656 A | 12/1991 | Briggs et al. |
| 5,085,492 A | 2/1992 | Kelsoe et al. |
| 5,088,804 A | 2/1992 | Grinderslev |
| 5,091,990 A | 2/1992 | Leung et al. |
| 5,131,735 A | 7/1992 | Berkey et al. |
| 5,142,602 A | 8/1992 | Cabato et al. |
| 5,146,519 A | 9/1992 | Miller et al. |
| 5,155,900 A | 10/1992 | Grois et al. |
| 5,162,397 A | 11/1992 | Descamps et al. |
| 5,210,810 A | 5/1993 | Darden et al. |
| 5,212,752 A | 5/1993 | Stephenson et al. |
| 5,224,187 A | 6/1993 | Davisdon |
| 5,231,685 A | 7/1993 | Hanzawa et al. |
| 5,245,683 A | 9/1993 | Belenkiy et al. |
| 5,263,239 A | 11/1993 | Ziemek |
| 5,276,750 A | 1/1994 | Manning |
| 5,317,663 A | 5/1994 | Beard et al. |
| 5,321,917 A | 6/1994 | Franklin et al. |
| 5,375,183 A | 12/1994 | Edwards et al. |
| 5,381,494 A | 1/1995 | O'Donnell et al. |
| 5,390,269 A | 2/1995 | Palecek et al. |
| 5,408,570 A | 4/1995 | Cook et al. |
| 5,425,121 A | 6/1995 | Cooke et al. |
| 5,452,388 A | 9/1995 | Rittle et al. |
| 5,519,799 A | 5/1996 | Murakami et al. |
| 5,553,186 A | 9/1996 | Allen |
| 5,557,696 A | 9/1996 | Stein |
| 5,569,050 A | 10/1996 | Lloyd |
| 5,588,077 A | 12/1996 | Woodside |
| 5,600,747 A | 2/1997 | Yamakawa et al. |
| 5,603,631 A | 2/1997 | Kawahara et al. |
| 5,608,828 A | 3/1997 | Coutts et al. |
| 5,631,993 A | 5/1997 | Cloud et al. |
| 5,647,045 A | 7/1997 | Robinson et al. |
| 5,673,346 A | 9/1997 | Iwano et al. |
| 5,694,507 A | 12/1997 | Walles |
| 5,748,821 A | 5/1998 | Schempp et al. |
| 5,761,359 A | 6/1998 | Chudoba et al. |
| 5,781,686 A | 7/1998 | Robinson et al. |
| 5,782,892 A | 7/1998 | Castle et al. |
| 5,790,740 A | 8/1998 | Cloud et al. |
| 5,791,918 A | 8/1998 | Pierce |
| 5,796,895 A | 8/1998 | Jennings et al. |
| RE35,935 E | 10/1998 | Cabato et al. |
| 5,818,993 A | 10/1998 | Chudoba et al. |
| 5,857,050 A | 1/1999 | Jiang et al. |
| 5,862,290 A | 1/1999 | Burek et al. |
| 5,883,999 A | 3/1999 | Cloud et al. |
| 5,884,000 A | 3/1999 | Cloud et al. |
| 5,884,001 A | 3/1999 | Cloud et al. |
| 5,884,002 A | 3/1999 | Cloud et al. |
| 5,884,003 A | 3/1999 | Cloud et al. |
| 5,887,099 A | 3/1999 | Csipkes et al. |
| 5,920,669 A | 7/1999 | Knecht et al. |
| 5,925,191 A | 7/1999 | Stein et al. |
| 5,926,596 A | 7/1999 | Edwards et al. |
| 5,960,141 A | 9/1999 | Sasaki et al. |
| 5,961,344 A | 10/1999 | Rosales et al. |
| 5,971,626 A | 10/1999 | Knodell et al. |
| RE36,592 E | 2/2000 | Giebel et al. |
| 6,030,129 A | 2/2000 | Rosson |
| 6,035,084 A | 3/2000 | Haake et al. |
| 6,045,270 A | 4/2000 | Weiss et al. |
| 6,094,517 A | 7/2000 | Hayato |
| 6,108,482 A | 8/2000 | Roth |
| 6,112,006 A | 8/2000 | Foss |
| 6,179,482 B1 | 1/2001 | Takizawa et al. |
| 6,193,421 B1 | 2/2001 | Tamekuni et al. |
| RE37,079 E | 3/2001 | Stephenson et al. |
| RE37,080 E | 3/2001 | Stephenson et al. |
| 6,200,040 B1 | 3/2001 | Edwards et al. |
| 6,206,581 B1 | 3/2001 | Driscoll et al. |
| 6,224,268 B1 | 5/2001 | Manning et al. |
| 6,224,270 B1 | 5/2001 | Nakajima et al. |

(56) References Cited

U.S. PATENT DOCUMENTS

| | | |
|---|---|---|
| 6,293,710 B1 | 9/2001 | Lampert et al. |
| 6,298,190 B2 | 10/2001 | Waldron et al. |
| 6,321,013 B1 | 11/2001 | Hardwick et al. |
| 6,356,390 B1 | 3/2002 | Hall, Jr. |
| 6,375,363 B1 | 4/2002 | Harrison et al. |
| 6,404,962 B1 | 6/2002 | Hardwick et al. |
| 6,409,391 B1 | 6/2002 | Chang |
| 6,427,035 B1 | 7/2002 | Mahony |
| 6,428,215 B1 | 8/2002 | Nault |
| 6,466,725 B2 | 10/2002 | Battey et al. |
| 6,496,641 B1 | 12/2002 | Mahony |
| 6,522,804 B1 | 2/2003 | Mahony |
| 6,533,468 B2 | 3/2003 | Nakajima et al. |
| 6,536,956 B2 | 3/2003 | Luther et al. |
| 6,542,652 B1 | 4/2003 | Mahony |
| 6,554,489 B2 | 4/2003 | Kent et al. |
| 6,625,375 B1 | 9/2003 | Mahony |
| 6,629,782 B2 | 10/2003 | McPhee et al. |
| 6,672,774 B2 | 1/2004 | Theuerkorn et al. |
| 6,678,442 B2 | 1/2004 | Gall et al. |
| 6,695,489 B2 | 2/2004 | Nault |
| 6,702,475 B1 | 3/2004 | Giobbio et al. |
| 6,738,555 B1 | 5/2004 | Cooke et al. |
| 6,748,146 B2 | 6/2004 | Parris |
| 6,771,861 B2 | 8/2004 | Wagner et al. |
| 6,789,950 B1 | 9/2004 | Loder et al. |
| 6,841,729 B2 | 1/2005 | Sakabe et al. |
| 6,856,748 B1 | 2/2005 | Elkins et al. |
| 6,877,906 B2 | 4/2005 | Mizukami et al. |
| 6,880,219 B2 | 4/2005 | Griffioen et al. |
| 6,908,233 B2 | 6/2005 | Nakajima et al. |
| 6,916,120 B2 | 7/2005 | Zimmel et al. |
| 6,944,387 B2 | 9/2005 | Howell et al. |
| 6,962,445 B2 | 11/2005 | Zimmel et al. |
| 6,970,629 B2 | 11/2005 | Lail et al. |
| 6,983,095 B2 | 1/2006 | Reagan et al. |
| 7,013,074 B2 | 3/2006 | Battey et al. |
| 7,044,650 B1 | 5/2006 | Tran et al. |
| 7,052,185 B2 | 5/2006 | Rubino et al. |
| 7,088,899 B2 | 8/2006 | Reagan et al. |
| 7,103,255 B2 | 9/2006 | Reagan et al. |
| 7,103,257 B2 | 9/2006 | Donaldson et al. |
| 7,118,283 B2 | 10/2006 | Nakajima et al. |
| 7,118,284 B2 | 10/2006 | Nakajima et al. |
| 7,120,347 B2 | 10/2006 | Blackwell, Jr. et al. |
| 7,146,089 B2 | 12/2006 | Reagan et al. |
| 7,150,567 B1 | 12/2006 | Luther et al. |
| 7,171,102 B2 | 1/2007 | Reagan et al. |
| 7,195,403 B2 | 3/2007 | Oki et al. |
| 7,200,317 B2 | 4/2007 | Reagan et al. |
| 7,201,518 B2 | 4/2007 | Holmquist |
| 7,213,975 B2 | 5/2007 | Khemakhem et al. |
| 7,213,980 B2 | 5/2007 | Oki et al. |
| 7,228,047 B1 | 6/2007 | Szilagyi et al. |
| 7,232,260 B2 | 6/2007 | Takahashi et al. |
| 7,236,670 B2 | 6/2007 | Lail et al. |
| 7,260,301 B2 | 8/2007 | Barth et al. |
| 7,261,472 B2 | 8/2007 | Suzuki et al. |
| 7,266,265 B2 | 9/2007 | Gall et al. |
| 7,266,274 B2 | 9/2007 | Elkins et al. |
| 7,277,614 B2 | 10/2007 | Cody et al. |
| 7,279,643 B2 | 10/2007 | Morrow et al. |
| 7,292,763 B2 | 11/2007 | Smith et al. |
| 7,302,152 B2 | 11/2007 | Luther et al. |
| 7,318,677 B2 | 1/2008 | Dye |
| 7,326,091 B2 | 2/2008 | Nania et al. |
| 7,330,629 B2 | 2/2008 | Cooke et al. |
| 7,333,708 B2 | 2/2008 | Blackwell, Jr. et al. |
| 7,336,873 B2 | 2/2008 | Lail et al. |
| 7,341,382 B2 | 3/2008 | Dye |
| 7,346,256 B2 | 3/2008 | Marrs et al. |
| 7,349,605 B2 | 3/2008 | Noonan et al. |
| 7,357,582 B2 | 4/2008 | Oki et al. |
| 7,366,416 B2 | 4/2008 | Ramachandran et al. |
| 7,394,964 B2 | 7/2008 | Tinucci et al. |
| 7,397,997 B2 | 7/2008 | Ferris et al. |
| 7,400,815 B2 | 7/2008 | Mertesdorf et al. |
| 7,407,332 B2 | 8/2008 | Oki et al. |
| 7,428,366 B2 | 9/2008 | Mullaney et al. |
| 7,444,056 B2 | 10/2008 | Allen et al. |
| 7,454,107 B2 | 11/2008 | Miller et al. |
| 7,463,803 B2 | 12/2008 | Cody et al. |
| 7,469,091 B2 | 12/2008 | Mullaney et al. |
| 7,477,824 B2 | 1/2009 | Reagan et al. |
| 7,480,437 B2 | 1/2009 | Ferris et al. |
| 7,484,898 B2 | 2/2009 | Katagiyama et al. |
| 7,485,804 B2 | 2/2009 | Dinh et al. |
| 7,489,849 B2 | 2/2009 | Reagan et al. |
| 7,492,996 B2 | 2/2009 | Kowalczyk et al. |
| 7,512,304 B2 | 3/2009 | Gronvall et al. |
| 7,520,678 B2 | 4/2009 | Khemakhem et al. |
| 7,539,387 B2 | 5/2009 | Mertesdorf et al. |
| 7,539,388 B2 | 5/2009 | Mertesdorf et al. |
| 7,542,645 B1 | 6/2009 | Hua et al. |
| 7,559,702 B2 | 7/2009 | Fujiwara et al. |
| 7,565,055 B2 | 7/2009 | Lu et al. |
| 7,568,845 B2 | 8/2009 | Caveney et al. |
| 7,572,065 B2 | 8/2009 | Lu et al. |
| 7,591,595 B2 | 9/2009 | Lu et al. |
| 7,614,797 B2 | 11/2009 | Lu et al. |
| 7,621,675 B1 | 11/2009 | Bradley |
| 7,627,222 B2 | 12/2009 | Reagan et al. |
| 7,628,545 B2 | 12/2009 | Cody et al. |
| 7,628,548 B2 | 12/2009 | Benjamin et al. |
| 7,646,958 B1 | 1/2010 | Reagan et al. |
| 7,653,282 B2 | 1/2010 | Blackwell, Jr. et al. |
| 7,654,747 B2 | 2/2010 | Theuerkorn et al. |
| 7,654,748 B2 | 2/2010 | Kuffel et al. |
| 7,658,549 B2 | 2/2010 | Elkins et al. |
| 7,661,995 B2 | 2/2010 | Nania et al. |
| 7,677,814 B2 | 3/2010 | Lu et al. |
| 7,680,388 B2 | 3/2010 | Reagan et al. |
| 7,708,476 B2 | 5/2010 | Liu |
| 7,709,733 B1 | 5/2010 | Plankell |
| 7,712,971 B2 | 5/2010 | Lee et al. |
| 7,722,262 B2 | 5/2010 | Caveney et al. |
| 7,726,998 B2 | 6/2010 | Siebens |
| 7,738,759 B2 | 6/2010 | Parikh et al. |
| 7,740,409 B2 | 6/2010 | Bolton et al. |
| 7,742,117 B2 | 6/2010 | Lee et al. |
| 7,742,670 B2 | 6/2010 | Benjamin et al. |
| 7,744,286 B2 | 6/2010 | Lu et al. |
| 7,744,288 B2 | 6/2010 | Lu et al. |
| 7,747,117 B2 | 6/2010 | Greenwood et al. |
| 7,751,666 B2 | 7/2010 | Parsons et al. |
| 7,753,596 B2 | 7/2010 | Cox |
| 7,762,726 B2 | 7/2010 | Lu et al. |
| 7,785,019 B2 | 8/2010 | Lewallen et al. |
| 7,805,044 B2 | 9/2010 | Reagan et al. |
| 7,806,599 B2 | 10/2010 | Margolin et al. |
| 7,820,090 B2 | 10/2010 | Morrow et al. |
| 7,844,158 B2 | 11/2010 | Gronvall et al. |
| 7,844,160 B2 | 11/2010 | Reagan et al. |
| 7,869,681 B2 | 1/2011 | Battey et al. |
| RE42,094 E | 2/2011 | Barnes et al. |
| 7,881,576 B2 | 2/2011 | Melton et al. |
| 7,889,961 B2 | 2/2011 | Cote et al. |
| 7,891,882 B2 | 2/2011 | Kuffel et al. |
| 7,903,923 B2 | 3/2011 | Gronvall et al. |
| 7,903,925 B2 | 3/2011 | Cooke et al. |
| 7,933,517 B2 | 4/2011 | Ye et al. |
| 7,938,670 B2 | 5/2011 | Nania et al. |
| 7,941,027 B2 | 5/2011 | Mertesdorf et al. |
| 7,959,361 B2 | 6/2011 | Lu et al. |
| 8,002,476 B2 | 8/2011 | Caveney et al. |
| 8,005,335 B2 | 8/2011 | Reagan et al. |
| 8,023,793 B2 | 9/2011 | Kowalczyk et al. |
| 8,025,445 B2 | 9/2011 | Rambow et al. |
| 8,041,178 B2 | 10/2011 | Lu et al. |
| 8,052,333 B2 | 11/2011 | Kuffel et al. |
| 8,055,167 B2 | 11/2011 | Park et al. |
| 8,083,418 B2 | 12/2011 | Fujiwara et al. |
| 8,111,966 B2 | 2/2012 | Holmberg et al. |
| 8,137,002 B2 | 3/2012 | Lu et al. |

(56) References Cited

U.S. PATENT DOCUMENTS

| | | |
|---|---|---|
| 8,147,147 B2 | 4/2012 | Khemakhem et al. |
| 8,157,454 B2 | 4/2012 | Ito et al. |
| 8,164,050 B2 | 4/2012 | Ford et al. |
| 8,202,008 B2 | 6/2012 | Lu et al. |
| 8,213,761 B2 | 7/2012 | Gronvall et al. |
| 8,218,935 B2 | 7/2012 | Reagan et al. |
| 8,224,145 B2 | 7/2012 | Reagan et al. |
| 8,229,263 B2 | 7/2012 | Parris et al. |
| 8,231,282 B2 | 7/2012 | Kuffel et al. |
| 8,238,706 B2 | 8/2012 | Kachmar |
| 8,238,709 B2 | 8/2012 | Solheid et al. |
| 8,249,450 B2 | 8/2012 | Conner |
| 8,256,971 B2 | 9/2012 | Caveney et al. |
| 8,267,596 B2 | 9/2012 | Theuerkorn |
| RE43,762 E | 10/2012 | Smith et al. |
| 8,301,003 B2 | 10/2012 | de los Santos Campos et al. |
| 8,301,004 B2 | 10/2012 | Cooke et al. |
| 8,317,411 B2 | 11/2012 | Fujiwara et al. |
| 8,348,519 B2 | 1/2013 | Kuffel et al. |
| 8,363,999 B2 | 1/2013 | Mertesdorf et al. |
| 8,376,629 B2 | 2/2013 | Cline et al. |
| 8,376,632 B2 | 2/2013 | Blackburn et al. |
| 8,402,587 B2 | 3/2013 | Sugita et al. |
| 8,408,811 B2 | 4/2013 | de Jong et al. |
| 8,414,196 B2 | 4/2013 | Lu et al. |
| 8,466,262 B2 | 6/2013 | Siadak et al. |
| 8,472,773 B2 | 6/2013 | De Jong |
| 8,480,312 B2 | 7/2013 | Smith et al. |
| 8,494,329 B2 | 7/2013 | Nhep et al. |
| 8,496,384 B2 | 7/2013 | Kuffel et al. |
| 8,506,173 B2 | 8/2013 | Lewallen et al. |
| 8,520,996 B2 | 8/2013 | Cowen et al. |
| 8,534,928 B2 | 9/2013 | Cooke et al. |
| 8,536,516 B2 | 9/2013 | Ford et al. |
| 8,556,522 B2 | 10/2013 | Cunningham |
| 8,573,855 B2 | 11/2013 | Nhep |
| 8,591,124 B2 | 11/2013 | Griffiths et al. |
| 8,622,627 B2 | 1/2014 | Elkins et al. |
| 8,622,634 B2 | 1/2014 | Arnold et al. |
| 8,635,733 B2 | 1/2014 | Bardzilowski |
| 8,662,760 B2 | 3/2014 | Cline et al. |
| 8,668,512 B2 | 3/2014 | Chang |
| 8,678,668 B2 | 3/2014 | Cooke et al. |
| 8,687,930 B2 | 4/2014 | McDowell et al. |
| 8,702,324 B2 | 4/2014 | Caveney et al. |
| 8,714,835 B2 | 5/2014 | Kuffel et al. |
| 8,727,638 B2 | 5/2014 | Lee et al. |
| 8,737,837 B2 | 5/2014 | Conner et al. |
| 8,755,663 B2 | 6/2014 | Makrides-Saravanos et al. |
| 8,758,046 B2 | 6/2014 | Pezzetti et al. |
| 8,770,861 B2 | 7/2014 | Smith et al. |
| 8,770,862 B2 | 7/2014 | Lu et al. |
| 8,837,894 B2 | 9/2014 | Holmberg et al. |
| 8,864,390 B2 | 10/2014 | Chen et al. |
| 8,870,469 B2 | 10/2014 | Kachmar |
| 8,879,883 B2 | 11/2014 | Parikh et al. |
| 8,882,364 B2 | 11/2014 | Busse et al. |
| 8,917,966 B2 | 12/2014 | Thompson et al. |
| 8,974,124 B2 | 3/2015 | Chang |
| 8,992,097 B2 | 3/2015 | Koreeda et al. |
| 8,998,502 B2 | 4/2015 | Benjamin et al. |
| 8,998,506 B2 | 4/2015 | Pepin et al. |
| 9,011,858 B2 | 4/2015 | Siadak et al. |
| 9,039,293 B2 | 5/2015 | Hill et al. |
| 9,075,205 B2 | 7/2015 | Pepe et al. |
| 9,146,364 B2 | 9/2015 | Chen et al. |
| 9,151,906 B2 | 10/2015 | Kobayashi et al. |
| 9,151,909 B2 | 10/2015 | Chen et al. |
| 9,158,074 B2 | 10/2015 | Anderson et al. |
| 9,158,075 B2 | 10/2015 | Benjamin et al. |
| 9,182,567 B2 | 11/2015 | Mullaney |
| 9,188,759 B2 | 11/2015 | Conner |
| 9,207,410 B2 | 12/2015 | Lee et al. |
| 9,207,421 B2 | 12/2015 | Conner |
| 9,213,150 B2 | 12/2015 | Matsui et al. |
| 9,223,106 B2 | 12/2015 | Coan et al. |
| 9,239,441 B2 | 1/2016 | Melton et al. |
| 9,268,102 B2 | 2/2016 | Daems et al. |
| 9,274,286 B2 | 3/2016 | Caveney et al. |
| 9,279,951 B2 | 3/2016 | McGranahan et al. |
| 9,285,550 B2 | 3/2016 | Nhep et al. |
| 9,297,974 B2 | 3/2016 | Valderrabano et al. |
| 9,297,976 B2 | 3/2016 | Hill et al. |
| 9,310,570 B2 | 4/2016 | Busse et al. |
| 9,316,791 B2 | 4/2016 | Durrant et al. |
| 9,322,998 B2 | 4/2016 | Miller |
| 9,360,640 B2 | 6/2016 | Ishigami et al. |
| 9,383,539 B2 | 7/2016 | Hill et al. |
| 9,400,364 B2 | 7/2016 | Hill et al. |
| 9,405,068 B2 | 8/2016 | Graham et al. |
| 9,417,403 B2 | 8/2016 | Mullaney et al. |
| 9,423,584 B2 | 8/2016 | Coan et al. |
| 9,435,969 B2 | 9/2016 | Lambourn et al. |
| 9,442,257 B2 | 9/2016 | Lu |
| 9,450,393 B2 | 9/2016 | Thompson et al. |
| 9,459,412 B2 | 10/2016 | Katoh |
| 9,482,819 B2 | 11/2016 | Li et al. |
| 9,482,829 B2 | 11/2016 | Lu et al. |
| 9,513,451 B2 | 12/2016 | Corbille et al. |
| 9,535,229 B2 | 1/2017 | Ott et al. |
| 9,541,711 B2 | 1/2017 | Raven et al. |
| 9,557,504 B2 | 1/2017 | Holmberg et al. |
| 9,684,138 B2 | 1/2017 | Lu |
| 9,581,775 B2 | 2/2017 | Kondo et al. |
| 9,588,304 B2 | 3/2017 | Durrant et al. |
| 9,612,407 B2 | 4/2017 | Kobayashi et al. |
| 9,618,704 B2 | 4/2017 | Dean et al. |
| 9,618,718 B2 | 4/2017 | Islam |
| 9,624,296 B2 | 4/2017 | Siadak et al. |
| 9,625,660 B2 | 4/2017 | Daems et al. |
| 9,638,871 B2 | 5/2017 | Bund et al. |
| 9,645,331 B1 | 5/2017 | Kim |
| 9,645,334 B2 | 5/2017 | Ishii et al. |
| 9,651,741 B2 | 5/2017 | Isenhour et al. |
| 9,664,862 B2 | 5/2017 | Lu et al. |
| 9,678,285 B2 | 6/2017 | Hill et al. |
| 9,678,293 B2 | 6/2017 | Coan et al. |
| 9,684,136 B2 | 6/2017 | Cline et al. |
| 9,696,500 B2 | 7/2017 | Barnette et al. |
| 9,711,868 B2 | 7/2017 | Scheucher |
| 9,720,193 B2 | 8/2017 | Nishimura |
| 9,733,436 B2 | 8/2017 | Van Baelen et al. |
| 9,739,951 B2 | 8/2017 | Busse et al. |
| 9,762,322 B1 | 9/2017 | Amundson |
| 9,766,416 B1 | 9/2017 | Kim |
| 9,772,457 B2 | 9/2017 | Hill et al. |
| 9,804,343 B2 | 10/2017 | Hill et al. |
| 9,810,855 B2 | 11/2017 | Cox et al. |
| 9,810,856 B2 | 11/2017 | Graham et al. |
| 9,829,658 B2 | 11/2017 | Nishimura |
| 9,829,668 B2 | 11/2017 | Coenegracht et al. |
| 9,851,522 B2 | 12/2017 | Reagan et al. |
| 9,857,540 B2 | 1/2018 | Ahmed et al. |
| 9,864,151 B2 | 1/2018 | Lu |
| 9,878,038 B2 | 1/2018 | Siadak et al. |
| 9,885,841 B2 | 2/2018 | Pepe et al. |
| 9,891,391 B2 | 2/2018 | Watanabe |
| 9,905,933 B2 | 2/2018 | Scheucher |
| 9,910,236 B2 | 3/2018 | Cooke et al. |
| 9,921,375 B2 | 3/2018 | Compton et al. |
| 9,927,580 B2 | 3/2018 | Bretz et al. |
| 9,933,582 B1 | 4/2018 | Lin |
| 9,939,591 B2 | 4/2018 | Mullaney et al. |
| 9,964,713 B2 | 5/2018 | Barnette et al. |
| 9,964,715 B2 | 5/2018 | Lu |
| 9,977,194 B2 | 5/2018 | Waldron et al. |
| 9,977,198 B2 | 5/2018 | Bund et al. |
| 9,983,374 B2 | 5/2018 | Li et al. |
| 10,007,068 B2 | 6/2018 | Hill et al. |
| 10,031,302 B2 | 7/2018 | Ji et al. |
| 10,036,859 B2 | 7/2018 | Daems et al. |
| 10,038,946 B2 | 7/2018 | Smolorz |
| 10,042,136 B2 | 8/2018 | Reagan et al. |
| 10,061,090 B2 | 8/2018 | Coenegracht |

(56) References Cited

U.S. PATENT DOCUMENTS

| | | |
|---|---|---|
| 10,073,224 B2 | 9/2018 | Tong et al. |
| 10,094,986 B2 | 10/2018 | Barnette et al. |
| 10,101,538 B2 | 10/2018 | Lu et al. |
| 10,107,968 B2 | 10/2018 | Tong et al. |
| 10,109,927 B2 | 10/2018 | Scheucher |
| 10,114,176 B2 | 10/2018 | Gimblet et al. |
| 10,126,508 B2 | 11/2018 | Compton et al. |
| 10,180,541 B2 | 1/2019 | Coenegracht et al. |
| 10,209,454 B2 | 2/2019 | Isenhour et al. |
| 10,215,930 B2 | 2/2019 | Mullaney et al. |
| 10,235,184 B2 | 3/2019 | Walker |
| 10,261,268 B2 | 4/2019 | Theuerkorn |
| 10,268,011 B2 | 4/2019 | Courchaine et al. |
| 10,288,820 B2 | 5/2019 | Coenegracht |
| 10,317,628 B2 | 6/2019 | Van Baelen et al. |
| 10,324,263 B2 | 6/2019 | Bund et al. |
| 10,338,323 B2 | 7/2019 | Lu et al. |
| 10,353,154 B2 | 7/2019 | Ott et al. |
| 10,353,156 B2 | 7/2019 | Hill et al. |
| 10,359,577 B2 | 7/2019 | Dannoux et al. |
| 10,371,914 B2 | 8/2019 | Coan et al. |
| 10,379,298 B2 | 8/2019 | Dannoux et al. |
| 10,386,584 B2 | 8/2019 | Rosson |
| 10,401,575 B2 | 9/2019 | Daily et al. |
| 10,401,578 B2 | 9/2019 | Coenegracht |
| 10,401,584 B2 | 9/2019 | Coan et al. |
| 10,409,007 B2 | 9/2019 | Kadar-Kallen et al. |
| 10,422,962 B2 | 9/2019 | Coenegracht |
| 10,422,970 B2 | 9/2019 | Holmberg et al. |
| 10,429,593 B2 | 10/2019 | Baca et al. |
| 10,429,594 B2 | 10/2019 | Dannoux et al. |
| 10,434,173 B2 | 10/2019 | Siadak et al. |
| 10,439,295 B2 | 10/2019 | Scheucher |
| 10,444,442 B2 | 10/2019 | Takano et al. |
| 10,451,811 B2 | 10/2019 | Coenegracht et al. |
| 10,451,817 B2 | 10/2019 | Lu |
| 10,451,830 B2 | 10/2019 | Szumacher et al. |
| 10,488,597 B2 | 11/2019 | Parikh et al. |
| 10,495,822 B2 | 12/2019 | Nhep |
| 10,502,916 B2 | 12/2019 | Coan et al. |
| 10,520,683 B2 | 12/2019 | Nhep |
| 10,539,745 B2 | 1/2020 | Kamada et al. |
| 10,578,821 B2 | 3/2020 | Ott et al. |
| 10,585,246 B2 | 3/2020 | Bretz et al. |
| 10,591,678 B2 | 3/2020 | Mullaney et al. |
| 10,605,998 B2 | 3/2020 | Rosson |
| 10,606,006 B2 | 3/2020 | Hill et al. |
| 10,613,278 B2 | 4/2020 | Kempeneers et al. |
| 10,620,388 B2 | 4/2020 | Isenhour et al. |
| 10,656,347 B2 | 5/2020 | Kato |
| 10,677,998 B2 | 6/2020 | Van Baelen et al. |
| 10,680,343 B2 | 6/2020 | Scheucher |
| 10,712,516 B2 | 7/2020 | Courchaine et al. |
| 10,739,534 B2 | 8/2020 | Murray et al. |
| 10,746,939 B2 | 8/2020 | Lu et al. |
| 10,761,274 B2 | 9/2020 | Pepe et al. |
| 10,782,487 B2 | 9/2020 | Lu |
| 10,802,236 B2 | 10/2020 | Kowalczyk et al. |
| 10,830,967 B2 | 11/2020 | Pimentel et al. |
| 10,830,975 B2 | 11/2020 | Vaughn et al. |
| 10,852,498 B2 | 12/2020 | Hill et al. |
| 10,852,499 B2 | 12/2020 | Cooke et al. |
| 10,859,771 B2 | 12/2020 | Nhep |
| 10,859,781 B2 | 12/2020 | Hill et al. |
| 10,962,731 B2 | 3/2021 | Coenegracht |
| 10,976,500 B2 | 4/2021 | Ott et al. |
| 11,061,191 B2 | 7/2021 | Van Baelen et al. |
| 11,290,188 B2 | 3/2022 | Tuccio et al. |
| 2001/0002220 A1 | 5/2001 | Throckmorton et al. |
| 2001/0012428 A1 | 8/2001 | Nakajima et al. |
| 2002/0012502 A1 | 1/2002 | Farrar et al. |
| 2002/0064364 A1 | 5/2002 | Battey et al. |
| 2002/0076165 A1 | 6/2002 | Childers et al. |
| 2002/0079697 A1 | 6/2002 | Griffioen et al. |
| 2002/0081077 A1 | 6/2002 | Nault |
| 2002/0122634 A1 | 9/2002 | Miyake et al. |
| 2002/0131721 A1 | 9/2002 | Gaio et al. |
| 2002/0159745 A1 | 10/2002 | Howell et al. |
| 2002/0172477 A1 | 11/2002 | Quinn et al. |
| 2003/0016440 A1 | 1/2003 | Zeidan et al. |
| 2003/0031447 A1 | 2/2003 | Nault |
| 2003/0059181 A1 | 3/2003 | Jackman et al. |
| 2003/0063866 A1 | 4/2003 | Melton et al. |
| 2003/0080555 A1 | 5/2003 | Griffioen et al. |
| 2003/0086664 A1 | 5/2003 | Moisel et al. |
| 2003/0123813 A1 | 7/2003 | Ravasio et al. |
| 2003/0128936 A1 | 7/2003 | Fahrnbauer et al. |
| 2003/0165311 A1 | 9/2003 | Wagman et al. |
| 2003/0201117 A1 | 10/2003 | Sakabe et al. |
| 2003/0206705 A1 | 11/2003 | McAlpine et al. |
| 2003/0210875 A1 | 11/2003 | Wagner et al. |
| 2004/0057676 A1 | 3/2004 | Doss et al. |
| 2004/0057681 A1 | 3/2004 | Quinn et al. |
| 2004/0072454 A1 | 4/2004 | Nakajima et al. |
| 2004/0076377 A1 | 4/2004 | Mizukami et al. |
| 2004/0076386 A1 | 4/2004 | Nechitailo |
| 2004/0086238 A1 | 5/2004 | Finona et al. |
| 2004/0096162 A1 | 5/2004 | Kocher et al. |
| 2004/0157499 A1 | 8/2004 | Nania et al. |
| 2004/0206542 A1 | 10/2004 | Gladd et al. |
| 2004/0240808 A1 | 12/2004 | Rhoney et al. |
| 2004/0247251 A1 | 12/2004 | Rubino et al. |
| 2004/0252954 A1 | 12/2004 | Ginocchio et al. |
| 2004/0262023 A1 | 12/2004 | Morrow et al. |
| 2005/0019031 A1 | 1/2005 | Ye et al. |
| 2005/0036744 A1 | 2/2005 | Caveney et al. |
| 2005/0036786 A1 | 2/2005 | Ramachandran et al. |
| 2005/0053342 A1 | 3/2005 | Melton et al. |
| 2005/0084215 A1 | 4/2005 | Grzegorzewska et al. |
| 2005/0105873 A1 | 5/2005 | Reagan et al. |
| 2005/0123422 A1 | 6/2005 | Lilie |
| 2005/0129379 A1 | 6/2005 | Reagan et al. |
| 2005/0163448 A1 | 7/2005 | Blackwell et al. |
| 2005/0175307 A1 | 8/2005 | Battey et al. |
| 2005/0180697 A1 | 8/2005 | De Marchi |
| 2005/0213890 A1 | 9/2005 | Barnes et al. |
| 2005/0213892 A1 | 9/2005 | Barnes et al. |
| 2005/0213899 A1 | 9/2005 | Hurley et al. |
| 2005/0213902 A1 | 9/2005 | Parsons |
| 2005/0213921 A1 | 9/2005 | Mertesdorf et al. |
| 2005/0226568 A1 | 10/2005 | Nakajima et al. |
| 2005/0232550 A1 | 10/2005 | Nakajima et al. |
| 2005/0232552 A1 | 10/2005 | Takahashi et al. |
| 2005/0232567 A1 | 10/2005 | Reagan et al. |
| 2005/0244108 A1 | 11/2005 | Billman et al. |
| 2005/0271344 A1 | 12/2005 | Grubish et al. |
| 2005/0281510 A1 | 12/2005 | Vo et al. |
| 2005/0281514 A1 | 12/2005 | Oki et al. |
| 2005/0286837 A1 | 12/2005 | Oki et al. |
| 2005/0286838 A1 | 12/2005 | Oki et al. |
| 2006/0002668 A1 | 1/2006 | Lail et al. |
| 2006/0008232 A1 | 1/2006 | Reagan et al. |
| 2006/0008233 A1 | 1/2006 | Reagan et al. |
| 2006/0008234 A1 | 1/2006 | Reagan et al. |
| 2006/0045428 A1 | 3/2006 | Theuerkorn et al. |
| 2006/0045430 A1 | 3/2006 | Theuerkorn et al. |
| 2006/0056769 A1 | 3/2006 | Khemakhem et al. |
| 2006/0056770 A1 | 3/2006 | Schmitz |
| 2006/0088247 A1 | 4/2006 | Tran et al. |
| 2006/0093278 A1 | 5/2006 | Elkins et al. |
| 2006/0093303 A1 | 5/2006 | Reagan et al. |
| 2006/0093304 A1 | 5/2006 | Battey et al. |
| 2006/0098932 A1 | 5/2006 | Battey et al. |
| 2006/0120672 A1 | 6/2006 | Cody et al. |
| 2006/0127016 A1 | 6/2006 | Baird et al. |
| 2006/0133748 A1 | 6/2006 | Seddon et al. |
| 2006/0133753 A1 | 6/2006 | Mullaney et al. |
| 2006/0133759 A1 | 6/2006 | Mullaney et al. |
| 2006/0147172 A1 | 7/2006 | Luther et al. |
| 2006/0153503 A1 | 7/2006 | Suzuki et al. |
| 2006/0153517 A1 | 7/2006 | Reagan et al. |
| 2006/0165352 A1 | 7/2006 | Caveney et al. |
| 2006/0171638 A1 | 8/2006 | Dye |
| 2006/0171640 A1 | 8/2006 | Dye |

(56) References Cited

U.S. PATENT DOCUMENTS

| | | |
|---|---|---|
| 2006/0210750 A1 | 9/2006 | Morrow et al. |
| 2006/0233506 A1 | 10/2006 | Noonan et al. |
| 2006/0257092 A1 | 11/2006 | Lu et al. |
| 2006/0269204 A1 | 11/2006 | Barth et al. |
| 2006/0269208 A1 | 11/2006 | Allen et al. |
| 2006/0280420 A1 | 12/2006 | Blackwell et al. |
| 2007/0031100 A1 | 2/2007 | Garcia et al. |
| 2007/0036483 A1 | 2/2007 | Shin et al. |
| 2007/0041732 A1 | 2/2007 | Oki et al. |
| 2007/0047897 A1 | 3/2007 | Cooke et al. |
| 2007/0110374 A1 | 5/2007 | Oki et al. |
| 2007/0116413 A1 | 5/2007 | Cox |
| 2007/0127872 A1 | 6/2007 | Caveney et al. |
| 2007/0140642 A1 | 6/2007 | Mertesdorf et al. |
| 2007/0160327 A1 | 7/2007 | Lewallen et al. |
| 2007/0189674 A1 | 8/2007 | Scheibenreif et al. |
| 2007/0237484 A1 | 10/2007 | Reagan et al. |
| 2007/0263961 A1 | 11/2007 | Khemakhem et al. |
| 2007/0286554 A1 | 12/2007 | Kuffel et al. |
| 2008/0019641 A1 | 1/2008 | Elkins et al. |
| 2008/0020532 A1 | 1/2008 | Monfray et al. |
| 2008/0044145 A1 | 2/2008 | Jenkins et al. |
| 2008/0069511 A1 | 3/2008 | Blackwell et al. |
| 2008/0080817 A1 | 4/2008 | Melton et al. |
| 2008/0112681 A1 | 5/2008 | Battey et al. |
| 2008/0131068 A1 | 6/2008 | Mertesdorf et al. |
| 2008/0138016 A1 | 6/2008 | Katagiyama et al. |
| 2008/0138025 A1 | 6/2008 | Reagan et al. |
| 2008/0166906 A1 | 7/2008 | Nania et al. |
| 2008/0175541 A1 | 7/2008 | Lu et al. |
| 2008/0175542 A1 | 7/2008 | Lu et al. |
| 2008/0175544 A1 | 7/2008 | Fujiwara et al. |
| 2008/0175548 A1 | 7/2008 | Knecht et al. |
| 2008/0226252 A1 | 9/2008 | Mertesdorf et al. |
| 2008/0232743 A1 | 9/2008 | Gronvall et al. |
| 2008/0260344 A1 | 10/2008 | Smith et al. |
| 2008/0260345 A1 | 10/2008 | Mertesdorf et al. |
| 2008/0264664 A1 | 10/2008 | Dinh et al. |
| 2008/0273837 A1 | 11/2008 | Margolin et al. |
| 2009/0003772 A1 | 1/2009 | Lu et al. |
| 2009/0034923 A1 | 2/2009 | Miller et al. |
| 2009/0041411 A1 | 2/2009 | Melton et al. |
| 2009/0060421 A1 | 3/2009 | Parikh et al. |
| 2009/0060423 A1 | 3/2009 | Melton et al. |
| 2009/0067791 A1 | 3/2009 | Greenwood et al. |
| 2009/0067849 A1 | 3/2009 | Oki et al. |
| 2009/0074363 A1 | 3/2009 | Parsons et al. |
| 2009/0074369 A1 | 3/2009 | Bolton et al. |
| 2009/0123115 A1 | 5/2009 | Gronvall et al. |
| 2009/0129729 A1 | 5/2009 | Caveney et al. |
| 2009/0148101 A1 | 6/2009 | Lu et al. |
| 2009/0148102 A1 | 6/2009 | Lu et al. |
| 2009/0148103 A1 | 6/2009 | Lu et al. |
| 2009/0148104 A1 | 6/2009 | Lu et al. |
| 2009/0148118 A1 | 6/2009 | Gronvall et al. |
| 2009/0148120 A1 | 6/2009 | Reagan et al. |
| 2009/0156041 A1 | 6/2009 | Radle |
| 2009/0162016 A1 | 6/2009 | Lu et al. |
| 2009/0185835 A1 | 7/2009 | Park et al. |
| 2009/0190895 A1 | 7/2009 | Reagan et al. |
| 2009/0238531 A1 | 9/2009 | Holmberg et al. |
| 2009/0245737 A1 | 10/2009 | Fujiwara et al. |
| 2009/0245743 A1 | 10/2009 | Cote et al. |
| 2009/0263097 A1 | 10/2009 | Solheid et al. |
| 2009/0297112 A1 | 12/2009 | Mertesdorf et al. |
| 2009/0317039 A1 | 12/2009 | Blazer et al. |
| 2009/0317045 A1 | 12/2009 | Reagan et al. |
| 2010/0008909 A1 | 1/2010 | Siadak et al. |
| 2010/0014813 A1 | 1/2010 | Ito et al. |
| 2010/0014824 A1 | 1/2010 | Lu et al. |
| 2010/0014867 A1 | 1/2010 | Ramanitra et al. |
| 2010/0015834 A1 | 1/2010 | Siebens |
| 2010/0021254 A1 | 1/2010 | Jenkins et al. |
| 2010/0034502 A1 | 2/2010 | Lu et al. |
| 2010/0040331 A1 | 2/2010 | Khemakhem et al. |
| 2010/0040338 A1 | 2/2010 | Sek |
| 2010/0061685 A1 | 3/2010 | Kowalczyk et al. |
| 2010/0074578 A1 | 3/2010 | Imaizumi et al. |
| 2010/0080516 A1 | 4/2010 | Coleman et al. |
| 2010/0086260 A1 | 4/2010 | Parikh et al. |
| 2010/0086267 A1 | 4/2010 | Cooke et al. |
| 2010/0092129 A1 | 4/2010 | Conner |
| 2010/0092133 A1 | 4/2010 | Conner |
| 2010/0092136 A1 | 4/2010 | Nhep |
| 2010/0092146 A1 | 4/2010 | Conner et al. |
| 2010/0092169 A1 | 4/2010 | Conner et al. |
| 2010/0092171 A1 | 4/2010 | Conner |
| 2010/0129034 A1 | 5/2010 | Kuffel et al. |
| 2010/0144183 A1 | 6/2010 | Nania et al. |
| 2010/0172616 A1 | 7/2010 | Lu et al. |
| 2010/0197222 A1 | 8/2010 | Scheucher |
| 2010/0215321 A1 | 8/2010 | Jenkins |
| 2010/0220962 A1 | 9/2010 | Caveney et al. |
| 2010/0226615 A1 | 9/2010 | Reagan et al. |
| 2010/0232753 A1 | 9/2010 | Parris et al. |
| 2010/0247053 A1 | 9/2010 | Cowen et al. |
| 2010/0266242 A1 | 10/2010 | Lu et al. |
| 2010/0266244 A1 | 10/2010 | Lu et al. |
| 2010/0266245 A1 | 10/2010 | Sabo |
| 2010/0272399 A1 | 10/2010 | Griffiths et al. |
| 2010/0284662 A1 | 11/2010 | Reagan et al. |
| 2010/0290741 A1 | 11/2010 | Lu et al. |
| 2010/0303426 A1 | 12/2010 | Davis |
| 2010/0303427 A1 | 12/2010 | Rambow et al. |
| 2010/0310213 A1 | 12/2010 | Lewallen et al. |
| 2010/0322563 A1 | 12/2010 | Melton et al. |
| 2010/0329625 A1 | 12/2010 | Reagan et al. |
| 2011/0019964 A1 | 1/2011 | Nhep et al. |
| 2011/0047731 A1 | 3/2011 | Sugita et al. |
| 2011/0067452 A1 | 3/2011 | Gronvall et al. |
| 2011/0069932 A1 | 3/2011 | Overton et al. |
| 2011/0097050 A1* | 4/2011 | Blackwell, Jr. ...... G02B 6/4441 385/88 |
| 2011/0108719 A1 | 5/2011 | Ford et al. |
| 2011/0116749 A1 | 5/2011 | Kuffel et al. |
| 2011/0123166 A1 | 5/2011 | Reagan et al. |
| 2011/0129186 A1 | 6/2011 | Lewallen et al. |
| 2011/0164854 A1 | 7/2011 | Desard et al. |
| 2011/0262099 A1 | 10/2011 | Castonguay et al. |
| 2011/0262100 A1 | 10/2011 | Reagan et al. |
| 2011/0299814 A1 | 12/2011 | Nakagawa |
| 2011/0305421 A1 | 12/2011 | Caveney et al. |
| 2012/0008909 A1 | 1/2012 | Mertesdorf et al. |
| 2012/0045179 A1 | 2/2012 | Theuerkorn |
| 2012/0063724 A1 | 3/2012 | Kuffel et al. |
| 2012/0063729 A1 | 3/2012 | Fujiwara et al. |
| 2012/0106912 A1 | 5/2012 | McGranahan et al. |
| 2012/0106913 A1 | 5/2012 | Makrides-Saravanos et al. |
| 2012/0121223 A1* | 5/2012 | Tamura ............... G02B 6/4278 385/92 |
| 2012/0134629 A1 | 5/2012 | Lu et al. |
| 2012/0183268 A1 | 7/2012 | De Montmorillon et al. |
| 2012/0213478 A1 | 8/2012 | Chen et al. |
| 2012/0251060 A1 | 10/2012 | Hurley |
| 2012/0251063 A1 | 10/2012 | Reagan et al. |
| 2012/0252244 A1 | 10/2012 | Elkins, II et al. |
| 2012/0275749 A1 | 11/2012 | Kuffel et al. |
| 2012/0321256 A1 | 12/2012 | Caveney et al. |
| 2013/0004122 A1 | 1/2013 | Kingsbury |
| 2013/0020480 A1 | 1/2013 | Ford et al. |
| 2013/0034333 A1 | 2/2013 | Holmberg et al. |
| 2013/0064506 A1 | 3/2013 | Eberle, Jr. et al. |
| 2013/0094821 A1 | 4/2013 | Logan |
| 2013/0109213 A1 | 5/2013 | Chang |
| 2013/0114930 A1 | 5/2013 | Smith et al. |
| 2013/0136402 A1 | 5/2013 | Kuffel et al. |
| 2013/0170834 A1 | 7/2013 | Cho et al. |
| 2013/0209099 A1 | 8/2013 | Reagan et al. |
| 2013/0236139 A1 | 9/2013 | Chen et al. |
| 2013/0266562 A1 | 10/2013 | Siadak et al. |
| 2013/0315538 A1 | 11/2013 | Kuffel et al. |
| 2014/0016902 A1* | 1/2014 | Pepe ..................... H01R 13/62 403/376 |
| 2014/0056561 A1 | 2/2014 | Lu et al. |

(56) References Cited

U.S. PATENT DOCUMENTS

| | | |
|---|---|---|
| 2014/0079356 A1 | 3/2014 | Pepin et al. |
| 2014/0133804 A1 | 5/2014 | Lu et al. |
| 2014/0133806 A1 | 5/2014 | Hill et al. |
| 2014/0133807 A1 | 5/2014 | Katoh |
| 2014/0133808 A1 | 5/2014 | Hill et al. |
| 2014/0153876 A1 | 6/2014 | Dendas et al. |
| 2014/0153878 A1 | 6/2014 | Mullaney |
| 2014/0161397 A1 | 6/2014 | Gallegos et al. |
| 2014/0205257 A1 | 7/2014 | Durrant et al. |
| 2014/0219609 A1 | 8/2014 | Nielson et al. |
| 2014/0219622 A1 | 8/2014 | Coan et al. |
| 2014/0226945 A1* | 8/2014 | Claessens ............ G02B 6/4478 385/135 |
| 2014/0233896 A1 | 8/2014 | Ishigami et al. |
| 2014/0241670 A1 | 8/2014 | Barnette et al. |
| 2014/0241671 A1 | 8/2014 | Koreeda et al. |
| 2014/0241689 A1 | 8/2014 | Bradley et al. |
| 2014/0254987 A1 | 9/2014 | Caveney et al. |
| 2014/0294395 A1 | 10/2014 | Waldron et al. |
| 2014/0314379 A1 | 10/2014 | Lu et al. |
| 2014/0328559 A1 | 11/2014 | Kobayashi et al. |
| 2014/0341511 A1 | 11/2014 | Daems et al. |
| 2014/0348467 A1 | 11/2014 | Cote et al. |
| 2014/0355936 A1 | 12/2014 | Bund et al. |
| 2015/0003787 A1 | 1/2015 | Chen et al. |
| 2015/0003788 A1 | 1/2015 | Chen et al. |
| 2015/0036982 A1 | 2/2015 | Nhep et al. |
| 2015/0110451 A1 | 4/2015 | Blazer et al. |
| 2015/0153532 A1 | 6/2015 | Holmberg et al. |
| 2015/0168657 A1 | 6/2015 | Islam |
| 2015/0183869 A1 | 7/2015 | Siadak et al. |
| 2015/0185423 A1 | 7/2015 | Matsui et al. |
| 2015/0253527 A1 | 9/2015 | Hill et al. |
| 2015/0253528 A1 | 9/2015 | Corbille et al. |
| 2015/0268423 A1 | 9/2015 | Burkholder et al. |
| 2015/0268434 A1 | 9/2015 | Barnei, Jr. et al. |
| 2015/0293310 A1 | 10/2015 | Kanno |
| 2015/0309274 A1 | 10/2015 | Hurley et al. |
| 2015/0316727 A1 | 11/2015 | Kondo et al. |
| 2015/0346435 A1 | 12/2015 | Kato |
| 2015/0346436 A1 | 12/2015 | Pepe et al. |
| 2016/0015885 A1 | 1/2016 | Pananen et al. |
| 2016/0041346 A1 | 2/2016 | Barnette et al. |
| 2016/0062053 A1 | 3/2016 | Mullaney |
| 2016/0085032 A1 | 3/2016 | Lu et al. |
| 2016/0109671 A1 | 4/2016 | Coan et al. |
| 2016/0116686 A1 | 4/2016 | Durrant et al. |
| 2016/0126667 A1 | 5/2016 | Droesbeke et al. |
| 2016/0131851 A1 | 5/2016 | Theuerkorn |
| 2016/0131857 A1 | 5/2016 | Pimentel et al. |
| 2016/0139346 A1 | 5/2016 | Bund et al. |
| 2016/0154184 A1 | 6/2016 | Bund et al. |
| 2016/0161682 A1 | 6/2016 | Nishimura |
| 2016/0161688 A1 | 6/2016 | Nishimura |
| 2016/0161689 A1 | 6/2016 | Nishimura |
| 2016/0187590 A1 | 6/2016 | Lu |
| 2016/0202431 A1 | 7/2016 | Hill et al. |
| 2016/0209599 A1 | 7/2016 | Van Baelen et al. |
| 2016/0209602 A1 | 7/2016 | Theuerkorn |
| 2016/0216468 A1 | 7/2016 | Gimblet et al. |
| 2016/0238810 A1 | 8/2016 | Hubbard et al. |
| 2016/0246019 A1 | 8/2016 | Ishii et al. |
| 2016/0259133 A1 | 9/2016 | Kobayashi et al. |
| 2016/0259134 A1 | 9/2016 | Daems et al. |
| 2016/0306122 A1 | 10/2016 | Tong et al. |
| 2016/0327754 A1 | 11/2016 | Hill et al. |
| 2017/0023758 A1 | 1/2017 | Reagan et al. |
| 2017/0045699 A1 | 2/2017 | Coan et al. |
| 2017/0052325 A1 | 2/2017 | Mullaney et al. |
| 2017/0123163 A1 | 5/2017 | Lu et al. |
| 2017/0123165 A1 | 5/2017 | Barnette et al. |
| 2017/0131509 A1 | 5/2017 | Xiao et al. |
| 2017/0139158 A1 | 5/2017 | Coenegracht |
| 2017/0168248 A1 | 6/2017 | Hayauchi et al. |
| 2017/0168256 A1 | 6/2017 | Reagan et al. |
| 2017/0170596 A1 | 6/2017 | Goossens et al. |
| 2017/0176252 A1 | 6/2017 | Marple et al. |
| 2017/0176690 A1 | 6/2017 | Bretz et al. |
| 2017/0182160 A1 | 6/2017 | Siadak et al. |
| 2017/0219782 A1 | 8/2017 | Nishimura |
| 2017/0235067 A1 | 8/2017 | Holmberg et al. |
| 2017/0238822 A1 | 8/2017 | Young et al. |
| 2017/0254961 A1 | 9/2017 | Kamada et al. |
| 2017/0254962 A1 | 9/2017 | Mueller-Schlomka et al. |
| 2017/0261696 A1* | 9/2017 | Compton ............ G02B 6/3893 |
| 2017/0261698 A1 | 9/2017 | Compton et al. |
| 2017/0261699 A1 | 9/2017 | Compton et al. |
| 2017/0285275 A1 | 10/2017 | Hill et al. |
| 2017/0288315 A1 | 10/2017 | Scheucher |
| 2017/0293091 A1 | 10/2017 | Lu et al. |
| 2017/0336587 A1 | 11/2017 | Coan et al. |
| 2017/0343741 A1 | 11/2017 | Coenegracht et al. |
| 2017/0343745 A1 | 11/2017 | Rosson |
| 2017/0351037 A1 | 12/2017 | Watanabe et al. |
| 2018/0031774 A1 | 2/2018 | Van Baelen et al. |
| 2018/0081127 A1 | 3/2018 | Coenegracht |
| 2018/0143386 A1 | 5/2018 | Coan et al. |
| 2018/0151960 A1 | 5/2018 | Scheucher |
| 2018/0180831 A1 | 6/2018 | Blazer et al. |
| 2018/0224610 A1 | 8/2018 | Pimentel et al. |
| 2018/0239094 A1 | 8/2018 | Barnette et al. |
| 2018/0246283 A1 | 8/2018 | Pepe et al. |
| 2018/0259721 A1 | 9/2018 | Bund et al. |
| 2018/0329149 A1 | 11/2018 | Mullaney et al. |
| 2018/0329153 A1* | 11/2018 | Verheyden ............ G02B 6/3849 |
| 2018/0372962 A1 | 12/2018 | Isenhour et al. |
| 2019/0004251 A1 | 1/2019 | Dannoux et al. |
| 2019/0004255 A1 | 1/2019 | Dannoux et al. |
| 2019/0004256 A1 | 1/2019 | Rosson |
| 2019/0004258 A1 | 1/2019 | Dannoux et al. |
| 2019/0011641 A1 | 1/2019 | Isenhour et al. |
| 2019/0018210 A1 | 1/2019 | Coan et al. |
| 2019/0033532 A1 | 1/2019 | Gimblet et al. |
| 2019/0038743 A1 | 2/2019 | Siadak et al. |
| 2019/0041584 A1 | 2/2019 | Coenegracht et al. |
| 2019/0041585 A1 | 2/2019 | Bretz et al. |
| 2019/0041595 A1 | 2/2019 | Reagan et al. |
| 2019/0058259 A1 | 2/2019 | Scheucher |
| 2019/0107677 A1 | 4/2019 | Coenegracht et al. |
| 2019/0147202 A1 | 5/2019 | Harney |
| 2019/0162910 A1 | 5/2019 | Gurreri |
| 2019/0162914 A1 | 5/2019 | Baca et al. |
| 2019/0170961 A1* | 6/2019 | Coengracht ............ G02B 6/4444 |
| 2019/0187396 A1 | 6/2019 | Finnegan et al. |
| 2019/0235177 A1 | 8/2019 | Lu et al. |
| 2019/0250338 A1 | 8/2019 | Mullaney et al. |
| 2019/0271817 A1 | 9/2019 | Coenegracht |
| 2019/0324217 A1 | 10/2019 | Lu et al. |
| 2019/0339460 A1 | 11/2019 | Dannoux et al. |
| 2019/0339461 A1 | 11/2019 | Dannoux et al. |
| 2019/0369336 A1 | 12/2019 | Van Baelen et al. |
| 2019/0369345 A1 | 12/2019 | Reagan et al. |
| 2019/0374637 A1 | 12/2019 | Siadak et al. |
| 2020/0012051 A1 | 1/2020 | Coenegracht et al. |
| 2020/0036101 A1 | 1/2020 | Scheucher |
| 2020/0049922 A1 | 2/2020 | Rosson |
| 2020/0057205 A1 | 2/2020 | Dannoux et al. |
| 2020/0057222 A1 | 2/2020 | Dannoux et al. |
| 2020/0057223 A1 | 2/2020 | Dannoux et al. |
| 2020/0057224 A1 | 2/2020 | Dannoux et al. |
| 2020/0057723 A1 | 2/2020 | Chirca et al. |
| 2020/0096705 A1 | 3/2020 | Rosson |
| 2020/0096709 A1 | 3/2020 | Rosson |
| 2020/0096710 A1 | 3/2020 | Rosson |
| 2020/0103599 A1 | 4/2020 | Rosson |
| 2020/0103608 A1 | 4/2020 | Johnson et al. |
| 2020/0110229 A1 | 4/2020 | Dannoux et al. |
| 2020/0110234 A1 | 4/2020 | Holmberg et al. |
| 2020/0116949 A1 | 4/2020 | Rosson |
| 2020/0116952 A1 | 4/2020 | Rosson |
| 2020/0116953 A1 | 4/2020 | Rosson |
| 2020/0116954 A1 | 4/2020 | Rosson |
| 2020/0116958 A1 | 4/2020 | Dannoux et al. |
| 2020/0116962 A1 | 4/2020 | Dannoux et al. |

(56) References Cited

U.S. PATENT DOCUMENTS

| | | | |
|---|---|---|---|
| 2020/0124812 A1 | 4/2020 | Dannoux et al. |
| 2020/0132939 A1 | 4/2020 | Coenegracht et al. |
| 2020/0192042 A1 | 6/2020 | Coan et al. |
| 2020/0209492 A1 | 7/2020 | Rosson |
| 2020/0218017 A1 | 7/2020 | Coenegracht |
| 2020/0225422 A1 | 7/2020 | Van Baelen et al. |
| 2020/0225424 A1 | 7/2020 | Coenegracht |
| 2020/0241211 A1 | 7/2020 | Shonkwiler et al. |
| 2020/0348476 A1 | 11/2020 | Hill et al. |
| 2020/0371306 A1 | 11/2020 | Mosier et al. |
| 2020/0393629 A1 | 12/2020 | Hill et al. |
| 2021/0318499 A1 | 10/2021 | Cote et al. |

FOREIGN PATENT DOCUMENTS

| | | | |
|---|---|---|---|
| CN | 1071012 A | 4/1993 |
| CN | 1213783 A | 4/1999 |
| CN | 1114839 C | 7/2003 |
| CN | 1646962 A | 7/2005 |
| CN | 1833188 A | 9/2006 |
| CN | 1922523 A | 2/2007 |
| CN | 1985205 A | 6/2007 |
| CN | 101084461 A | 12/2007 |
| CN | 101111790 A | 1/2008 |
| CN | 101195453 A | 6/2008 |
| CN | 201404194 Y | 2/2010 |
| CN | 201408274 Y | 2/2010 |
| CN | 201522561 U | 7/2010 |
| CN | 101806939 A | 8/2010 |
| CN | 101846773 A | 9/2010 |
| CN | 101866034 A | 10/2010 |
| CN | 101939680 A | 1/2011 |
| CN | 201704194 U | 1/2011 |
| CN | 102141655 A | 8/2011 |
| CN | 102346281 A | 2/2012 |
| CN | 202282523 U | 6/2012 |
| CN | 203224645 U | 10/2013 |
| CN | 203396982 U | 1/2014 |
| CN | 103713362 A | 4/2014 |
| CN | 104064903 A | 9/2014 |
| CN | 104280830 A | 1/2015 |
| CN | 104603656 A | 5/2015 |
| CN | 105467529 A | 4/2016 |
| CN | 105492946 A | 4/2016 |
| CN | 106716205 A | 5/2017 |
| CN | 106873086 A | 6/2017 |
| EP | 0026553 A1 | 4/1981 |
| EP | 0244791 A2 | 11/1987 |
| EP | 0547788 A1 | 6/1993 |
| EP | 0782025 A1 | 7/1997 |
| EP | 0856751 A1 | 8/1998 |
| EP | 957381 A1 | 11/1999 |
| EP | 1243957 A2 | 9/2002 |
| EP | 1391762 A1 | 2/2004 |
| EP | 1431786 A2 | 6/2004 |
| EP | 1438622 A2 | 7/2004 |
| EP | 1678537 A1 | 7/2006 |
| EP | 1759231 A1 | 3/2007 |
| EP | 1810062 A1 | 7/2007 |
| EP | 2069845 A2 | 6/2009 |
| EP | 2149063 A1 | 2/2010 |
| EP | 2150847 A1 | 2/2010 |
| EP | 2193395 A1 | 6/2010 |
| EP | 2255233 A1 | 12/2010 |
| EP | 2333597 A2 | 6/2011 |
| EP | 2362253 A1 | 8/2011 |
| EP | 2401641 A1 | 1/2012 |
| EP | 2609458 A1 | 7/2013 |
| EP | 2622395 A1 | 8/2013 |
| EP | 2734879 A1 | 5/2014 |
| EP | 2815259 A1 | 12/2014 |
| EP | 2817667 A1 | 12/2014 |
| EP | 2992372 A1 | 3/2016 |
| EP | 3022596 A1 | 5/2016 |
| EP | 3064973 A2 | 9/2016 |
| EP | 3101740 A1 | 12/2016 |
| EP | 3245545 A1 | 11/2017 |
| EP | 3265859 A1 | 1/2018 |
| EP | 3336992 A1 | 6/2018 |
| EP | 3362830 A1 | 8/2018 |
| EP | 3427096 A1 | 1/2019 |
| EP | 3443395 A1 | 2/2019 |
| EP | 3535614 A1 | 9/2019 |
| EP | 3537197 A1 | 9/2019 |
| EP | 3646074 A1 | 5/2020 |
| EP | 3646079 A1 | 5/2020 |
| FR | 2485754 A1 | 12/1981 |
| JP | 61-145509 A | 7/1986 |
| JP | 63089421 A | 4/1988 |
| JP | 63078908 U | 5/1988 |
| JP | 03-063615 A | 3/1991 |
| JP | 03207223 A | 9/1991 |
| JP | 05-297246 A | 11/1993 |
| JP | 06-320111 A | 11/1994 |
| JP | 07318758 A | 12/1995 |
| JP | 08292331 A | 11/1996 |
| JP | 09-135526 A | 5/1997 |
| JP | 09-325249 A | 12/1997 |
| JP | 10-339826 A | 12/1998 |
| JP | 11064682 A | 3/1999 |
| JP | 11-281861 A | 10/1999 |
| JP | 11326693 A | 11/1999 |
| JP | 2001290051 A | 10/2001 |
| JP | 2003121699 A | 4/2003 |
| JP | 2003177279 A | 6/2003 |
| JP | 2005031544 A | 2/2005 |
| JP | 2005077591 A | 3/2005 |
| JP | 2005-520987 A | 7/2005 |
| JP | 2006023502 A | 1/2006 |
| JP | 2006-259631 A | 9/2006 |
| JP | 2006337637 A | 12/2006 |
| JP | 2007078740 A | 3/2007 |
| JP | 2007121859 A | 5/2007 |
| JP | 2009265208 A | 11/2009 |
| JP | 2010152084 A | 7/2010 |
| JP | 2011033698 A | 2/2011 |
| JP | 2013156580 A | 8/2013 |
| JP | 2014085474 A | 5/2014 |
| JP | 05537852 B2 | 7/2014 |
| JP | 05538328 B2 | 7/2014 |
| JP | 2014134746 A | 7/2014 |
| JP | 3207233 U | 11/2016 |
| KR | 1020130081087 A | 7/2013 |
| TW | 222688 B | 4/1994 |
| WO | 01/92927 A2 | 12/2001 |
| WO | 03/36358 A2 | 5/2003 |
| WO | 2004/061509 A1 | 7/2004 |
| WO | 2005/045494 A1 | 5/2005 |
| WO | 2006/009597 A1 | 1/2006 |
| WO | 2006/052420 A1 | 5/2006 |
| WO | 2006113726 A1 | 10/2006 |
| WO | 2008/027201 A2 | 3/2008 |
| WO | 2008/150408 A1 | 12/2008 |
| WO | 2008/150423 A1 | 12/2008 |
| WO | 2009/042066 A1 | 4/2009 |
| WO | 2009/113819 A1 | 9/2009 |
| WO | 2009/117060 A1 | 9/2009 |
| WO | 2009/154990 A2 | 12/2009 |
| WO | 2010/092009 A1 | 8/2010 |
| WO | 2010/099141 A1 | 9/2010 |
| WO | 2011/044090 A2 | 4/2011 |
| WO | 2011/047111 A1 | 4/2011 |
| WO | 2012/027313 A1 | 3/2012 |
| WO | 2012037727 A1 | 3/2012 |
| WO | 2012/044741 A1 | 4/2012 |
| WO | 2012163052 A1 | 12/2012 |
| WO | 2013/016042 A1 | 1/2013 |
| WO | 2013/055714 A1 | 4/2013 |
| WO | 2013/083729 A2 | 6/2013 |
| WO | 2013/122752 A1 | 8/2013 |
| WO | 2013/126488 A1 | 8/2013 |
| WO | 2014151259 A1 | 9/2014 |
| WO | 2014167447 A1 | 10/2014 |
| WO | 2014/179411 A1 | 11/2014 |

(56) References Cited

FOREIGN PATENT DOCUMENTS

| | | | |
|---|---|---|---|
| WO | 2014197894 A1 | 12/2014 | |
| WO | 2015/047508 A1 | 4/2015 | |
| WO | 2015144883 A1 | 10/2015 | |
| WO | WO-2015144883 A1 * | 10/2015 | ........... G02B 6/3817 |
| WO | 2015/197588 A1 | 12/2015 | |
| WO | 2016/059320 A1 | 4/2016 | |
| WO | 2016/073862 A2 | 5/2016 | |
| WO | 2016095213 A1 | 6/2016 | |
| WO | 2016100078 A1 | 6/2016 | |
| WO | 2016/115288 A1 | 7/2016 | |
| WO | 2016156610 A1 | 10/2016 | |
| WO | 2016168389 A1 | 10/2016 | |
| WO | WO-2016156610 A1 * | 10/2016 | ........... G02B 6/3825 |
| WO | 2017/063107 A1 | 4/2017 | |
| WO | 2017/146722 A1 | 8/2017 | |
| WO | 2017/155754 A1 | 9/2017 | |
| WO | 2017/178920 A1 | 10/2017 | |
| WO | 2018/083561 A1 | 5/2018 | |
| WO | 2018/175123 A1 | 9/2018 | |
| WO | 2018/204864 A1 | 11/2018 | |
| WO | 2019005190 A2 | 1/2019 | |
| WO | 2019005191 A1 | 1/2019 | |
| WO | 2019005192 A1 | 1/2019 | |
| WO | 2019005193 A1 | 1/2019 | |
| WO | 2019005194 A1 | 1/2019 | |
| WO | 2019005195 A1 | 1/2019 | |
| WO | 2019005196 A1 | 1/2019 | |
| WO | 2019005197 A1 | 1/2019 | |
| WO | 2019005198 A1 | 1/2019 | |
| WO | 2019005199 A1 | 1/2019 | |
| WO | 2019005200 A1 | 1/2019 | |
| WO | 2019005201 A1 | 1/2019 | |
| WO | 2019005202 A1 | 1/2019 | |
| WO | 2019005203 A1 | 1/2019 | |
| WO | 2019005204 A1 | 1/2019 | |
| WO | 2019/036339 A1 | 2/2019 | |
| WO | 2019/126333 A1 | 6/2019 | |
| WO | 2019/195652 A1 | 10/2019 | |
| WO | 2020/101850 A1 | 5/2020 | |

OTHER PUBLICATIONS

Ramanitra et al. "Optical access network using a self-latching variable splitter remotely powered through an optical fiber link," Optical Engineering 46(4) p. 45007-1-9, Apr. 2007.

Ratnam et al. "Burst switching using variable optical splitter based switches with wavelength conversion," ICIIS 2017—Poeceedings Jan. 2018, pp. 1-6.

Wang et al. "Opto-VLSI-based dynamic optical splitter," Electron. Lett.0013-5194 10.1049/el:20046715 40(22), 14451446 (2004).

Xiao et al. "1×N wavelength selective adaptive optical power splitter for wavelength-division-multiplexed passive optical networks," Optics & Laser Technology 68, pp. 160-164, May 2015.

Coaxum, L., et al., U.S. Provisional U.S. Appl. No. 62/341,947, "Fiber Optic Multiport Having Different Types of Ports for Multi-Use," filed May 26, 2016.

International Search Report and Written Opinion PCT/US2017/063938 dated May 14, 2018.
International Search Report and Written Opinion PCT/US2017/063953 dated May 14, 2018.
International Search Report and Written Opinion PCT/US2017/063991 dated May 14, 2018.
International Search Report and Written Opinion PCT/US2017/064027 dated Oct. 9, 2018.
International Search Report and Written Opinion PCT/US2017/064063 dated May 15, 2018.
International Search Report and Written Opinion PCT/US2017/064071 dated May 14, 2018.
International Search Report and Written Opinion PCT/US2017/064072 dated May 14, 2018.
International Search Report and Written Opinion PCT/US2017/064077 dated Feb. 26, 2018.
International Search Report and Written Opinion PCT/US2017/064084 dated Feb. 26, 2018.
International Search Report and Written Opinion PCT/US2017/064087 dated Feb. 26, 2018.
International Search Report and Written Opinion PCT/US2017/064092 dated Feb. 23, 2018.
International Search Report and Written Opinion PCT/US2017/064093 dated Feb. 26, 2018.
International Search Report and Written Opinion PCT/US2017/064095 dated Feb. 23, 2018.
International Search Report and Written Opinion PCT/US2017/064096 dated Feb. 26, 2018.
International Search Report and Written Opinion PCT/US2018/039019 dated Sep. 18, 2018.
International Search Report and Written Opinion PCT/US2018/039490 dated Oct. 4, 2018.
International Search Report and Written Opinion PCT/US2018/039494 dated Oct. 11, 2018.
International Search Report and Written Opinion PCT/US2018/040011 dated Oct. 5, 2018.
International Search Report and Written Opinion PCT/US2018/040104 dated Oct. 9, 2018.
International Search Report and Written Opinion PCT/US2018/040126 dated Oct. 9, 2018.
International Search Report and Written Opinion PCT/US2018/040130 dated Sep. 18, 2018.
Notice of Allowance Received for U.S. Appl. No. 16/018,997 dated Oct. 4, 2018.
Office Action Pertaining to U.S. Appl. No. 16/018,918 dated Sep. 28, 2018.
Office Action Pertaining to U.S. Appl. No. 16/018,988 dated Oct. 31, 2018.
Office Action Pertaining to U.S. Appl. No. 16/109,008 dated Oct. 31, 2018.
Invitation to Pay Additional Fees of the European International Searching Authority; PCT/US2019/058316; dated Feb. 14, 2020; 12 Pgs.
Liu et al., "Variable optical power splitters create new apps", Retrieved from: https://www.lightwaveonline.com/fttx/pon-systems/article/16648432/variable-optical-power-splitters-create-new-apps, 2005, 14 pages.

* cited by examiner

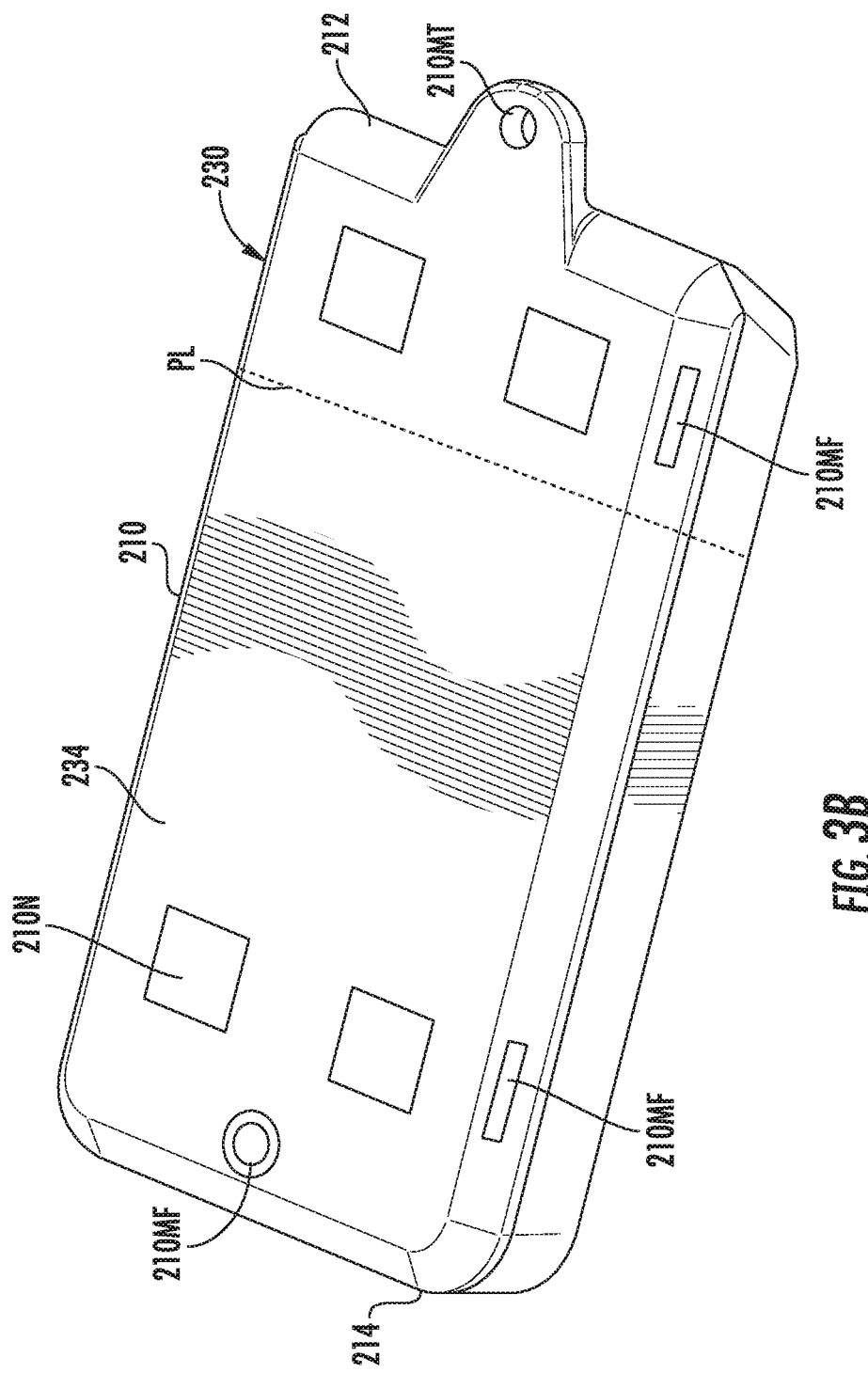

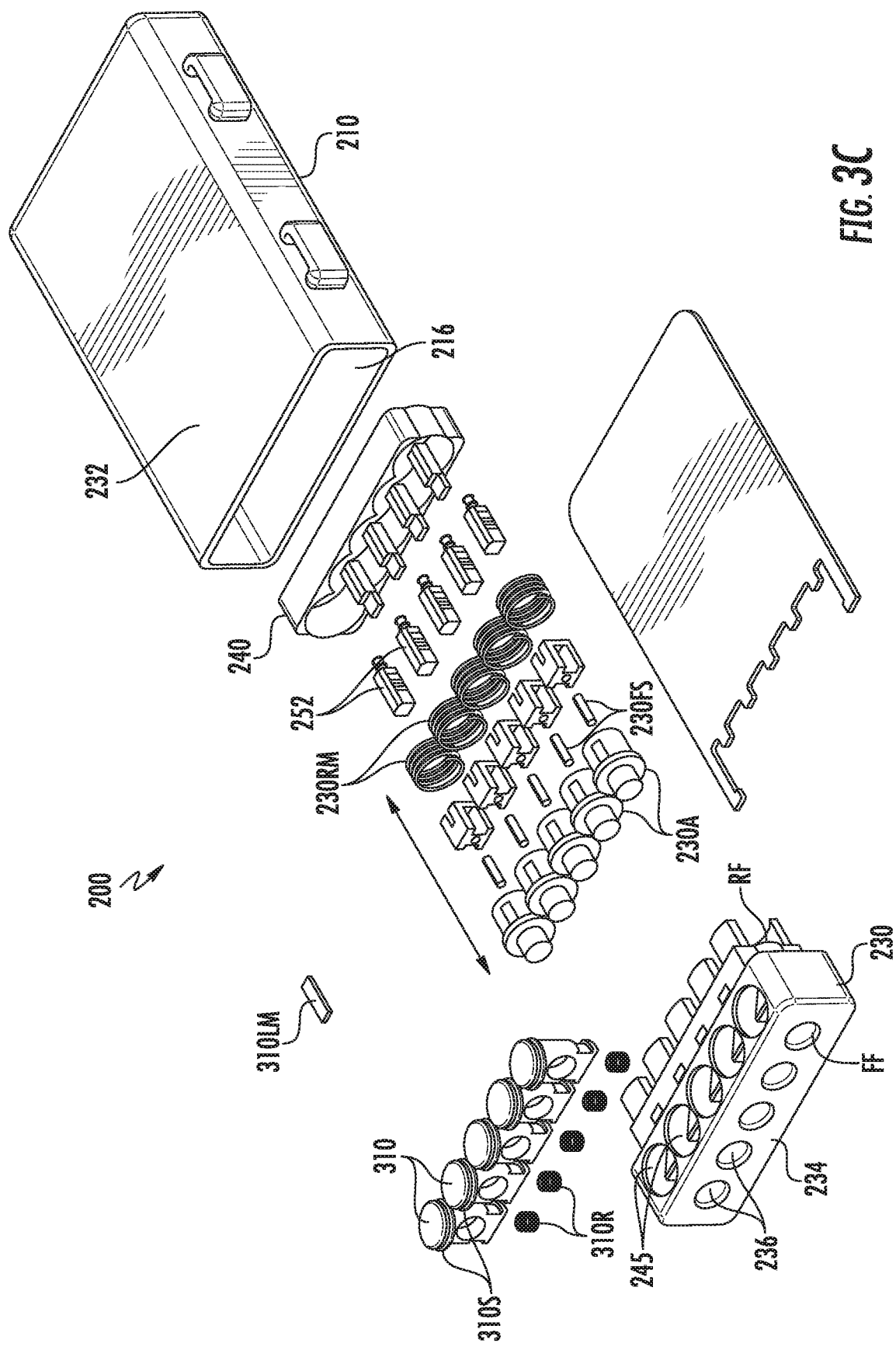

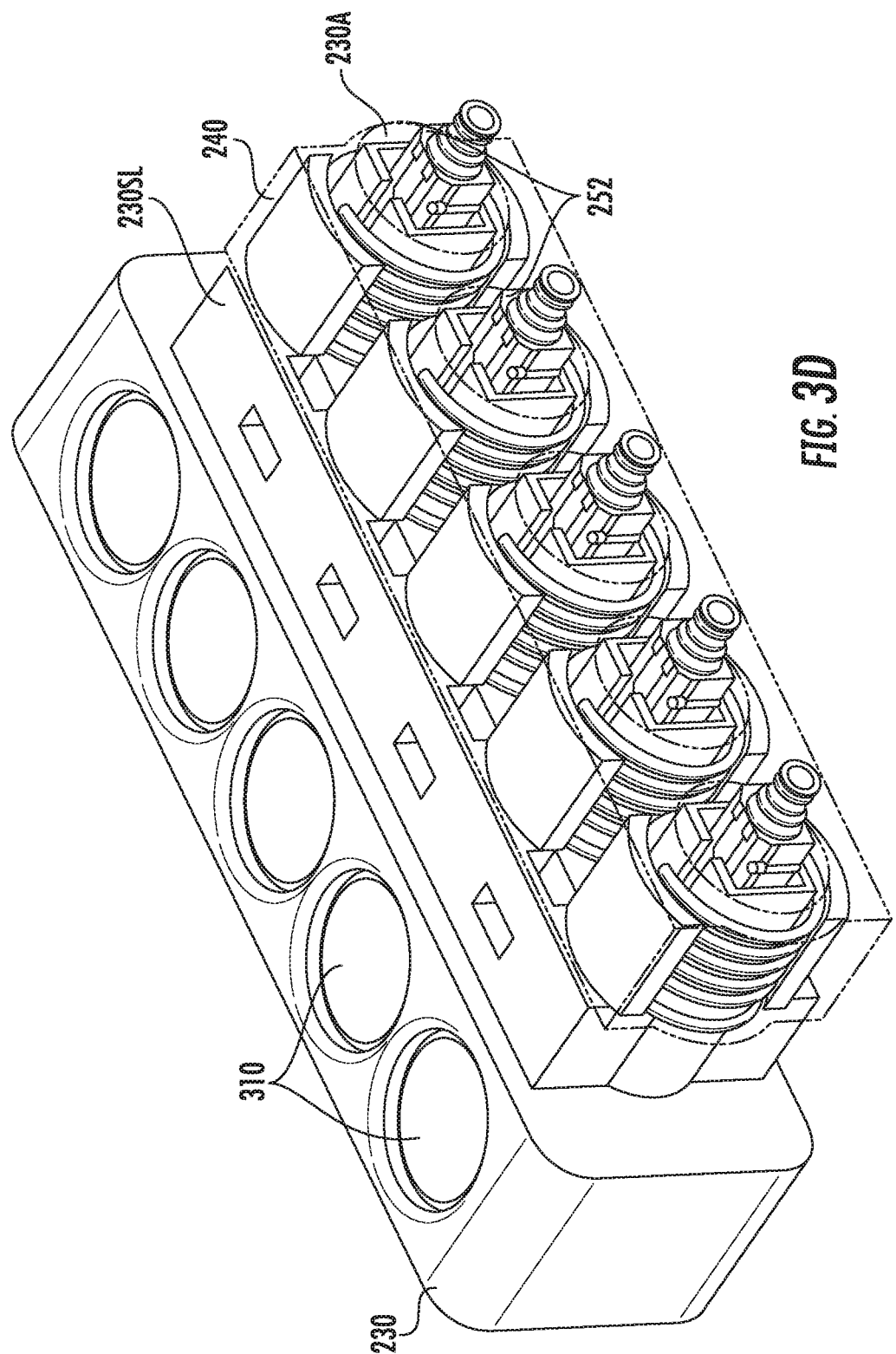

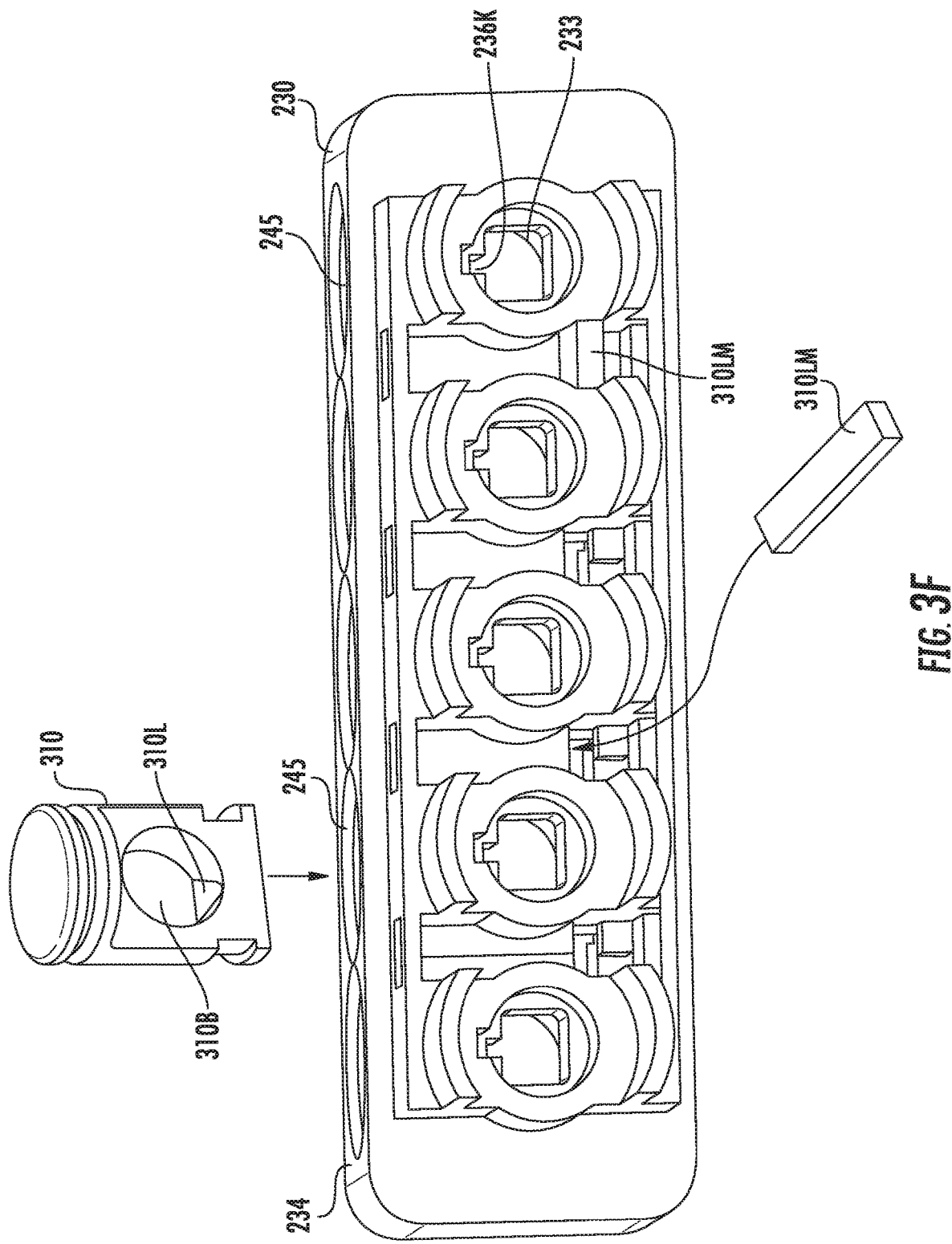

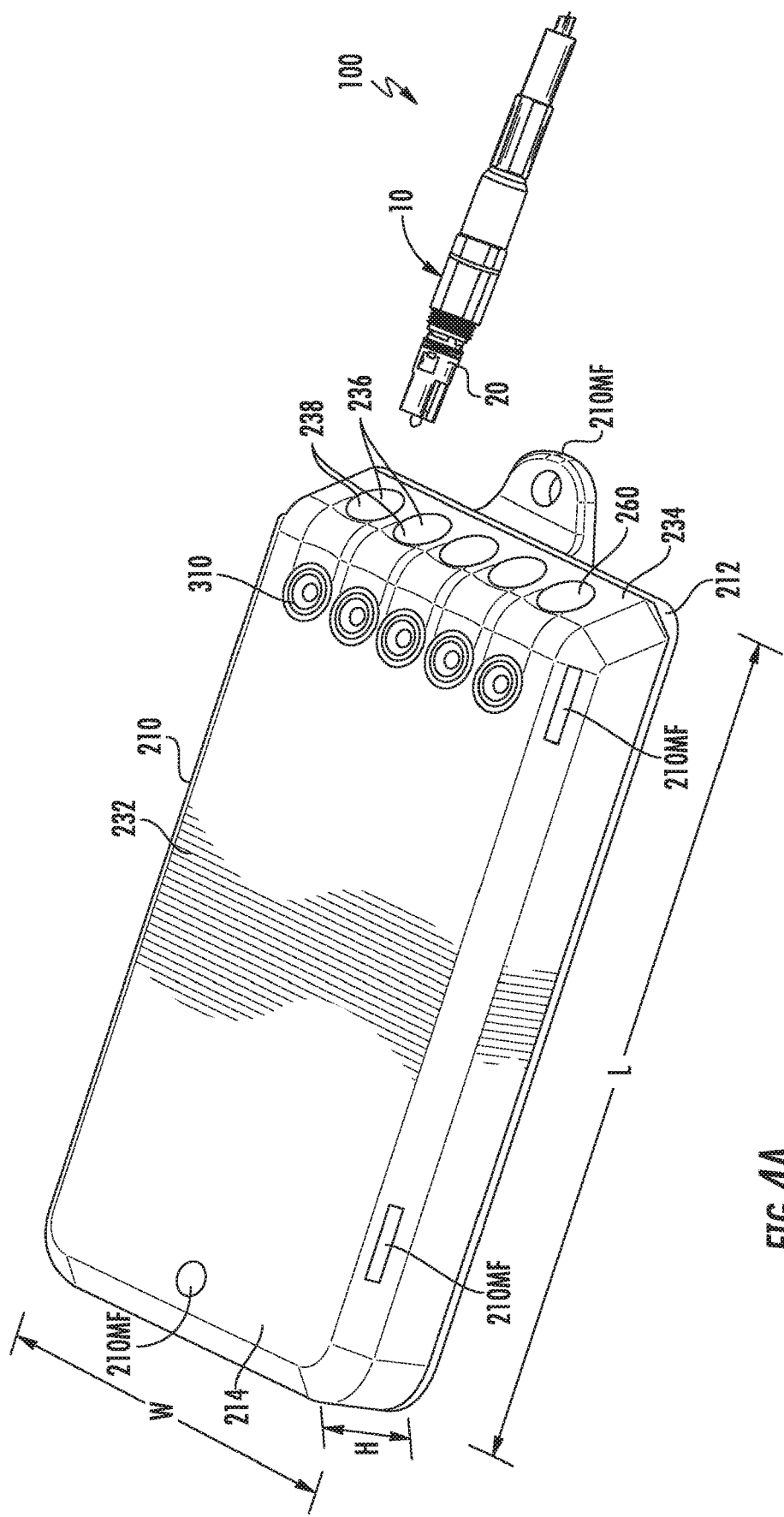

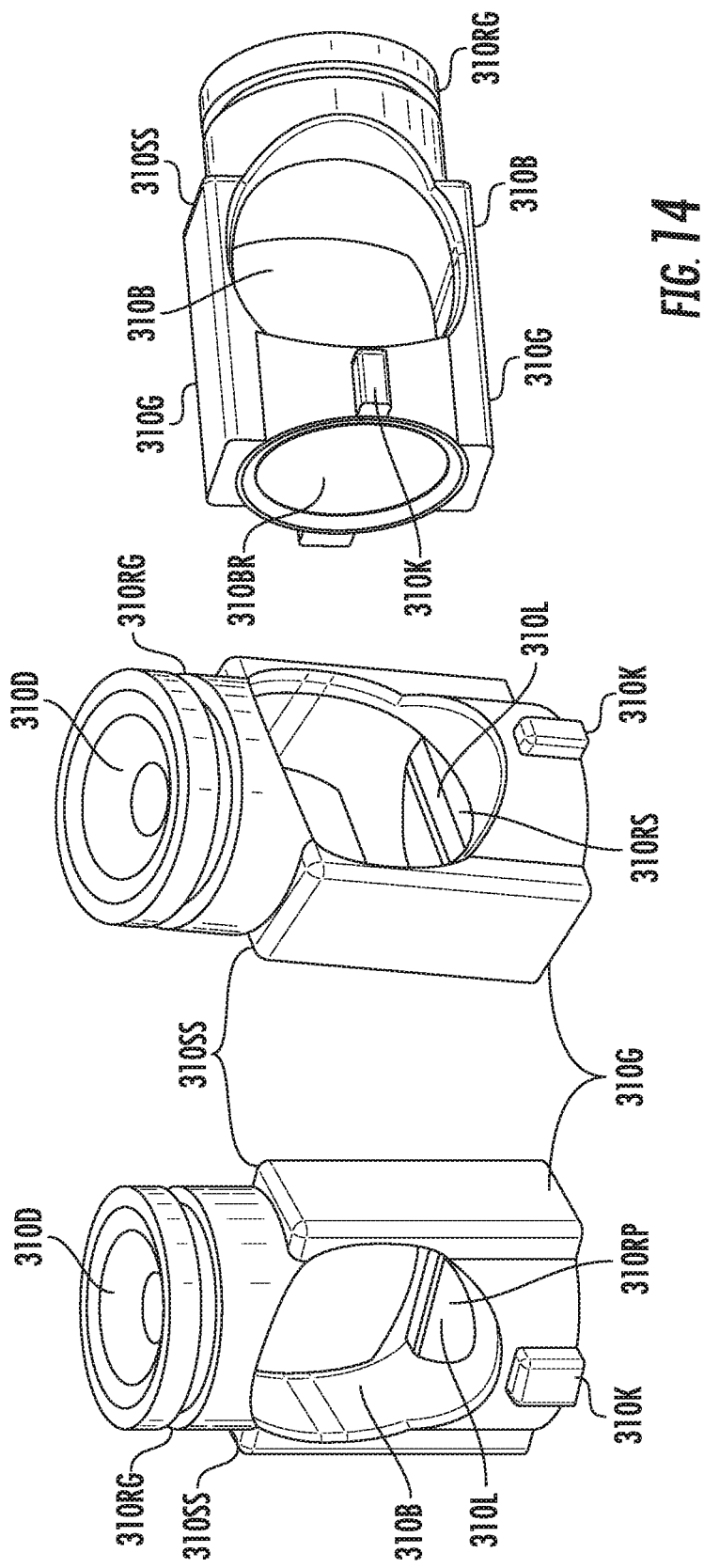

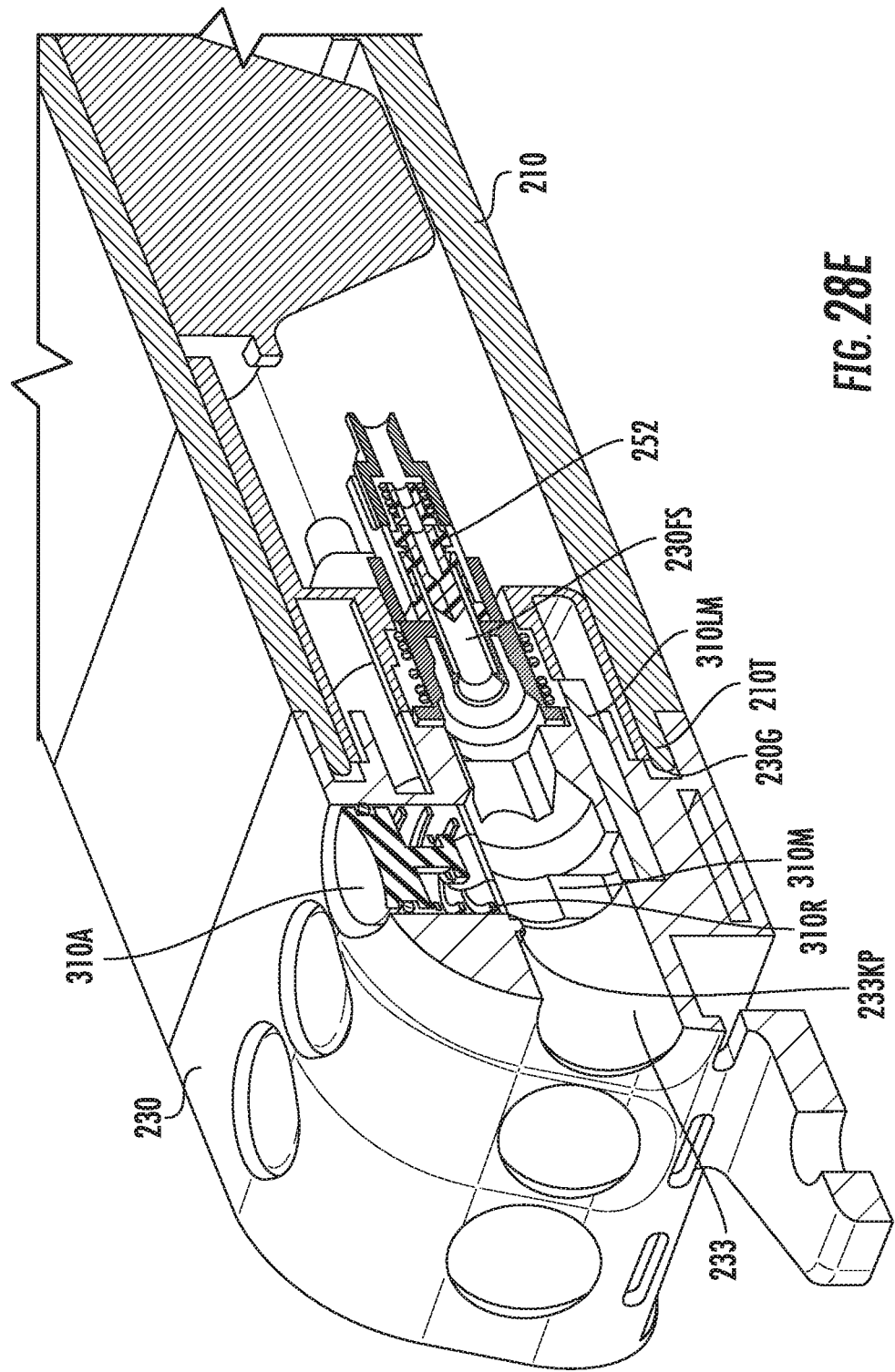

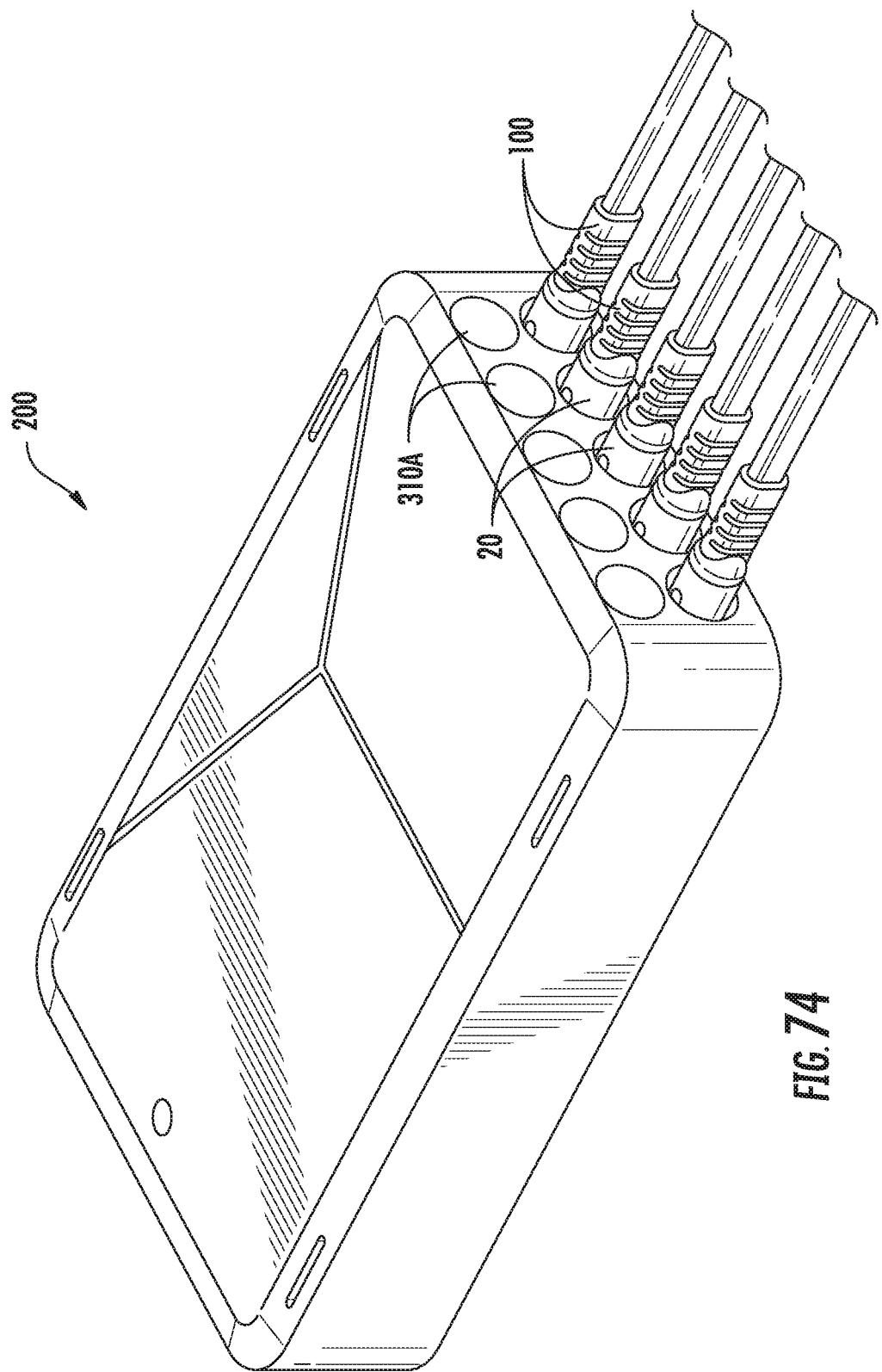

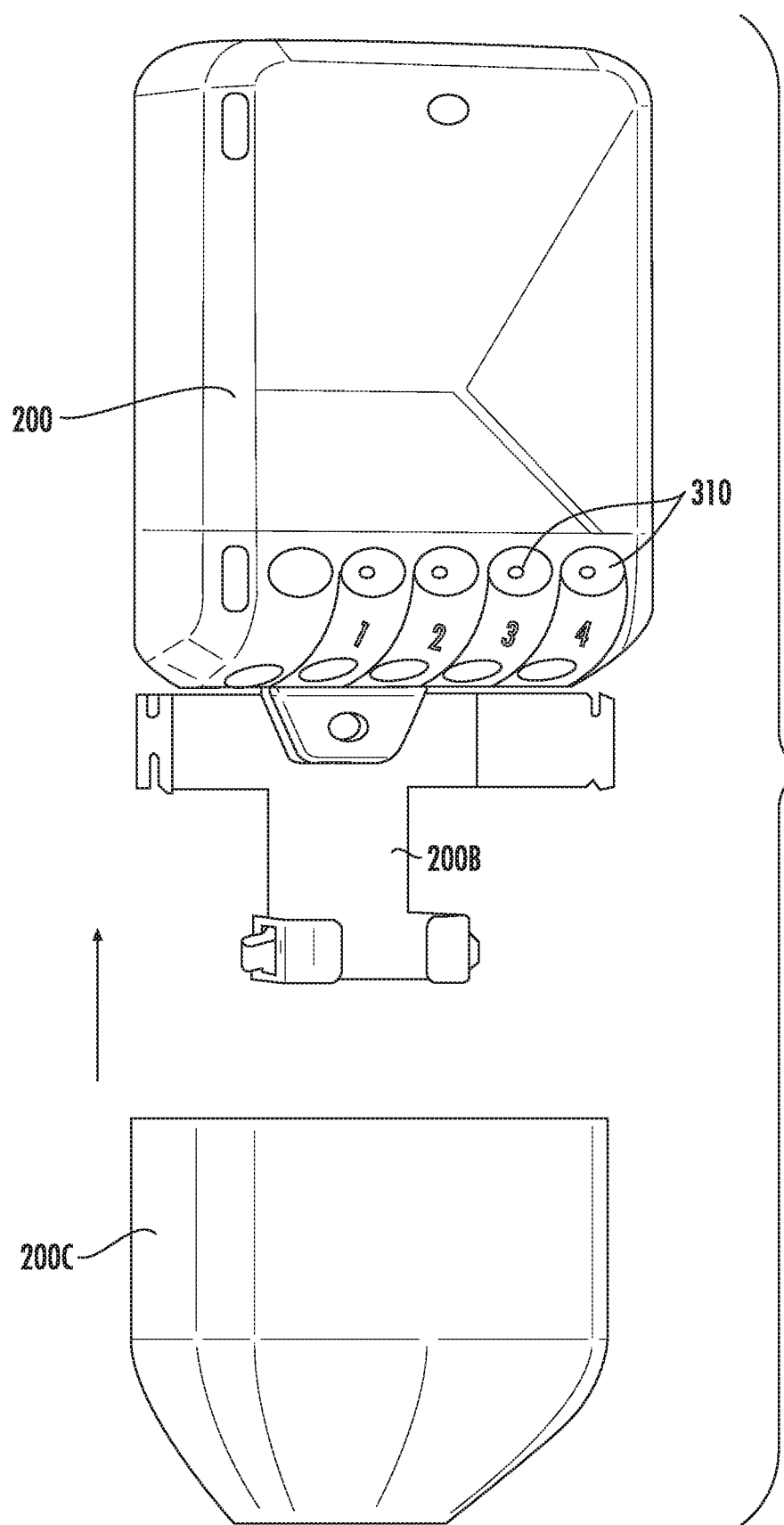

MULTIPORTS AND OTHER DEVICES HAVING KEYED CONNECTION PORTS AND SECURING FEATURES AND METHODS OF MAKING THE SAME

CROSS-REFERENCE TO RELATED APPLICATIONS

This application is a continuation of International Application No. PCT/US2017/064095 filed Nov. 30, 2017, which claims the benefit of priority to U.S. Application No. 62/526,011, filed on Jun. 28, 2017, U.S. Application No. 62/526,018, filed on Jun. 28, 2017, and U.S. Application No. 62/526,195, filed on Jun. 28, 2017, the content of which is relied upon and incorporated herein by reference in entirety.

BACKGROUND

The disclosure is directed to devices providing at least one optical connection port along with methods for making the same. More specifically, the disclosure is directed to devices such as multiports comprising a keyed-connection port and a securing feature associated with the connection port for securing an optical connector along with methods of making the same.

Optical fiber is increasingly being used for a variety of applications, including but not limited to broadband voice, video, and data transmission. As bandwidth demands increase optical fiber is migrating deeper into communication networks such as in fiber to the premises applications such as FTTx, 5G and the like. As optical fiber extended deeper into communication networks the need for making robust optical connections in outdoor applications in a quick and easy manner was apparent. To address this need for making quick, reliable, and robust optical connections in communication networks hardened fiber optic connectors such as the OptiTap® plug connector were developed.

Multiports were also developed for making an optical connection with hardened connectors such as the OptiTap. Prior art multiports have a plurality of receptacles mounted through a wall of the housing for protecting an indoor connector inside the housing that makes an optical connection to the external hardened connector of the branch or drop cable.

Illustratively, FIG. 1 shows a conventional fiber optic multiport 1 having an input fiber optic cable 4 carrying one or more optical fibers to indoor-type connectors inside a housing 3. The multiport 1 receives the optical fibers into housing 3 and distributes the optical fibers to receptacles 7 for connection with a hardened connector. The receptacles 7 are separate assemblies attached through a wall of housing 3 of the multiport 1. The receptacles 7 allow mating with hardened connectors attached to drop or branching cables (not shown) such as drop cables for "fiber-to-the-home" applications. During use, optical signals pass through the branch cables, to and from the fiber optic cable 4 by way of the optical connections at the receptacles 7 of multiport 1. Fiber optic cable 4 may also be terminated with a fiber optic connector 5. Multiports 1 allowed quick and easy deployment for optical networks.

Although, the housing 3 of the prior art multiport 1 is rugged and weatherable for outdoor deployments, the housings 3 of multiport 1 are relatively bulky for mounting multiple receptacles 7 for the hardened connector on the housing 3. Receptacles 7 allow an optical connection between the hardened connector such as the OptiTap male plug connector on the branch cable with a non-hardened connector such as the SC connector disposed within the housing 3, which provides a suitable transition from an outdoor space to an protected space inside the housing 3.

Receptacle 7 for the OptiTap connector is described in further detail in U.S. Pat. No. 6,579,014. As depicted in U.S. Pat. No. 6,579,014, the receptacle includes a receptacle housing and an adapter sleeve disposed therein. Thus, the receptacles for the hardened connector are large and bulky and require a great deal of surface array when arranged in an array on the housing 3 such as shown with multiport 1. Further, conventional hardened connectors use a separate threaded or bayonet coupling that requires rotation about the longitudinal axis of the connector and room for grabbing and rotating the coupling by hand when mounted in an array on the housing 3.

Consequently, the housing 3 of the multiport 1 is excessively bulky. For example, the multiport 1 may be too boxy and inflexible to effectively operate in smaller storage spaces, such as the underground pits or vaults that may already be crowded. Furthermore, having all of the receptacles 7 on the housing 3, as shown in FIG. 1, requires sufficient room for the drop or branch cables attached to the hardened connectors attached to the multiport 1. While pits can be widened and larger storage containers can be used, such solutions tend to be costly and time-consuming. Network operators may desire other deployment applications for multiports 1 such as aerial, in a pedestal or mounted on a façade of a building that are not ideal for the prior art multiports 1 for numerous reasons such as congested poles or spaces or for aesthetic concerns.

Other multiports designs have been commercialized to address the drawbacks of the prior art multiports depicted in FIG. 1. By way of explanation, US 2015/0268434 discloses multiports 1' having one or more connection ports 9 positioned on the end of extensions 8 that project from the housing of the multiport 1' such as depicted in FIG. 2. Connection ports 9 of multiport 1' are configured for mating directly with a hardened connector (not shown) such as an OptiTap without the need to protect the receptacle 7 within a housing like the prior art multiport 1 of FIG. 1.

Although, these types of multiport designs such as shown in FIG. 2 and disclosed in US 2015/0268434 allow the device to have smaller footprints for the housing 3', these designs still have concerns such as the space consumed by the relatively large ports 9 and associated space requirements of optical connections between the ports and hardened connector of the drop cables along with organizational challenges. Simply stated, the ports 9 on the extensions 8 of the multiport 1' and the optical connections between ports 9 and hardened connector occupy significant space at a location a short distance away from the multiport housing 3' such as within a buried vault or disposed on a pole. In other words, a cluster of optical ports 9 of multiport 1' are bulky or occupy limited space. The conventional hardened connectors used with multiport 1' also use a separate threaded or bayonet coupling that requires rotation about the longitudinal axis of the connector along with sufficient space for grabbing and rotating the coupling means by hand. Further, there are aesthetic concerns with the prior art multiports 1' as well.

Consequently, there exists an unresolved need for multiports that allow flexibility for the network operators to quickly and easily make optical connections in their optical network while also addressing concerns related to limited space, organization, or aesthetics.

SUMMARY

The disclosure is directed to devices comprising at least one connection port and a securing feature associated with the connection port. Devices that may use the concepts disclosed herein include multiports, closures or wireless devices. Methods of making the devices are also disclosed. The devices can have any suitable construction such as disclosed herein such a connection port that is keyed for inhibiting a non-compliant connector from being inserted and potentially causing damage to the device.

One aspect of the disclosure is directed to devices or multiports comprising a shell, at least one connection port, at least one securing feature passageway, and at least one securing feature. The at least one connection port is disposed on the multiport with the at least one connection port comprising an optical connector opening extending from an outer surface of the multiport to a cavity of the multiport and defining a connection port passageway. The connection port passageway defining a keying portion. The at least one securing feature is associated with the connection port passageway, where the at least one securing feature is disposed within a portion of the at least one securing feature passageway.

Another aspect of the disclosure is directed to devices or multiports comprising a shell, at least one connection port, at least one securing feature passageway, at least one securing feature, and at least one securing feature resilient member for biasing a portion of the at least one securing feature. The at least one connection port is disposed on the multiport with the at least one connection port comprising an optical connector opening extending from an outer surface of the multiport to a cavity of the multiport and defining a connection port passageway. The connection port passageway defining a keying portion. The at least one securing feature is associated with the connection port passageway, where the at least one securing feature is disposed within a portion of the at least one securing feature passageway.

Still another aspect of the disclosure is directed to devices or multiports comprising a shell, at least one connection port, at least one securing feature passageway, at least one securing feature. The at least one connection port is disposed on the multiport with the at least one connection port comprising an optical connector opening extending from an outer surface of the multiport to a cavity of the multiport and defining a connection port passageway. The connection port passageway defining a keying portion. The at least one securing feature is associated with the connection port passageway, where the at least one securing feature is disposed within a portion of the at least one securing feature passageway, and the at least one securing feature is capable of translating within a portion of the at least one securing feature passageway.

Yet another aspect of the disclosure is directed to devices or multiports comprising a shell, at least one connection port, at least one securing feature passageway, at least one securing feature. The at least one connection port is disposed on the multiport with the at least one connection port comprising an optical connector opening extending from an outer surface of the multiport to a cavity of the multiport and defining a connection port passageway. The connection port passageway defining a keying portion. The at least one securing feature is associated with the connection port passageway, and the at least one securing feature comprises a bore, where the at least one securing feature is disposed within a portion of the at least one securing feature passageway, and the at least one securing feature is capable of translating within a portion of the at least one securing feature passageway.

A further aspect of the disclosure is directed to devices or multiports comprising a shell, at least one connection port, at least one securing feature passageway, at least one securing feature. The at least one connection port is disposed on the multiport with the at least one connection port comprising an optical connector opening extending from an outer surface of the multiport to a cavity of the multiport and defining a connection port passageway. The connection port passageway defining a keying portion. The at least one securing feature is associated with the connection port passageway, and the at least one securing feature comprises a bore, where the at least one securing feature is disposed within a portion of the at least one securing feature passageway, and the at least one securing feature is capable of translating within a portion of the at least one securing feature passageway wherein the at least one securing feature translates from a retain position to an open position as a suitable fiber optic connector is inserted into the at least one connection port.

Still another aspect of the disclosure is directed to devices or multiports comprising a shell, at least one connection port, at least one securing feature passageway, at least one securing feature. The at least one connection port is disposed on the multiport with the at least one connection port comprising an optical connector opening extending from an outer surface of the multiport to a cavity of the multiport and defining a connection port passageway. The connection port passageway defining a keying portion. The at least one securing feature is associated with the connection port passageway, and the at least one securing feature comprises a bore and a locking feature, where the at least one securing feature is disposed within a portion of the at least one securing feature passageway, and the at least one securing feature is capable of translating within a portion of the at least one securing feature passageway wherein the at least one securing feature translates from a retain position to an open position as a suitable fiber optic connector is inserted into the at least one connection port.

Other aspects of the disclosure are directed to devices or multiports comprising a shell, at least one connection port, at least one securing feature passageway, at least one securing feature. The at least one connection port is disposed on the multiport with the at least one connection port comprising an optical connector opening extending from an outer surface of the multiport to a cavity of the multiport and defining a connection port passageway. The connection port passageway defining a keying portion. The at least one securing feature is associated with the connection port passageway, and the at least one securing feature comprises a locking member and an actuator, where the at least one securing feature is disposed within a portion of the at least one securing feature passageway, and the at least one securing feature translates from a retain position to an open position as a suitable fiber optic connector is inserted into the at least one connection port.

A still further aspect of the disclosure is directed to a wireless device comprising a shell, at least one connection port, at least one securing feature passageway, at least one securing feature. The at least one connection port is disposed on the wireless device, the at least one connection port comprising an optical connector opening extending from an outer surface of the wireless device into a cavity of the wireless device and defining a connection port passageway. The connection port passageway defining a keying portion. The at least one securing feature is associated with the connection port passageway, and the at least one securing feature comprises a locking member and an actuator, where the at least one securing feature is disposed within a portion of the at least one securing feature passageway. The connection port of the wireless device may also comprise other features, structures or components as disclosed herein.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

BRIEF DESCRIPTION OF THE FIGURES

FIGS. 3A and 3B respectively depict top and bottom perspective views of an assembled device such as a multiport comprising at least one connection port defined by a respective optical connector opening disposed in a connection port insert of the multiport along with a securing feature associated with the connection port passageway;

FIG. 3C depicts a partially exploded view of another device such as a multiport comprising at least one connection port defined by an optical connector opening disposed in a connection port insert of the multiport along with a securing feature associated with the connection port passageway;

FIGS. 3D-3F depict various assembly views showing the connection port insert of the multiport of FIG. 3C;

FIGS. 4A and 4B respectively depict top and bottom perspective views of an assembled device such as a multiport comprising at least one connection port defined by a respective optical connector opening disposed in a shell of the multiport along with a securing feature associated with the connection port passageway:

FIGS. 12-14 are various perspective views of the securing features of the multiport of FIG. 5;

FIGS. 28A-28E are respective assembled and partially exploded perspective views of a device similar to the device of FIGS. 27 and 28, and comprising a connection port insert having at least one connection port defined by an optical connector opening and a securing feature associated with the connection port according to concepts disclosed;

FIG. 74 depicts a device with the actuator of the securing feature disposed in a horizontal direction that is generally aligned with the longitudinal axis of the connection port;

FIGS. 99-101 are perspective views of a second cover that cooperates with a bracket that may be used with the devices disclosed herein;

DETAILED DESCRIPTION

Reference will now be made in detail to the embodiments of the disclosure, examples of which are illustrated in the accompanying drawings. Whenever possible, like reference numbers will be used to refer to like components or parts.

The concepts for the devices disclosed herein are suitable for providing at least one optical connection to a device for indoor, outdoor or other environments as desired. Generally speaking, the devices disclosed and explained in the exemplary embodiments are multiports, but the concepts disclosed may be used with any suitable device as appropriate. As used herein, the term "multiport" means any device comprising at least one connection port for making an optical connection and a securing feature associated with the at least one connection port. By way of example, the multiport may be any suitable device having at least one optical connection such as a passive device like an optical closure (hereinafter "closure") or an active device such as a wireless device having electronics for transmitting or receiving a signal.

The concepts disclosed advantageously allow compact form-factors for devices such as multiports comprising at least one connection port comprising a keying portion and the securing feature associated with the connection port. The concepts are scalable to many connection ports on a device in a variety of arrangements or constructions. The securing features disclosed herein for devices engage directly with a portion of connector without conventional structures like prior art devices that require the turning of a coupling nut, bayonet or the like. As used herein, "securing feature" excludes threads and features that cooperate with bayonets on a connector. Thus, the devices disclosed may allow connection port to be closely spaced and may result in small devices since the room need for turning a threaded coupling nut or bayonet is not necessary. The compact form-factors may allow the placement of the devices in tight spaces in indoor, outdoor, buried, aerial, industrial or other applications while providing at least one connection port that is advantageous for a robust and reliable optical connection in a removable and replaceable manner. The disclosed devices may also be aesthetically pleasing and provide organization for the optical connections in manner that the prior art multiports cannot provide.

Figure 18:
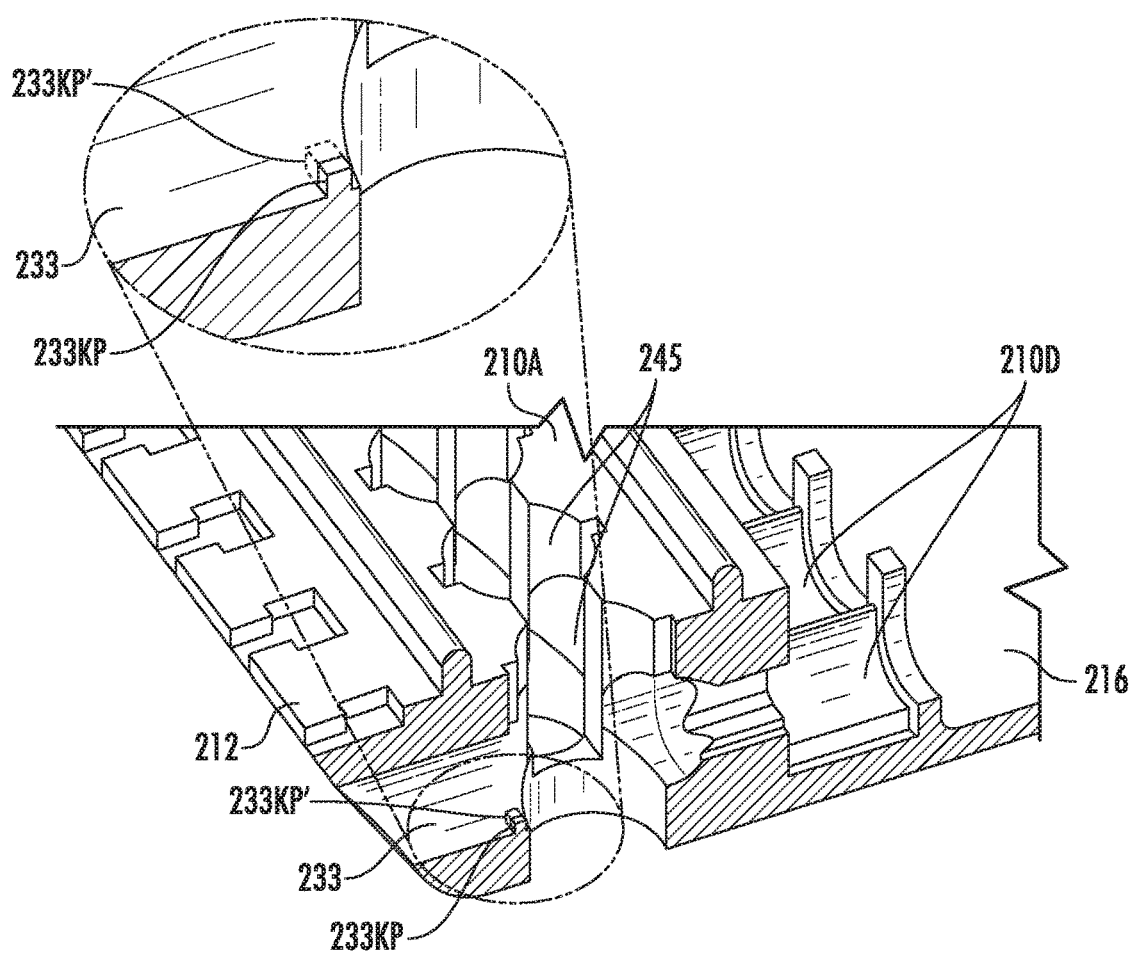

The devices disclosed are simple and elegant in their designs. The devices disclosed comprise at least one connection port with a keying portion and a securing feature associated with the connection port that is suitable for retaining an external fiber optic connector received by the connection port. The keying portion of the connection port cooperates with a key on a complimentary external fiber optic connector to inhibit damage to the connection port by inhibiting the insertion of a non-compliant connector. The keying portion may also aid the user during blind insertion of the connector into the connection port of the device to determine the correct rotational orientation with respect to the connection port when a line of sight is not possible or practical for alignment. Illustratively, FIG. 18 depicts a representative connection port passageway 233 comprising a keying portion 233KP. As shown, the keying portion 233KP is an additive keying portion to the primitive geometric round shape of the connection port passageway 233 such as a male key (not labeled) that is disposed forward of the securing feature in the connection port passageway 233. However, the concepts for the connection ports 236 of devices may be modified for different connector designs. For instance, the keying portion 233KP may be defined as a walled-portion across part of the connection port passageway 233 as represented by the dashed line 233KP'. Thus, the connection port with keying portion 233KP' would be able to properly receive an external fiber optic connector having a portion with a proper D-shaped portion. The keying portion 233KP is illustrated in appropriate FIGS., but will not be discussed with every depiction for the sake of brevity. Unlike prior art multiports, the concepts disclosed advantageously allow the quick and easy connection and retention by inserting the fiber optic connectors directly into the connection port of the device without the need or space considerations for turning a threaded coupling nut or bayonet for retaining the external fiber optic connector. Generally speaking, the securing features disclosed for use with devices herein may comprise one or more components with at least one component translating for releasing or securing the external fiber optic connector to the device. As used herein, the term "securing feature" excludes threaded portions or features for securing a bayonet disposed on a connector.

Since the connector footprint used with the devices disclosed does not require the bulkiness of a coupling nut or bayonet, the fiber optic connectors used with the devices disclosed herein may be significantly smaller than conventional connectors used with prior art multiports. Moreover, the present concepts for connection ports on devices allows an increased density of connection ports per volume of the shell since there is no need for accessing and turning the coupling nut or bayonets by hand for securing a fiber optic connector like the prior art multiports.

The devices disclosed comprise a securing feature for directly engaging with a suitable portion of a connector housing of the external fiber optic connector or the like for securing an optical connection with the device. Different variations of the concepts are discussed in further detail below. The structure for securing the fiber optic connectors in the devices disclosed allows much smaller footprints for both the devices and the fiber optic connectors along with a quick-connect feature. Devices may also have a dense spacing of connection ports if desired. The devices disclosed advantageously allow a relatively dense and organized array of connection ports in a relatively small form-factor while still being rugged for demanding environments. As optical networks increase densifications and space is at a premium, the robust and small-form factors for devices such as multiports, closures and wireless devices disclosed herein becomes increasingly desirable for network operators.

The concepts disclosed herein are suitable for optical distribution networks such as for Fiber-to-the-Home applications, but are equally applicable to other optical applications as well including indoor, automotive, industrial, wireless, or other suitable applications. Additionally, the concepts disclosed may be used with any suitable fiber optic connector footprint that cooperates with the securing feature of the device. Various designs, constructions, or features for devices are disclosed in more detail as discussed herein and may be modified or varied as desired. In one variation, the connection port may have a keying portion for inhibiting the insertion of non-compliant connectors that may damage the device.

Figure 3A:
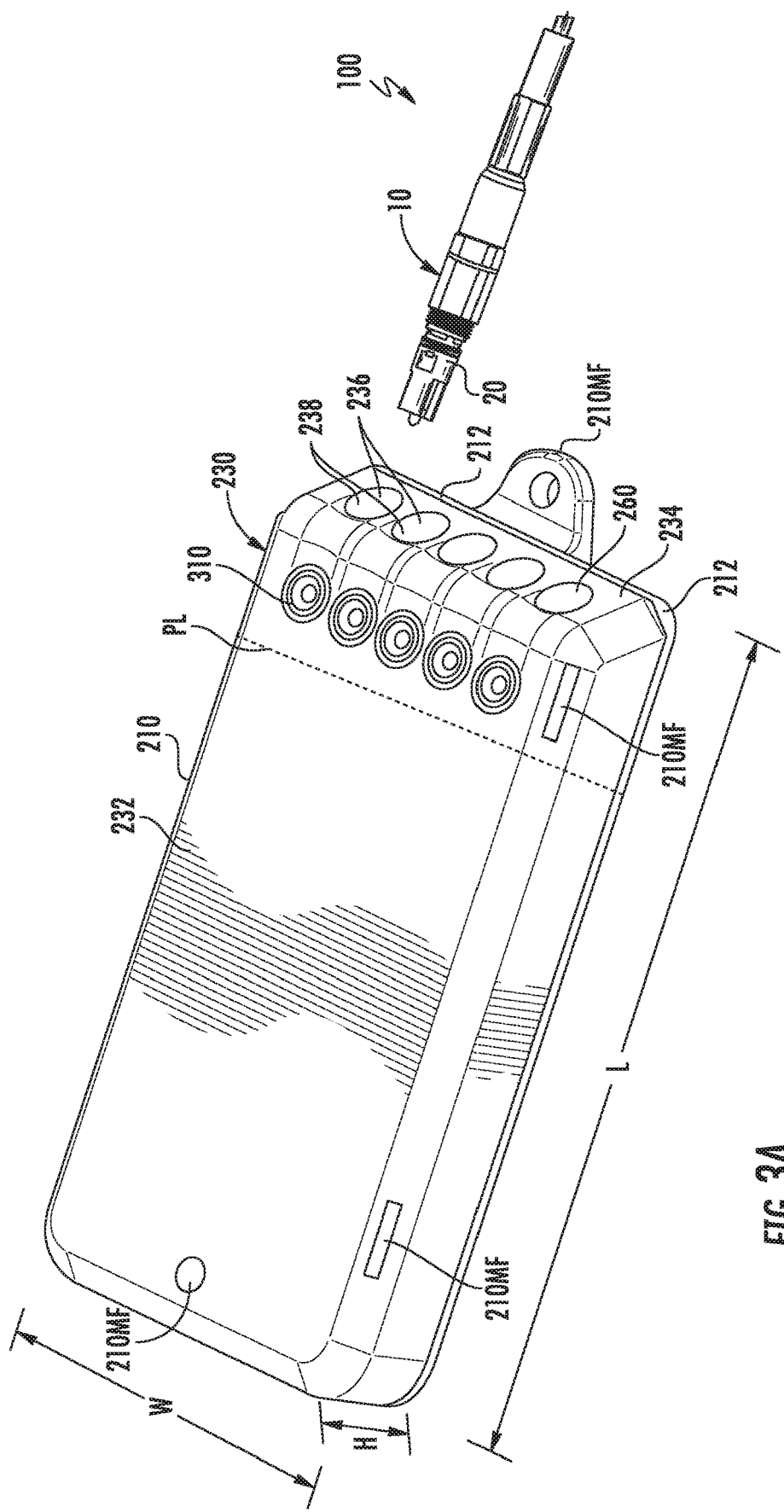
Figure 4B:
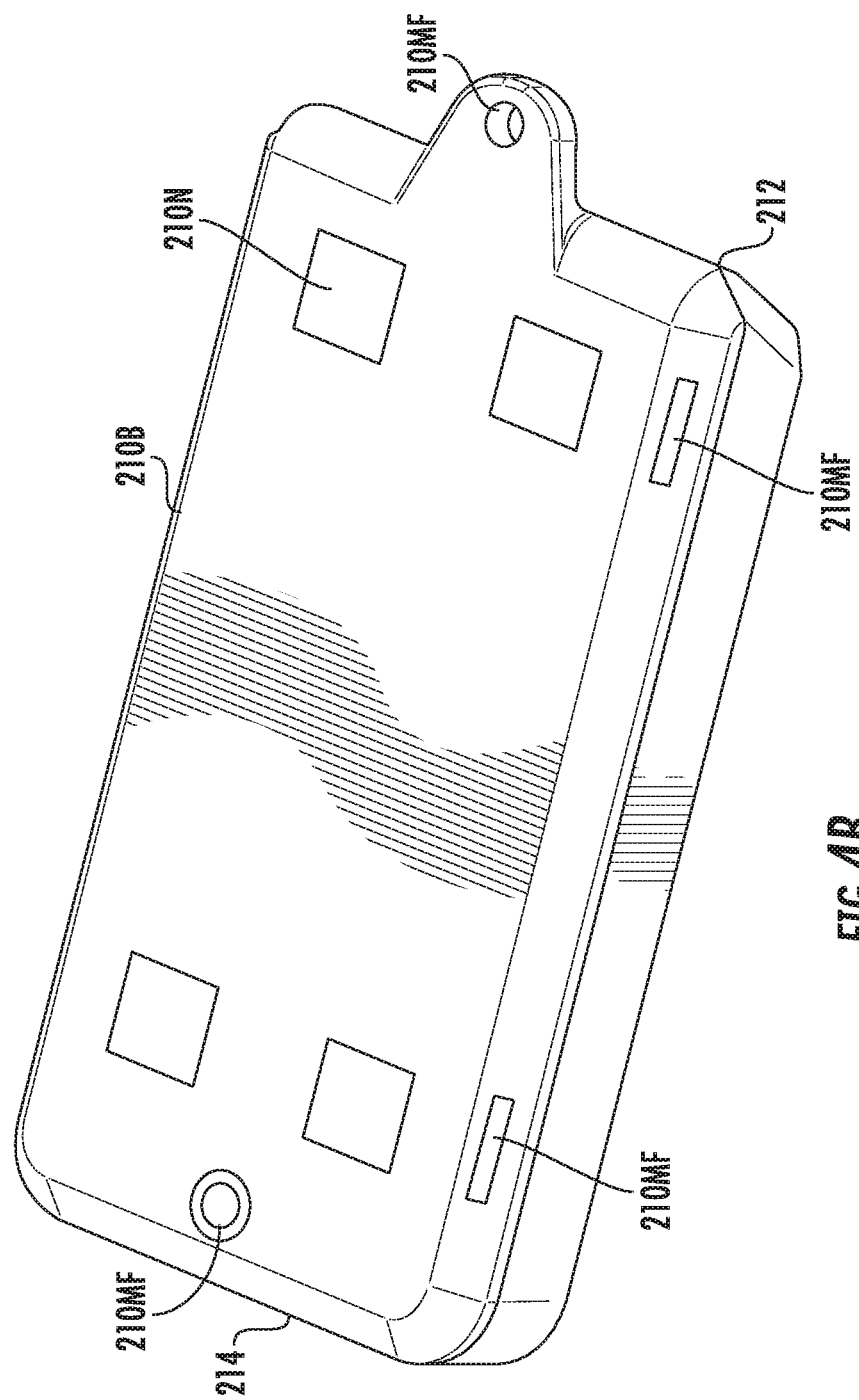

The devices disclosed may locate the at least one connection port 236 in different portions or components of the device as desired. FIGS. 3A and 3B respectively depict top and bottom perspective view of explanatory multiports 200 comprising at least one connection port 236 disposed on a connection port insert 230 for making optical connections. Generally speaking, when assembled a portion of the connection port insert 230 is disposed within a shell 210. FIGS. 4A and 4B respectively depict top and bottom perspective views of other explanatory multiports 200 comprising at least one connection port 236 being a portion of a shell of the device. By way of explanation, at least one connection ports 236 is molded as a portion of shell 210. Although, these concepts are described with respect to multiports the concepts may be used with any other suitable devices such as wireless devices (FIG. 102), closures (FIG. 103) or other suitable devices.

Figure 7:
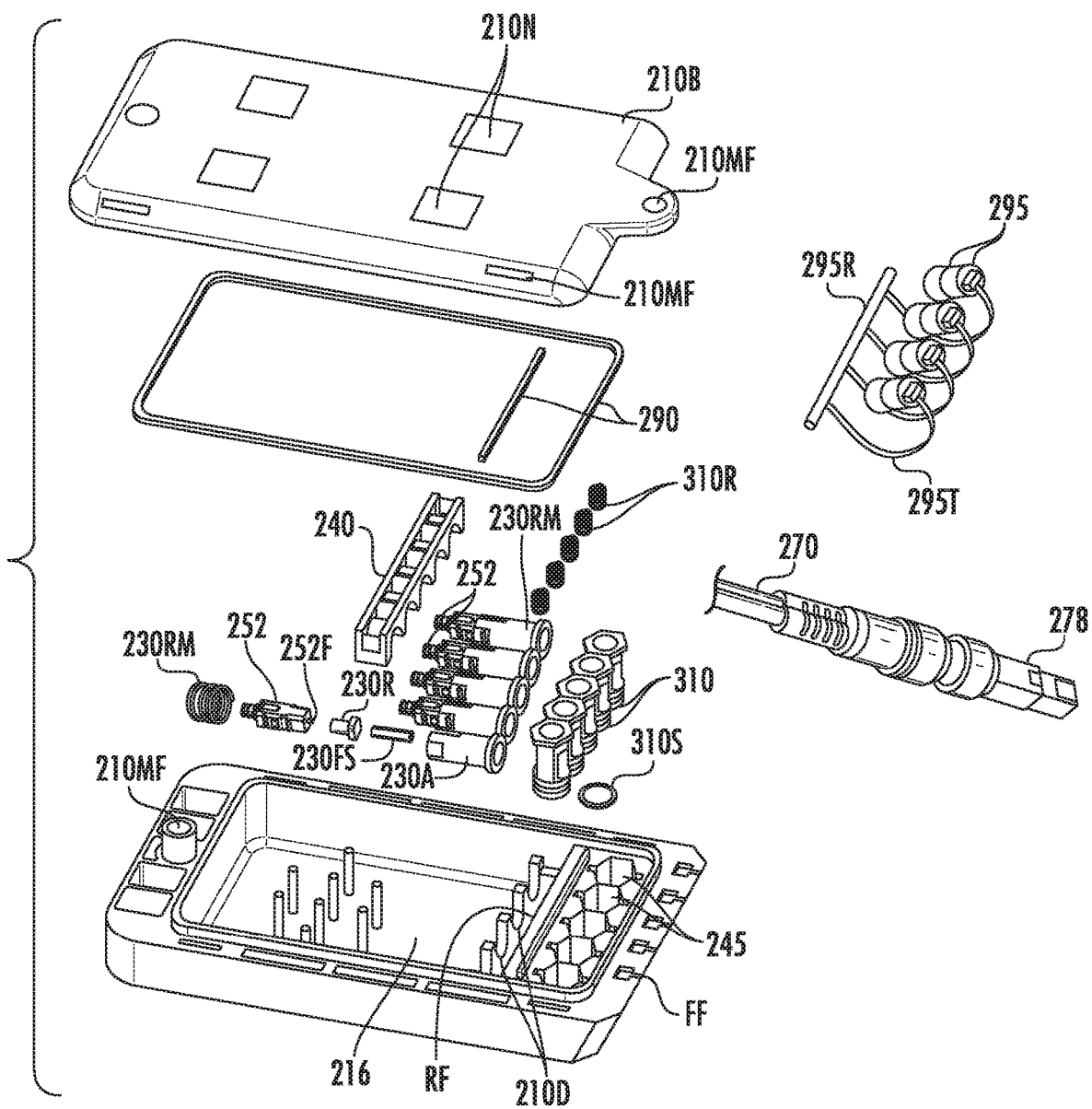
FIG. 7 is a partially exploded view of the multiport of FIG. 5 showing one of the rear connectors removed from the adapter and having the optical fibers removed for clarity.
Figure 32:
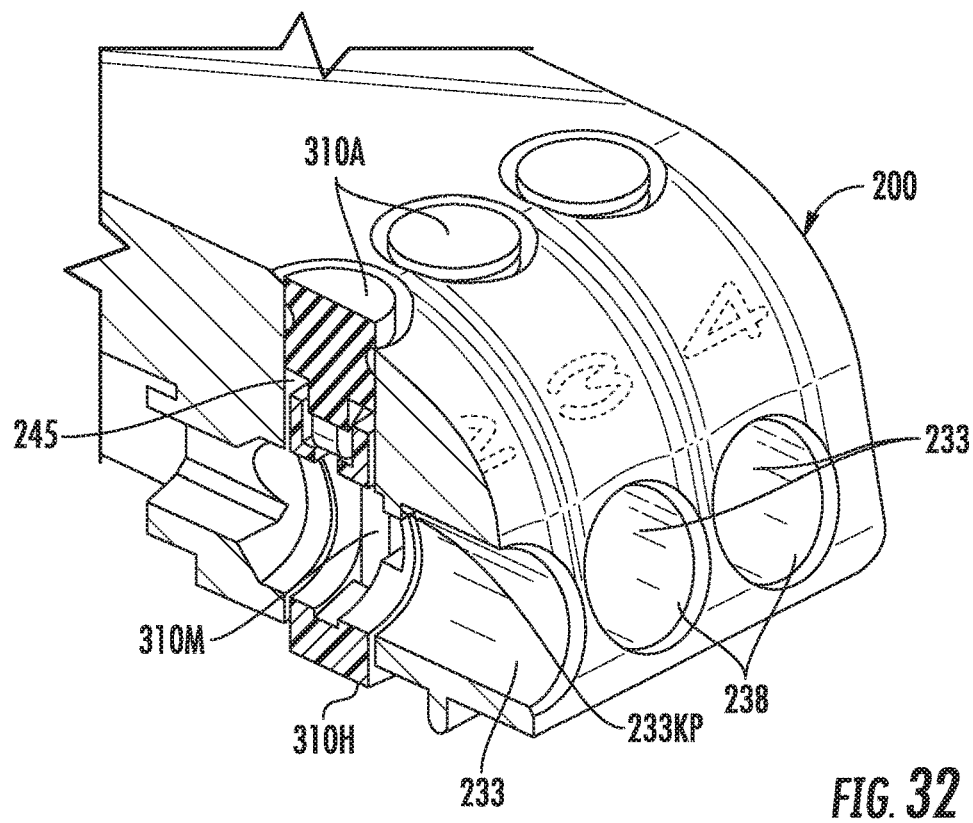

Generally speaking, devices such as multiport 200 comprise a shell 210 comprising a body 232 and one or more connection ports 236 disposed on a first end or portion 212 of multiport 200. The connection ports 236 are configured for receiving and retaining external fiber optic connectors 10 such as shown in FIG. 3A for making optical connections with the multiport 200. Connection ports 236 each comprises a respective optical connector opening 238 extending from an outer surface 234 of the multiport 200 into a cavity 216 of the multiport 200 and defining a connection port passageway 233. At least one securing feature 310 is associated with the connection port passageway 233 for cooperating with the external fiber optic connector 10. The securing feature may translate for releasing or securing the external fiber optic connector 10. One or more respective securing feature passageways 245 such as shown in FIG. 3C, FIG. 7 or FIG. 32 extend from the outer surface 234 of multiport 200 to a portion of the respective connection port passageways 233 of the multiport 200. Respective securing features 310 are associated with the connection port passageways 233 and may be disposed within a portion of the securing feature passageway 245 of the multiport 200.

Optical connections to the devices are made by inserting one or more suitable external fiber optic connectors 10 into respective connection port passageways 233 as desired. Specifically, the connection port passageway 233 is configured for receiving a suitable external fiber optic connector 10 (hereinafter connector) of a fiber optic cable assembly 100 (hereinafter cable assembly). Connection port passageway 233 is associated with a securing feature 310 for retaining (e.g., securing) connector 10 in the multiport 200. The securing feature 310 advantageously allows the user to make a quick and easy optical connection at the connection port 236 of multiport 200. The securing feature 310 may operate for providing a connector release feature when actuated.

Specifically, the connector 10 may be retained within the respective connection port 236 of the device by pushing and fully-seating the connector 10 within the connection port 236. To release the connector 10 from the respective connection port 236, the securing feature 310 is actuated releasing the securing feature from the connector housing and allow the connector to be removed from the connection port 236. Stated another way, the at least one securing feature 310 is capable of releasing the connector 10 when translating within a portion of a securing feature passageway 245. The full insertion and automatic retention of the connector 10 may advantageously allow one-handed installation of the connector 10 by merely pushing the connector into the connection port 236. The devices disclosed accomplish this connector retention feature upon full-insertion by biasing the securing feature to a retain position. However, other modes of operation for retaining and releasing the connector 10 are possible according to the concepts disclosed. For instance, the securing feature 310 may be designed to require actuation for inserting the connector 10; however, this may require a two-handed operation.

Securing feature 310 may be designed for holding a minimum pull-out force for connector 10. In some embodiments, the pull-out force may be selected to release the connector 10 before damage is done to the device or the connector 10. By way of example, the securing feature 310 associated with the connection port 236 may require a pull-out force of about 50 pounds (about 220N) before the connector 10 would release. Likewise, the securing feature 310 may provide a side pull-out force for connector 10 for inhibiting damage as well. By way of example, the securing feature 310 associated with the connection port 236 may provide a side pull-out force of about 25 pounds (about 110N) before the connector 10 would release. Of course, other pull-out forces such as 75 pounds (about 330N) or 100 (about 440N) pounds are possible along with other side pull-out forces.

Figure 30:
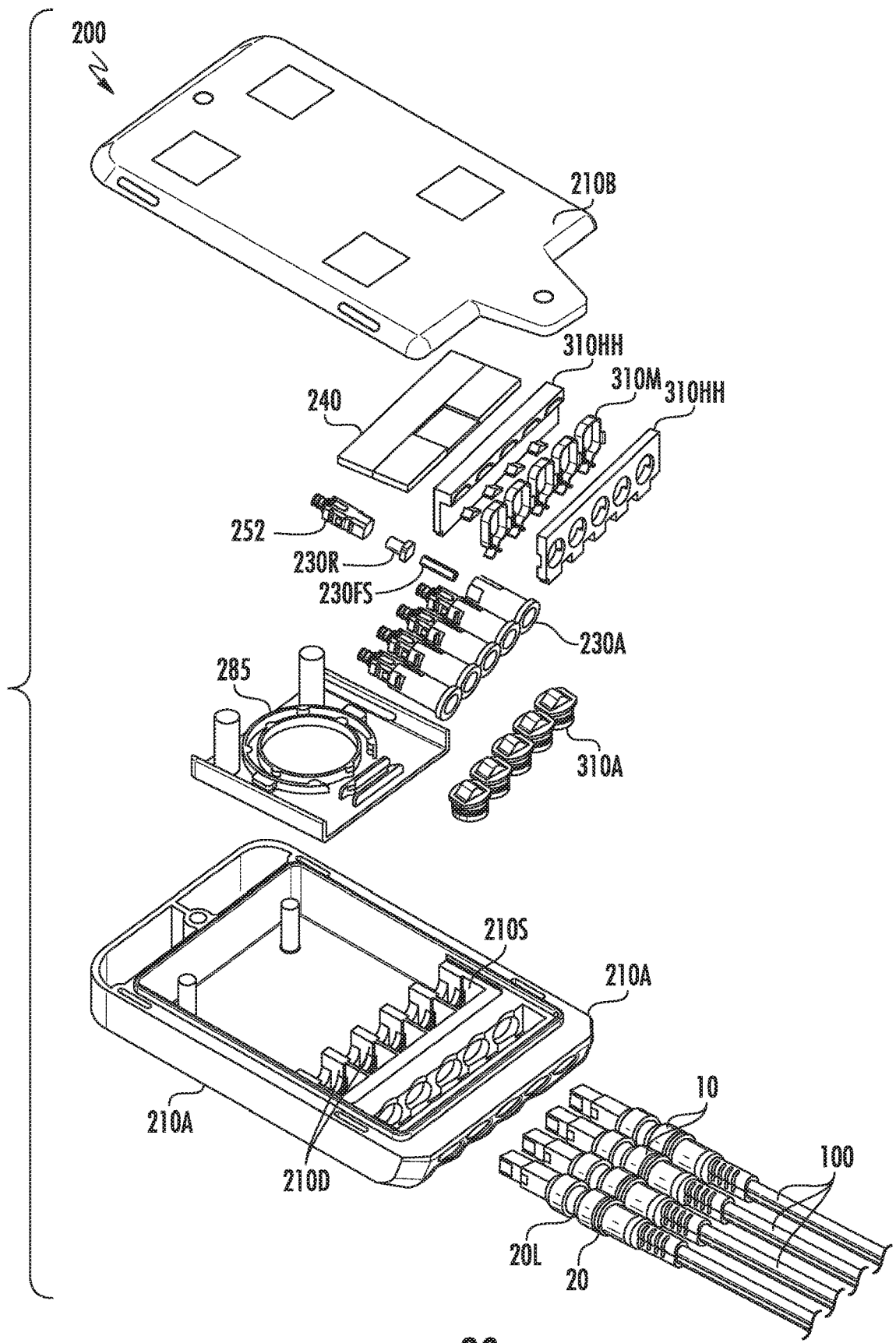
FIG. 30 is a partially exploded view of the multiport of FIGS. 27 and 28 showing one of the rear connectors removed from the adapter and having the optical fibers removed for clarity.
Figure 50:
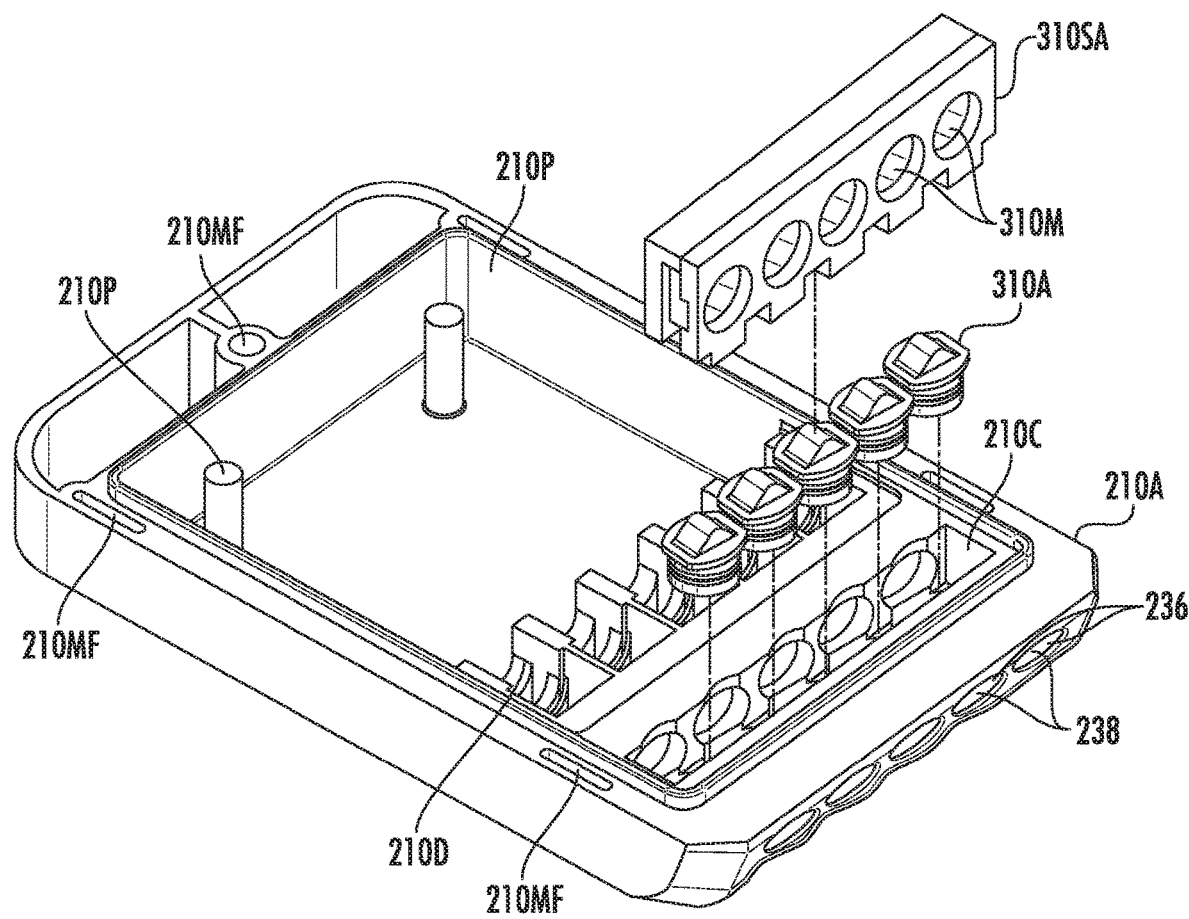
FIG. 50 depicts the components of securing features being installed into the first portion of the shell of FIG. 46.

The securing features 310 disclosed herein may take many different constructions or configurations. By way of explanation, securing features 310 may be formed from a single component as shown in FIG. 3C or a plurality of components as shown in FIG. 30. Furthermore, the securing features 310 or portions of securing features 310 may be constructed as sub-assemblies such as shown in FIG. 50 for easy assembly of multiple securing features 310 or other design considerations.

Devices such as multiports 200, wireless devices 500 (FIG. 102), or closures 700 (FIG. 103) can have different constructions for securing features, shells, rear connectors, input ports, splitters, keying portions for connection ports, tethers, electronics or components according to the concepts disclosed herein. Generally speaking, the devices comprise at least one connection port 236 defined by an optical connector opening 238 extending into a cavity of the device 200, 500, 700 along with a securing feature 310 associated with the connection port 236.

FIGS. 3A and 3B depict a device where the one or more connection ports 236 and the one or more securing feature passageways 245 are a portion of a connector port insert 230. Connector port insert 230 is at least partially inserted into shell 210 as represented by the dashed line. Specifically, the dashed line represents a parting line PL between the connector port insert 230 and the shell 210. Shell 210 may take many different forms as disclosed herein as well. Other devices may have the one or more connection ports 236 and the one or more securing feature passageways 245 formed as a portion of the shell 210, instead of being at least partially inserted into shell as an assembly.

FIG. 3C is a partially exploded view of another device 200 similar to the multiport 200 of FIGS. 3A and 3B. FIG. 3C depicts the multiport 200 comprising at least one connection port 236 disposed on the multiport 200 with the connection port 236 defined by an optical connector opening 238 extending from an outer surface 234 of the multiport 200 into a cavity 216 of the multiport 200 and defining a connection port passageway 233. Multiport 200 also comprises at least one securing feature 310 associated with the connection port passageway 233. Connector port insert 230 also comprises at least one securing feature passageway 245 for receiving the securing feature 310. As depicted in FIG. 3F, the securing feature passageways 245 extend from the outer surface 234 of multiport 200 to the respective connection port passageways 233 of the multiport 200. Multiport 200 of FIG. 3C comprises a shell 210 with a portion of the connection port insert 230 sized for fitting into a first opening of the shell 210 that leads to a cavity 216. Multiport 200 of FIG. 3C also comprises a plurality of adapters 230A for receiving respective rear connectors 252 in alignment with the respective connection port 236. In this embodiment, a plurality of securing feature locking members 310LM are used retaining the securing features 310 in the securing feature passageway 245 as best shown in FIG. 3F. The multiport 200 may also comprise a fiber tray (not numbered) for routing and organizing the optical fibers. The fiber tray inhibits damage to optical fibers and also provides a location for the mounting of other components such as splitters, electronics or the like. The fiber tray shown in FIG. 3C attaches to one or more slots formed in a retainer 240, which is used for securing adapters to the connection port insert 230.

Figure 3E:
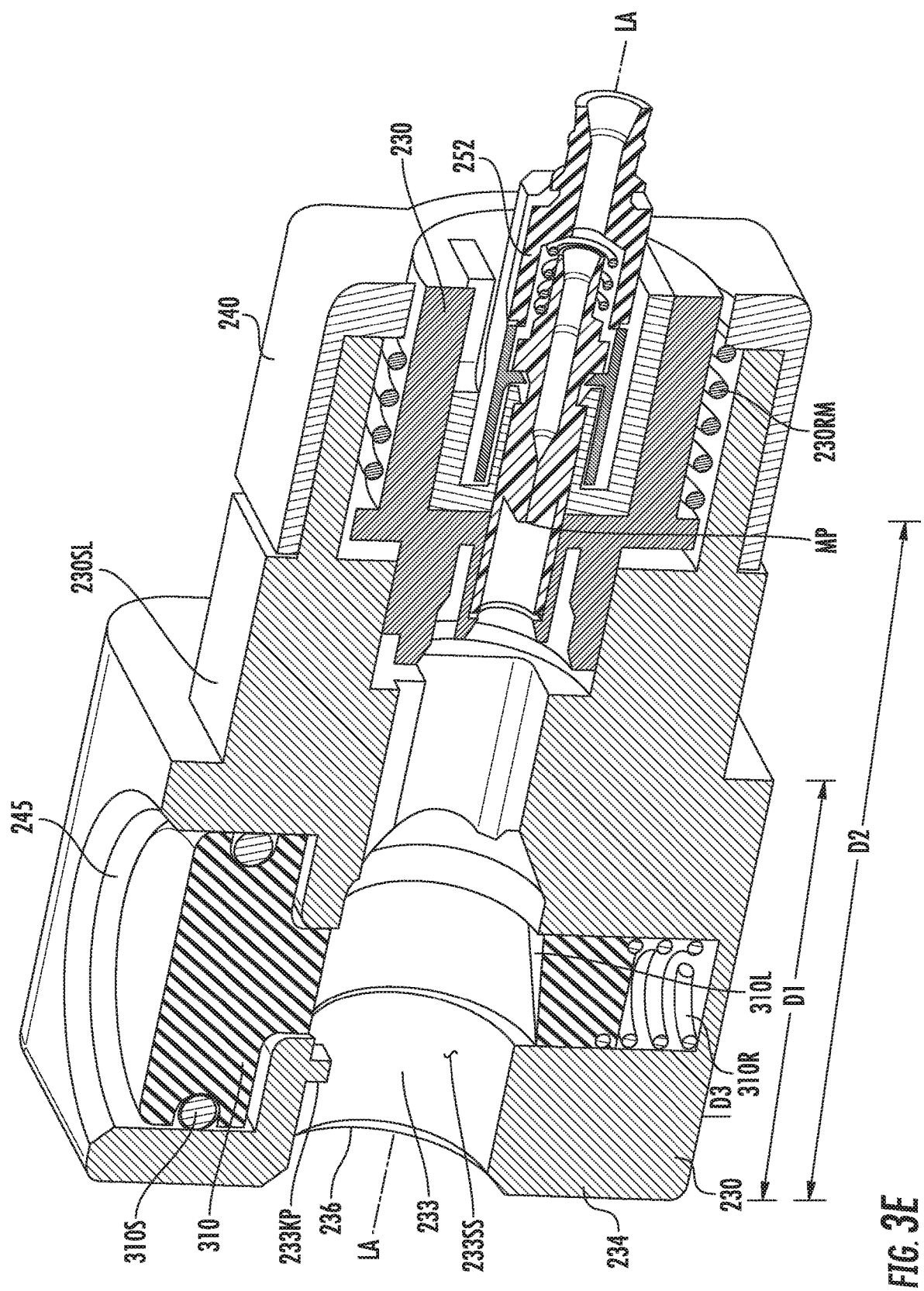

FIG. 3D shows an assembly comprising the connection port insert 230 with securing features 310 installed and the rear connectors 252 attached and FIG. 3E shows a cross-section through the connection port passageway 233. As depicted, this connection port passageway 233 comprises a keying portion 233KP as part of the connection port insert 230. As shown, keying portion 233KP is disposed forward of the securing feature 310 in the connection port passageway 233. Further, the keying portion 233KP or 233KP' may have any suitable location in the connection port passageway forward of the securing feature. The optical fibers 250 have been removed from rear connectors 252 of FIGS. 3C and 3D for clarity. As depicted, the assembly has the securing features 310 associated with each connection port passageway 233 disposed within a portion of the securing feature passageway 245. In this embodiment, the securing feature 310 is a push-button actuator formed as a single component.

As shown in FIG. 3E, securing feature 310 is biased to a retain position. Specifically, the securing feature 310 is biased in an upward direction using a securing feature resilient member 310R, which is disposed within the connection port insert 230 below the securing feature 310. Consequently, securing feature 310 is capable of translating within a portion of the securing feature passageway 245. As depicted, a sealing feature 310S is disposed on the securing feature 310. Sealing feature 310S provides a seal between the securing feature 310 and the securing feature passageway 245 to inhibit dirt, dust and debris from entering the device.

Multiport 200 of FIG. 3C also comprises at least one adapter 230A aligned with the respective connection port 236. Adapter 230A is suitable for securing a rear connector 252 thereto for aligning the rear connector 252 with the connection port 236. One or more optical fibers 252 (not shown) may be routed from the connection port 236 toward an input connection port 260 of the multiport 200. For instance, the rear connector 252 may terminate the optical fiber 250 for optical connection at connection port 236 and route the optical fiber 250 to the input connection port 260. In this embodiment, adapters 230A are secured to connection port insert 230 using retainer 240. Adapters 230A may be biased using a resilient member 230RM as shown. Rear connectors 252 may take any suitable form and be aligned and secured with the connection ports 236 in any suitable manner. As used herein, "input connection port" is the location where external optical fibers are received or enter the device, and the input connection port does not require the ability to make an optical connection.

In this embodiment, the securing feature 310 comprises a bore 310B that is aligned with the least one connection port passageway 233 when assembled as shown in FIG. 3E. Bore 310B is sized for receiving a suitable connector 10 therethrough for securing the same for optical connectivity. Bores or openings through the securing feature 310 may have any suitable shape or geometry for cooperating with its respective connector. As used herein, the bore may have any suitable shape desired including features on the surface of the bore for engaging with a connector.

In some embodiments, the securing feature 310 is capable of moving to an open position when inserting a suitable connector 10 into the connection port passageway 233. When the connector 10 is fully-inserted into the connector port passageway 233, the securing feature 310 is capable of moving to the retain position automatically. Consequently, the connector 10 is secured within the connection port 236 by securing feature 310 without turning a coupling nut or a bayonet like the prior art multiports. Stated another way, the securing feature 310 translates from the retain position to an open position as a suitable connector 10 is inserted into the connection port 236. The securing feature passageway 245 is arranged transversely to a longitudinal axis LA of the multiport 200, but other arrangements are possible. Other securing features may operate in a similar manner, but use an opening instead of a bore that receives the connector therethrough.

Figure 8:
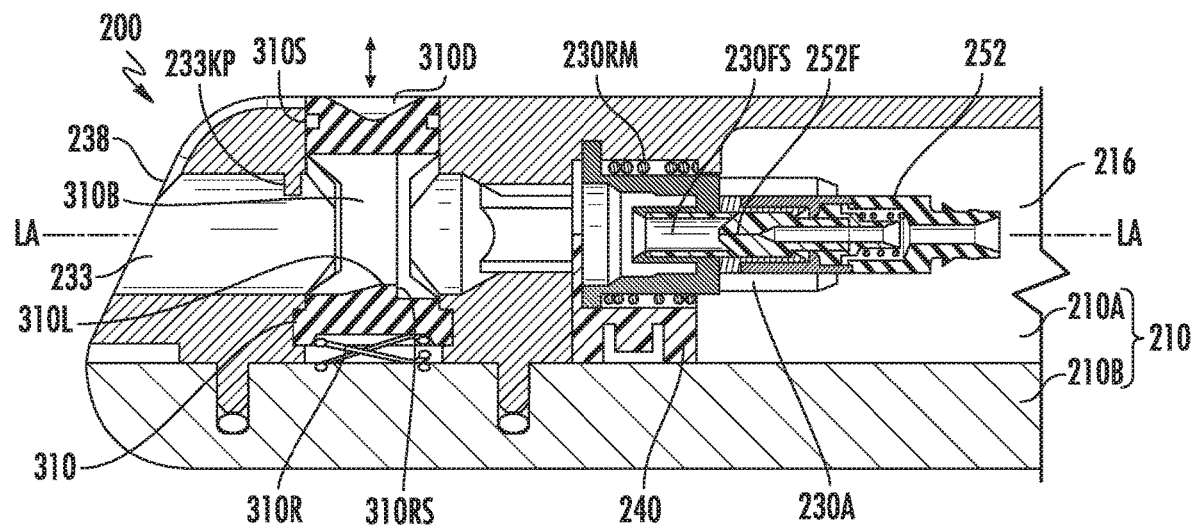
FIG. 8 is a longitudinal cross-sectional view of a portion of the multiport of FIG. 5 depicting the connection port with a keying portion and associated securing feature.
Figure 9:
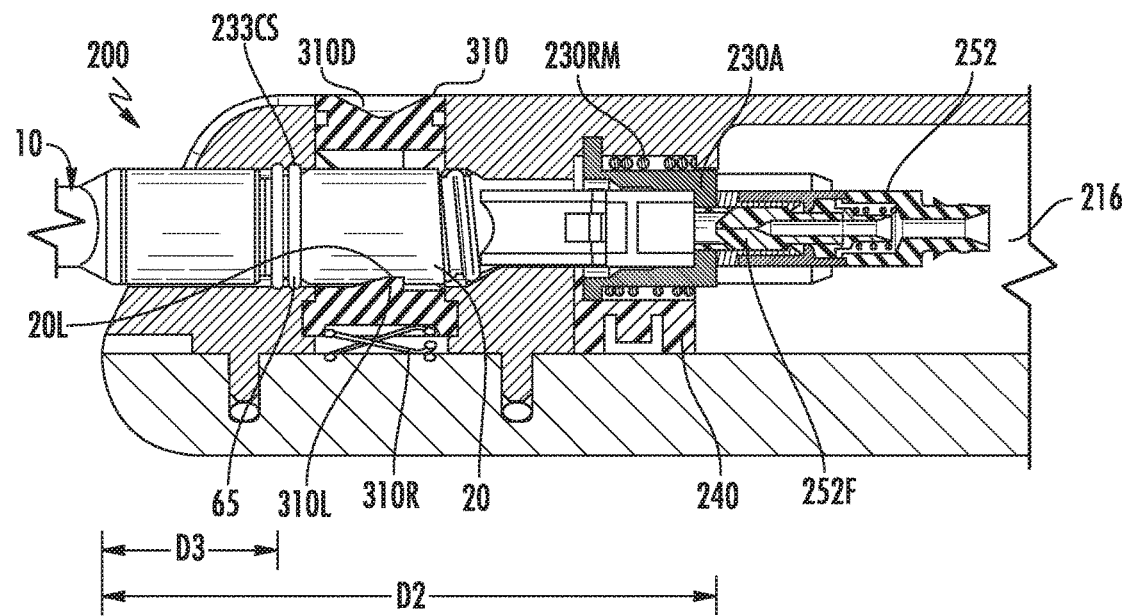
FIG. 9 is a longitudinal cross-sectional view of a portion of the multiport of FIG. 5 depicting an optical connector disposed in the connection port and retained by the securing feature.

As shown in FIG. 3E, securing feature 310 comprises a locking feature 310L. Locking feature 310L cooperates with a portion of the connector 10 when it is fully-inserted into the connection port 236 for securing the same. Specifically, the connector housing 20 of connector 10 may have a cooperating geometry that engages the locking feature 310L of securing feature 310. In this embodiment, locking feature 310L comprises a ramp (not numbered). The ramp is integrally formed at a portion of the bore 310B with the ramp angling up when looking into the connection port 236. The ramp allows the connector 10 to push and translate the securing feature 310 downward against the securing feature resilient member 310R as the connector 10 is inserted in the connection port 236 as shown. Ramp may have any suitable geometry. Once the locking feature 310L of the securing feature 310 is aligned with the cooperating geometry of the locking feature 20L of connector 10, then the securing feature 310 translates so that the locking feature 310L engages the locking feature 20L of connector 10. FIGS. 8 and 9 depict a similar securing feature 310 illustrating the concepts with and without a connector 20.

Locking feature 310L comprises a retention surface 310RS. In this embodiment, the back-side of the ramp of locking feature 310L forms a ledge that cooperates with complimentary geometry on the connector housing 20 of connector 10. However, retention surface 310RS may have different surfaces or edges that cooperate for securing connector 10 for creating the desired mechanical retention. For instance, the retention surface 310RS may be canted or have a vertical wall for tailoring the pull-out force for the connection port 236. However, other geometries are possible for the retention surface 310RS. Additionally, the connection port 236 has a sealing location at a connection port passageway sealing surface 233SS with the connector 10 that is located closer to the optical connector opening 238 at the outer surface 234 than the securing feature 310 or locking feature 310L. Illustratively, connection port 236 has connection port passageway sealing surface 233CS for the connector 10 disposed at a distance D3 from the optical connector opening 238 and the locking feature 310L and securing feature 310 are disposed at a distance further into the connection port passageway 233 than distance D3 such as shown in FIG. 3E.

Other types of securing members 310 disclosed herein may operate in a similar manner for securing connector 10, but comprise more than one component such as an actuator 310A that cooperates with a securing member 310M such as disclosed herein. Additionally, the use of more than one component allows other arrangements for the securing feature passageway 245 relative to a longitudinal axis LA of the device.

The connection port insert 230 comprises a body having a front face FF and a plurality of connection ports 236. Each connection port 236 has an optical connector opening 238 extending from the front face FF into the connection port insert 230 with a connection port passageway 233 extending through part of the connection port insert 230 to a rear face RF (not visible) of the connection port insert 230. Connection port insert 230 is sized so that at least a portion of the connection port insert 230 fits into a first opening of the shell 210 such as as shown in FIG. 28E. As shown, the connection port passageway 233 comprises a keying portion 233KP disposed forward of the securing feature 310 in connection port passageway. The sealing location of the connector port insert 230 with the shell (210) comprises a sealing surface (233SS) disposed a first distance (D1) inward from the outer surface (234) of the device and disposed on a portion of connection port passageway 233. The adapters 230A align the rear connectors 252 at a connector mating position MP disposed inward from the outer surface (234) of the multiport at a distance D2, where the second distance (D2) is greater that the first distance (D1). Additionally, the connection port insert 230 may comprise one or more components or include a feature for sealing with the shell 210 for making the multiport weatherproof. However, the devices could be made to be re-enterable if desired.

In more detail, connection port inserts 230 may also comprise a sealing location 230SL for providing a surface and location for making a weatherproof attachment to shell 210. Sealing location may be disposed at a first distance D1 from the front face 234 of the connector port insert 230. Sealing location is a disposed at a suitable distance D1 for providing a suitable seal with the shell 210. Connection port inserts 230 also have a connector mating plane 230MP disposed at a second distance D2 from the front face 234. The connector mating plane 230MP is disposed within the cavity of the shell 210 of the multiport for protecting the connector mating interface. In some particular embodiments, the connector port insert 230 comprises a sealing location 230SL disposed at a first distance D1 from the front face 234 and the connector mating position 230MP is disposed at the second distance D2 from the front face 234 with the second distance D2 being greater than the first distance D1.

The sealing location 230SL may comprise a sealing element 290 disposed between the connection port insert 230 and the shell 210. The sealing locations 230SL may comprise respective grooves in the connector port insert 230 or end cap 280 if used. Grooves may extend about the perimeter of the connection port insert 230 and are located at respective distances D1 from the front face 234 of the connection port insert 230 and end cap 280. Grooves may receive one or more appropriately sized O-rings or gaskets 290A for weatherproofing multiport 200. The O-rings are suitably sized for creating a seal between the connector port insert 230 and the shell 210. By way of example, suitable O-rings may be a compression O-ring for maintaining a weatherproof seal. Other embodiments may use an adhesive or suitable welding of the materials for sealing the device.

Variations of multiports 200 depicted in FIGS. 3A-3C are possible as well. For instance, the multiports depicted in FIGS. 3A-3C can have other features or constructions using a second insert 230' that is similar to the connection port insert 230. For instance, the second insert 230' comprises a body 232 having a front face 234 comprising a plurality of connection ports 236 having an optical connector port opening 238 like the connection port insert 230. Second inserts 230' can have other configurations as well for use with the multiports disclosed herein.

Other embodiments are possible that do not use a connection port insert as described. By way of explanation, the one or more connector ports 230 and the one or more securing feature passageways 245 are a portion of the shell 210. Illustratively, FIGS. 4A and 4B depict multiport 200 comprising a shell 210 comprising a body 232 with one or more connection ports 236 disposed on a first end or portion 212 with each connection port 236 comprising a respective optical connector opening 238. The optical connector openings extend from an outer surface 234 of shell 210 of the multiport 200 into a cavity 216 and define a connection port passageway 233. One or more respective securing feature passageways 245 extend from the outer surface 234 of the shell 210 to a portion of the respective connection port passageways 233. A plurality of security features 310 are associated with the respective plurality of connection port passageways 233 and at least a portion of the securing features are disposed within a portion of respective securing feature passageways 245. Moreover, the multiports 200 disclosed may have any suitable number of connection ports 236, input connection ports 260 or the like using the concepts disclosed.

For the sake of brevity, the concepts will be illustrated and described in more detail with respect to the embodiment of FIGS. 4A and 4B, but it is understood that the structure or features disposed in the shell 210 may also be disposed in the connection port insert 230 depicted in FIGS. 3A and 3B as appropriate. Further, multiports according the concepts disclosed may have any suitable number of ports as desired along with suitable optical fiber distribution, pass-throughs, or like.

Figure 5:
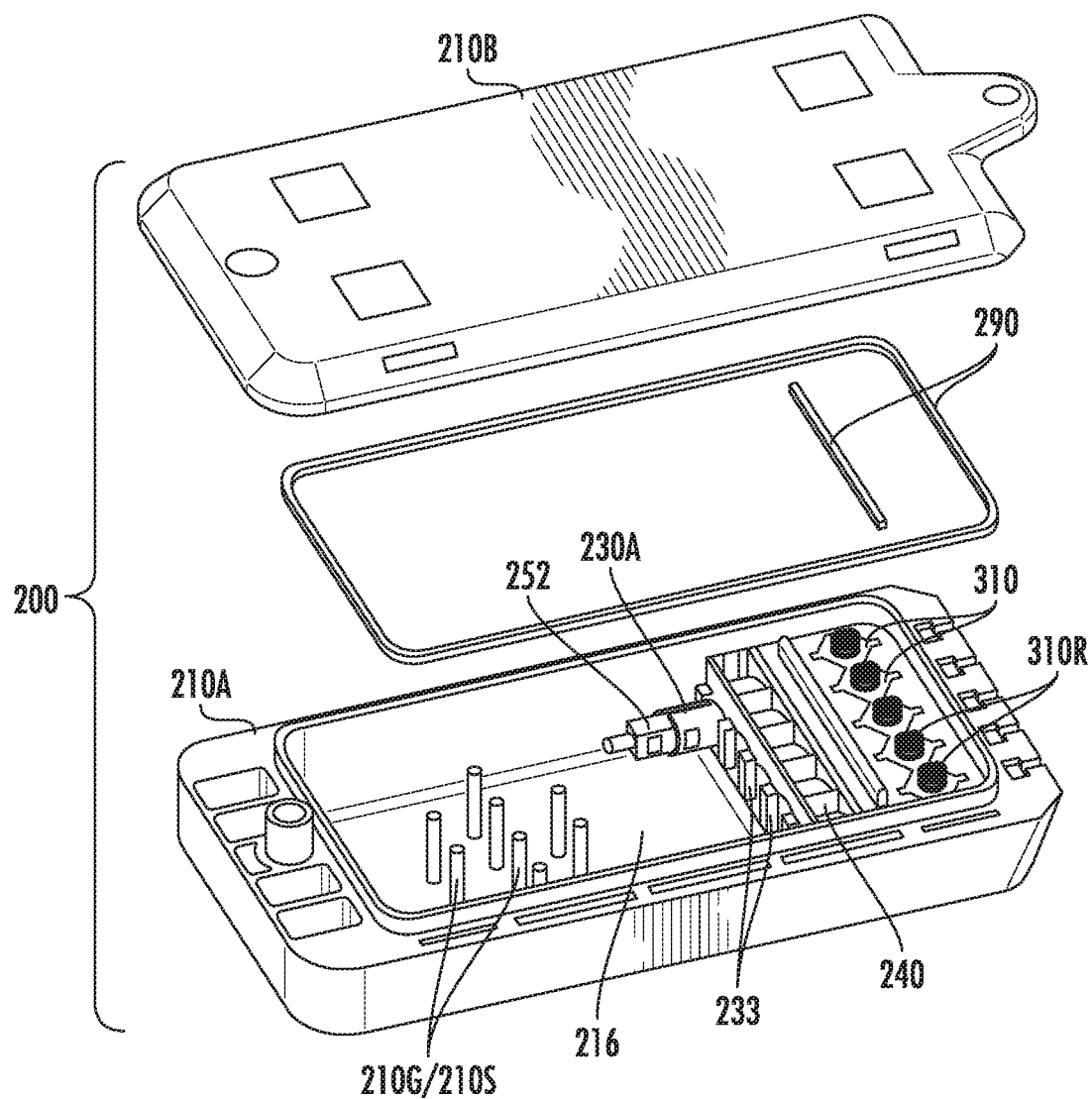
FIG. 5 depicts a bottom perspective view of the representative multiport of FIGS. 4A and 4B with a portion of the shell opened for showing the internal construction of the multiport with one rear (internal) connector shown and the optical fibers removed for clarity.
Figure 6:
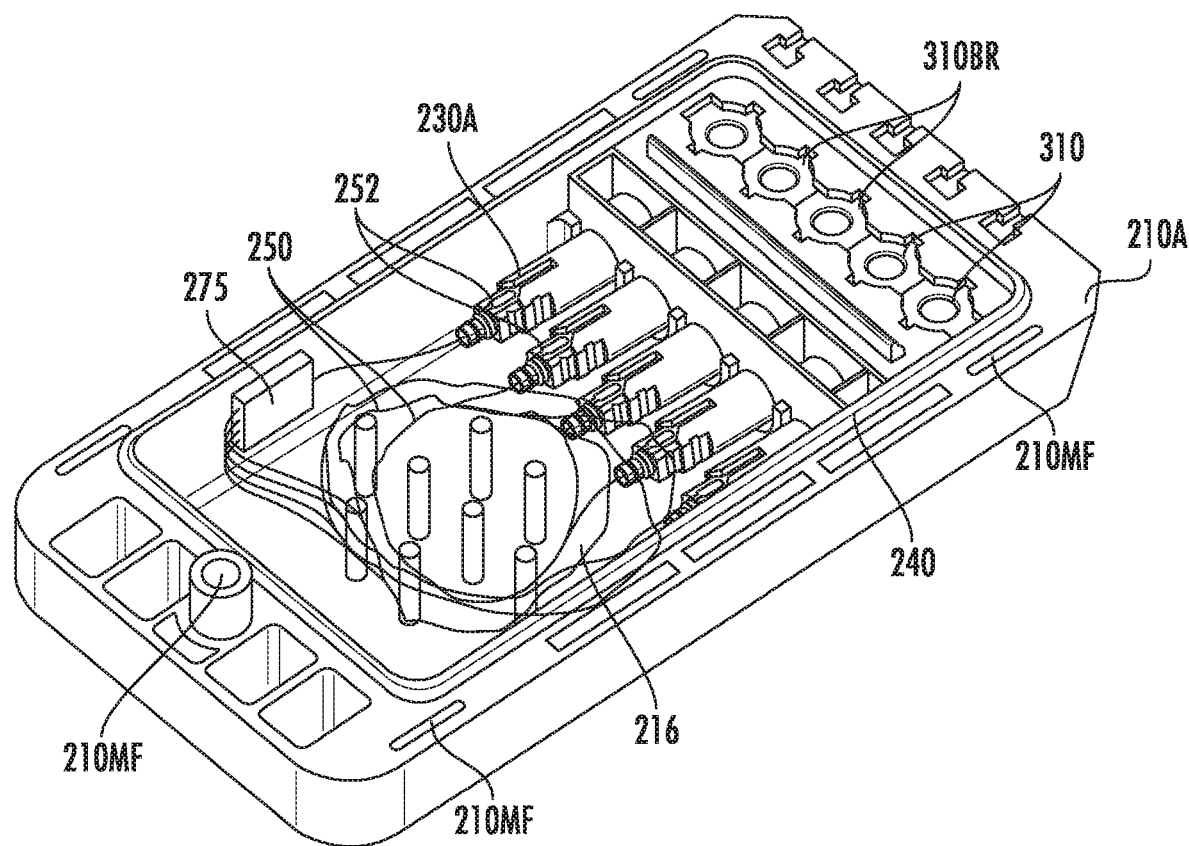
FIG. 6 is a bottom perspective view of the multiport of FIG. 5 with a portion of the shell removed and a plurality of rear connectors and the optical fibers shown.
Figure 10:
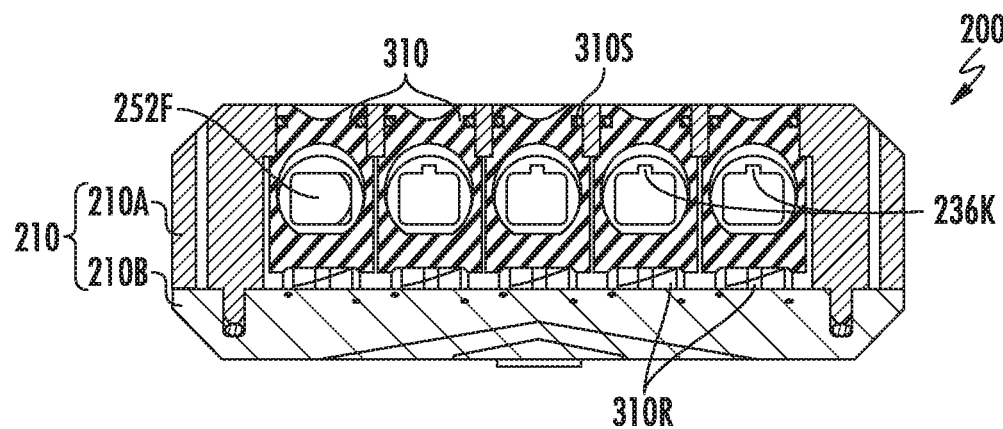
FIG. 10 is a transverse cross-sectional view of the multiport of FIG. 5 taken through the securing features with a rear optical connector disposed in one of the optical connection ports.
Figure 11:
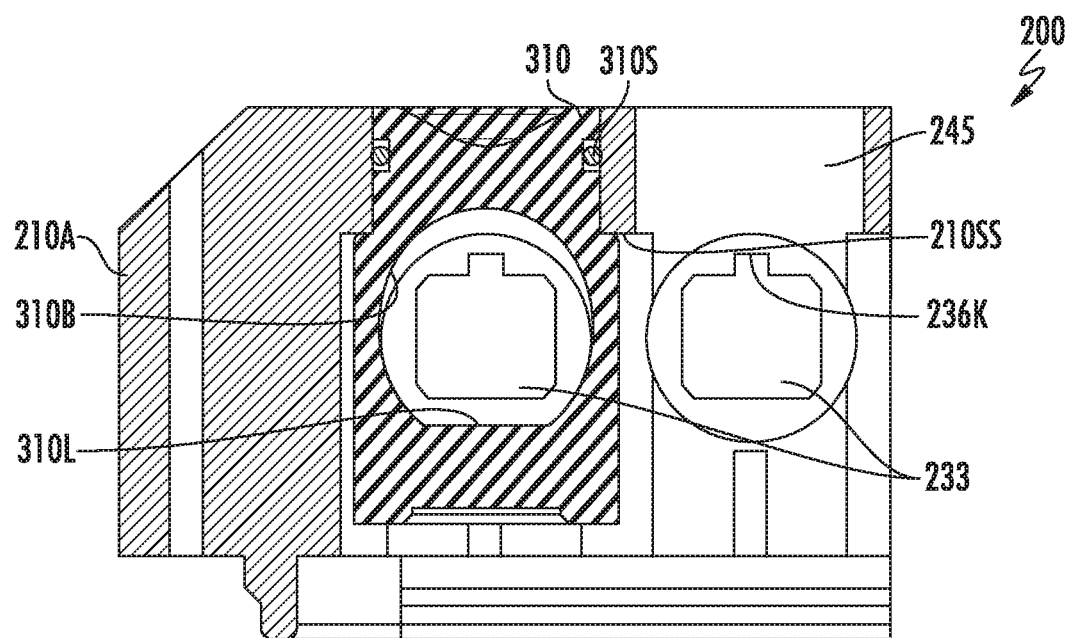
FIG. 11 is a detailed transverse cross-sectional view of the multiport of FIG. 5 showing a securing feature passageway with a securing feature disposed therein and an adjacent securing feature passageway without a securing feature disposed therein.

FIGS. 5-7 depict various views of multiport 200 of FIGS. 4A and 4B for explaining the concepts and the features may be used with other multiport designs as appropriate or modified with other concepts as appropriate or discussed herein. FIGS. 8 and 9 are longitudinal cross-sectional views respectively depicting the optical connection port 236 of the multiport 200 of FIGS. 4A and 4B with and without a connector 10 retained therein. FIGS. 10 and 11 are transverse cross-sectional views of the multiport 200 of FIGS. 4A and 4B taken through the securing features 310.

FIG. 5 depicts a bottom perspective view of a representative multiport 200 of FIGS. 4A and 4B. As depicted in this embodiment, shell 210 is formed by a first portion 210A and a second portion 210B. FIG. 5 shows the second portion 210B of shell 210 removed from the first portion 210A for showing the internal construction of multiport 200. Multiport 200 is depicted with only one rear (internal) connector 252 shown and the optical fibers 250 removed for clarity purposes in FIG. 5.

Optical fibers 250 are routed from one or more of the plurality of connection ports 236 toward an input connection port 260 for optical communication within the multiport 200. Consequently, the input connection port 260 receives one or more optical fibers and then routes the optical signals as desired such as passing the signal through 1:1 distribution, routing through an optical splitter or passing optical fibers through the multiport. Optical splitters 275 (hereinafter "splitter(s)") such as shown in FIG. 6 allow a single optical signal to be split into multiple signals such as 1×N split, but other splitter arrangements are possible such as a 2×N split. For instance, a single optical fiber may feed input connection port 260 and use a 1×8 splitter within the multiport 200 to allow eight connector ports 236 for outputs on the multiport 200. The input connection port 260 may be configured in an suitable manner with any of the multiports 200 disclosed herein as appropriate such as a single-fiber or multi-fiber port. Likewise, the connection ports 236 may be configured as a single-fiber port or multi-fiber port. For the sake of simplicity and clarity in the drawings, all of the optical fiber pathways may not be illustrated or portions of the optical fiber pathways may be removed in places so that other details of the design are visible.

FIG. 6 shows multiport 200 of FIG. 5 with the rear connectors 252 and optical fibers 250 routing through splitter 275 and FIG. 7 is a partially exploded view of FIG. 5. Multiport 200 has one or more optical fibers 250 routed from the one or more connection ports 236 toward an input connection port 260 in a suitable fashion inside cavity 216. As best shown in FIG. 9, inside the cavity 216 of multiport 200 one or more optical fibers 250 are aligned with the respective connection ports 236 for making an optical connection with connector 10. As shown, connector 10 comprises a connector housing 20 that has an O-ring 65 that cooperates with sealing location of the connector port 236 at a distance D3, which is located closer to the optical connector opening 238 than securing feature 310.

Although only one rear connector 252 is shown in FIG. 5, a plurality of rear connectors 252 (see FIG. 6) are aligned with the respective connector port passageways 233 from the rear portion 237 of connection port passageway 233 within the cavity 216 of the multiport 200. The rear connectors 252 are associated with one or more of the plurality of optical fibers 250. Each of the respective rear connectors 252 aligns and attaches to a structure such as the adapter 230A or other structure at the rear portion 237 of the connection port passageway 233 in a suitable matter. The plurality of rear connectors 252 may comprise a suitable rear connector ferrule 252F as desired and rear connectors 252 may take any suitable form from a simple ferrule that attaches to a standard connector type inserted into an adapter. By way of example, rear connectors 252 may comprise a resilient member for biasing the rear connector ferrule 252F or not. Additionally, rear connectors 252 may further comprise a keying feature.

In multiport 200 of FIG. 6, a single input optical fiber of the input connection port 260 is routed to a 1:4 splitter 275 and then each one of the individual optical fibers 250 from the splitter is routed to each of the respective four connection ports 236 for optical connection and communication within the multiport. Input connection port 260 may be configured in any suitable configuration for the multiports disclosed as desired for the given application. Examples of input connection ports 260 include being configured as a single-fiber input connection, a multi-fiber input connector, a tether input that may be a stubbed cable or terminated with a connector or even one of the connection ports 236 may function as an pass-through connection port as desired.

By way of explanation for multi-fiber ports, two or more optical fibers 250 may be routed from one or more of the plurality of connection ports 236 of the multiport 200 of FIG. 5. For instance, two optical fibers may be routed from each of the four connection ports 236 of multiport 200 toward the input connection port 260 with or without a splitter such as single-fiber input connection port 260 using a 1:8 splitter or by using an eight-fiber connection at the input connection port 260 for a 1:1 fiber distribution. To make identification of the connection ports or input connection port(s) easier for the user, a marking indicia may be used such as text or color-coding of multiport or marking the input tether (e.g. an orange or green polymer) or the like.

Other configurations are possible besides an input connection port 260 that receives a connector 10 such as a tether cable that extends from the input port. Instead of using a input connection port that receives a connector 10, multiports 200 may be configured for receiving an input tether 270 attached to the multiport such as represented in FIG. 7.

Figure 7A:
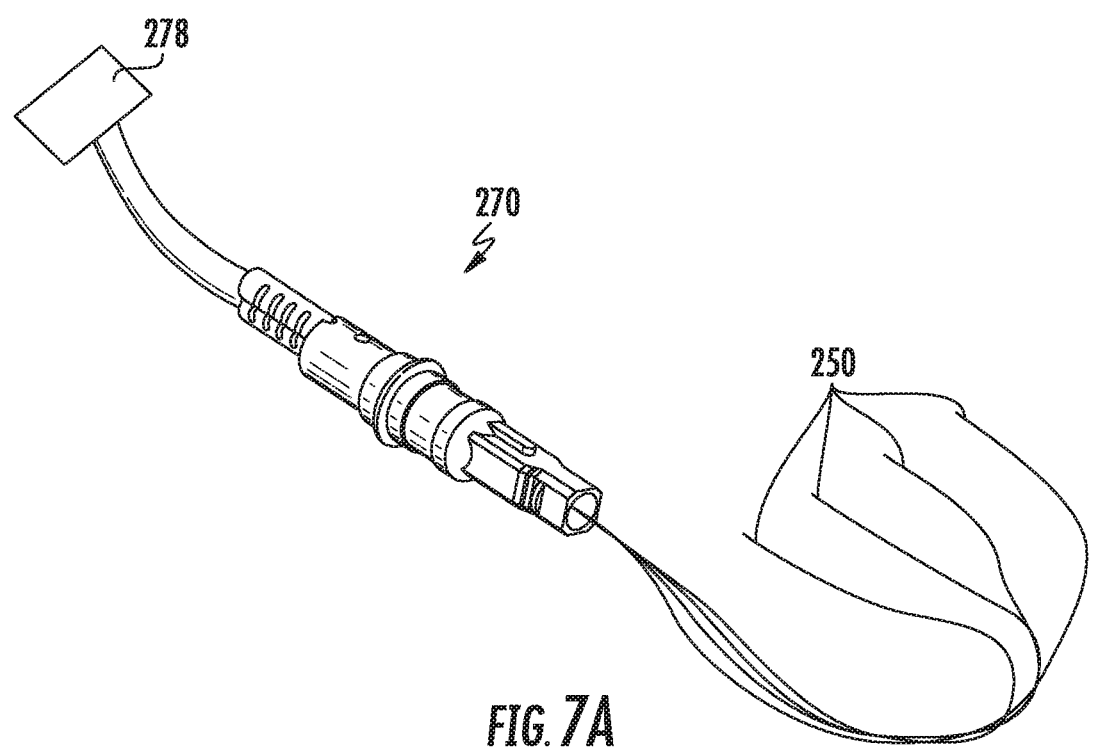
FIG. 7A is a perspective view of a input tether that may be secured at an input connection port of devices.
Figure 7B:
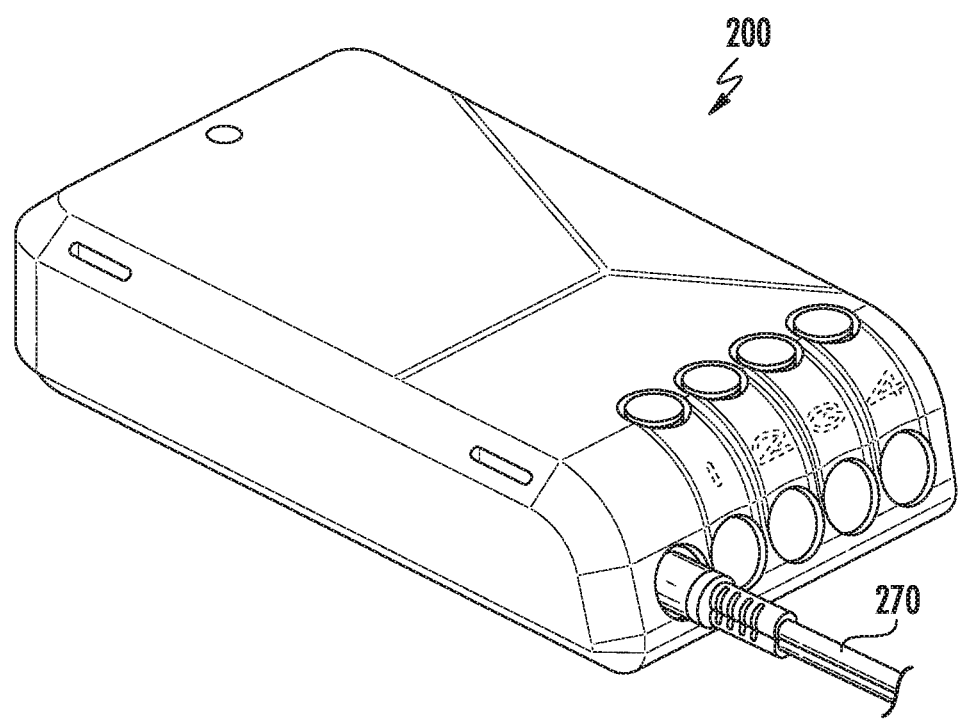
FIG. 7B is a perspective view of a device comprising the input tether secured at the input connection port.

FIG. 7A depicts an example of input tether 270 removed from a device. Input tether 270 has optical fibers 250 that enter the multiport 200 and are terminated with to rear connectors 252 for making an optical connection at the connection port 236. FIG. 7B is a perspective view of a representative multiport 200 having the input tether 270 secured at the input connection port 260. In this embodiment, there is no securing feature for the input connection port 260. However, other embodiments may retain the securing feature and secure the input tether 270 from inside the device.

If used, input tether 270 may terminate the other end with a fiber optic connector 278 as depicted or be a stubbed cable as desired. For instance, connector 278 may be an OptiTip® connector for optical connection to previously installed distribution cables; however, other suitable single-fiber or multi-fiber connectors may be used for terminating the input tether 270 as desired. Input tether 270 may be secured to the multiport 200 in any suitable manner such as adhesive, a collar or crimp, heat shrink or combinations of the same. The input tether 270 may also have stubbed optical fibers for splicing in the field if desired, instead of the connector 278.

Furthermore, the input tether 270 may further comprise a furcation body that has a portion that fits into the multiport 200 at the input port of the shell 210 or the connection port insert 230 such as into the optical connector opening 238 or bore 260B of the input connection port 260, but the furcation body may be disposed within the shell 210 if desired. The furcation body is a portion of the input tether that transitions the optical fibers 250 to individual fibers for routing within the cavity 216 of the shell 210 to the respective connector ports. As an example, a ribbon may be used for insertion into the back end of the ferrule of fiber optic connector 278 and then be routed through the input tether 270 to the furcation body where the optical fibers are then separated out into individual optical fibers 250. From the furcation body the optical fibers 250 may be protected with a buffer layer or not inside the cavity 216 of the multiport 200 and then terminated on rear connector 252 as desired.

The input tether 270 may be assembled with the rear connectors 252 and/or fiber optic connector 278 in a separate operation from the assembly of multiport 200 if the rear connectors 252 fit through the input port. Thereafter, the rear connectors 252 may be individually threaded through a bore 260B of the input connection port 260 of the multiport or connection port insert 230 with the appropriate routing of the optical fiber slack and then have the rear connectors 252 attached to the appropriate structure for optical communication with the connection port passageways 233 of the multiport 200. The furcation body may also be secured to the connection port insert in the manner desired. By way of explanation, the input tether may be secured to shell 210 or connection port insert 230 using a collar that fits into a cradle. This attachment of the input tether using collar and cradle provides improved pull-out strength and aids in manufacturing; however, other constructions are possible for securing the input tether.

Generally speaking, the connection port passageways 233 may be configured for the specific connector 10 intended to be received in the connection port 236. Moreover, the connection port passageways 233 may be configured to provide a weatherproof seal with connector 10 or dust cap 295 for inhibiting dust, dirt, debris or moisture from entering the multiport 200 at a connection port passageway sealing surface 233SS (see FIG. 9). Likewise, the connection port passageways 233 should be configured for receiving the specific rear connector 252 from the rear portion 237 for mating and making an optical connection with the connector 10.

Regarding the different embodiments, the shell 210 or connection port insert 230 may be configured as a monolithic (e.g., integral) component for making the optical connection between the rear connectors 252 and the external connectors 10 of cable assembly 100; however, other embodiments are possible according to the concepts disclosed that use multiple components. In one variation, the multiports 200 may comprise a plurality of adapters 230A that are integrally-formed with the shell 210 or connection port insert 230. In other variations, the shell 210 or connection port insert 230 may be configured to secure one or more adapters 230A thereto as separate components or assemblies. In either variation, the adapters 230A are aligned with the plurality of connection ports 236. Consequently, optical fibers of the connectors 10 are suitably aligned with the optical fibers 250 disposed within the multiport for optical communication therebetween.

Moreover, the adapters 230A may "float" relative to the shell 210 or connection port insert 230. "Float" means that the adapter 230A can have slight movement in the X-Y plane for alignment, and may be inhibited from over-traveling in the Z-direction along the axis of connector insertion so that suitable alignment may be made between mating connectors, which may include a biasing spring for allowing some displacement of the adapter 230A with a suitable restoring force provided by the spring.

Simply stated, the forces should be balanced between the both sides of these types of mated optical connections otherwise there may be concerns with one side of the mated connection over-traveling beyond its desired location, which may lead to optical performance issues especially if the connection experiences several matings and uses a floating ferrule sleeve for alignment. This over-travel condition typically is not of concern for mated connections where only side of the connection may be displaced and the other side is fixed. An example of both sides of the mated optical connection being able to be displaced occurs when both connectors have ferrules that are biased and mated within a ferrule sleeve such as when a SC connector is mated with a connector 10 as depicted in FIG. 9. Other embodiments could have an adapter sleeve that is biased instead of the rear connector ferrule being biased, which would result in a similar concern regarding forces that may result in over-travel conditions that could impact optical performance.

By way of explanation, multiports 200 that mate a rear connector 252 such as a SC with connector 10 that has a SC ferrule that is biased forward should have a spring force in connector 10 that mitigates concerns when mated within a ferrule sleeve or use a connector that has a fixed ferrule for mitigating concerns. The spring force for connector 10 should be selected to be in a range to overcome sleeve friction and the spring force of the rear connector 10. By way of explanation, when the rear connector 252 is first inserted into the adapter 230A of connection port insert 230, the ferrule 252F of the rear connector 252 contacts the ferrule sleeve 230FS and may displace the ferrule sleeve 230FS to extreme position on the right before the ferrule sleeve 230FS hits a physical stop in the adapter and the ferrule 252F is inserted into the ferrule sleeve 230FS. Thus, when the connector 10 is later inserted into the connector port 236 of the multiport it would be helpful for the ferrule to push the ferrule sleeve 230FS from an extreme position in the adapter if it was displaced. Consequently, the spring selected for biasing the ferrule of connector 10 may be selected to overcome the sum of initial friction along with the insertion friction to move the ferrule sleeve 230FS, thereby inhibiting the ferrule sleeve 230FS from being displaced to a maximum position due to the rear connector 252 being inserted first.

The construction of multiport 200 of FIG. 5 having securing feature 310 is discussed in more detail with respect to FIGS. 8-11, and similar details are applicable to multiports 200 using a connection insert 230 such as depicted in FIGS. 4A and 4B. FIG. 8 depicts a longitudinal sectional view show securing feature 310 disposed within a portion of securing feature passageway 245 along with the rear connector 252 attached at the rear portion 237 of the connection port 236 of multiport 200 and FIG. 9 depicts connector 10 of cable assembly 100 inserted into connection port 236 and retained by securing feature 310. FIG. 8 depicts the connection port passageway 233 comprising a keying portion 233KP as discussed herein.

The rear connector 252 shown in FIGS. 8 and 9 has a SC footprint, but other connectors are possible. If SC connectors are used as the rear connector 252 they have a keying feature 252K that cooperates with the keying feature of adapter 230A. Additionally, adapters 230A comprise a retention feature (not numbered) for seating the adapters 230A in the device adjacent to the connection port passageway 233. In this embodiment, the retention feature is configured to cooperate with a plurality of saddles 210D for receiving and seating adapters 230A. Adapters 230A may be secured to the shell 210A or connection port insert 230 using an adapter retainer 240. Adapters 230A may comprise latch arms for securing respective rear connectors therein. In other embodiments, adapters 230A may be ganged together or formed from several components, but some adapters or portions thereof could be integrally formed with the multiport as well.

As shown in FIG. 9, the connector mating plane 230MP between the ferrule of the rear connector 252 and ferrule of connector 10 is disposed within the cavity 216 multiport 200 for protecting the connector mating interface. Connector 10 comprises at least one O-ring 65 for sealing with the connector port passageway 233 at a sealing surface 233SS when the connector 10 is fully inserted into the connection port 236. Moreover, connector 10 includes a locking feature 20L on the housing 20 for cooperating with a securing feature 310 of multiport 200.

Multiports 200 may also comprise a keying feature 236K that is disposed rearward of the securing feature 310 (i.e., deeper into the connection port passageway 233) for aligning and mating connector 10, for instance, connection port 236 or input connector port 260 may include a keyway or key such as shown in FIGS. 10 and 11. Keying feature 236K is disposed on the connector mating plane 230MP side of the securing feature 310.

Multiport may also have a keying portion 233KP disposed on the optical connector opening 238 side of the securing feature 310. Keying portion 233KP inhibits the insertion of a non-compliant connector into connection port 236, thereby inhibiting damage that may be caused to the device. Keying portion 233KP may be a protrusion or additive feature disposed within the connection port passageway 233 on the optical connector opening 238 side of the securing feature 310 and may take several different configuration if used. For instance, keying portion 233KP may be a simple protrusion or may take the shape of a D-shaped opening to allow only a suitable connector 10 having a complimentary feature to be inserted into the connection port 236. The keying portion 233KP may also aid with blind mating a connector 10 into the connection port 236 since it only allows further insertion into the connection port 236 when the connector is in the proper rotational orientation.

As best shown in FIGS. 8 and 9, multiport 200 of FIG. 5 comprises at least one securing feature resilient member 310R for biasing the at least one securing feature 310. FIGS. 12-14 show various perspective detailed views of securing feature 310. In this embodiment, securing features 310 may translate in a vertical direction as represented by the arrow in FIG. 8 for retaining and releasing connector 10 and acts as an actuator. As depicted, the resilient member 310R is disposed below the securing feature 310 in the securing feature passageway 245 for biasing the securing feature 310 upwards to a normally retained position (RP). Securing feature 310 further includes a locking feature 310L. Locking feature 310L is configured for engaging with a suitable locking portion 20L on the housing 20 of connector 10.

In this embodiment, securing feature 310 comprise a bore 310B that is respectively aligned with the respective connector port passageway 233 as shown in FIG. 8 when assembled. The bore 310B is sized for receiving a portion of connector 10 therethrough as shown in FIG. 9. As depicted in this embodiment, locking feature 310L is disposed within bore 310B. As best shown in FIGS. 12 and 13, locking feature 310L is configured as ramp 310RP that runs to a short flat portion, then to a ledge that reverts to a round cross-section for creating the retention surface 310RS for engaging and retaining the connector 10 once it is fully-inserted into the connector port passageway 233 of the connection port 236. Consequently, the securing feature 310 is capable of moving to an open position (OP) when inserting a suitable connector 10 into the connector port passageway 233 since the connector housing 20 engages the ramp 310RP pushing the securing feature downward during insertion.

The securing feature 310 translates from a retain position (RP) to an open position (OP) as a suitable connector 10 is inserted into the connection port 236. Once connector 10 is fully inserted into connector passageway 233, then the securing feature 310 automatically moves to the retain position (RP) since it is biased upwards to the retain position. This advantageously allows a plug and play connectivity of the connectors 10 with multiport 200 without having to turn a coupling nut or a bayonet like conventional multiports. Thus, connections to the multiport may be made faster and in positions that may be awkward with relative ease.

Securing feature 310 may also comprise other features as best depicted in FIGS. 12-14. For instance, securing feature 310 may include a sealing member 310S disposed above the connector port passageway 233 for keeping dirt, debris and the like out of portions of the multiport 200. Sealing member 310S is sized for the retention groove 310RG in the securing feature 310 and the securing feature passageway 245 for sealing.

Sealing member 310 may also comprises one or more guides 310G that cooperate with the shell 210 or connection port insert 230 for keeping the bore 310B in the proper rotational orientation within the respective securing feature passageway 245 during translation. In this embodiment, two guides 310G are arranged about 180 degrees apart and guide the translation of the securing feature 310. Securing feature 310 may also comprise one or more keys 310K that cooperate with the shell 210 or connection port insert 230 for only allowing one assembly orientation into the shell 210 or connection port insert 230, thereby keeping the locking feature 310L in the proper position within the respective securing feature passageway 245 with respect to the connector insertion direction.

Securing feature 310 may also comprise a stop surface 310SS for inhibiting overtravel or the securing feature 310 from being removed from the multiport 200 when assembled. In this embodiment, the stop surface 310SS is disposed as the top surface of guides 310G. Securing feature 310 may also include a dimple 310G or other feature for inhibiting inadvertent activation/translation of the securing feature 310 or allowing a tactical feel for the user. Securing features 310 may also be a different color or have a marking indicia for identifying the port type. For instance, the securing features 310 may be colored red for connection ports 236 and the securing feature 310 for the input connection port 260 may be colored black. Other color or marking indicia schemes may be used for pass-through ports, multi-fiber ports or ports for split signals.

The rear connector 252 shown in FIGS. 8 and 9 has a SC footprint. The SC connectors used as the rear connector 252 has a keying feature 252K that cooperates with the keying feature of adapter 230A. Additionally, adapters 230A comprise a retention feature 233A disposed in the connection port passageway 233 and are configured as latch arms for securing a SC connector at the rear portion 237 of connection port insert 230.

Multiports may also have one or more dust caps (FIG. 7) for protecting the connection port 236 or input connection ports 260 from dust, dirt or debris entering the multiport or interfering with the optical performance. Thus, when the user wishes to make an optical connection to the multiport, the appropriate dust cap is removed and then connector 10 of cable assembly 100 may be inserted into the respective connection port 236 for making an optical connection to the multiport 200. Dust caps 295 may use similar release and retain features as the connectors 10. By way of explanation, when securing feature 310 is pushed inward or down, the dust cap 295 is released and may be removed. Dust caps 295 may be attached to a rail 295R by a tether 295T or singulated as desired. The rail 295R is configured to engage a groove 230DR formed in shell 210 or the connection port insert 230. Consequently, the dust caps 295 of the multiport 200 are tethered to the multiport 200 so the dust caps 295 will not be lost as easily.

Figure 15:
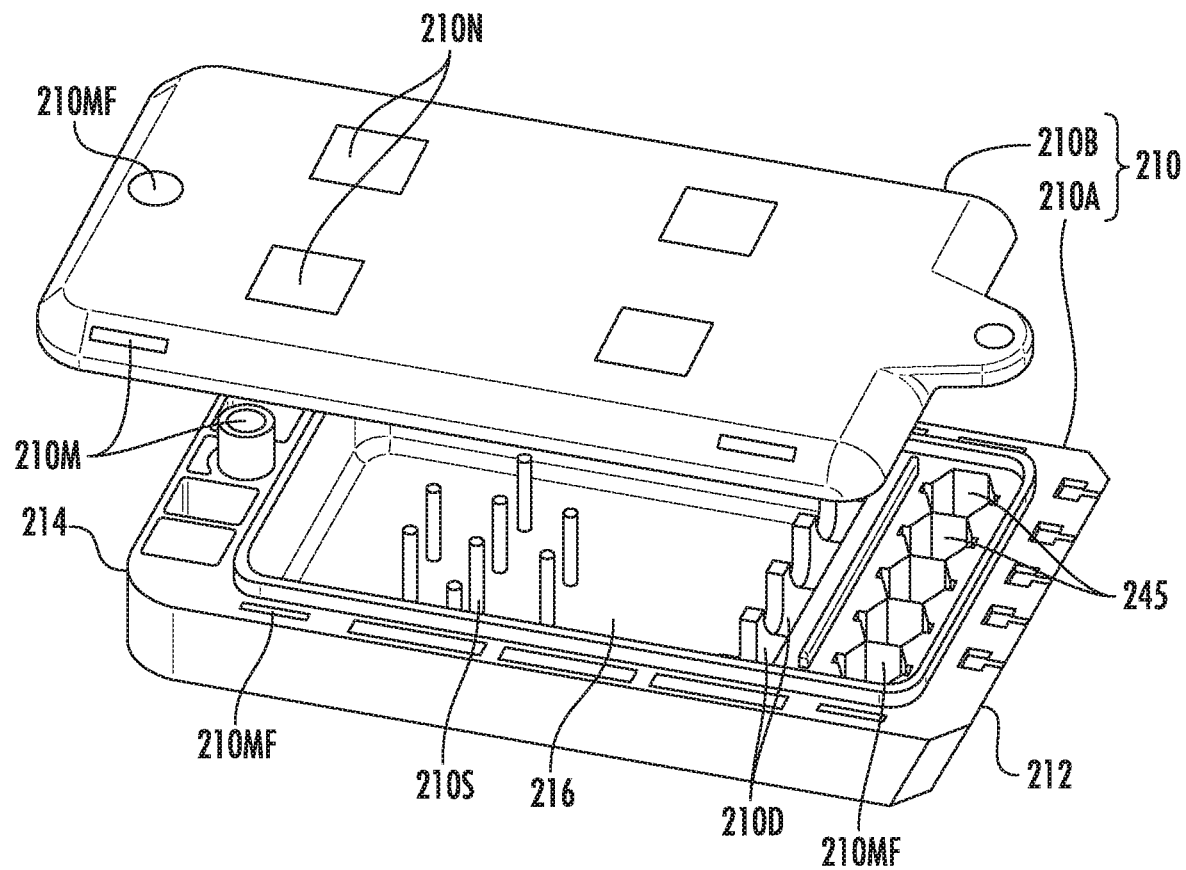
FIG. 15 is a bottom perspective view of the shell of the multiport of FIG. 5 comprising a first portion and a second portion.
Figure 16:
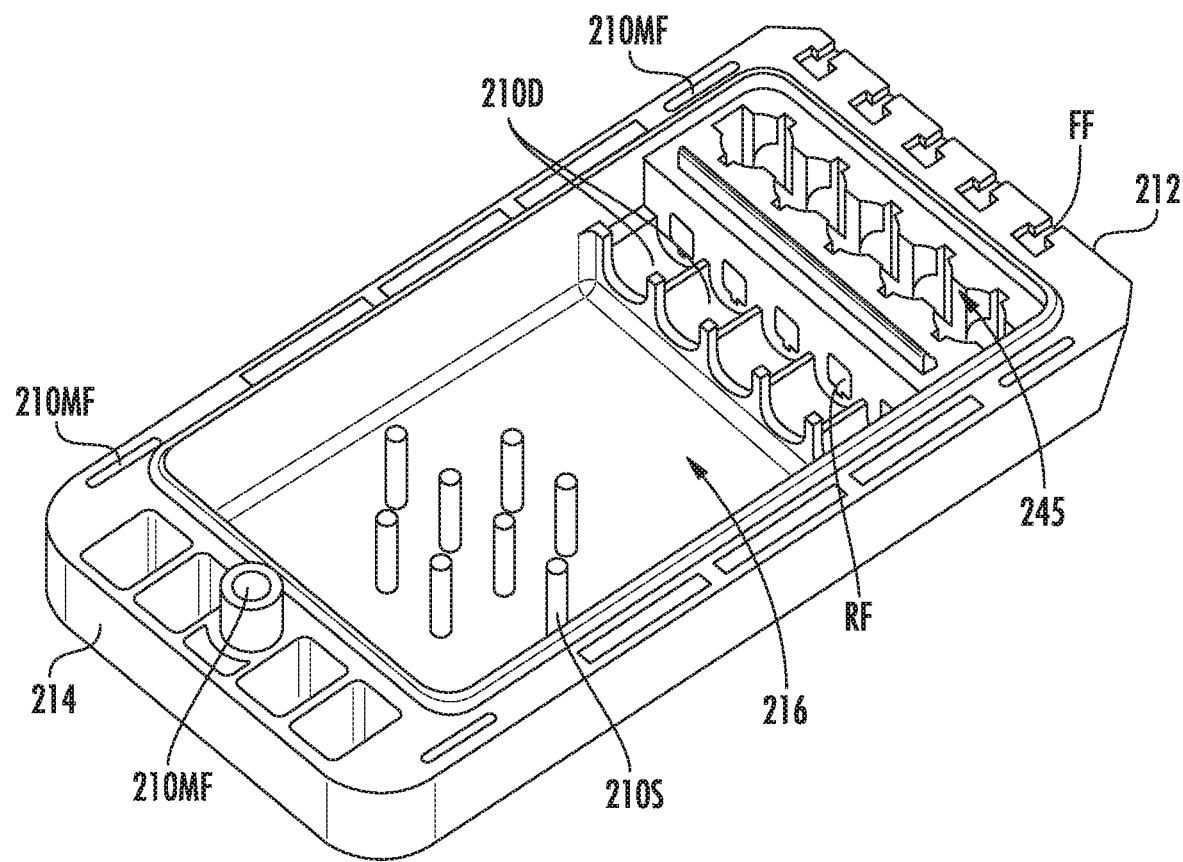
FIGS. 16-18 are various views of a first portion of the shell of FIG. 12.

FIG. 15 depicts shell 210 of multiport 200 of FIG. 5 and FIGS. 16-18 depict various views of the first portion 210A of shell 210 of FIG. 5. Shells 210 may have any suitable shape, design or configuration as desired. For instance, the shell 210 of multiport 200 shown in FIG. 15, may include a second end 213 comprising one or more connection ports, pass-through ports, or the like as desired. Further, shells 210 may comprise more than two portions if desired. Likewise, multiple portions of the shell 210 may comprise connection ports 236.

Any of the multiports 200 disclosed herein may optionally be weatherproof by appropriately sealing seams of the shell 210 or the connection port insert(s) 230 with the shell 210 using any suitable means such as gaskets, O-rings, adhesive, sealant, welding, overmolding or the like. Moreover, the interface between the connection ports 236 and the dust cap or connector 10 may be sealed using appropriate geometry and/or a sealing element such as an O-ring or gasket. Likewise, the input connection port may be weatherproofed in a suitable manner depending on the configuration such as a gasket, or O-ring with an optical connection or a heat shrink, adhesive or the like when using a input tether. If the multiport 200 is intended for indoor applications, then the weatherproofing may not be required.

Multiport 200 may comprise integrated mounting features. By way of example, shell 210 depicts mounting features 210MF disposed near first and second ends 212,214 of shell 210. Mounting feature 210MF adjacent the first end 212 is a mounting tab and the mounting feature 210MF adjacent the second end 214 is a through hole. However, mounting features 210MF may be disposed at any suitable location on the shell 210 or connection port insert 230. For instance, multiport 200 also depicts a plurality of mounting features 210MF configured as passageways disposed on the lateral sides. Thus, the user may simply use a fastener such as a zip-tie threaded thru these lateral passageways for mounting the multiport 200 to a wall or pole as desired.

Multiport 200 may have the input connection port 260 disposed in any suitable location. By way of explanation, multiport 200 may have the input connection port 260 disposed in an outboard position of the connection port insert 230. However, the input connection port 260 may be disposed in a medial portion of the multiport if desired.

Figure 17:
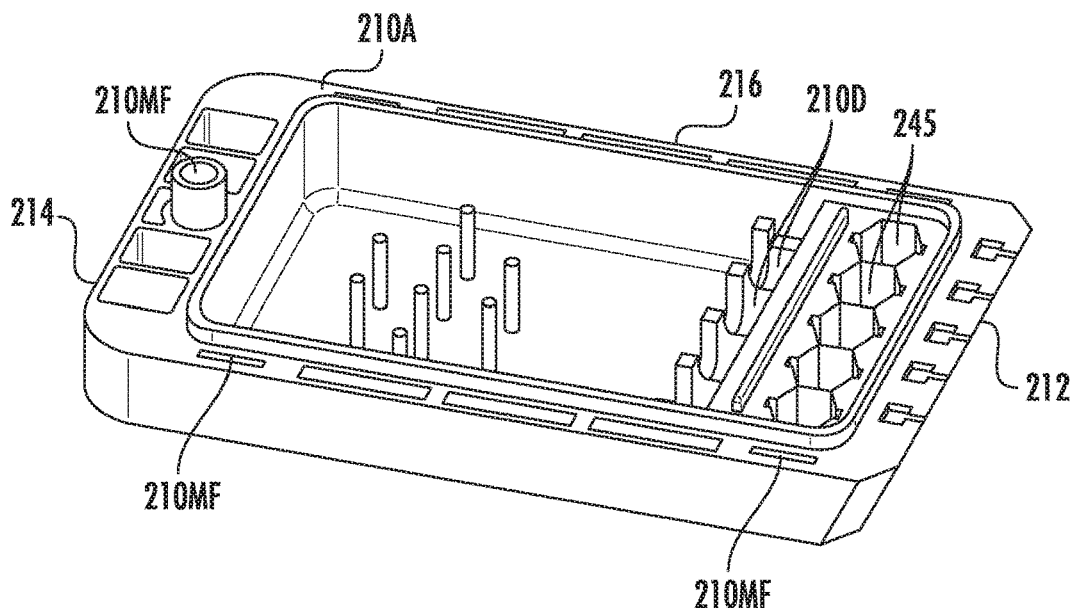

Additionally, shells 210 may comprise at least one support 210S or fiber guide 210G disposed within cavity 216, thereby providing crush support for the multiport and resulting in a robust structure. As best depicted in FIG. 17, one or more of securing feature passageways 245 are arranged transversely to a longitudinal axis LA of the multiport 200 or shell 210. Multiport may include a fiber tray or fiber guide/supports that is a discrete component that may attach to the shell 210 or connector port insert 230; however, fiber guides may be integrated with the shell if desires. FIG. 17 shows shell 210 comprise fiber guides 210G for organizing and routing optical fibers 250. Fiber guides 210G may also act as support 210S for providing crush strength to the shell 210 if they have a suitable length.

Figure 19:
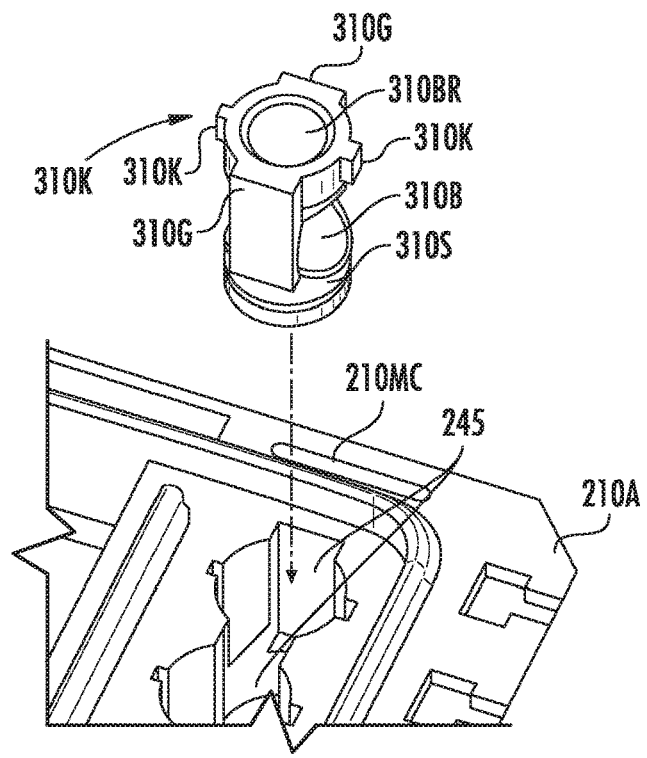
FIG. 19 is a perspective view of the securing feature being installed into the securing feature passageway of the shell of the multiport of FIG. 5.
Figure 20:
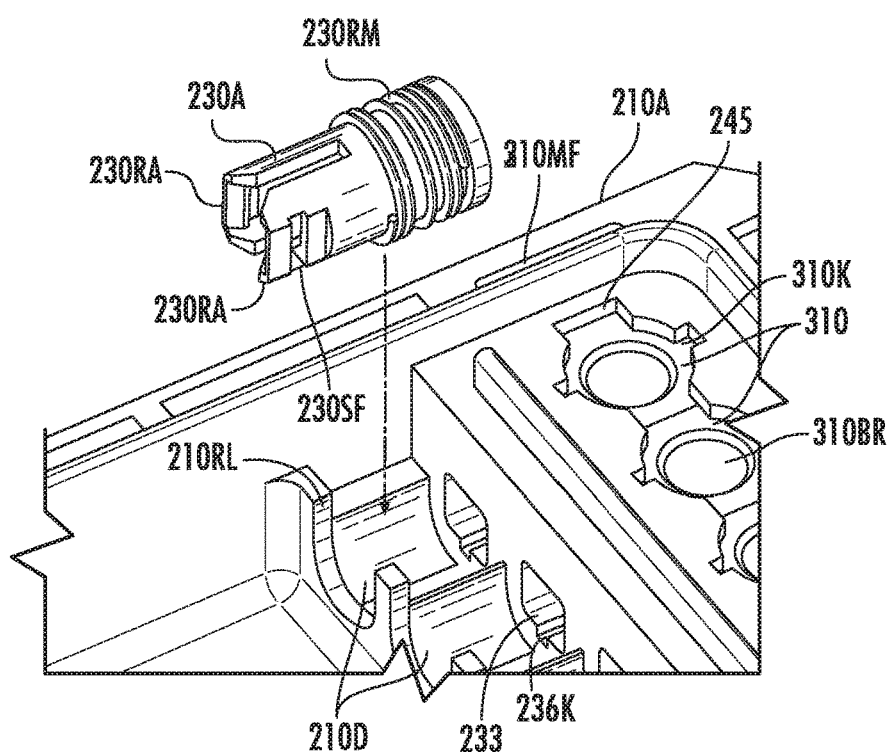
FIG. 20 is a perspective view of an adapter being installed into the shell of the multiport of FIG. 5.
Figure 21:
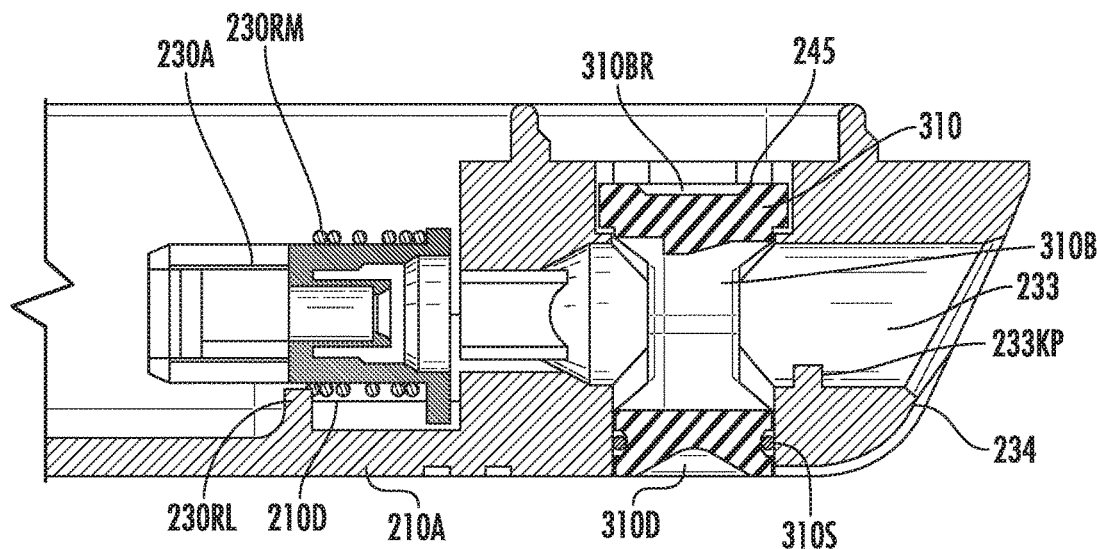
FIG. 21 is a longitudinal cross-sectional view of a portion of the optical connection port with a keying portion of FIG. 16 shown upside down with the rear connector removed from the adapter.
Figure 22:
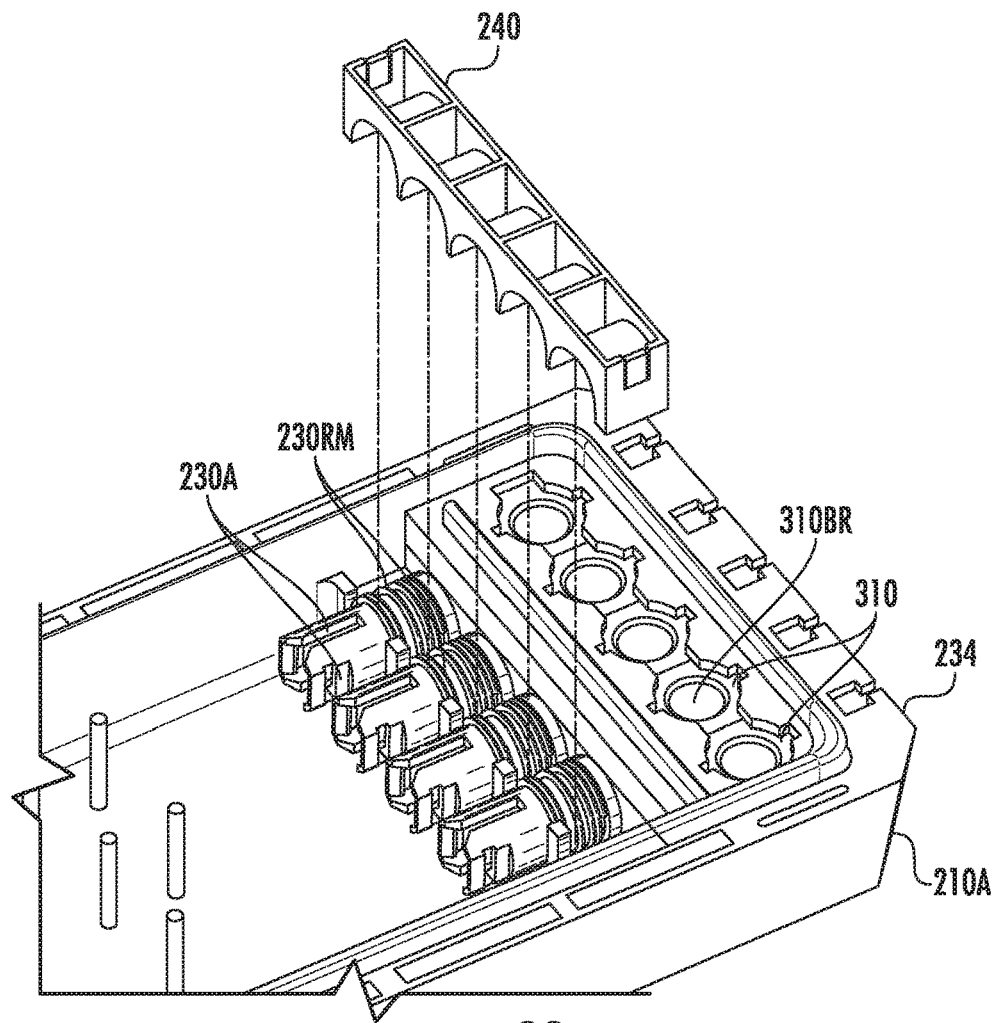
FIG. 22 depicts the adapters disposed within a portion of the shell of the multiport of FIG. 5 and being secured in place by an adapter retainer.

FIGS. 19-26 depict the assembly of multiport 200 of FIG. 5. FIGS. 19-26 depict the assembly of the multiport 200 of FIG. 5. FIG. 19 depicts the securing feature 310 being aligned for installation into the securing feature passageway 245 of the first portion 210A of shell 210. As depicted, keying features 310K of securing feature 310 are aligned with the features of the securing feature passageway 245, which only allow assembly in one orientation for the correct orientation of the locking feature 310L. FIG. 20 shows adapter 230A being aligned for installed into the saddle 210D of first portion 210A of shell 210. Once seated, the resilient member 230RM of adapter 230A is abutted against the rear ledge 210RL of saddle 210D, thereby compressing the resilient member 230RM and providing a suitable forward-biasing force to the adapter 230A as shown in FIG. 21. Once all of the adapters 230A are installed into first portion 210A, retainer 240 may be secured to first portion 210A for securing the adapters 230A in place as depicted in FIG. 22. Retainer 240 may include securing features 240A for a robust assembly, but fasteners or other suitable structure may be used to attach the retainer 240

Figure 23:
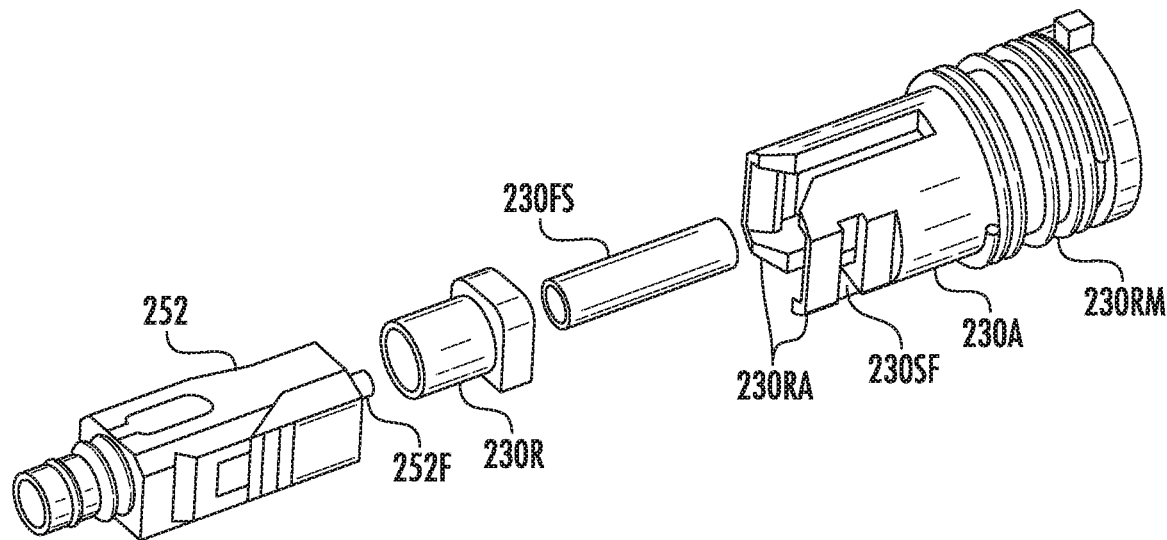
FIG. 23 is a partially exploded view showing one type of rear connector removed from the adapter along with the alignment sleeve retainer and the ferrule sleeve.
Figure 23A:
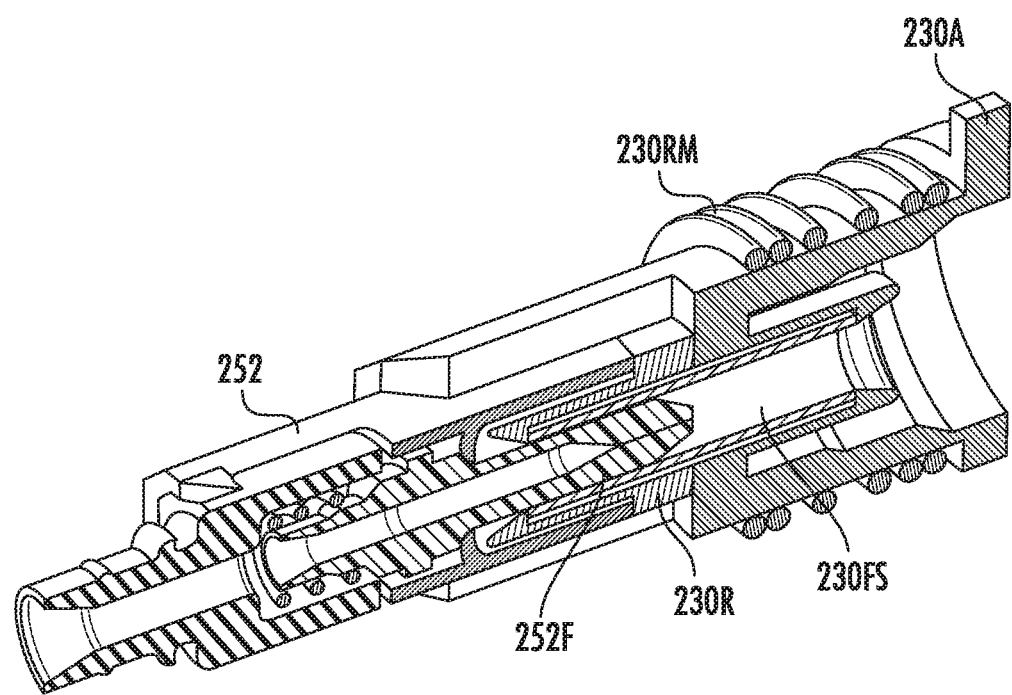
FIG. 23A is an assembled sectional view showing the rear connector of FIG. 23 attached to the adapter along with the ferrule sleeve retainer and the ferrule sleeve installed for aligning mating ferrules.

The devices disclose may use any suitable rear connector 252 for making an optical connection at the connection port 236. Illustratively, FIG. 23 depicts rear connector 252 comprising a ferrule 252F for securing and mating one or more to optical fibers 250 aligned with adapter 230A along with other components before being assembled. Rear connector 252 is a SC connector as known in the art, but any suitable device having a ferrule or other structure for receiving and aligning one or more optical fibers 250 from inside the multiport is possible. FIG. 23A is an assembled sectional view showing the rear connector 252 attached to the adapter 230A with the ferrule sleeve retainer 230R and the ferrule sleeve 230FS installed for aligning mating ferrules.

Figure 24:
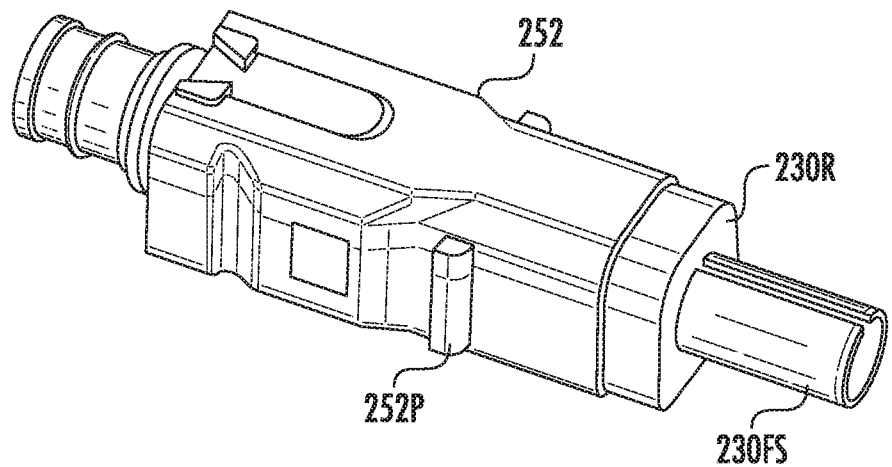
FIG. 24 is a perspective view of the rear connector of FIG. 23 with the ferrule sleeve retainer and ferrule sleeve aligned on the rear connector.
Figure 24A:
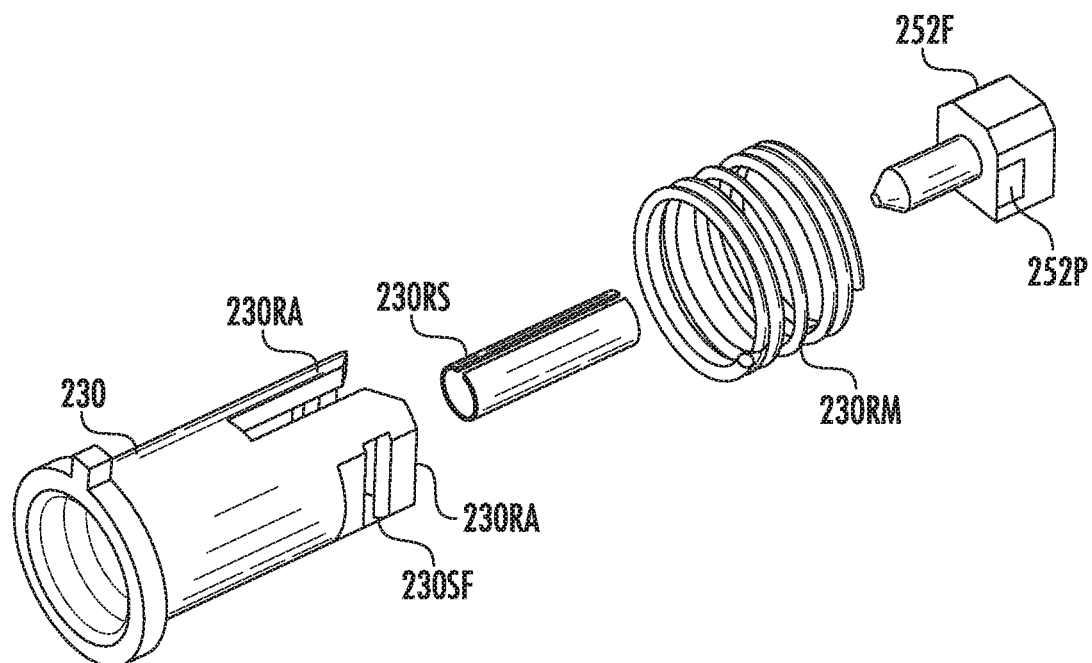
FIGS. 24A-24D depict various views of another construction for the rear connector that is received in the adapter and may be used with the concepts disclosed.
Figure 24B:
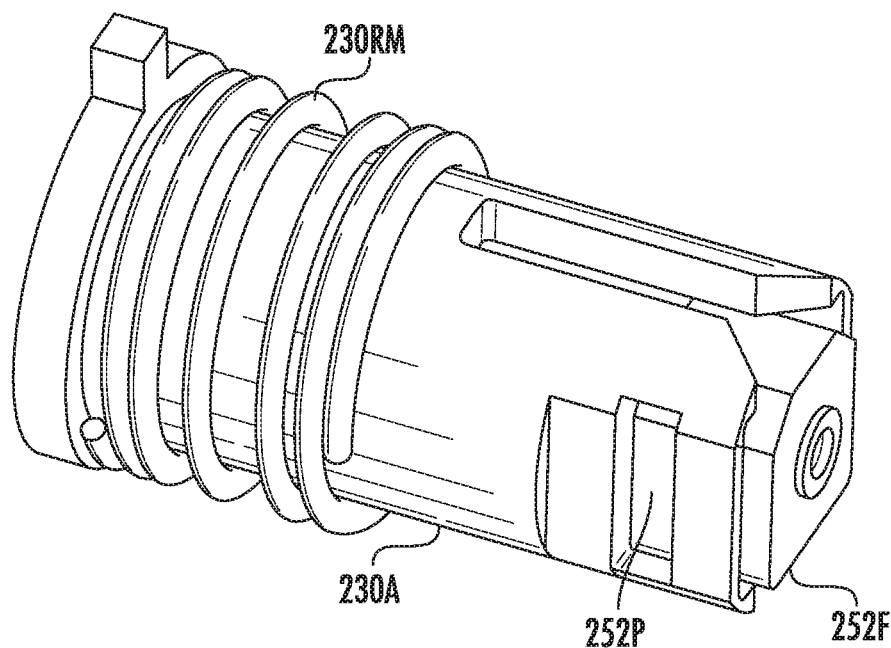
Figure 24C:
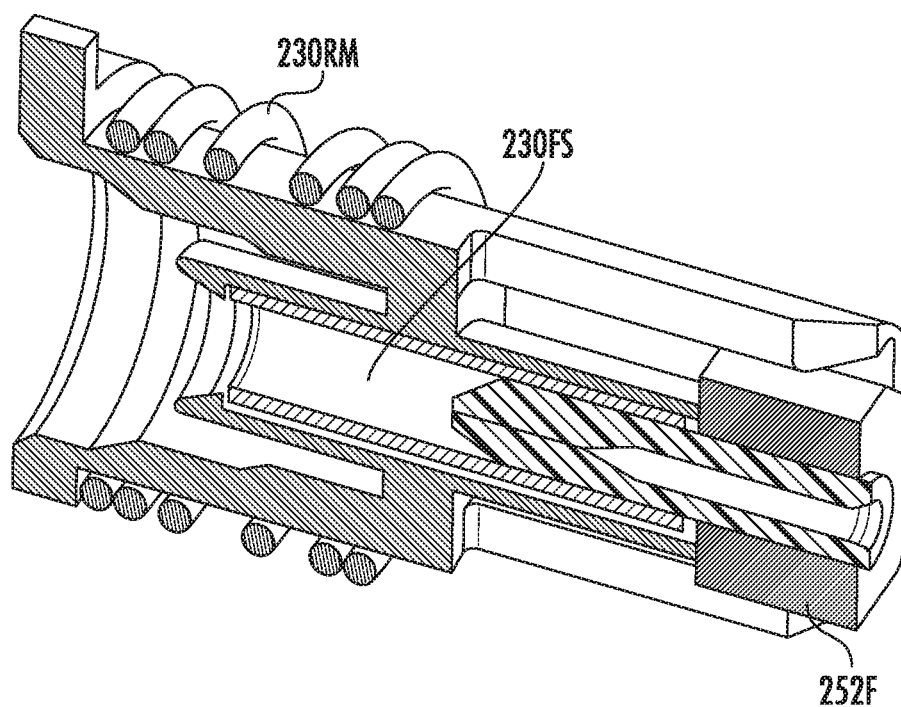
Figure 24D:
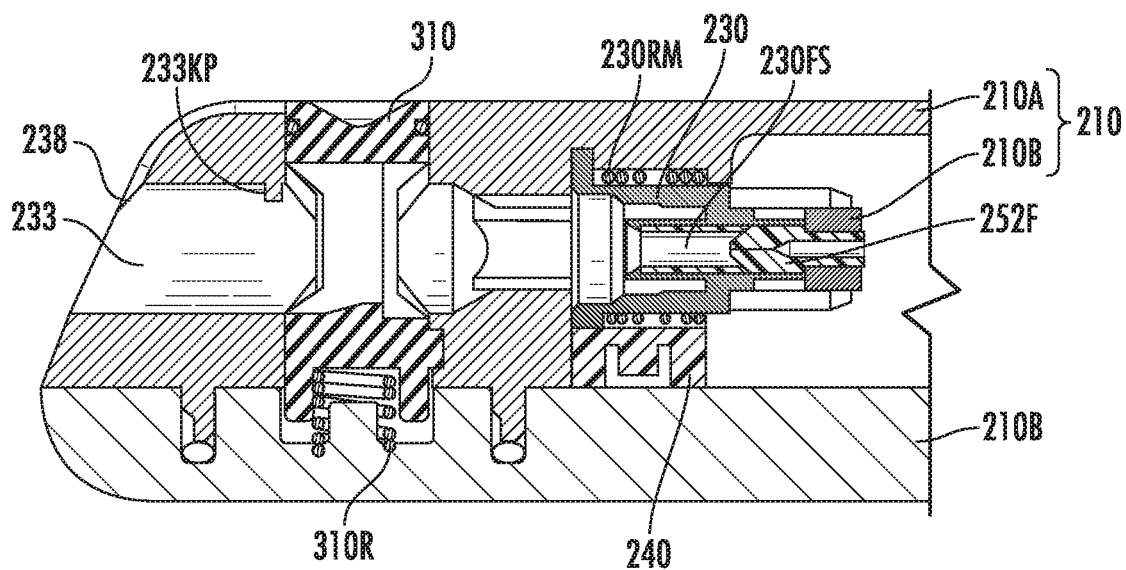

Resilient member 230RM is disposed over a barrel of adapter 230A and seated on the flange of adapter 230A as depicted. Then, ferrule sleeve retainer 230R and ferrule sleeve 230FS are aligned and disposed between connector 252 the adapter 230A for assembly as shown in FIG. 23. In this embodiment, adapter 230A comprises a plurality of resilient arms 230RA comprising securing features 230SF. Securing features 230SF cooperate with protrusions on the housing of rear connector 252 for retaining the rear connector 252 to the adapter 230A with the ferrule sleeve retainer 230R and ferrule sleeve 230FS therebetween. FIG. 23A is a sectional view showing the attachment of the rear connector 252 with the adapter 230A with ferrule sleeve retainer 230R and the ferrule sleeve 230FS therebetween. Ferrule sleeves 230FS are used for precision alignment of mating ferrules between rear connectors 252 and connector 10. FIG. 24 is a perspective view of the rear connector 252 with the ferrule sleeve retainer 230R and ferrule sleeve 230FS fitted over ferrule 252F before being attached to adapter 230A.

Figure 24E:
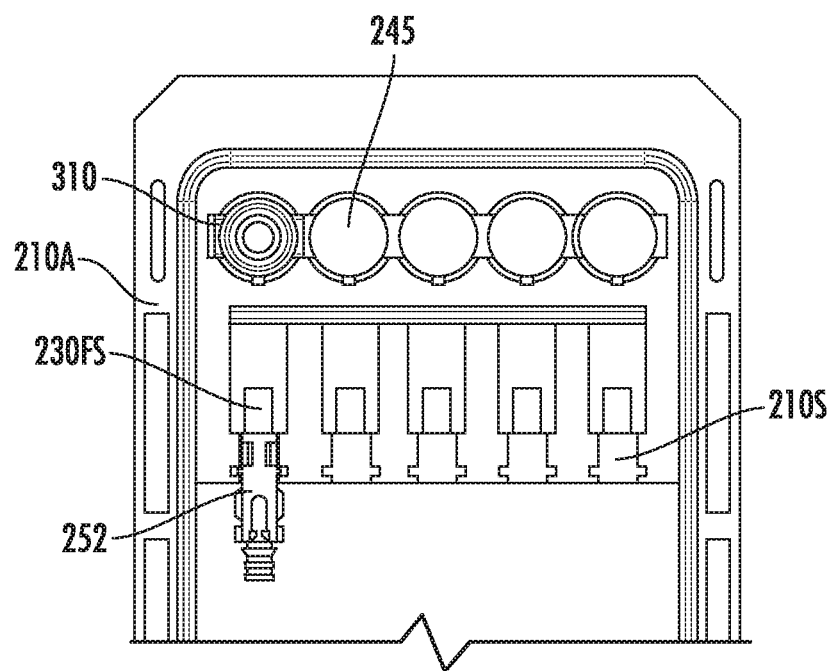
FIGS. 24E and 24F depict various views of yet another arrangement for the rear connector that is received directly into a portion of the shell that may be used with the concepts disclosed.
Figure 24F:
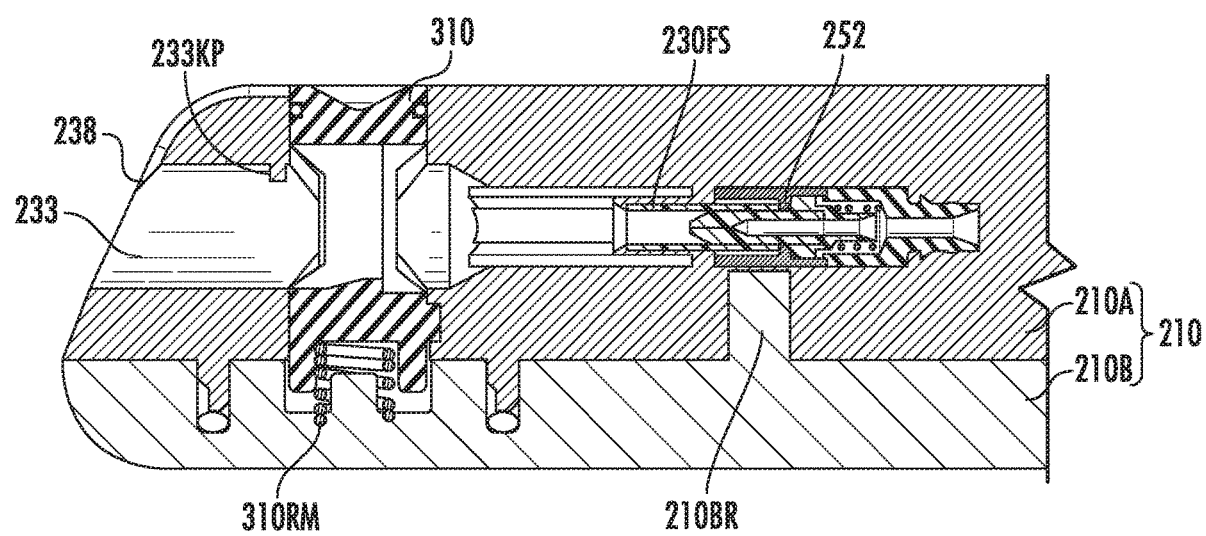
Figure 24G:
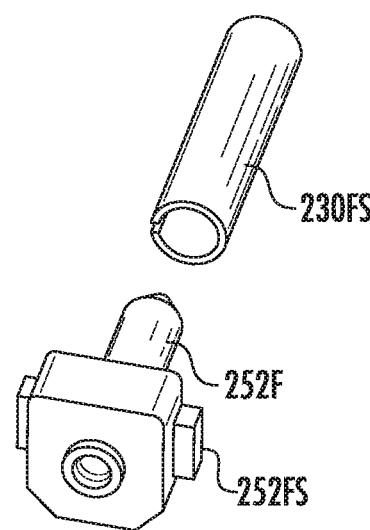
FIGS. 24G-24I depict various views of still another construction for the rear connector that is received directly into a portion of the shell that may be used with the concepts disclosed.
Figure 24H:
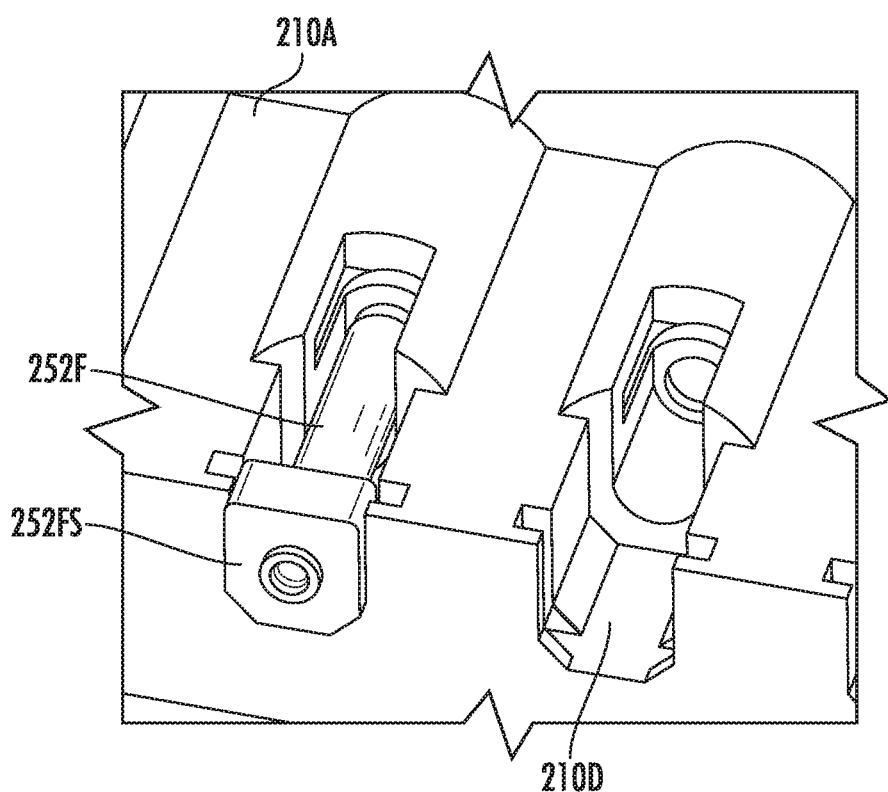
Figure 24I:
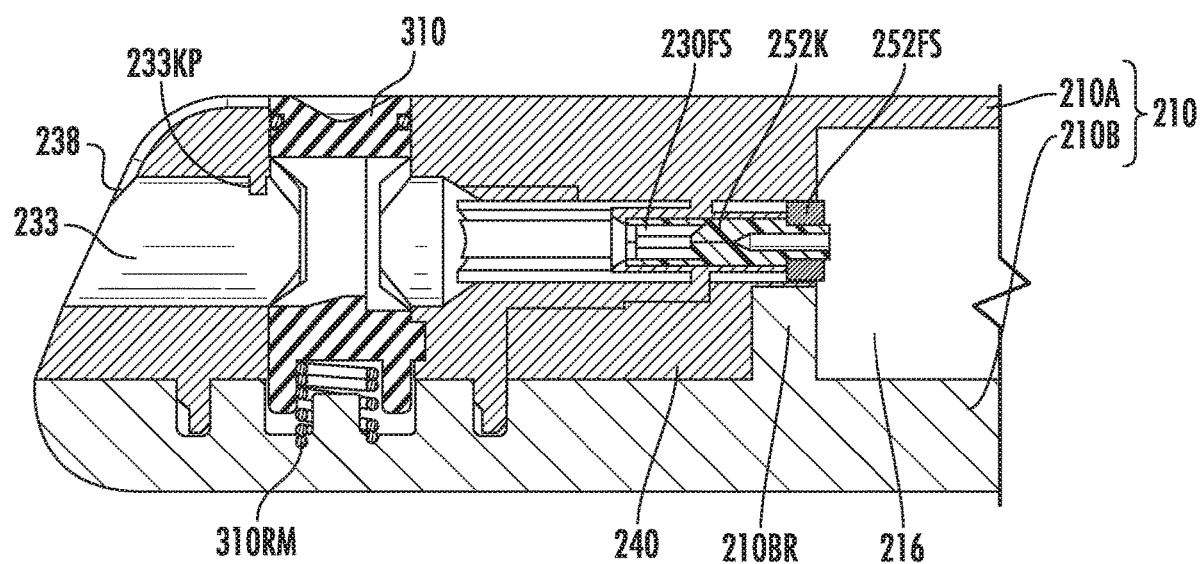

FIGS. 24A-24I depict alternative rear connectors that may be used with devices disclosed herein. FIGS. 24A-24D depict various views of a simplified construction for the rear connector 252 for use with adapter 230A. FIGS. 24A-24D show a simple ferrule 252F comprising protrusions 252P that cooperate with securing features 230SF disposed on the resilient arms 230RA of adapter 230A for securing the same. The ferrule sleeve 230FS is disposed between ferrule 252F and the adapter 230A as shown. FIGS. 24E and 24F show rear connector 252 having a ferrule 252F such as an SC connector that cooperates directly with a portion of the multiport such as a shell for securing the same. In this embodiment, the rear connector 252 is inserted into a portion of the multiport and the ferrule for alignment without a separate adapter. The ferrule sleeve 230FS is disposed between rear connector 252 and the multiport structure as shown. As best shown in FIG. 24I, a portion of the rear connector 252 is secured in a multiport saddle 210D and secured between the first portion 210A and the second portion 210B of shell 210 in this embodiment. As shown, the connection port passageway 233 comprises keying portion 233KP.

FIGS. 24G-24I depict rear connector 252 having a ferrule 252F and a ferrule socket 252FS that holds and aligns the ferrule 252F. This rear connector cooperates directly with a portion of the multiport such as a shell for securing the same. In this case, the ferrule socket 252FS has one or more tabs (not numbered) that fit into a portion of the multiport such as a first portion 210A of shell 210. The ferrule socket 252FS is secured in a multiport saddle 210D. As best shown in FIG. 24I, the ferrule socket 252FS is secured between the first portion 210A and the second portion 210B of shell 210.

Figure 25:
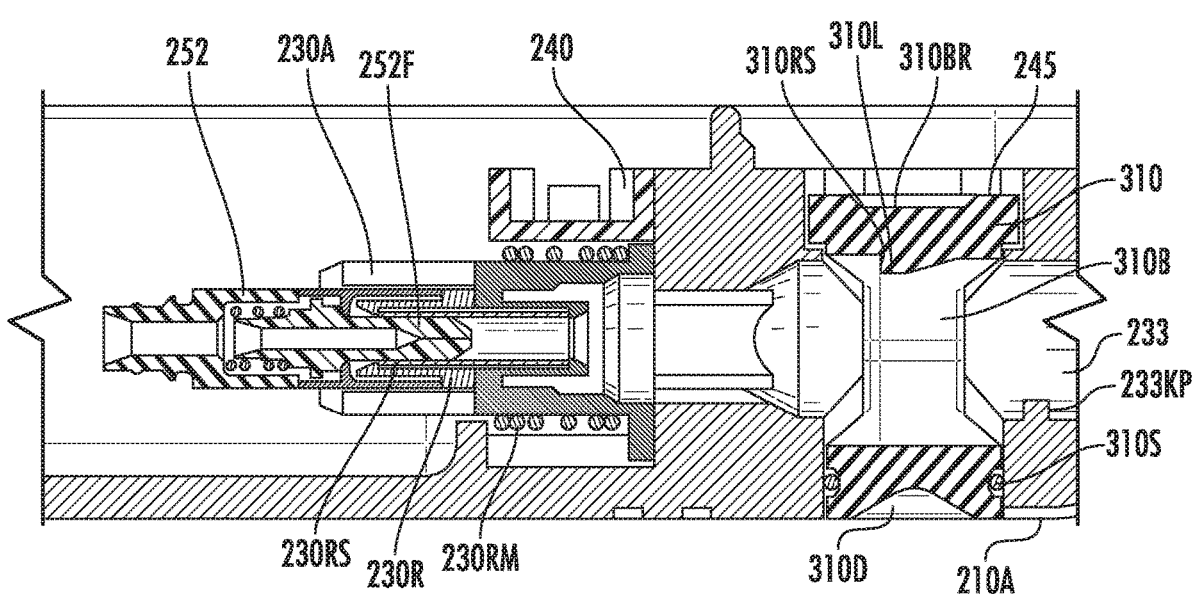
FIG. 25 is a longitudinal cross-sectional view of a portion of the optical connection port of FIG. 16 with the rear connector attached to the adapter.
Figure 26:
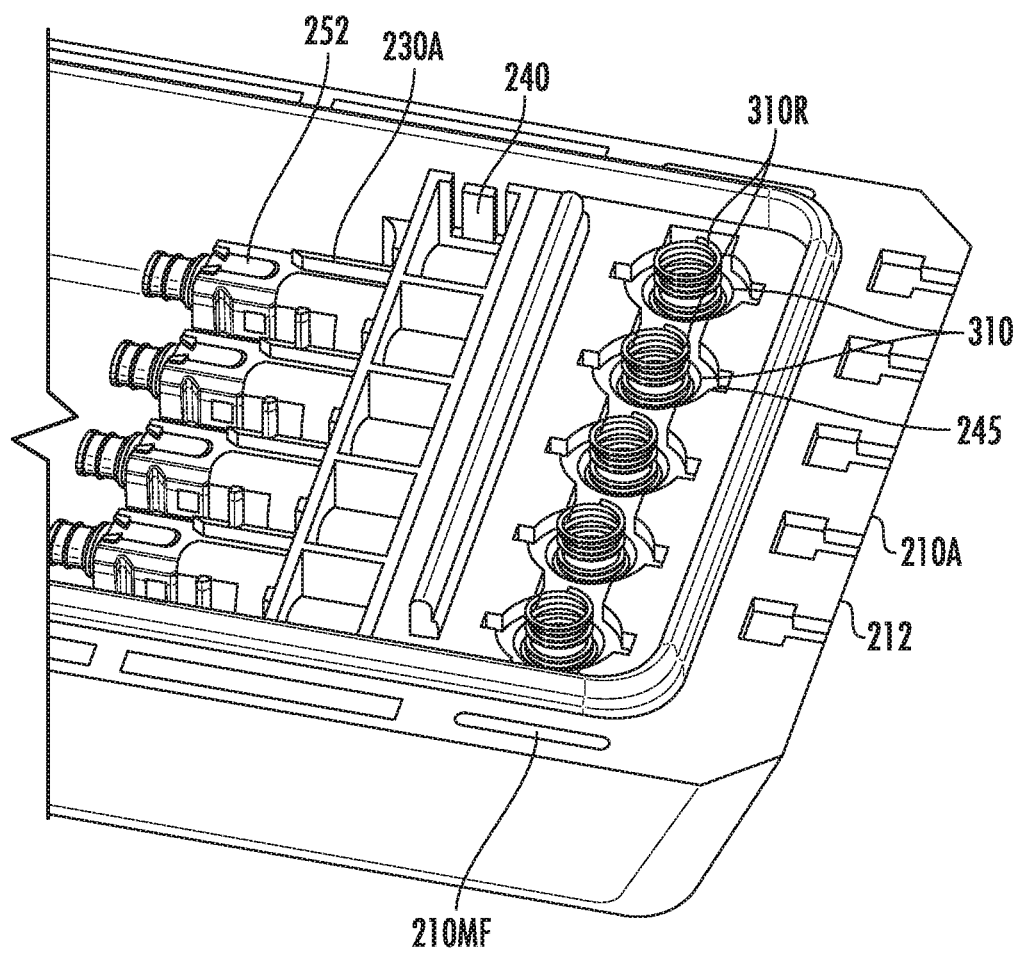
FIG. 26 is a partial assembled view of components within the first portion of the shell of FIG. 16 with the rear connector attached and a plurality of securing feature resilient members positioned on respective securing features.

FIG. 25 is a longitudinal cross-sectional view of a rear portion of the connection port 236 of the multiport 200 of FIG. 5 with the rear connector 252 of FIG. 24 attached to the adapter 230A. FIG. 26 is a partial assembled view of multiport 200 of FIG. 25 showing the respective securing feature resilient members 310R placed on a bottom portion of securing feature 310 within the first portion 210A of the shell 210 before the second portion 210B of shell 210 is attached to trap the securing feature resilient members 310R in place. Securing feature 310 may have a bottom recess 310BR for seating the securing feature resilient members 310R and centering the restoring force on the securing feature 310 as best shown in FIG. 14. Thereafter, the second portion 210B of shell 210 may be attached to the first portion 210A is a suitable fashion using a sealing element 290 or not.

Multiports 200 disclosed with shells 210 and/or connector port inserts 230 allow relatively small multiports 200 having a relatively high-density of connections along with an organized arrangement for connectors 10 attached to the multiports 200. Shells have a given height H, width W and length L that define a volume for the multiport as depicted in FIGS. 3A and 4A. By way of example, shells 210 of multiport 200 may define a volume of 800 cubic centimeters or less, other embodiments of shells 210 may define the volume of 400 cubic centimeters or less, other embodiments of shells 210 may define the volume of 100 cubic centimeters or less as desired. Some embodiments of multiports 200 comprise a connection port insert 230 having a port width density of at least one connection port 236 per 20 millimeters of width W of the multiport 200. Other port width densities are possible such as 15 millimeters of width W of the multiport. Likewise, embodiments of multiports 200 may comprise a given density per volume of the shell 210 as desired.

Figure 1:
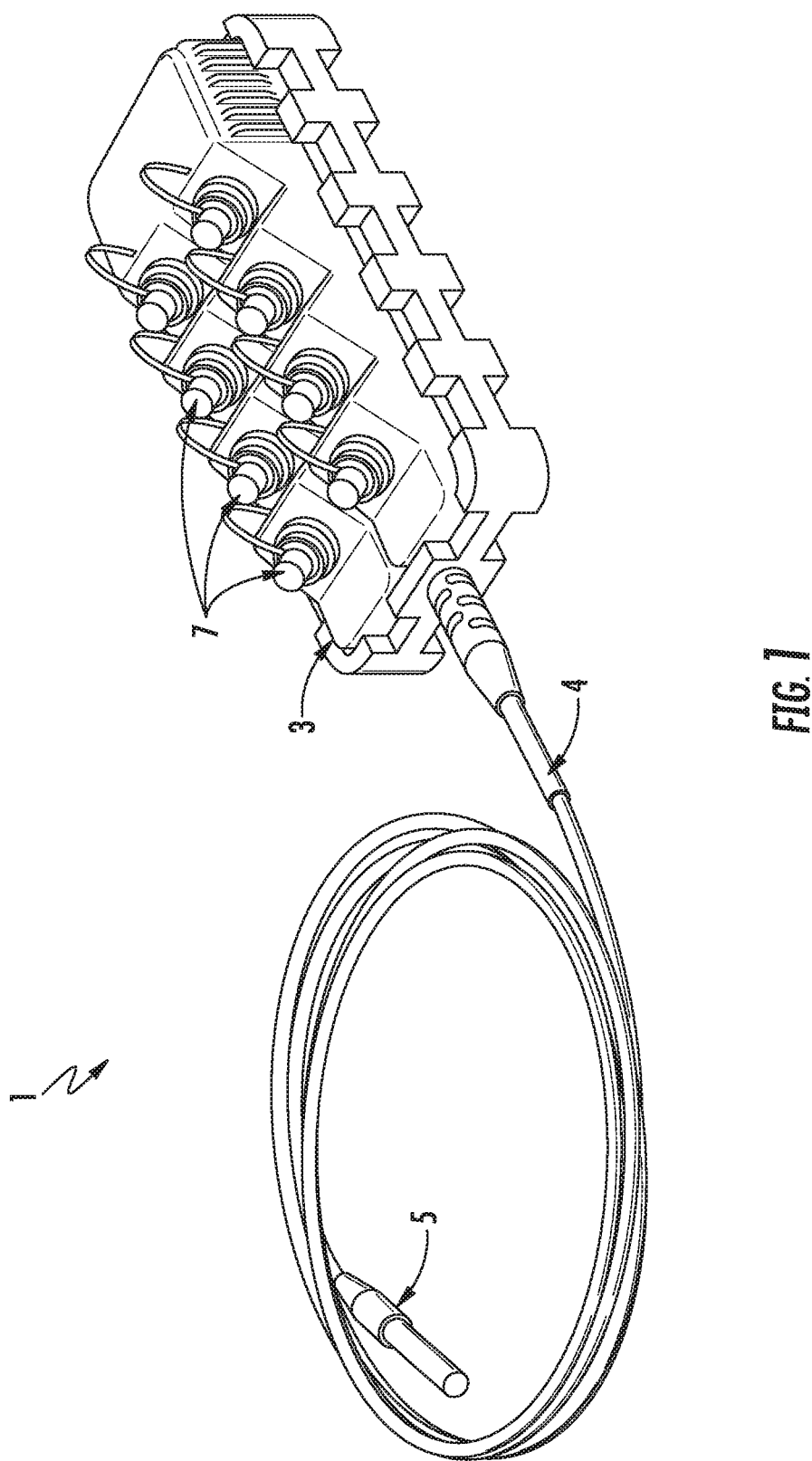
FIGS. 1 and 2 are prior art multiports.
Figure 2:
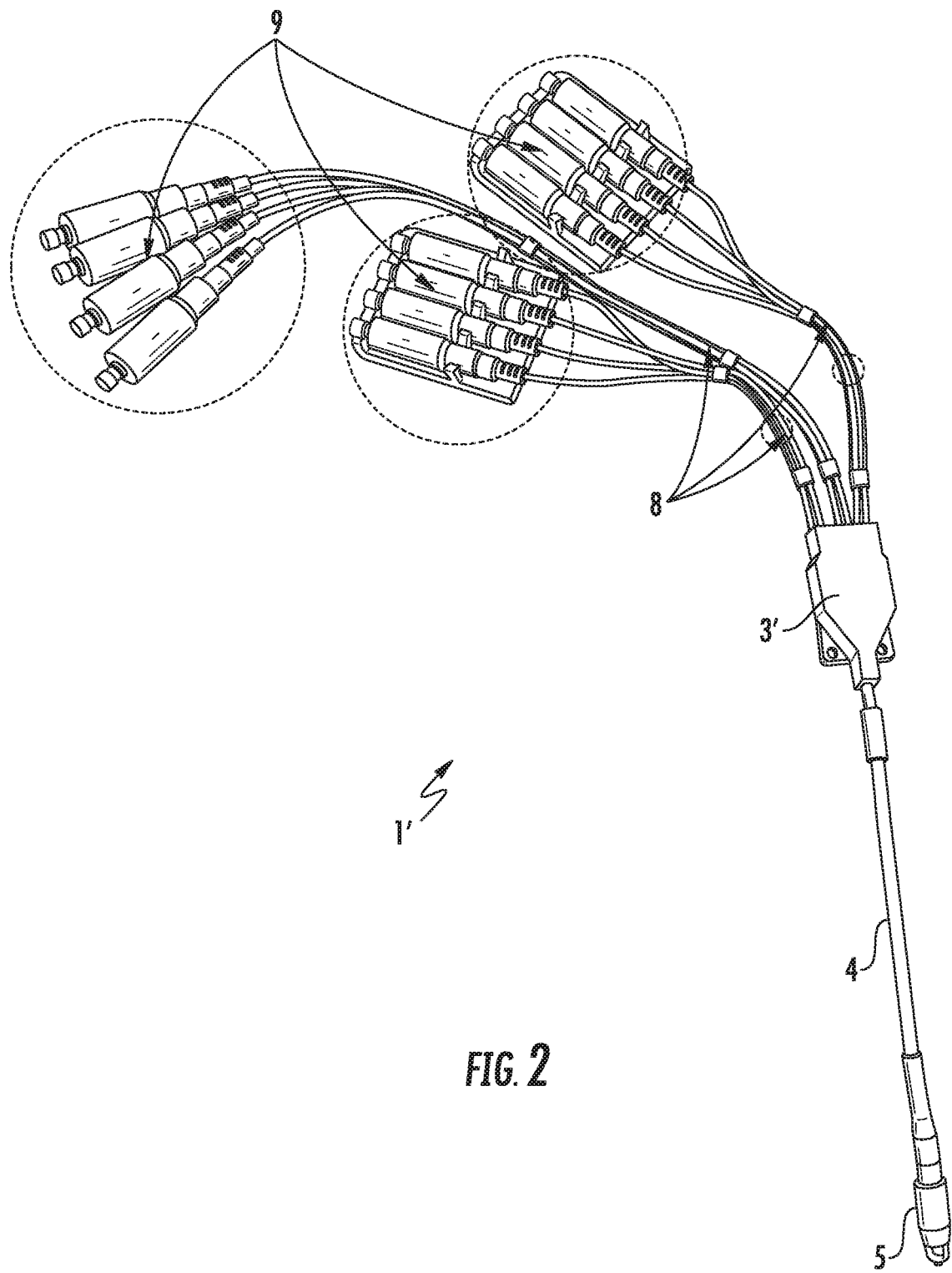

The concepts disclosed allow relatively small form-factors for multiports as shown in Table 1. Table 1 below compares representative dimensions, volumes, and normalized volume ratios with respect to the prior art of the shells (i.e., the housings) for multiports having 4, 8 and 12 ports as examples of how compact the multiports of the present application are with respect to convention prior art multiports. Specifically, Table 1 compares examples of the conventional prior art multiports such as depicted in FIG. 1 with multiports having a linear array of ports. As depicted, the respective volumes of the conventional prior art multiports of FIG. 1 with the same port count are on the order of ten times larger than multiports with the same port count as disclosed herein. By way of example and not limitation, the multiport may define a volume of 400 cubic centimeters or less for 12-ports, or even if double the size could define a volume of 800 cubic centimeters or less for 12-ports. Multiports with smaller port counts such as 4-ports could be even smaller such as the shell or multiport defining a volume of 200 cubic centimeters or less for 4-ports, or even if double the size could define a volume of 200 cubic centimeters or less for 4-ports. Devices with sizes that are different will have different volumes form the explanatory examples in Table 1, and these other variations are within the scope of the disclosure. Consequently, it is apparent the size (e.g., volume) of multiports of the present application are much smaller than the conventional prior art multiports of FIG. 1. In addition to being significantly smaller, the multiports of the present application do not have the issues of the conventional prior art multiports depicted in FIG. 2. Of course, the examples of Table 1 are for comparison purposes and other sizes and variations of multiports may use the concepts disclosed herein as desired.

One of the reasons that the size of the multiports may be reduced in size with the concepts disclosed herein is that the connectors 10 that cooperate with the multiports have locking features 20L that are integrated into the housing 20 of the connectors. In other words, the locking features for securing connector 10 are integrally formed in the housing 20 of the connector, instead of being a distinct and separate component like a coupling nut of a conventional hardened connector used with conventional multiports. Conventional connectors for multiports have threaded connections that require finger access for connection and disconnecting. By eliminating the threaded coupling nut (which is a separate component that must rotate about the connector) the spacing between conventional connectors may be reduced. Also eliminating the dedicated coupling nut from the conventional connectors also allows the footprint of the connectors to be smaller, which also aids in reducing the size of the multiports disclosed herein.

TABLE 1

Comparison of Conventional Multiport of FIG. 1 with Multiports of Present Application

| Multiport Type | Port Count | Dimension L × W × H (mm) | Volume ($cm^3$) | Normalized Volume Ratio |
|---|---|---|---|---|
| Prior Art FIG. 1 | 4 | 274 × 66 × 73 | 1320 | 1.0 |
|  | 8 | 312 × 76 × 86 | 2039 | 1.0 |
|  | 12 | 381 × 101 × 147 | 5657 | 1.0 |
| Linear | 4 | 76 × 59 × 30 | 134 | 0.10 |
|  | 8 | 123 × 109 × 30 | 402 | 0.20 |
|  | 12 | 159 × 159 × 30 | 758 | 0.14 |

Figure 27:
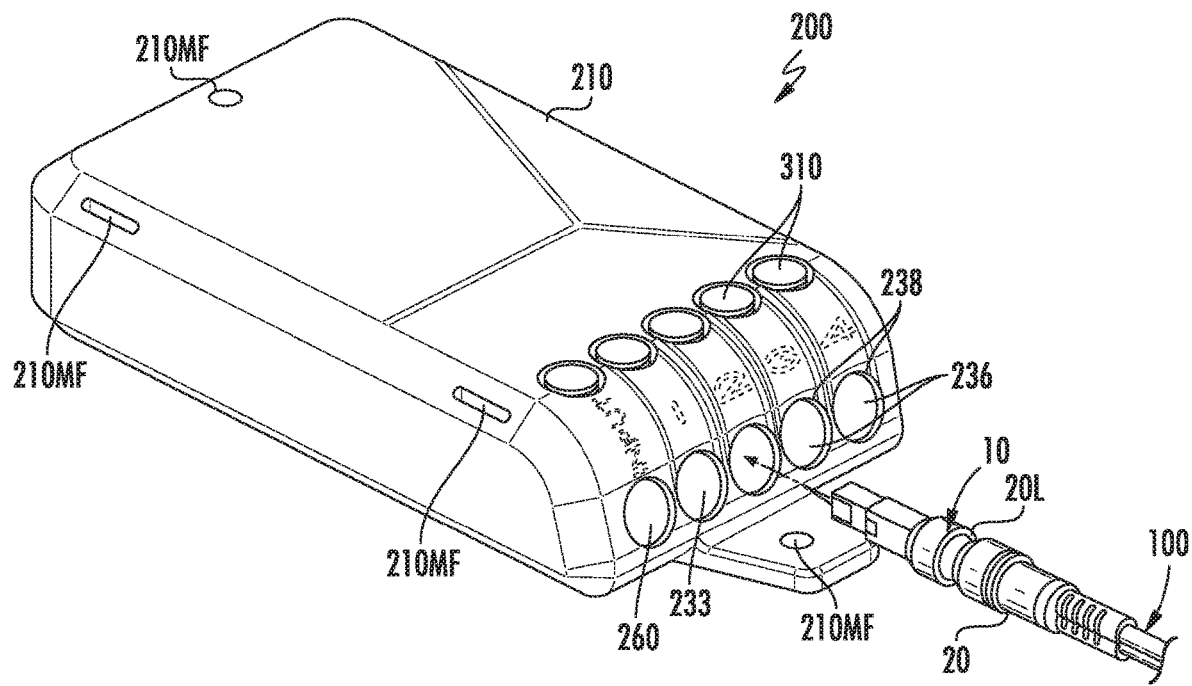
FIGS. 27 and 28 depict perspective views of another explanatory device such as a multiport comprising at least one connection port defined by an optical connector opening disposed in a shell of the multiport for receiving one or more fiber optic connectors according to the concepts disclosed.
Figure 28:
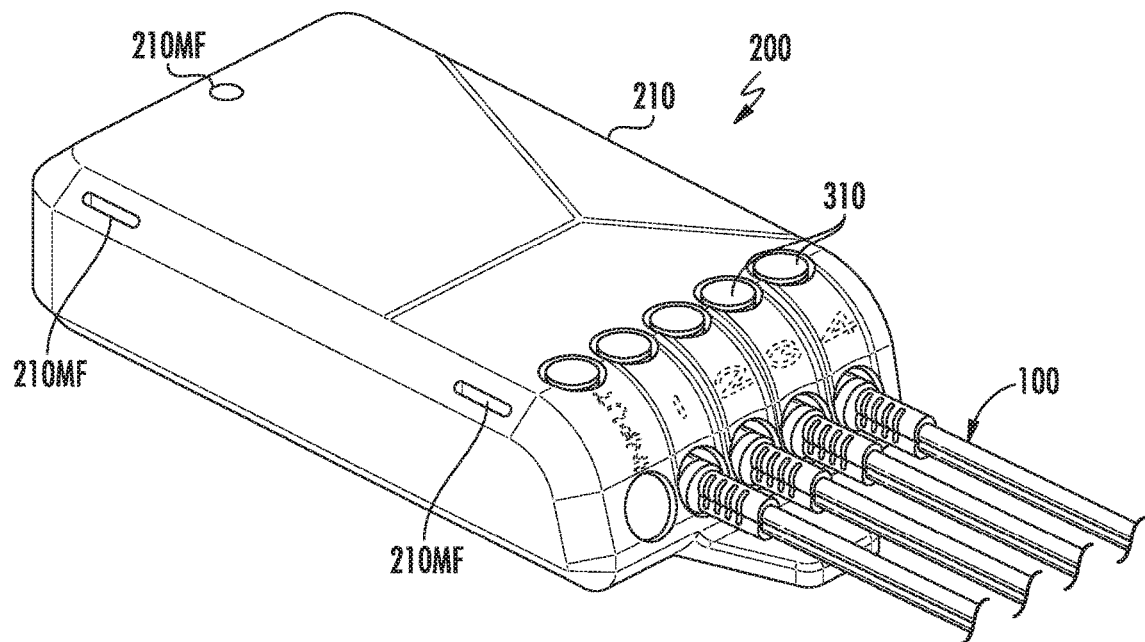
Figure 28A:
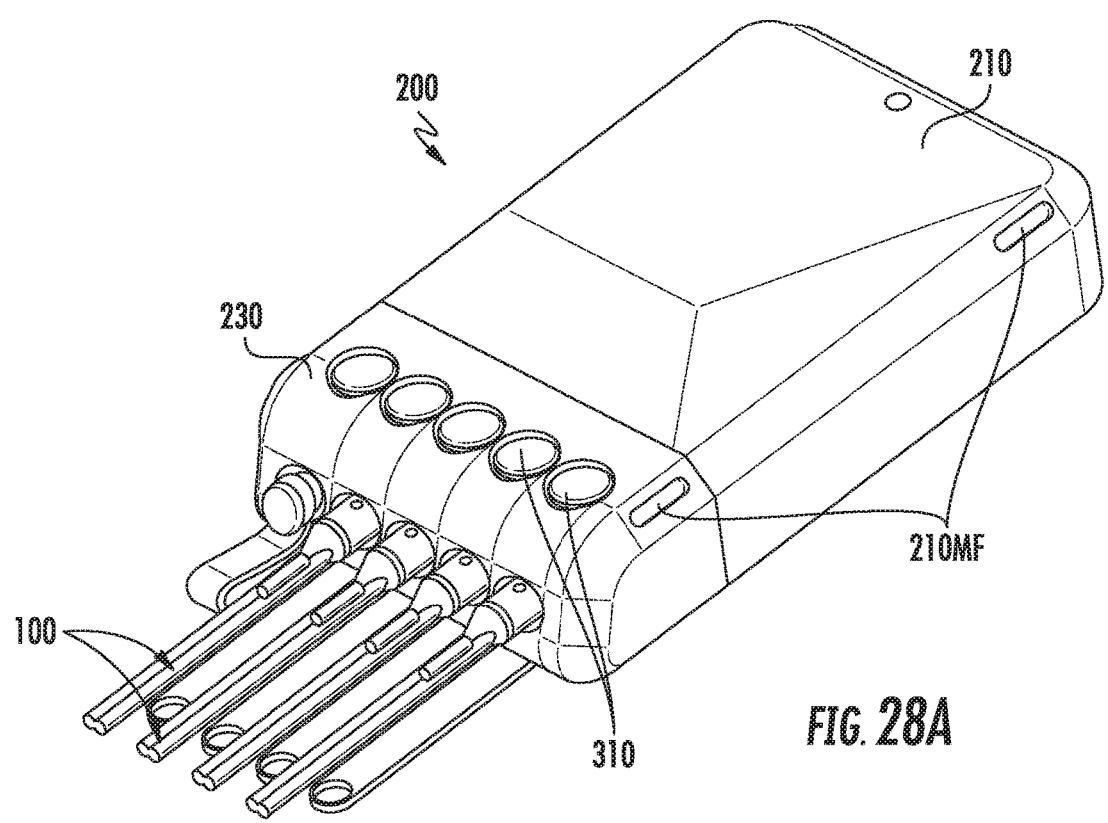
Figure 28B:
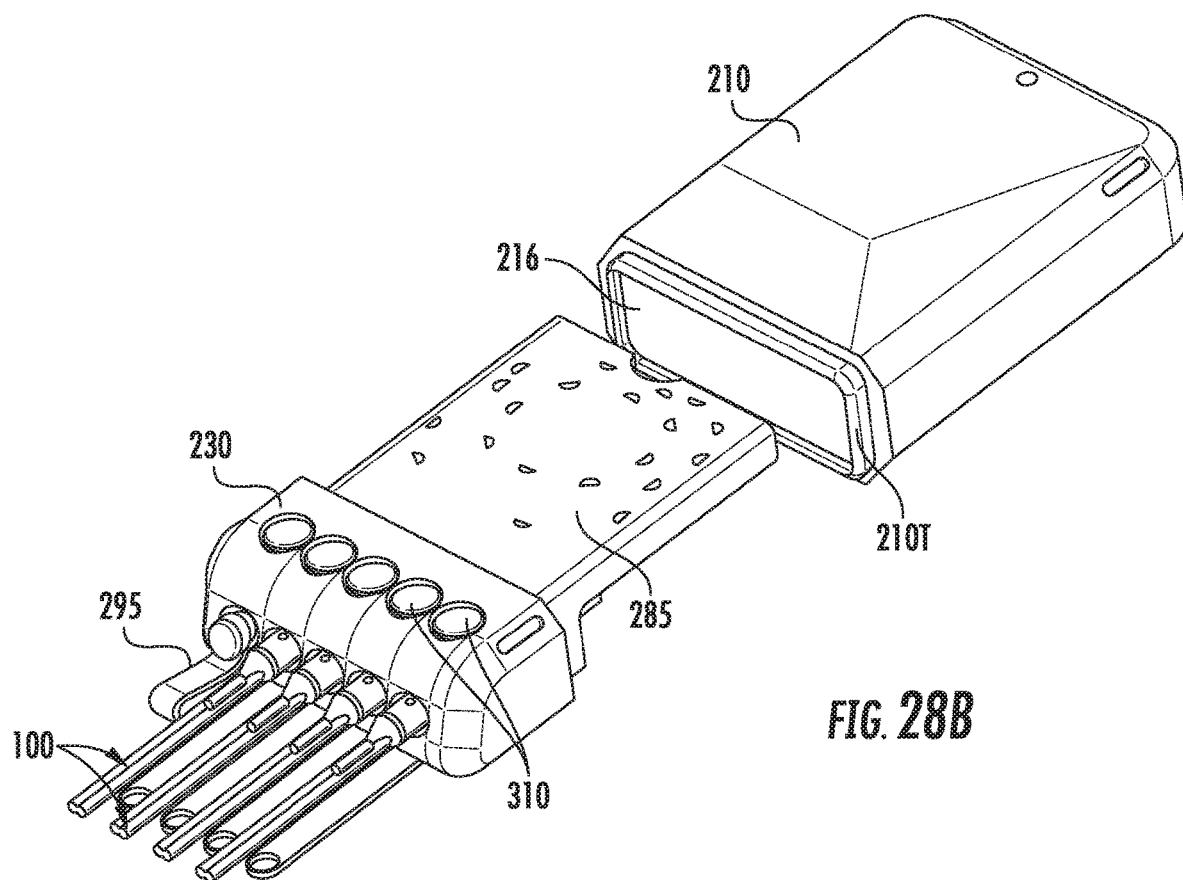
Figure 28C:
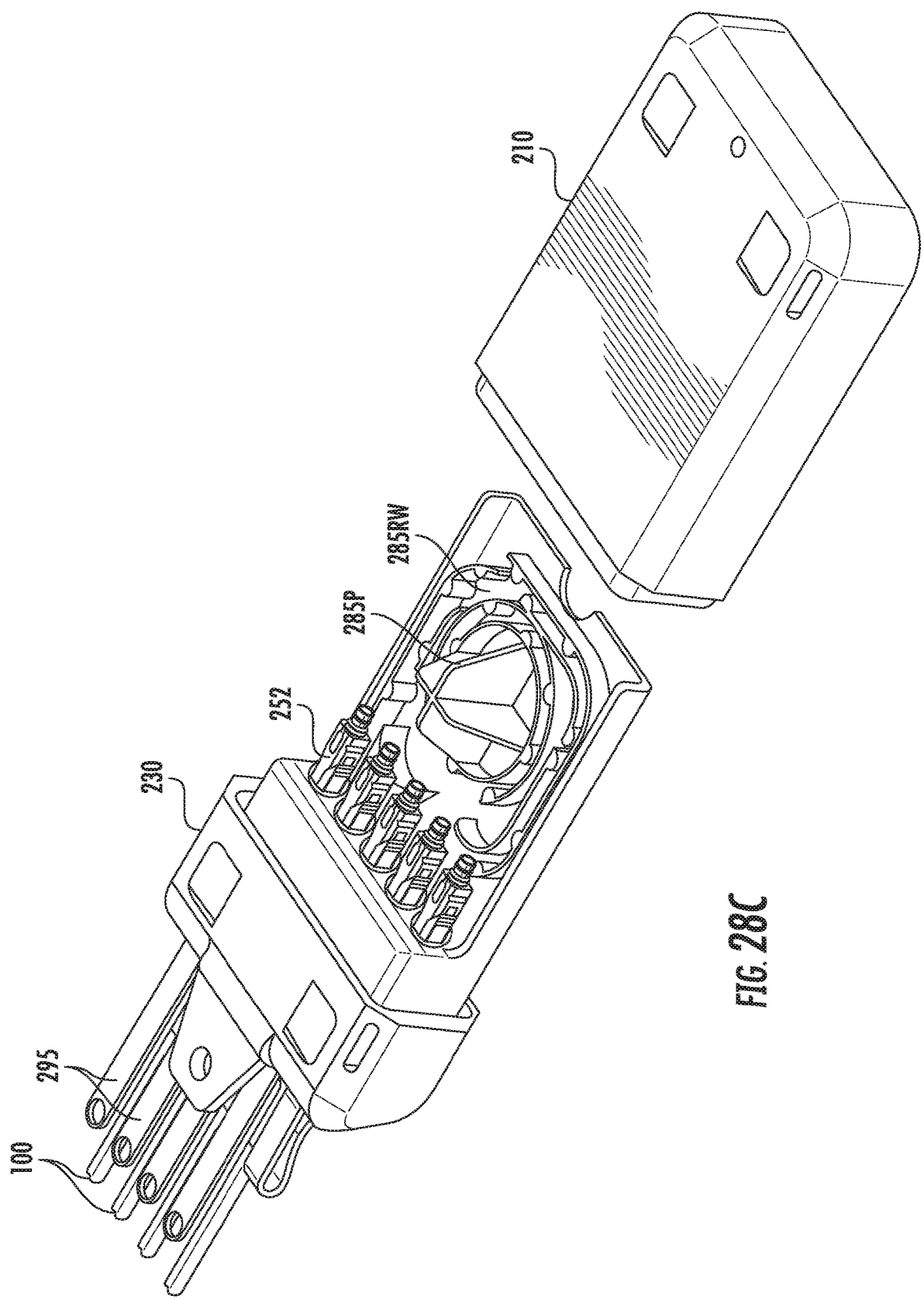

Devices may have other constructions for the securing features 310 that use more than one component. FIGS. 27 and 28 depict perspective views of another explanatory device 200 configured as a multiport that comprises at least one connection port 236 along with a securing feature 310 comprising more than one component. Multiports 200 with securing features having more than one component such as shown in FIGS. 27 and 28 may have a construction similar to that shown in FIGS. 3A and 3B with the connection ports 236 being a portion of the connection port insert 230 or a construction similar to that shown in FIGS. 4A and 4B with the connection ports 236 as a portion of shell 210 as desired.

Illustratively, FIGS. 28A-28E depict a device such as multiport 200 that comprises connection port insert 230 having at least one connection port 236 and FIGS. 29-56 depict device such as multiport 200 comprising a connection port 236 as a portion of the shell 210 with securing features 310 comprising more than one component. The description of these devices with the securing feature 310 comprising more than one component will describe differences in the designs for the sake of brevity.

Multiports 200 of FIGS. 27 and 28 comprise one or more optical connection ports 236 defined by one or more optical connector openings 238 disposed in a shell 210 of the multiport 200 for receiving one or more connectors 10 according to the concepts disclosed. FIG. 27 depicts a connector 10 aligned for insertion into one of the connection ports 236 and FIG. 28 depicts a plurality of connectors 10 retained within respective connection ports 236. Multiport 200 using securing features 310 comprising multiple components may also comprise an input port 260, splitter, tether, or other suitable components or features as desired.

Figure 28D:
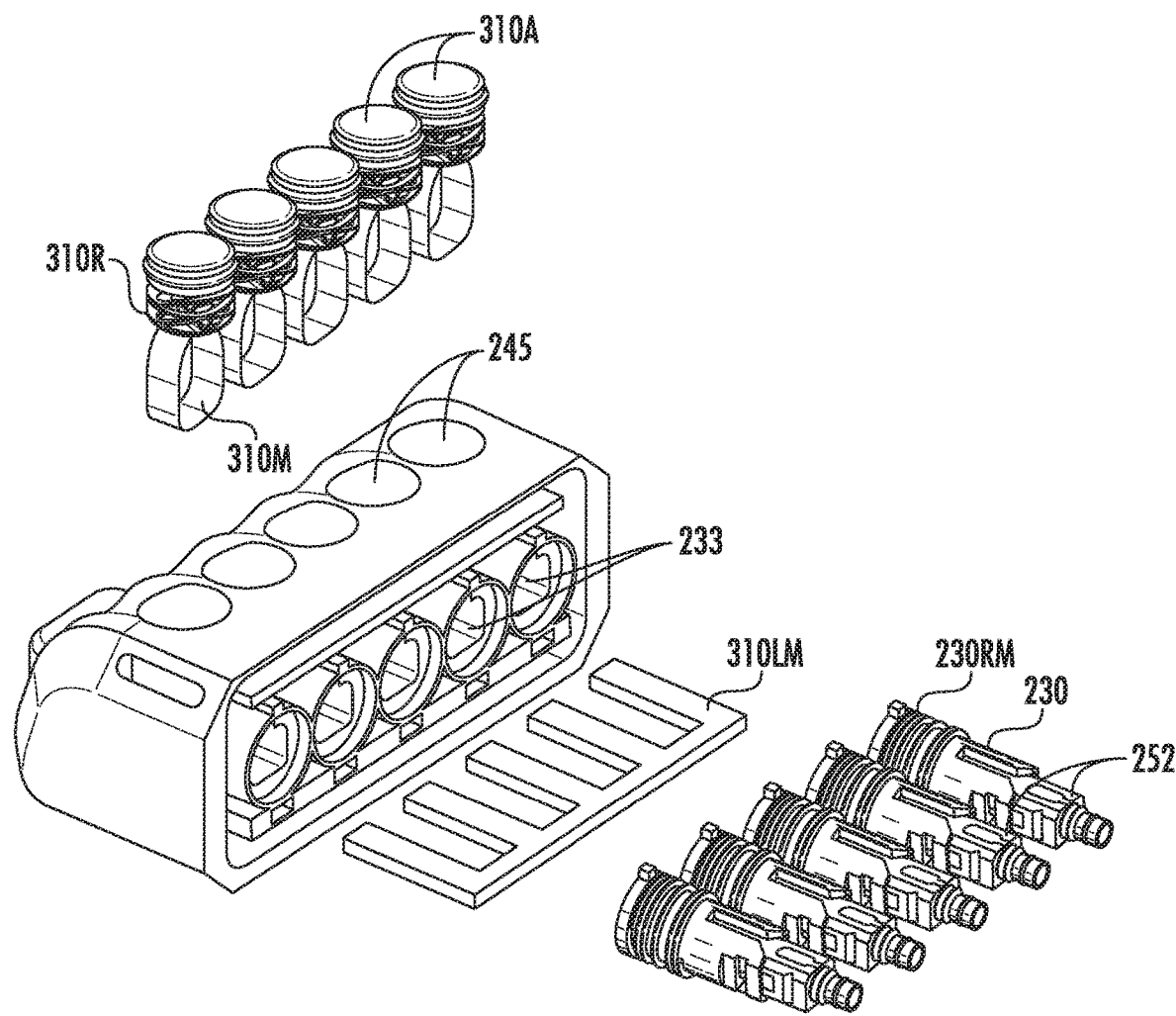
Figure 36:
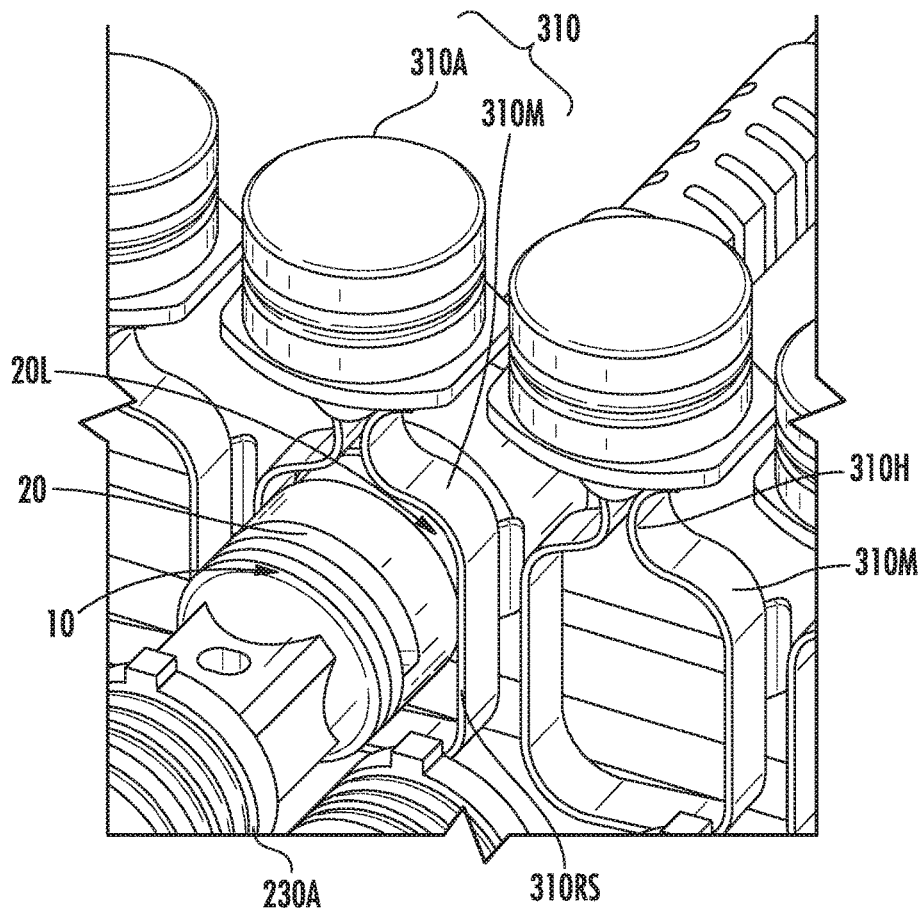
FIG. 36 is a detailed perspective view of the securing features of the multiport of FIGS. 27 and 28 removed from the shell with a fiber optic connector being retained by one of the securing features cooperating with the locking feature of the connector.

Multiport 200 of FIGS. 27 and 28 is similar to multiport 200 of FIGS. 4A and 4B, except it uses a securing feature 310 comprising more than one component as shown in FIG. 36. Likewise, the multiport 200 of FIGS. 28A-28E is similar to multiport 200 of FIGS. 3A and 4B, except it uses a securing feature 310 comprising more than one component as best shown in FIG. 28D. In these embodiments, the securing feature 310 comprises an actuator 310A and a securing feature member 310M. Specifically, securing feature member 310M comprises an opening may be elastically deformed by actuator 310A (or other structure) when pushed (or upon insertion of a suitable connector 10 into connection port 236) and the securing feature member 310M springs back to engage a suitable portion of connector 10 such as locking feature 20L of connector housing 20 when the actuator 310A is released or when connector 10 is fully-seated within the connection port 236 as will discussed in more detail. The securing member 310M comprises a locking feature 310L formed by one or more arms 310AM.

Thus, the securing feature member 310M of securing feature 310 is suitable for retaining connector 10 in connection port 236 as discussed herein. Various different embodiments are possible for securing features 310 comprising more than one component for the devices disclosed.

Multiport 200 of FIGS. 27 and 28 comprise one or more connection ports 236 and the one or more securing feature passageways 245 as a portion of the shell 210. Likewise, multiports 200 of FIGS. 28A-28E comprises the one or more connection ports 236 and the one or more securing feature passageways 245 as a portion of the connection port insert 230 as discussed herein.

Illustratively, FIGS. 27 and 28 depict multiport 200 comprising a shell 210 comprising a body 232 with one or more connection ports 236 disposed on a first end or portion 212 with each connection port 236 comprising a respective optical connector opening 238. The optical connector openings 238 extend from an outer surface 234 of shell 210 into a cavity 216 and define a connection port passageway 233. One or more respective securing feature passageways 245 extend from the outer surface 234 of the shell 210 to the respective connection port passageways 233. A plurality of security features 310 are associated with the respective plurality of connection port passageways 233 and the plurality of securing features 310 are disposed within portions of respective securing feature passageways 245.

FIGS. 28A-28E are views another multiport 200 comprising connection port insert 230 that receives an actuator 310A and a securing feature member 310M of the securing feature 310 similar to multiport 200 of FIGS. 27 and 28. As best shown in FIGS. 28D and 28E, this embodiment is different in the manner which the securing feature 310M is assembled to the connection port insert 230 from a rear side and secured with a securing feature locking member 310LM at the bottom of the securing feature member 310M. In this embodiment, the securing feature members 310M are individually placed into the connection port insert 230 from the rear and engage a portion of the actuator 310A for keeping the actuators 310A within the respective securing feature passageways 245. The securing feature 310 of this embodiment further includes a securing feature resilient member 310R for biasing the actuator 310A. In this embodiment, the fiber tray 285 may be used as a retainer for securing the adapters 230A as well.

Figure 29:
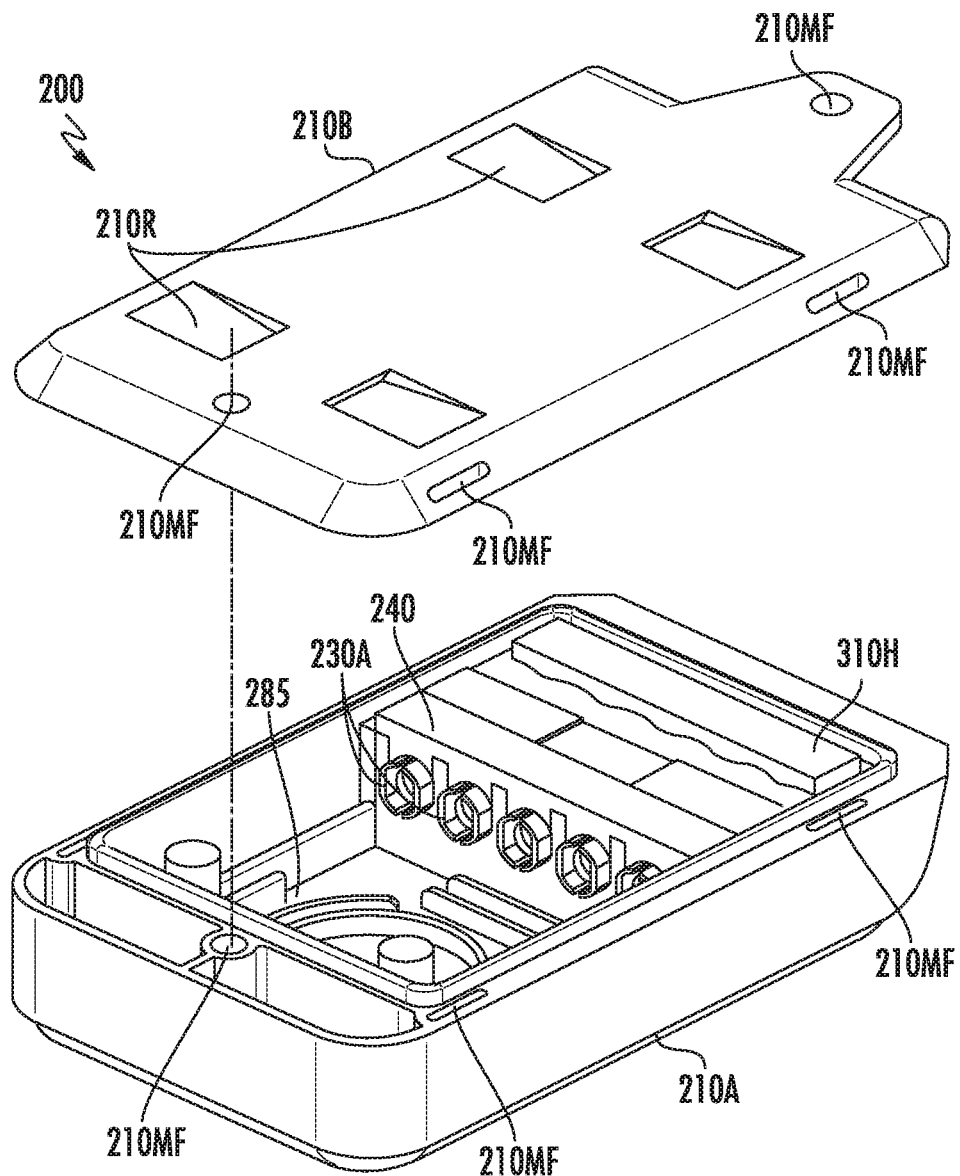
FIG. 29 depicts a bottom perspective view of the multiport of FIGS. 27 and 28 with an open shell for showing the internal construction of the multiport with the rear (internal) connector and the optical fibers removed for clarity.

FIG. 29 depicts a bottom perspective view of multiport 200 of FIGS. 27 and 28. As depicted, shell 210 is formed by a first portion 210A and a second portion 210B. FIG. 29 shows the second portion 210B of shell 210 removed from the first portion 210A for showing the internal construction of multiport 200. Multiport 200 is depicted with the rear connectors 252 and the optical fibers 250 removed for clarity purposes in FIG. 29.

FIG. 30 is a partially exploded view of the multiport of FIGS. 27 and 28 showing a single rear connector 252 and having the optical fibers 250 removed for clarity. Rear connectors 252 are aligned and sized for fitting into one or more of the respective connector port passageways 233 from the rear portion 237 of passageway 233 within the cavity 216 of shell 210, and the plurality of rear connectors 252 are associated with one or more of the plurality of optical fibers 250. As discussed, each of the respective rear connector 252 aligns and attaches to the shell 210 from the rear portion 237 in a suitable matter. However, rear connectors 252 may take any suitable form from a simple ferrule that attaches to standard connector type inserted into an adapter.

Figure 31:
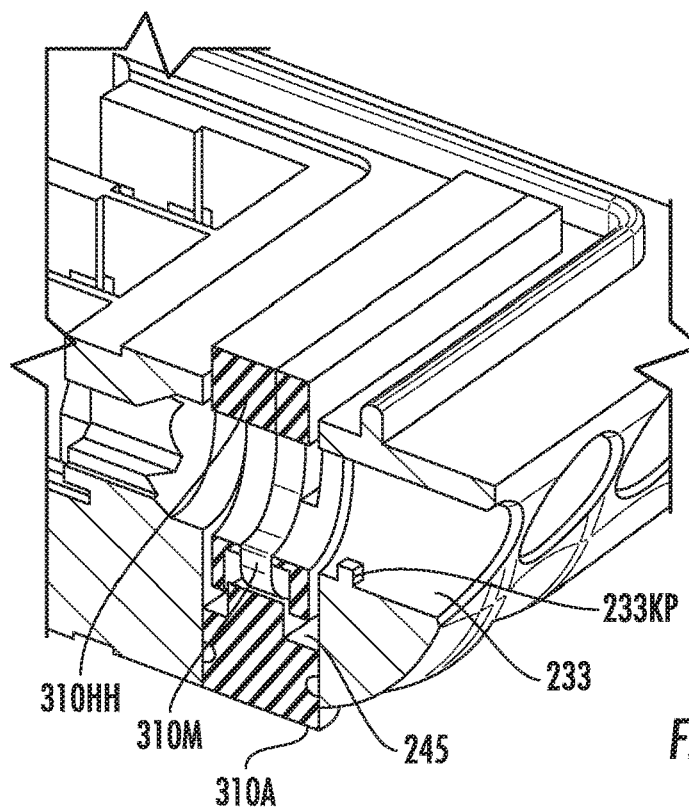
FIGS. 31 and 32 are longitudinal cross-sectional views of the multiport of FIGS. 27 and 28 take along the connection port in the vertical direction for showing assembly details of the securing feature respectively in an inverted position and an upright position with a portion of the shell removed.
Figure 33:
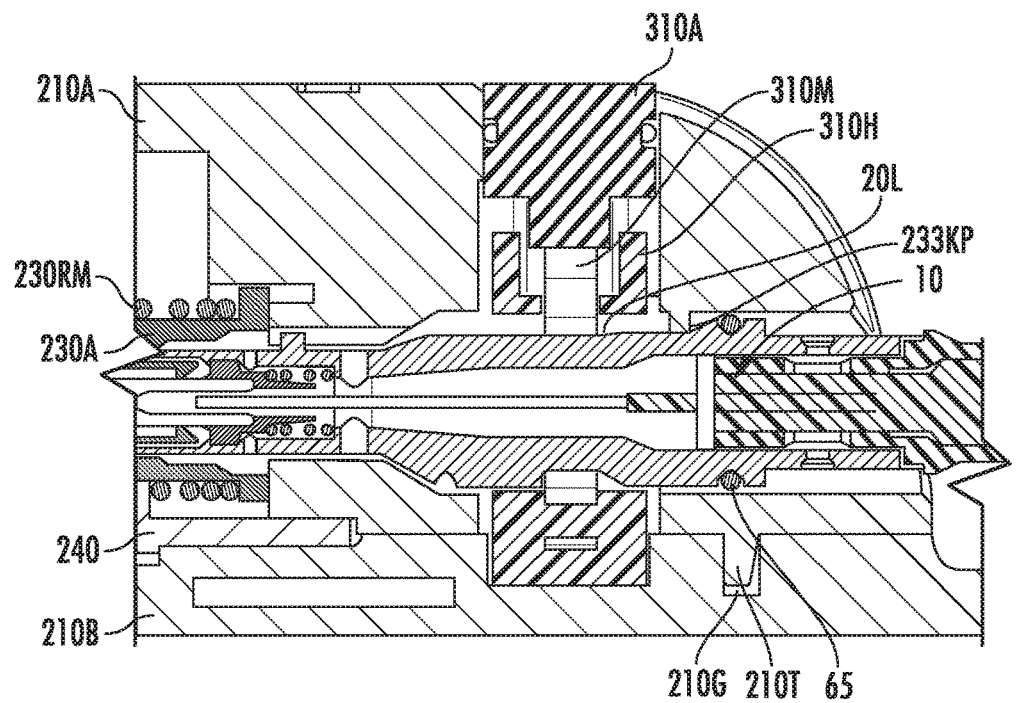
FIG. 33 is a longitudinal vertical cross-sectional view of the multiport of FIGS. 27 and 28 with an optical connector disposed and retained within the connection port having a keying portion using the securing feature.

FIGS. 31 and 32 are partial longitudinal cross-sectional views respectively depicting the optical connection port 236 of the multiport 200 of FIGS. 27 and 28 without connector 10 retained therein for showing details of securing feature 310. FIG. 33 is a longitudinal cross-sectional views of the multiport 200 of FIGS. 27 and 28 with connector 10 disposed and retained within connection port 236 by securing feature 310. As shown, the connection port passageway 233 comprises keying portion 233KP disposed forward of the securing feature 310 in connection port passageway 233.

Figure 34:
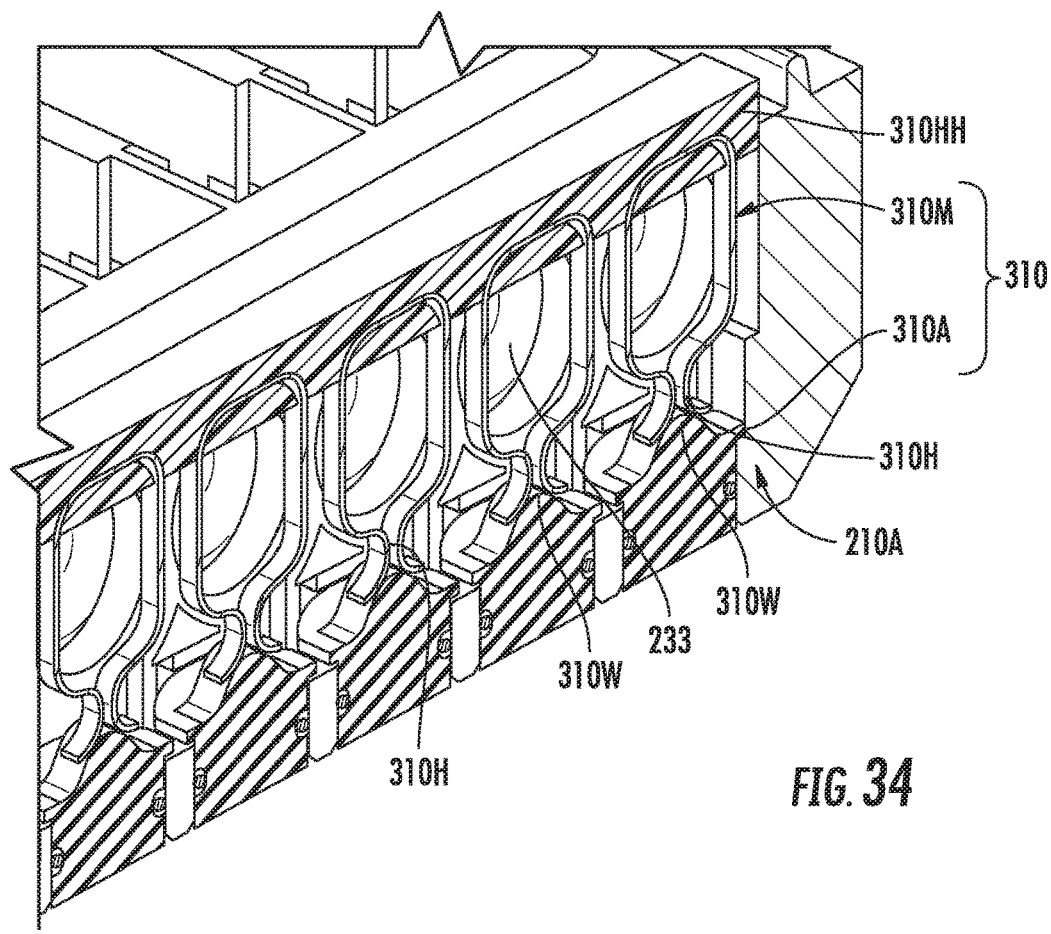
FIG. 34 is a detailed transverse cross-sectional view of the multiport of FIGS. 27 and 28 taken through the securing features for showing details of the construction.
Figure 35:
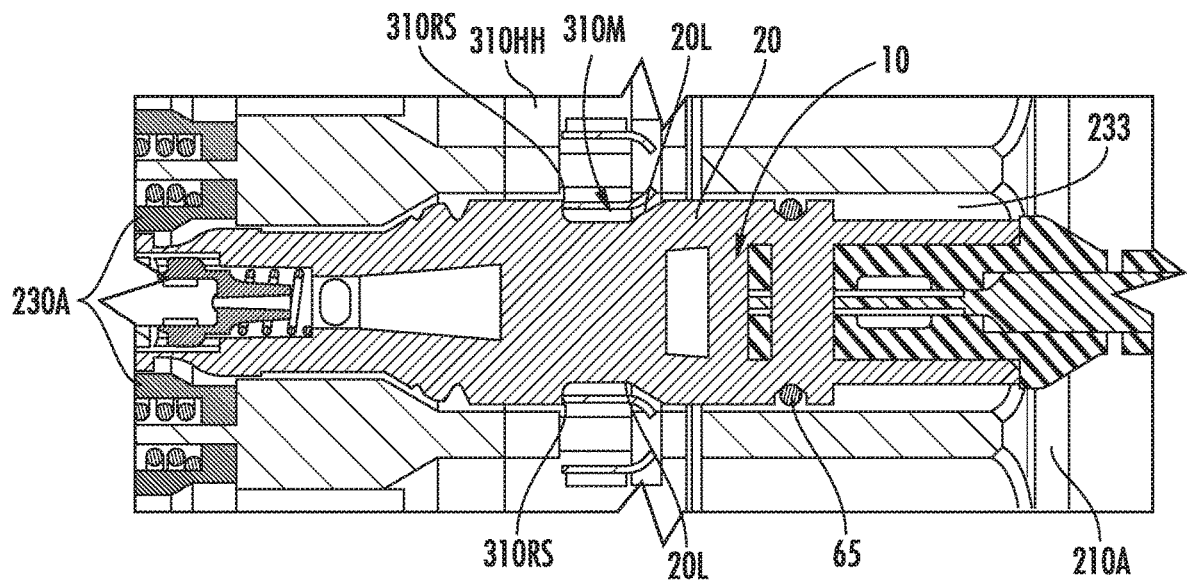
FIG. 35 is a detailed horizontal longitudinal cross-sectional view of the securing feature of the multiport of FIGS. 27 and 28 retaining a fiber optic connector within the connection port passageway.

FIG. 34 is a transverse cross-sectional view of a portion of the multiport 200 of FIGS. 27 and 28 taken through the securing features 310 showing details of the construction and operation for securing features 310 comprising more than one component. FIG. 35 is a detailed longitudinal horizontal cross-sectional view of the securing feature 310 receiving and retaining connector 10 within the connection port 236. Specifically, the arms of the securing member 310M engage a locking feature 20L (e.g., a groove) that is integrally-formed on the housing 20 of the connector 10. FIG. 36 is a detailed perspective view of the securing features of the multiport of FIGS. 27 and 28 removed from the shell with connector 10 being retained by one of the securing features 310.

Securing feature 310 comprises actuator 310A and securing member 310M. Securing member 310M comprises an opening between its arms 310AM that may be elastically deformed by actuator 310A when translated (i.e., pushed) or upon insertion of a suitable connector 10 into connection port 236 by spreading (i.e., translating) the arms of the securing member 310M outward. When the actuator 310A is released or the connector is fully-seated within the connection port 236 or input port 260, the arms 310AM of the securing member 310M springs back to engage a suitable portion of connector 10 such as locking feature 20L of connector housing 20 or move the actuator 310A to a normal position. The arms 310AM have an edge portion that act as a locking feature 310L for the suitable connector 10. By way of explanation, the edge portions of arms 310AM engage the locking feature 20L of the connector housing 20 for securing the connector 20. In order to release the connector 10 from the connection port 236, the arms 310AM and locking features 310L on the arms 310AM are translated outward.

As best shown in FIG. 34, actuator 310A comprises a wedge 310W that pushes into a head end 310H of securing member 310M, thereby elastically deflecting the arms 310AM of securing member 310M outward for releasing connector 10. The securing member 310M or actuators 310A of securing feature 310 may comprise a variety of different constructions. Likewise, the securing features 310 comprising more than one component may be biased by a securing feature resilient member 310RM if desired. For instance, securing feature resilient member 310RM may bias the actuator 310A toward a secure position. In other embodiments, the securing feature resilient member may bias the securing member 310M.

Figure 37:
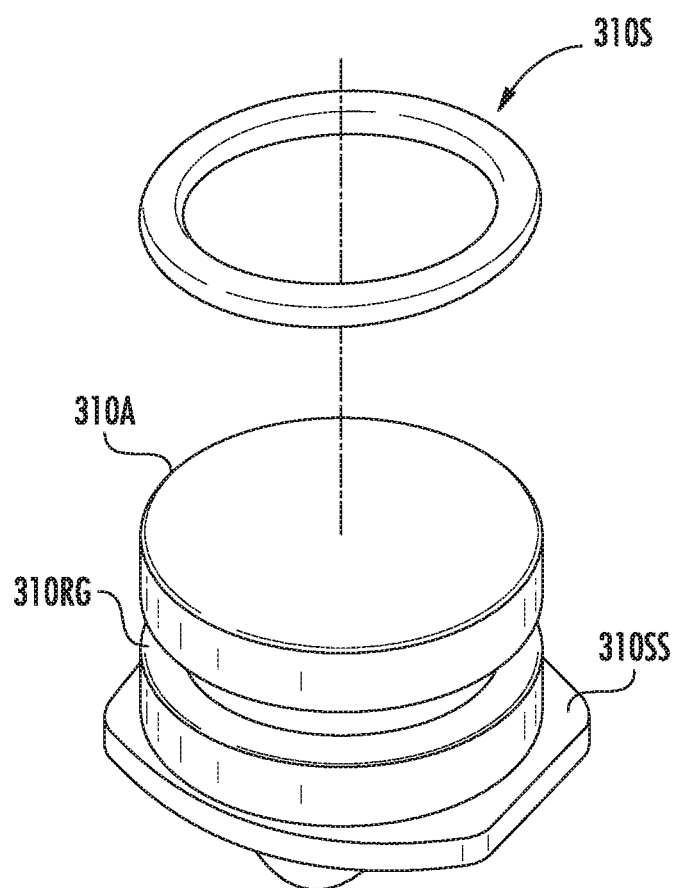
FIGS. 37-39 are various perspective views of the actuator of the securing feature assembly of the multiport of FIGS. 27 and 28.
Figures 38, 39:
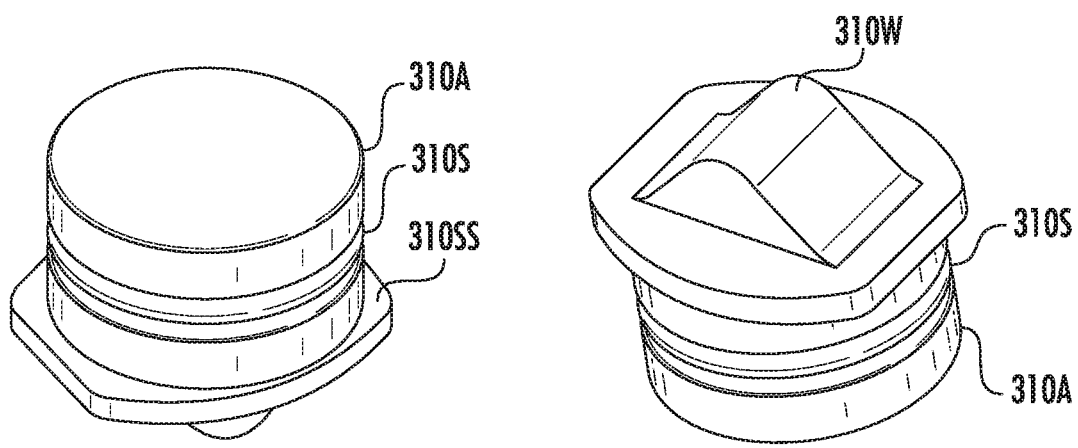

FIGS. 37-39 are various perspective views of the actuator 310A of the securing feature 310 of the multiport 200 shown in FIGS. 27 and 28. Actuator 310A may include a sealing member 310S disposed above the connector port passageway 233 for keeping dirt, debris and the like out of portions of the multiport 200. Sealing member 310S is sized for the retention groove 310RG in the actuator 310A and the securing feature passageway 245 for sealing. Actuator 310A may also be shaped to have one or more guides 310G that cooperate with the shell 210 or connection port insert 230 for keeping proper rotational orientation of the wedge 310W within the respective securing feature passageway 245 during translation. In this embodiment, the shape of the flange aids in the rotational orientation. Actuator 310A may also comprise a stop surface 310SS for inhibiting overtravel or the actuator 310A from being removed from the multiport 200 when assembled. Actuator 310A may also be a different color or have a marking indicia for identifying the port type. For instance, the actuator 310A may be colored red for connection ports 236 and the actuator 310A for the input connection port 260 may be colored black. Other color or marking indicia schemes may be used for pass-through ports, multi-fiber ports or ports for split signals.

Figure 40:
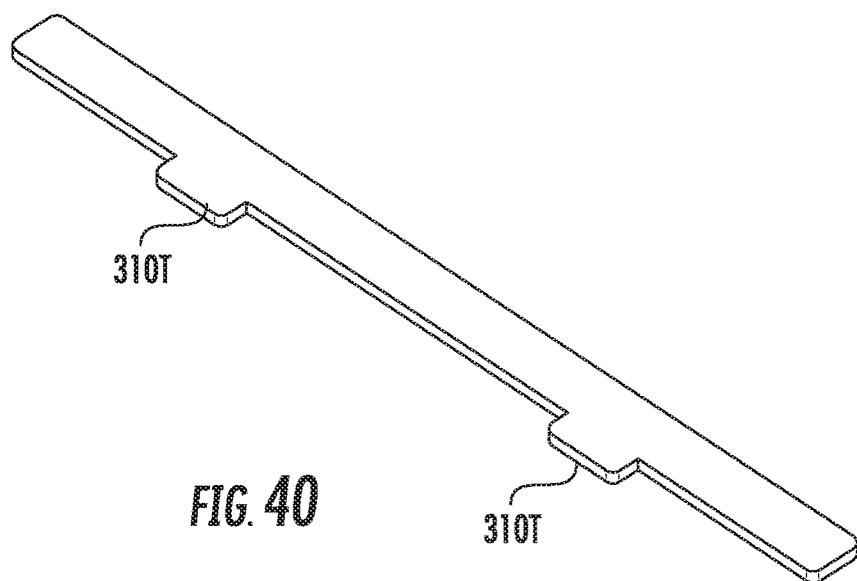
FIG. 40 is a perspective view of the securing member blank for forming the securing member of the securing feature of FIGS. 41-43.
Figure 41:
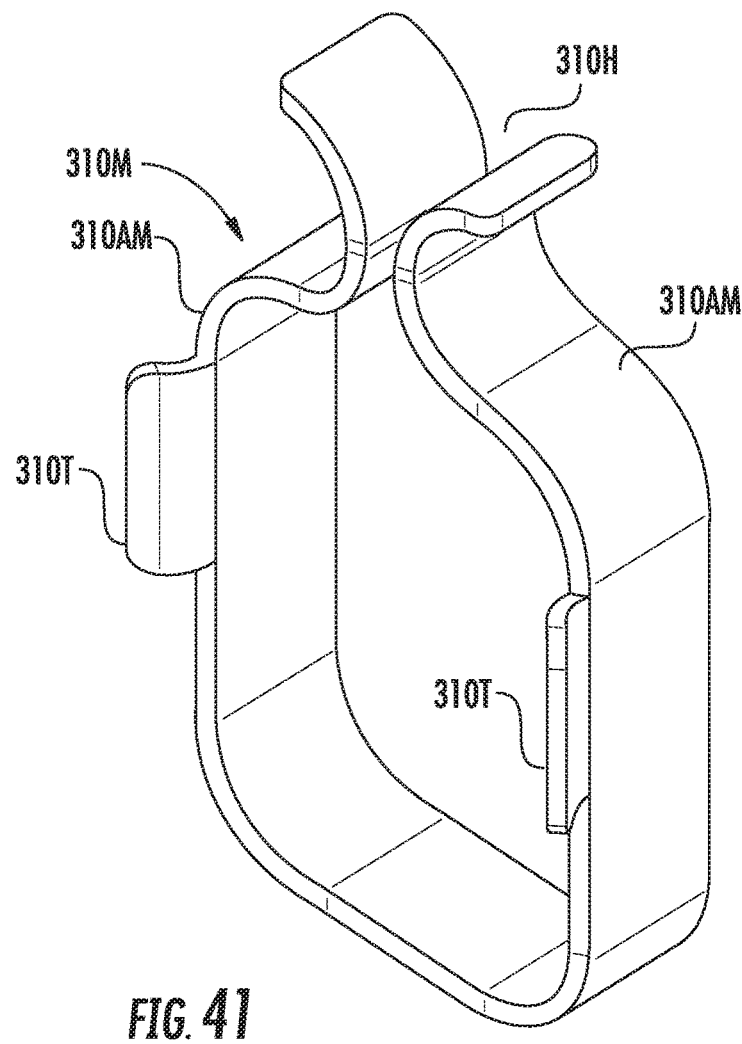
FIGS. 41-43 are various perspective views showing an explanatory securing member for the securing feature assembly of FIGS. 27 and 28 showing details of the same.
Figure 42:
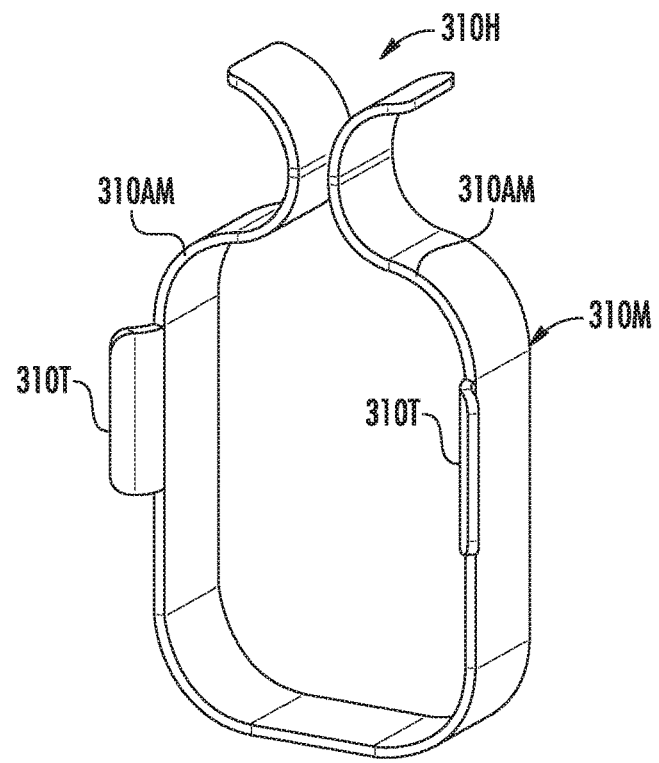
Figure 43:
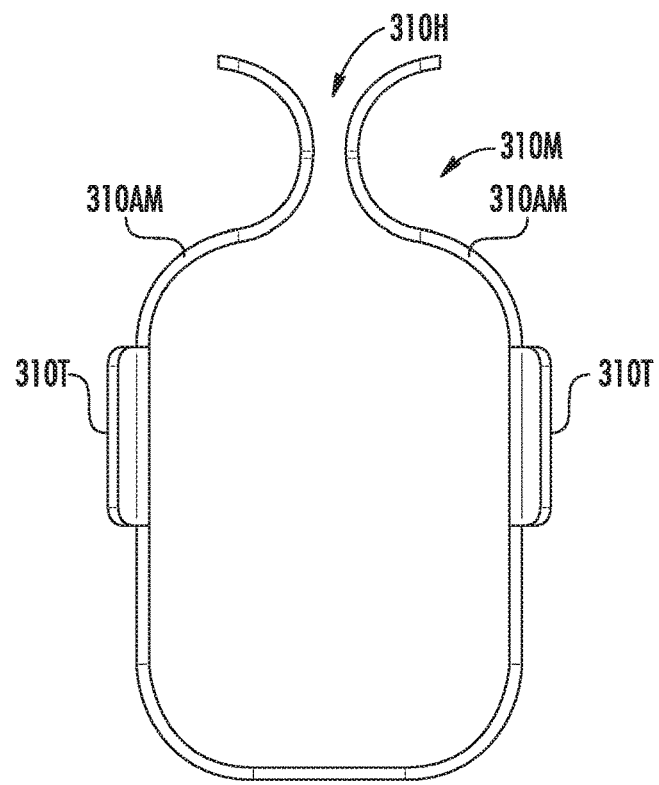

FIGS. 40-43 are various views of securing member 310M for explaining details of the design. FIG. 40 is a perspective view of the securing member blank for forming the securing feature 310M depicted in FIGS. 41-43. Securing member 310M may be formed from any suitable material such as a spring steel and have a suitable geometry for retaining a connector 10. FIGS. 41-43 are various perspective views showing the structure of securing member 310M. As depicted, securing member 310M comprises arms 310AM that define an opening (not numbered) therebetween along with a head end 310H formed at the ends of the arms 310AM. The opening (not numbered) between the arms 310AM is sized for cooperating with a suitable connector 10. Arms 310AM may comprise tabs 310T that are curved for aiding the engagement of the connector 10 with the securing member 310M upon insertion and allowing a smoother pushing and translation of the arms 310AM outward as connector 10 is inserted into connection port 236. Likewise, the head end 310H may also be formed with a suitable shape that cooperates with the actuator 310A.

Like the other securing features 310, the securing feature 310 may comprises more than one component for translating from a retain position (RP) to an open position (OP) as a suitable connector 10 is inserted into the connection port 236. Once connector 10 is fully-inserted into connector passageway 233, then the securing feature 310 automatically moves to the retain position (RP) since the arms 310AM are biased to the retain position. This advantageously allows a push and play connectivity of the connectors 10 with multiport 200 without having to turn a coupling nut or a bayonet like conventional multiports. Thus, connections to the multiport may be made faster and in positions that may be awkward with relative ease.

Figure 44:
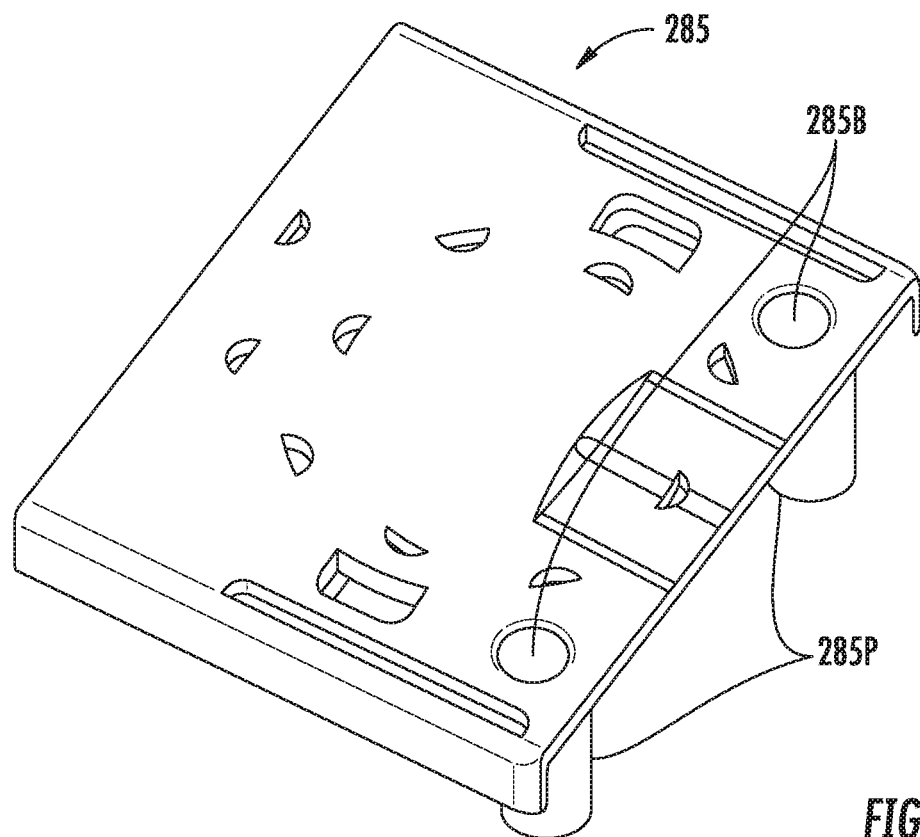
FIGS. 44 and 45 are bottom and top perspective views showing the optical fiber guide configured as a tray of FIGS. 27 and 28.
Figure 45:
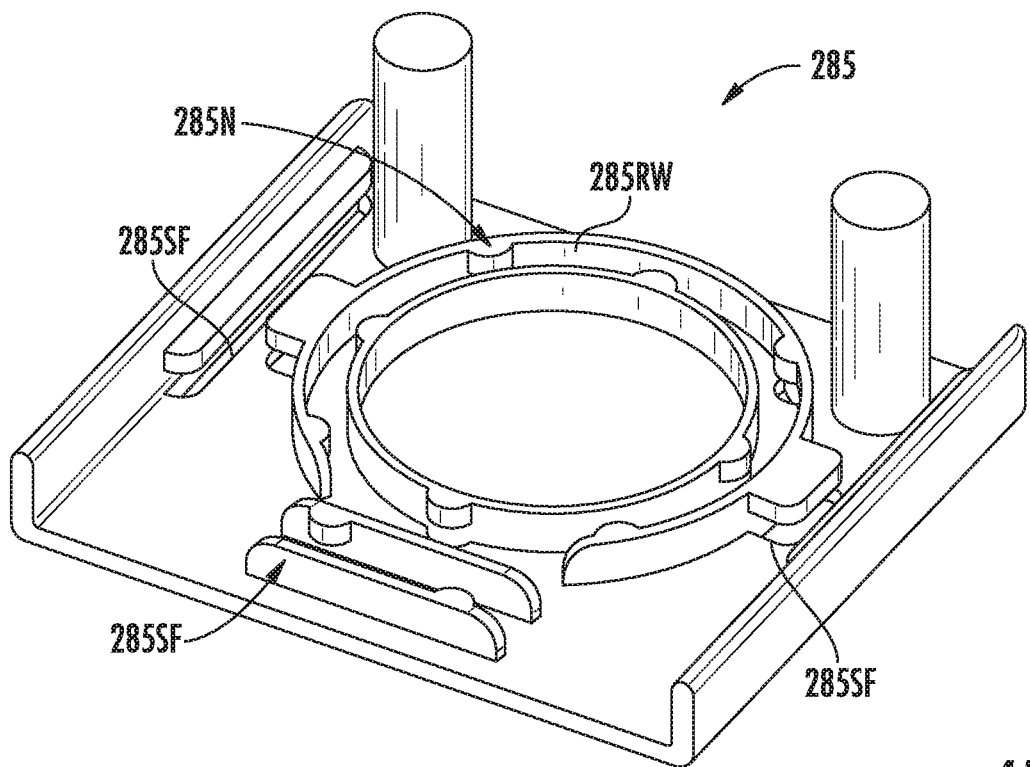
Figure 46:
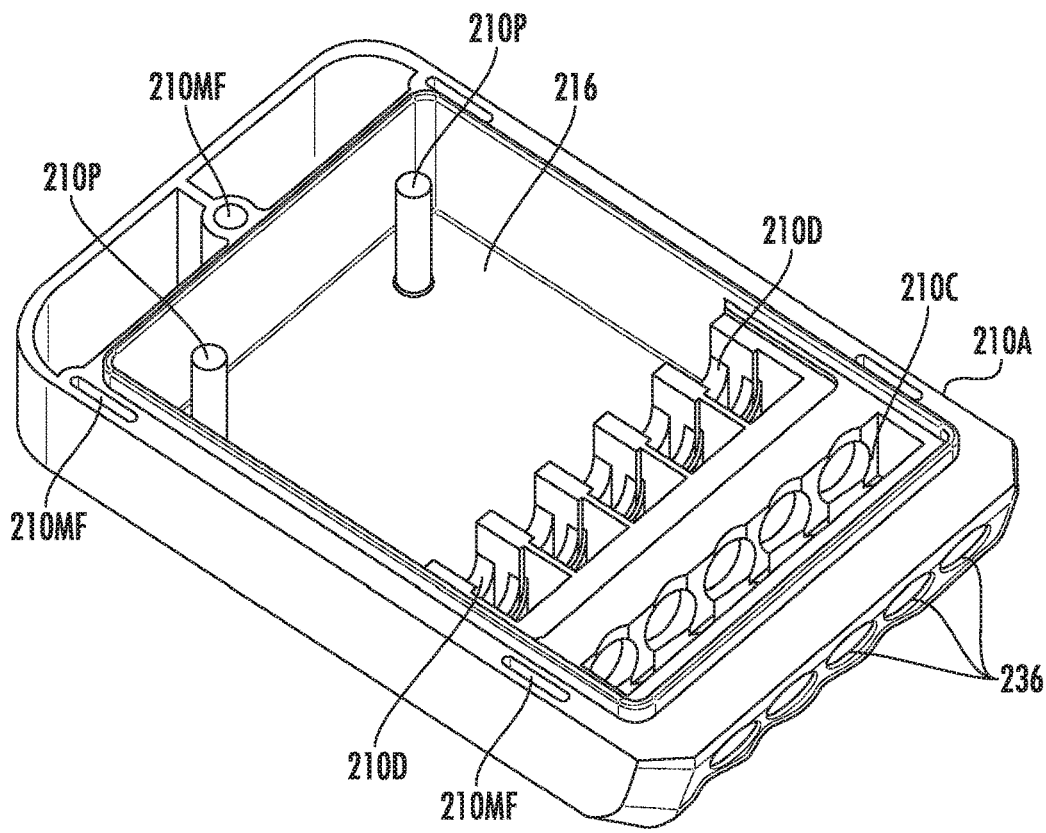
FIG. 46 is a bottom perspective view of a first portion of the shell of the multiport of FIGS. 27 and 28.
Figure 47:
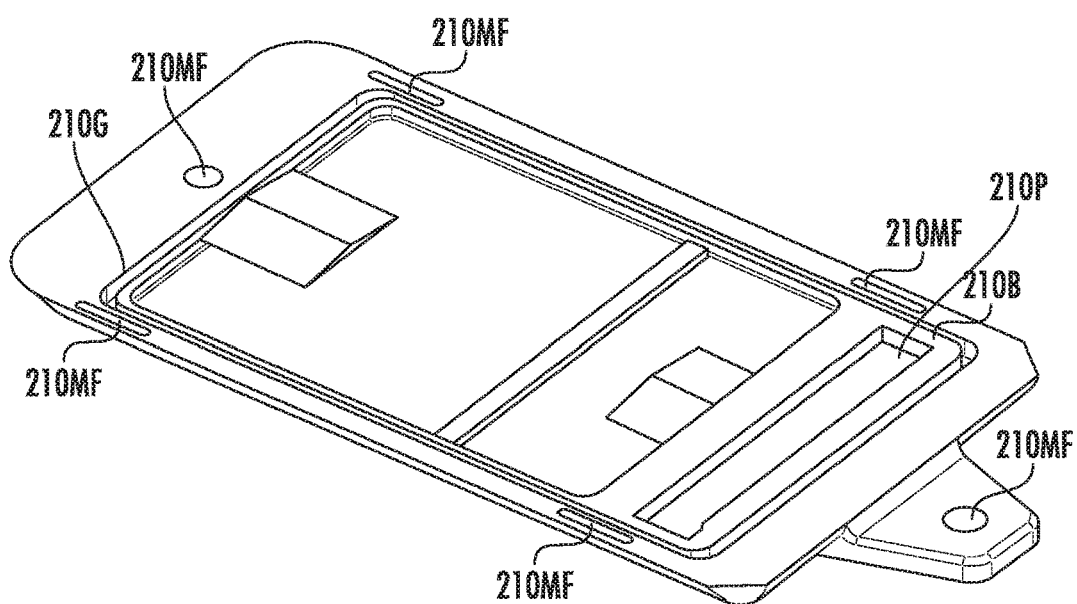
FIG. 47 is a perspective view of the second portion of the shell of the multiport of FIGS. 27 and 28.

The other components of the multiport 200 of FIGS. 27 and 28 are shown and discussed as assembled in FIGS. 44-56. FIGS. 44 and 45 are bottom and top perspective views showing the optical fiber tray or guide 285 that is placed into shell 210A of multiport 200. FIG. 46 is a bottom perspective view of a first portion of the shell of the multiport 200 and FIG. 47 is a perspective view of the second portion of the shell of the multiport of 200 for showing details.

Figure 48:
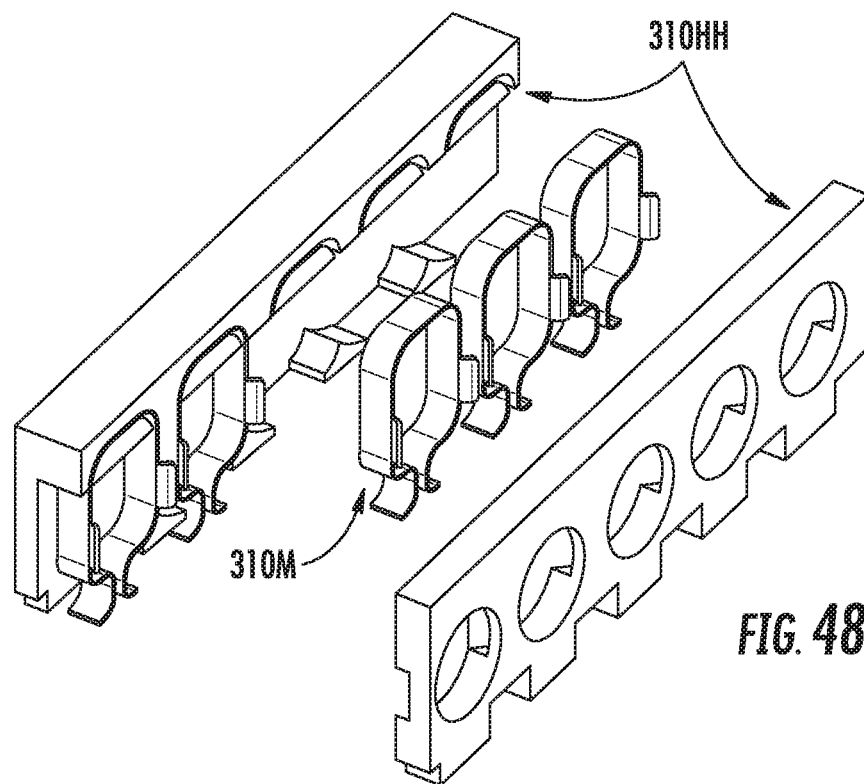
FIGS. 48 and 49 respectively are partially exploded and assembled views of an explanatory securing feature subassembly for the securing members.
Figure 49:
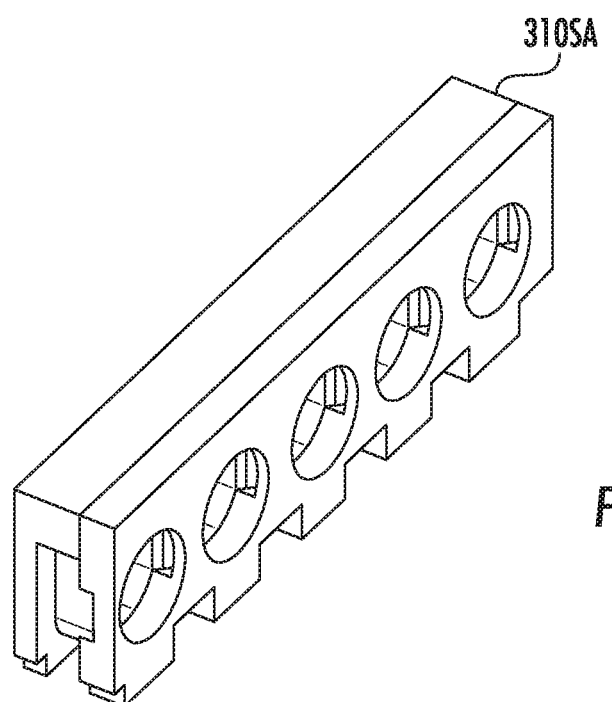

FIGS. 48 and 49 respectively are partially exploded and assembled views of a securing feature sub-assembly 310SA for a portion of the securing feature 310. As depicted, the securing members 310M may be placed into a housing formed by one or more housing portions 310HH for maintaining the proper orientation of the securing features. The securing feature sub-assembly 310SA also allows for easier assembly of multiple securing members 310M into the devices. Further, the housing portions 310HH may have suitable geometry for keeping the securing members in the desired orientation. FIG. 49 depicts the securing feature sub-assembly 310SA ready for placing into the device. FIG. 50 depicts the components of securing feature 310 being installed into the first portion of the shell of FIG. 46. As depicted, the actuators 310A of the securing features are installed into the respective securing feature passageways of the shell 210A with the wedge 310W facing up. Thereafter, the securing feature sub-assembly 310SA may be placed into a cavity 210C of the securing feature passageway formed within shell 210A. Consequently, the actuators 310A are aligned and positioned with respective securing members 310M of the securing features.

Figure 51:
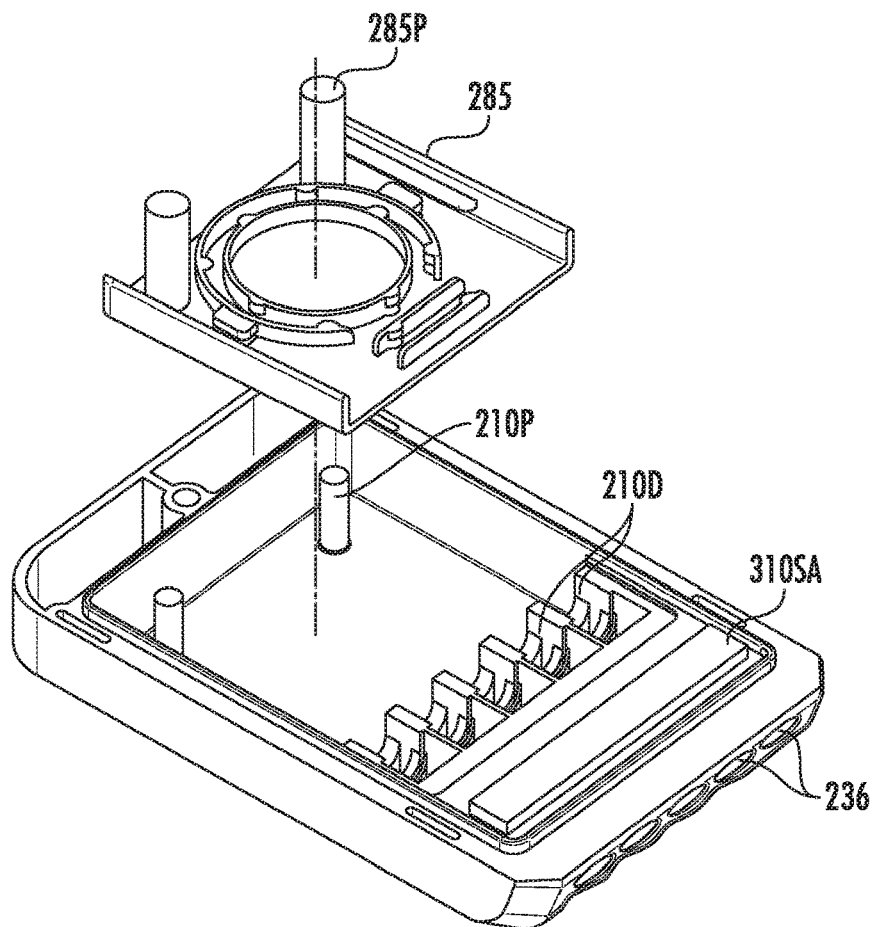
FIGS. 51 and 52 respectively are perspective view and a sectional view showing an optical fiber guide being installed into the first portion of the shell of the multiport of FIGS. 27 and 28.
Figure 52:
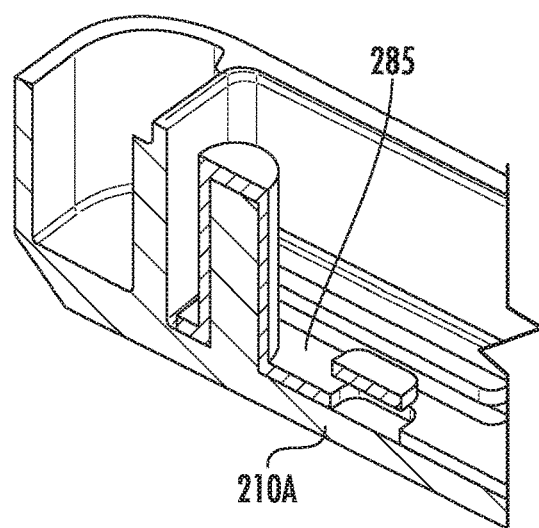

FIGS. 51-52 show the optical fiber tray or guide 285 being installed into the first portion of the shell of the multiport 200. The devices may also comprises a fiber guide or tray (not numbered) integrated with the body 232. Fiber tray 285 may include one or more protrusions 285P that aid alignment and may also provide strength for the device to withstand any crushing forces. Including supports for multiports 200 greatly improves the strength between the opposing walls, and the supports may be included on other components such as the shell 210 such as 210P or the integrated in a separate fiber tray such as depicted. Supports or protrusions may also act as fiber routing guides to inhibit tight bending or tangling of the optical fibers and aid with slack storage of optical fibers 250. Other embodiments may also comprises one or more fiber routing guides 230G or supports 230S.

Figure 53:
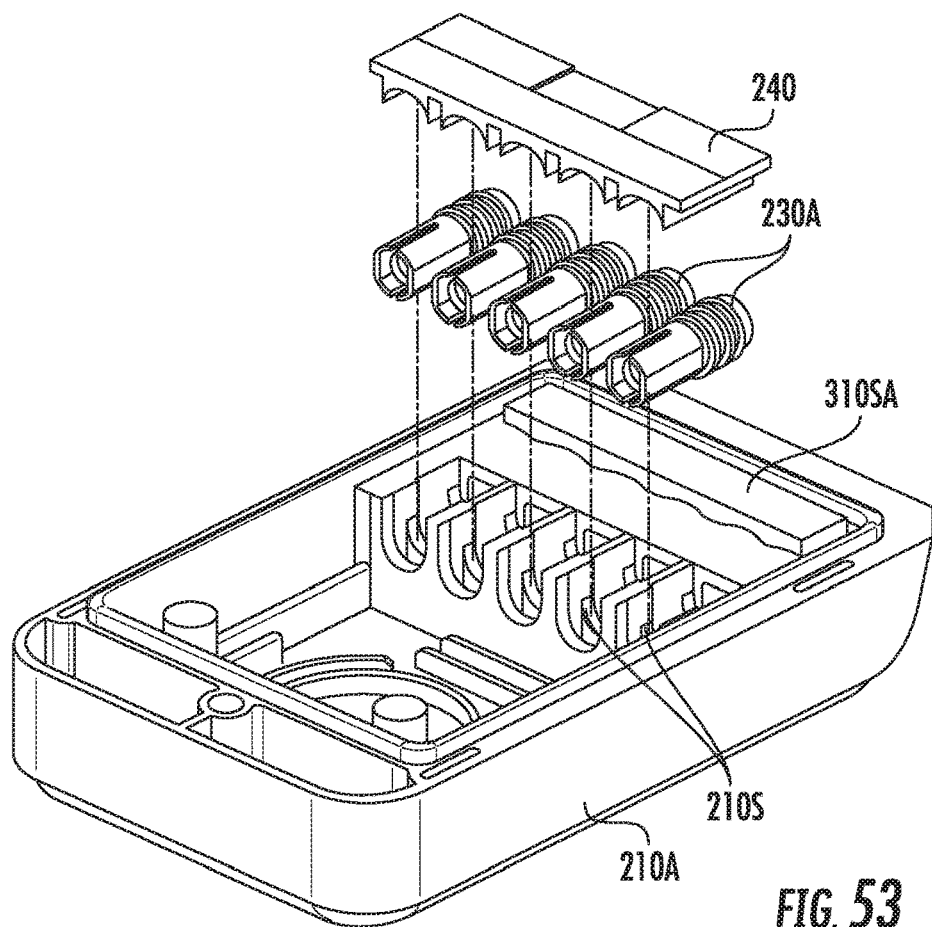
FIG. 53 is a perspective view of a plurality of adapters and an adapter retainer being aligned for installation into the first portion of the shell of the multiport of FIGS. 27 and 28.
Figure 54:
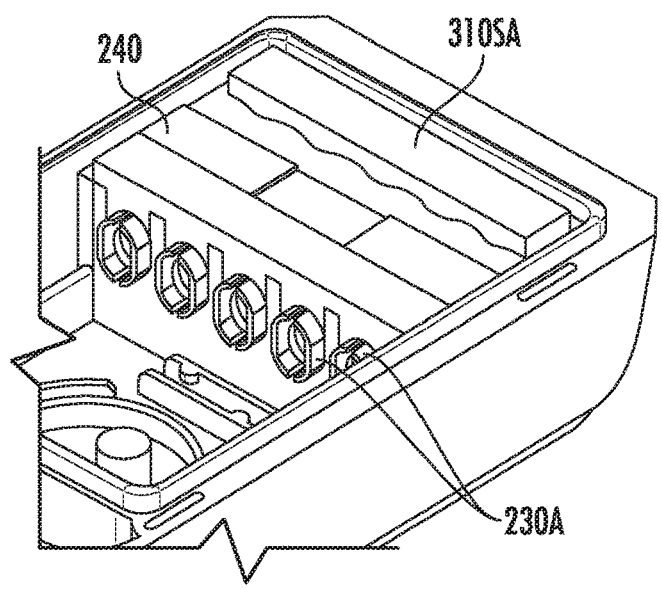
FIG. 54 is a perspective view of the plurality of adapters and an adapter retainer assembled into the first portion of the shell of the multiport of FIGS. 27 and 28.
Figure 55:
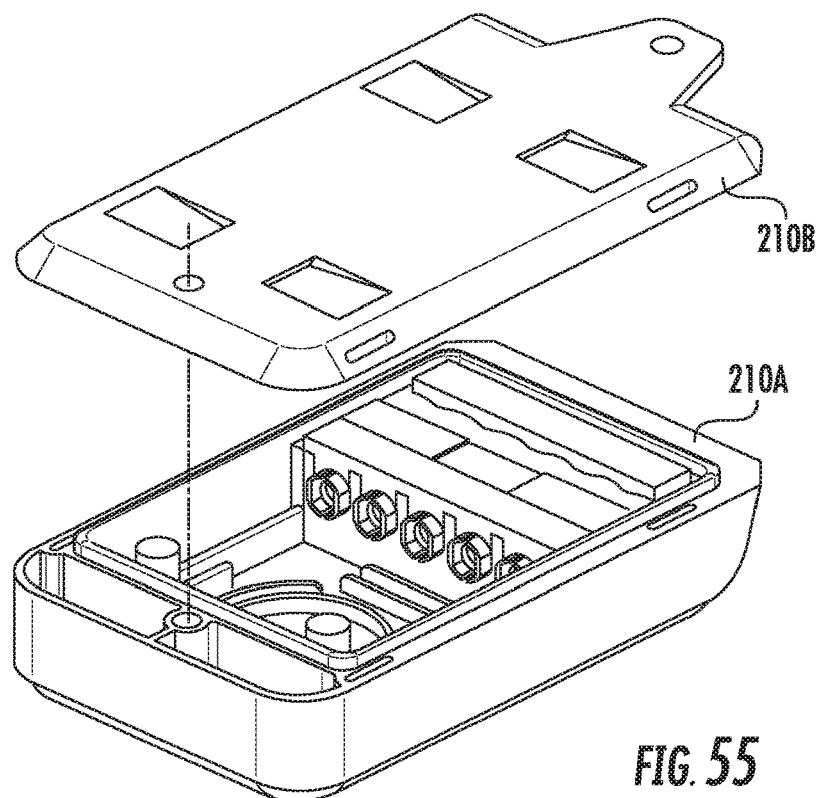
FIG. 55 is a perspective view of the second portion of the shell being aligned with the first portion of the shell of the multiport of FIGS. 27 and 28 with the rear connectors and optical fibers removed for clarity.
Figure 56:
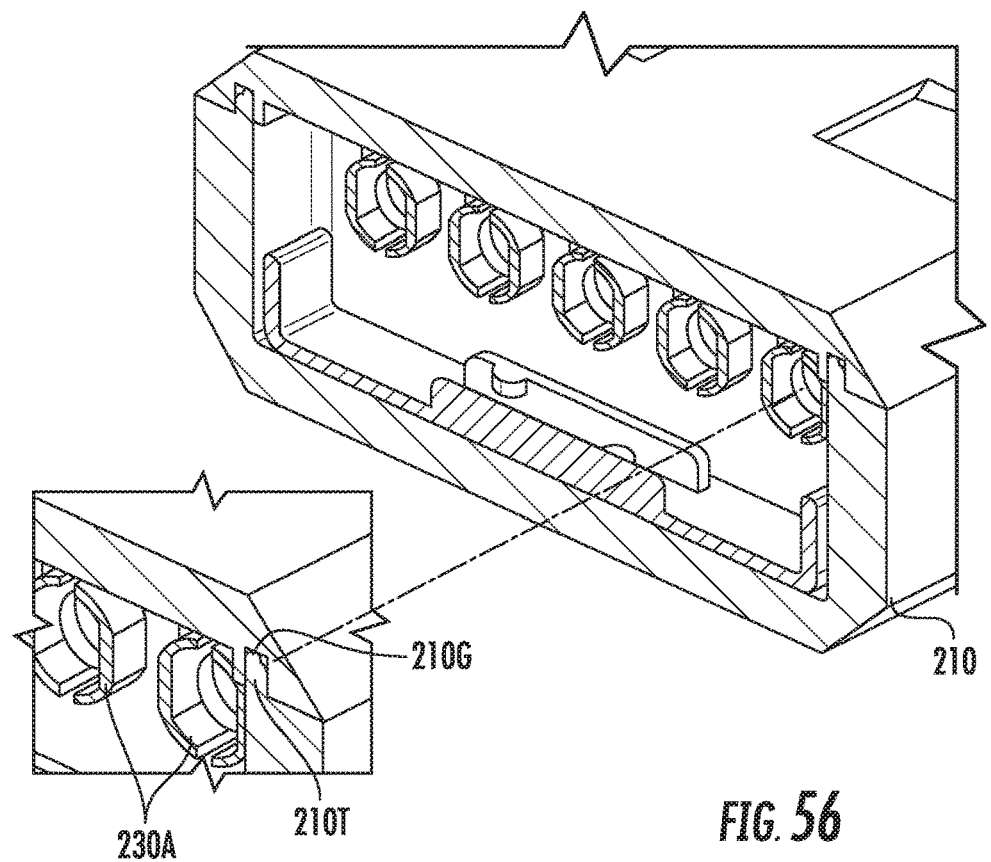
FIG. 56 is a detailed perspective view showing details of the interlocking features between the first portion and the second portion of the shell of the multiport of FIGS. 27 and 28.

FIG. 53 is a perspective view of the adapters 230A and retainer 240 being aligned for installation into the first portion 210A of the shell 210 and FIG. 54 is a perspective view of the plurality of adapters and an adapter retainer assembled into the first portion 210A of the shell 210. FIG. 55 shows the second portion 210B of the shell 210 being aligned with the first portion 210A of the shell 210 with the rear connectors 252 and optical fibers 250 removed for clarity. FIG. 56 is a detailed sectional view showing details of the interlocking features between the first portion 210A and the second portion 210B of the shell 210. Specifically, portions of the multiport may have a tongue 210T and groove 210G construction for alignment or sealing of the device.

Figure 57:
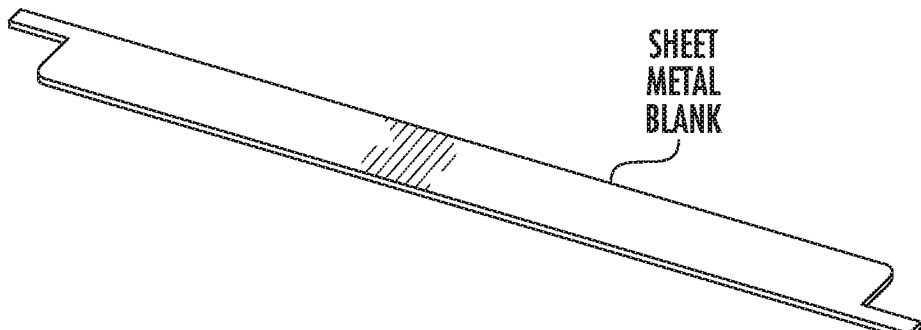
FIGS. 57-60 depict perspective views for another securing feature comprising more than one component for devices according to the concepts disclosed along with a suitable housing for a fiber optic connector having an integral locking feature that cooperates with the securing feature.
Figure 58:
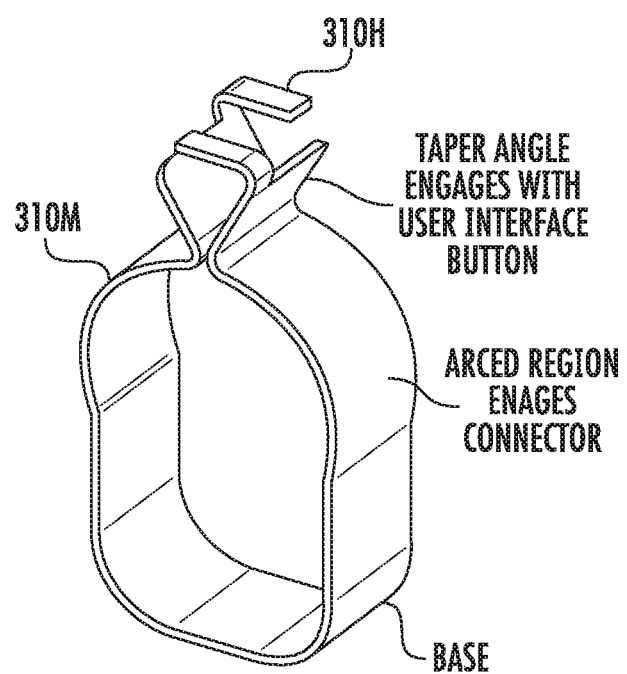
Figure 59:
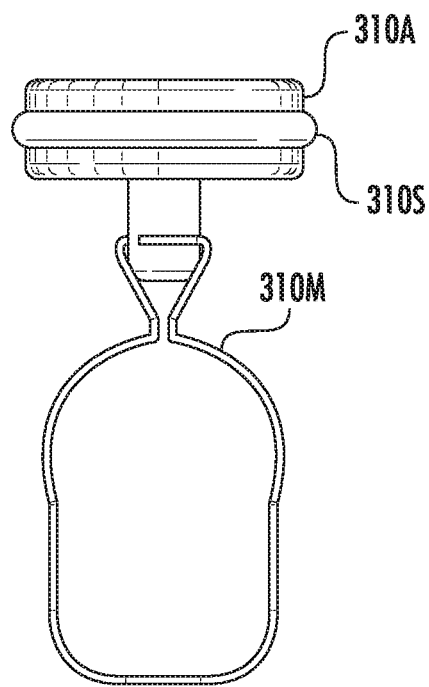
Figure 60:
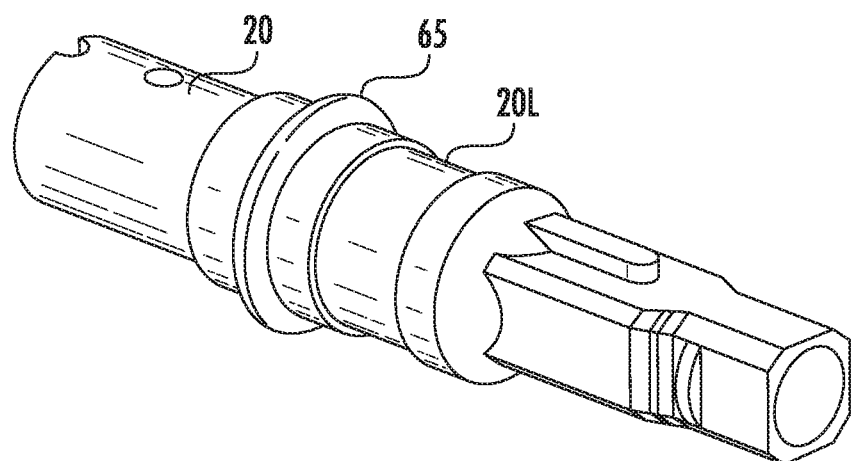
Figure 61:
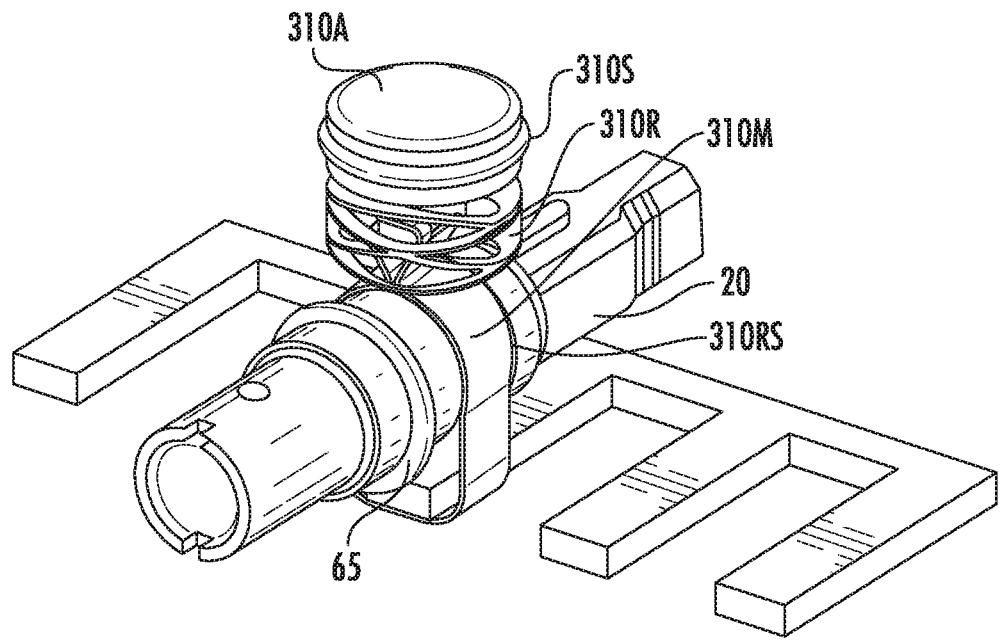
FIGS. 61 and 62 are perspective views of the securing feature and connector housing for the fiber optic connector of FIGS. 57-60 as disposed in a device.
Figure 62:
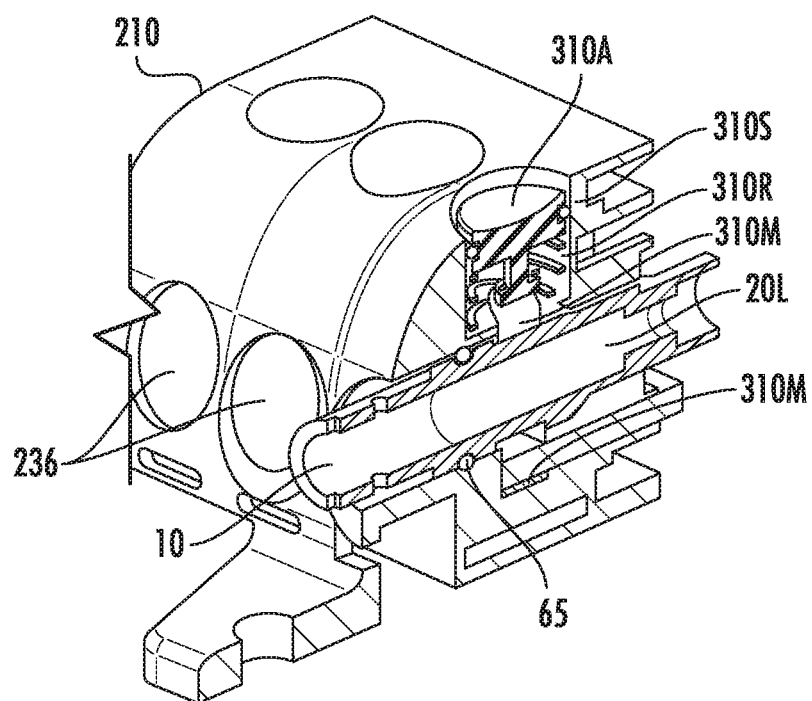

Securing features 310 comprising more than one component may have various configurations for use with devices disclosed herein. FIGS. 57-59 depict perspective views of another securing feature 310 comprising securing member 310M for use with an actuator 310A. FIG. 60 depicts a suitable connector housing 20 for the securing member 310M of FIGS. 57-59. As shown, the connector housing 20 has the locking feature 20L disposed forward of the O-ring 65. FIG. 57 is a perspective view of the securing member blank for forming the securing member 310M depicted in FIGS. 58 and 59. FIG. 58 depicts securing member 310M comprising arms 310AM that define an opening (not numbered) therebetween along with a head end 310H formed at the ends of the arms 310AM. The opening (not numbered) between the arms 310AM is sized for cooperating with a suitable connector 10. The head end 310H of the arms 310AM have a tapered shape for cooperating with the actuator 310A to translate the arms 310AM outward when the actuator 310A translates downward as best shown in FIG. 59. FIGS. 61 and 62 are perspective views of the securing feature 310 cooperating with the connector housing 20 of FIG. 60. As discussed and depicted, the securing member 310M may be secured in the device using locking member 310LM.

Figure 63:
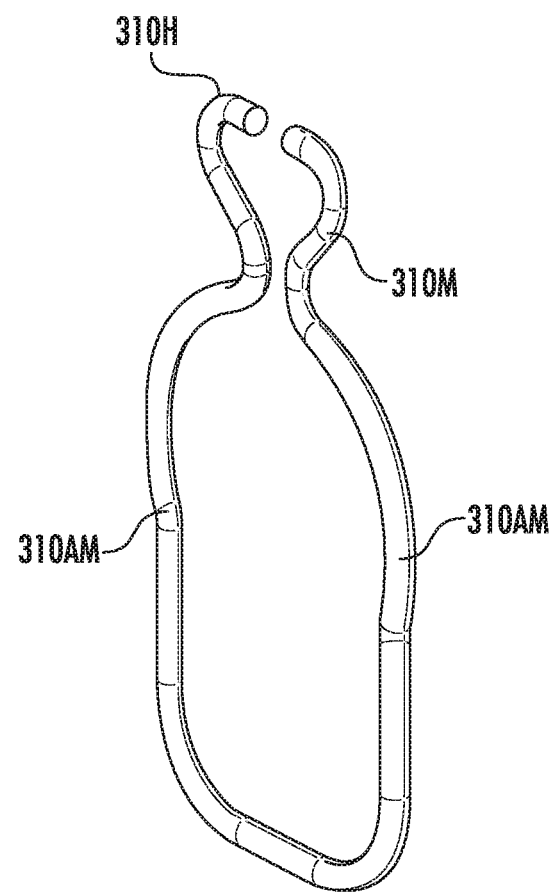
FIGS. 63-65 depict perspective views for yet another securing feature comprising more than one component for devices according to the concepts disclosed along with a suitable connector housing for a fiber optic connector having an integral locking feature that cooperates with the securing feature.
Figure 64:
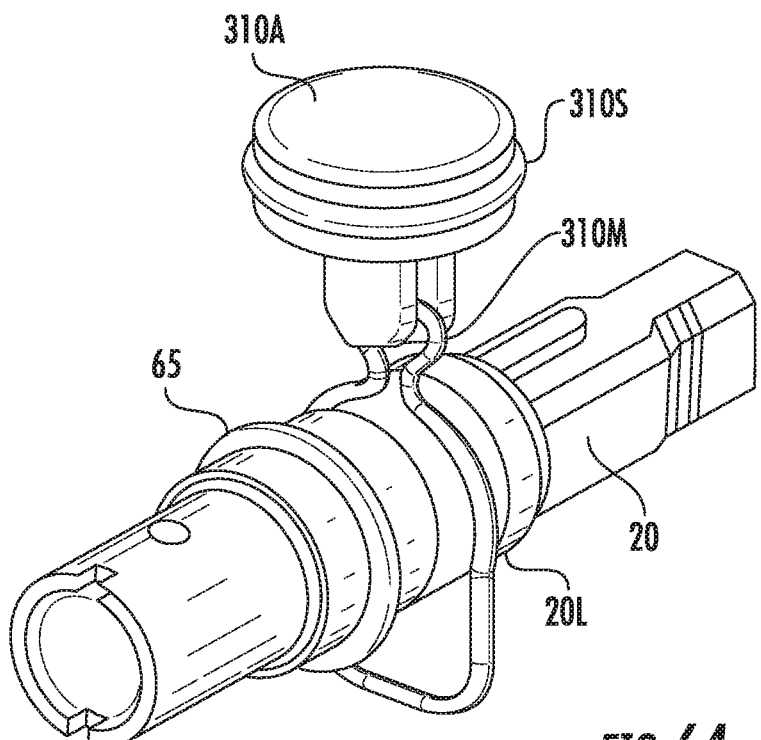
Figure 65:
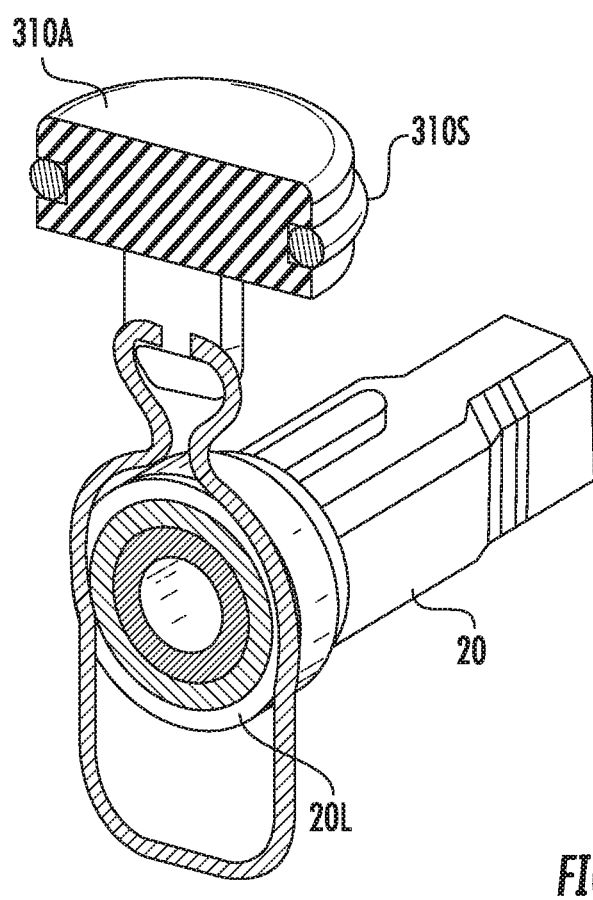

FIGS. 63-65 depict perspective views of yet another securing member 310M for securing features 310 comprising more than one component along with a suitable connector housing 20 for cooperating with the securing feature 310. By way of example, FIG. 63 shows securing member 310M formed from a wire. Like the other securing members 310M, this securing member 310M comprises arms 310AM that define an opening (not numbered) therebetween along with a head end 310H formed at the ends of the arms 310AM. The opening (not numbered) between the arms 310AM is sized for cooperating with a suitable connector 10. When assembled, the head end 310H of the arms 310AM are received in a portion of actuator 310A as shown in FIG. 65. This securing feature 310 may also be biased by a resilient member 310R.

Figure 66:
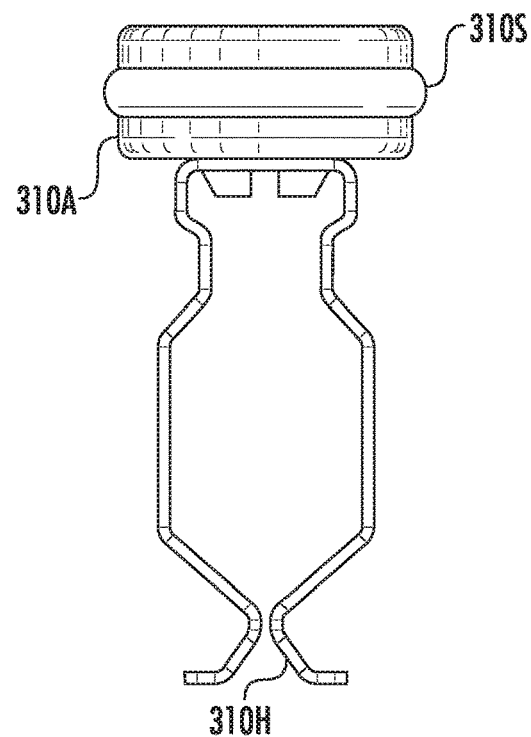
FIGS. 66-68 depict perspective views of yet another securing feature comprising more than one component for devices according to the concepts disclosed along with a suitable connector housing for a fiber optic connector having an integral locking feature that cooperates with the securing member.
Figure 67:
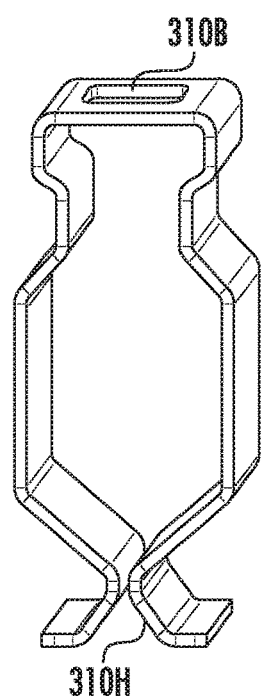
Figure 68:
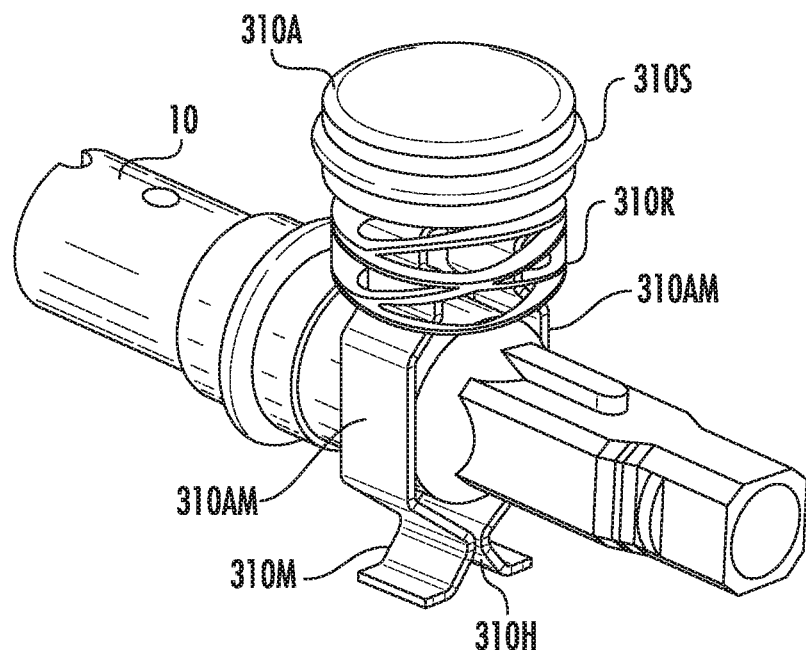
Figure 69:
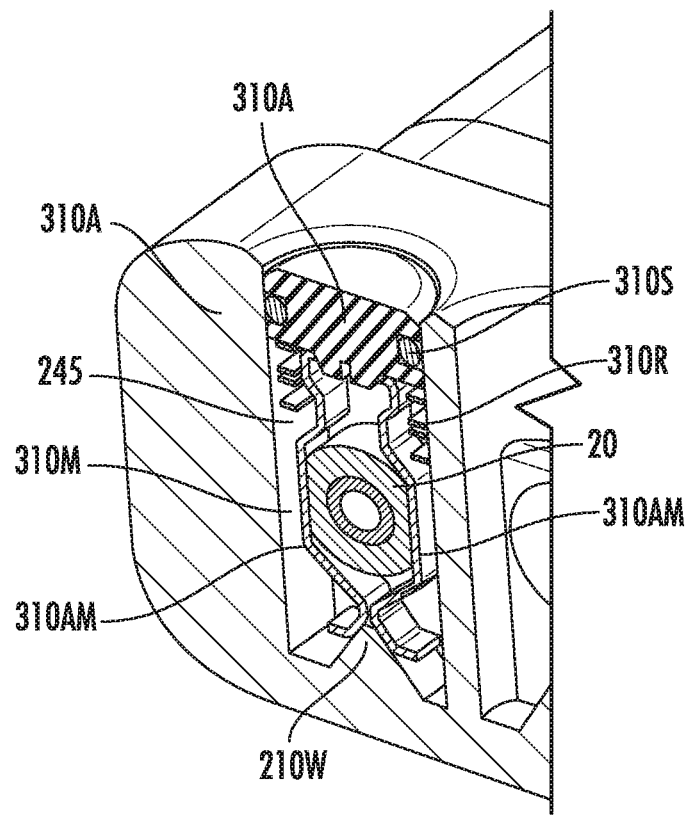
FIG. 69 is a sectional view showing the securing feature and connector housing of the fiber optic connector of FIG. 68 disposed in a device.

FIGS. 66-68 depict perspective views of yet another securing feature comprising more than one component. In this embodiment, the securing member 310M is inverted so that the head end 310H cooperates with a portion of the multiport for translating the arms 310AM compared with other embodiments. More specifically, a portion of the multiport such as connector port insert of shell comprises a wedge 210W as shown in FIG. 69. FIG. 66 depicts the actuator 310A attached to a base 310B of the securing member 310M and the head end 310H disposed on the opposite end and FIG. 67 shows that the base 310B may have aperture for securing the actuator 310A to the securing member 310M. FIG. 68 shows connector housing 20 cooperating with the arms 310AM for securing the connector 10. This securing feature 310 may also be biased by a resilient member 310R as shown. FIG. 69 shows how the head end 310H of securing member 310M cooperates with wedge 210W of the multiport for translating the arms 310AM outward when the actuator 310A translates downward.

Figure 70:
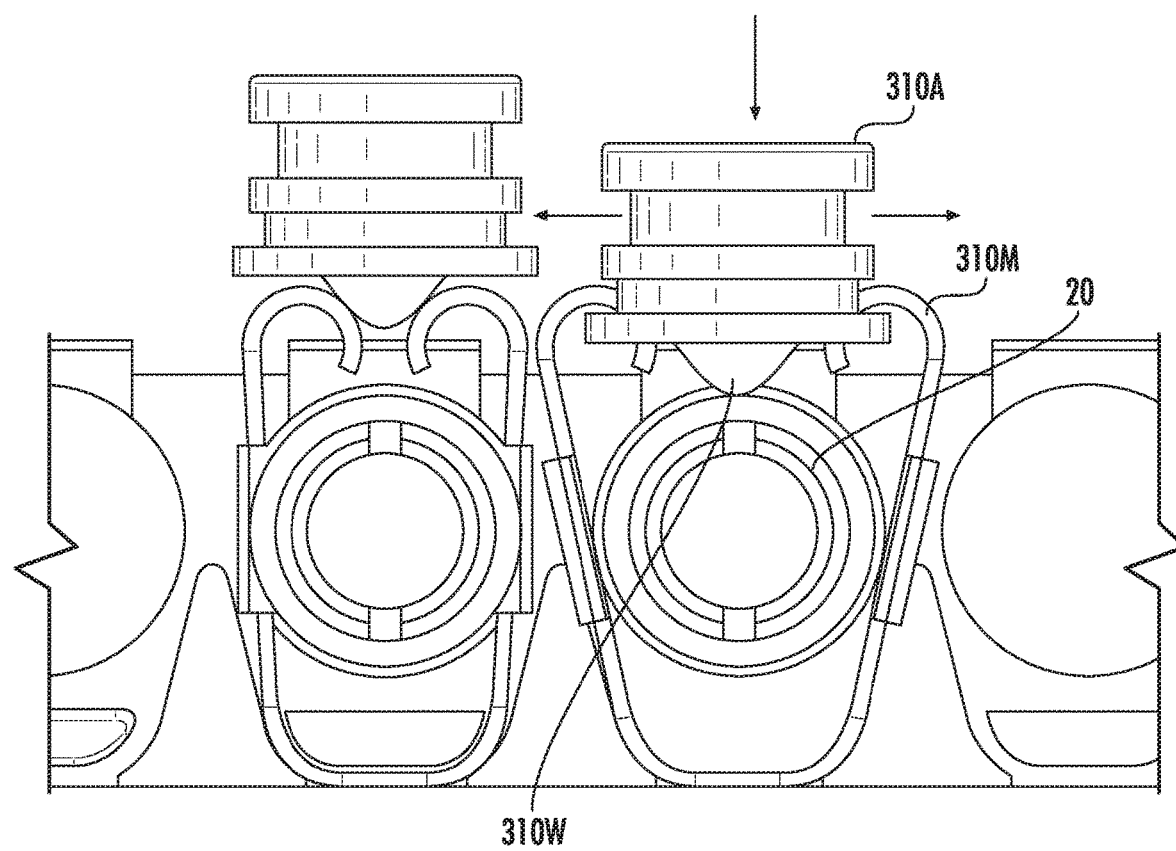
FIGS. 70-72 depict perspective views of yet another securing feature comprising more than one component for devices according to the concepts disclosed.
Figure 71:
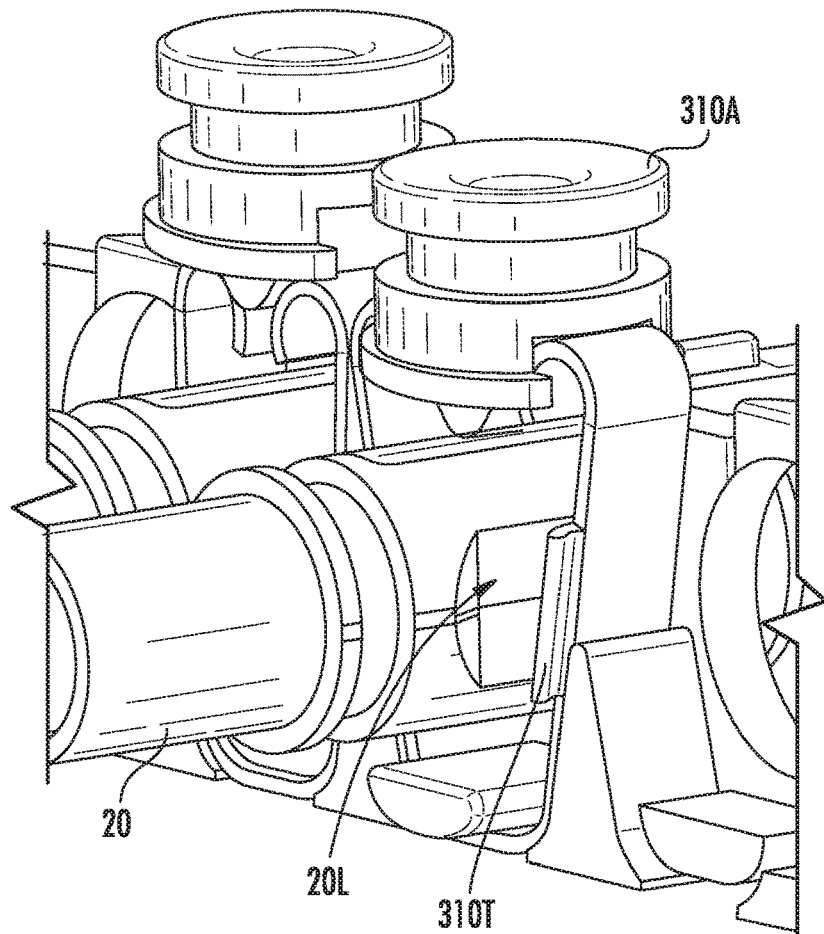
Figure 72:
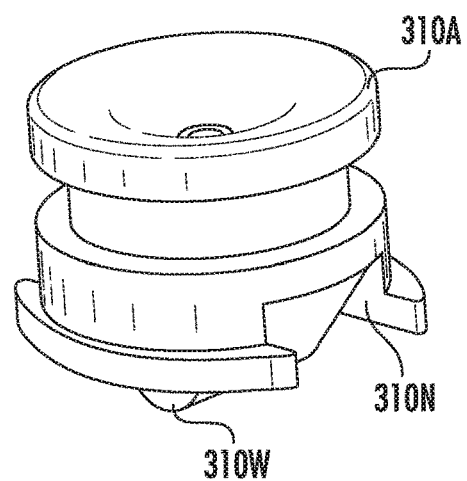

FIGS. 70-72 depict views of yet another securing feature comprising more than one component. FIG. 70 is a sectional view of another securing feature 310 comprising securing member 310M for use with an actuator 310A that provides a reduced height compared with other embodiments. This securing member 310M comprises arms 310AM that define an opening (not numbered) therebetween along with a head end 310H formed at the ends of the arms 310AM. Head end 310H of this securing member 310M has the ends curled in and downward and the actuator 310A positions the wedge 310W further upward into the actuator 310A footprint as shown in FIG. 70 resulting in a construction that has a reduced height and allowing the device to reduce its height as well. FIG. 71 depicts a suitable connector housing 20 for the securing member 310M with the actuator 310A translated to an open position for releasing the connector. Again, the connector housing 20 has the locking feature 20L disposed forward of the groove for the O-ring 65. FIG. 72 shows the notch 310N that allows the wedge 310W to be incorporated further into the body of the actuator 310A.

Figure 73:
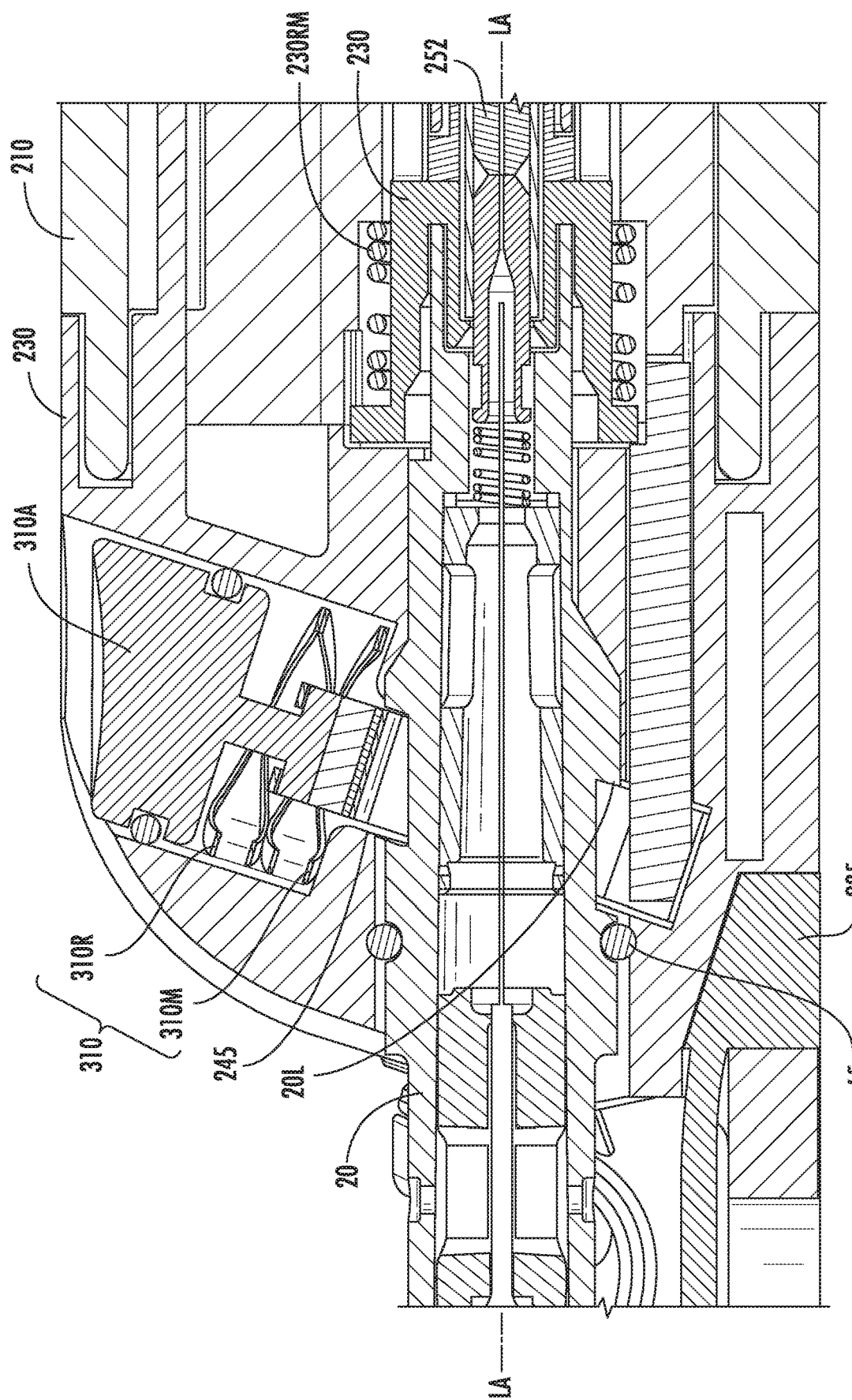
FIG. 73 is a sectional view of a further securing feature showing that the securing feature may be arranged at any suitable angle relative to a longitudinal axis of the connector port.

Securing features 310 may have any suitable orientation or construction for engaging connectors 10. FIG. 73 is a sectional view of a further securing feature 310 arranged at an angle relative to the longitudinal axis LA of the connection port 236. As shown, This securing feature 310 comprises securing member 310M and actuator 310A disposed in a securing feature passageway 245 that is angled with respect to the longitudinal axis LA of the connection port 236. Likewise, connector 10 has a connector housing 20 with the locking feature 20L that is angled with respect to the longitudinal axis of the connector. Similar concepts may be used with as a portion of the shell or the connection port insert as well as a monolithic securing feature 310.

Figure 74A:
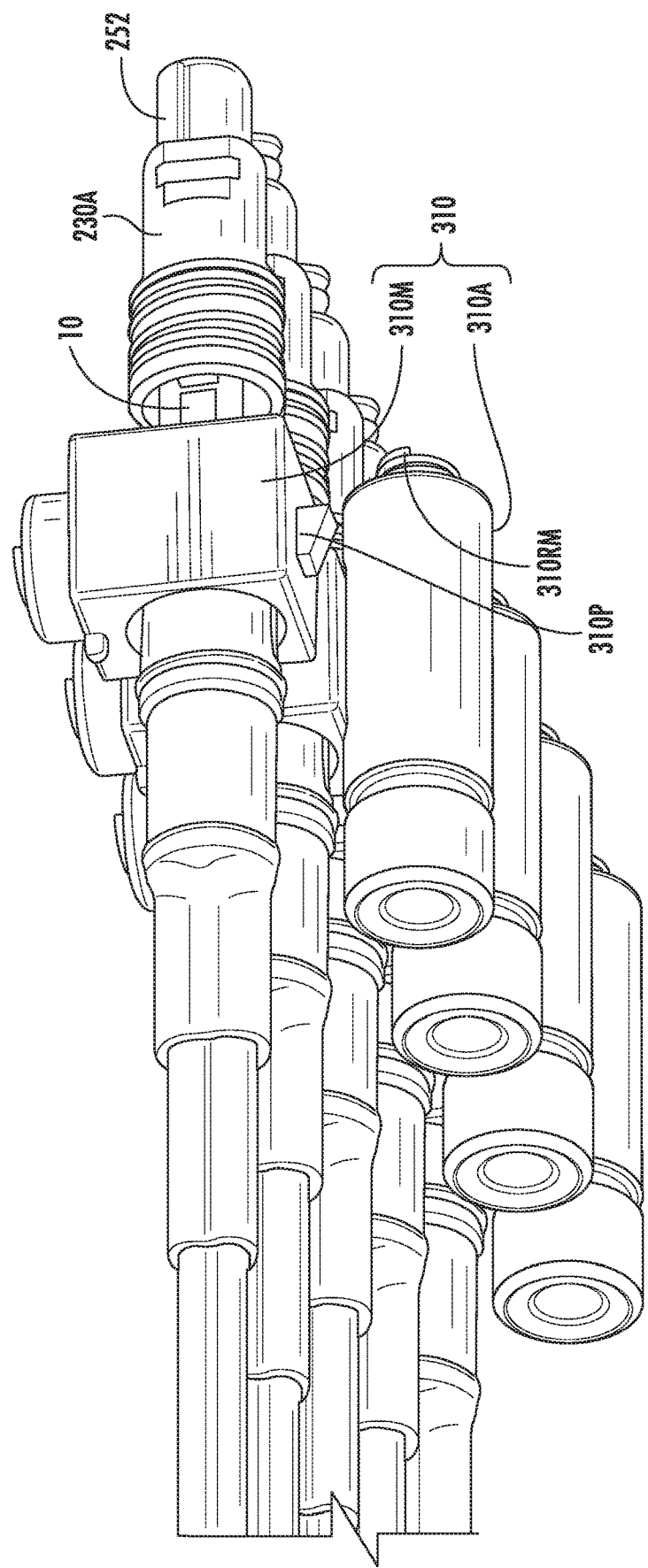
FIG. 74A is a perspective view of another securing feature construction without the multiport removed and securing the connector for showing the actuator of the securing feature of a device arranged in a direction that is generally aligned with the longitudinal axis of the connection port.
Figure 74B:
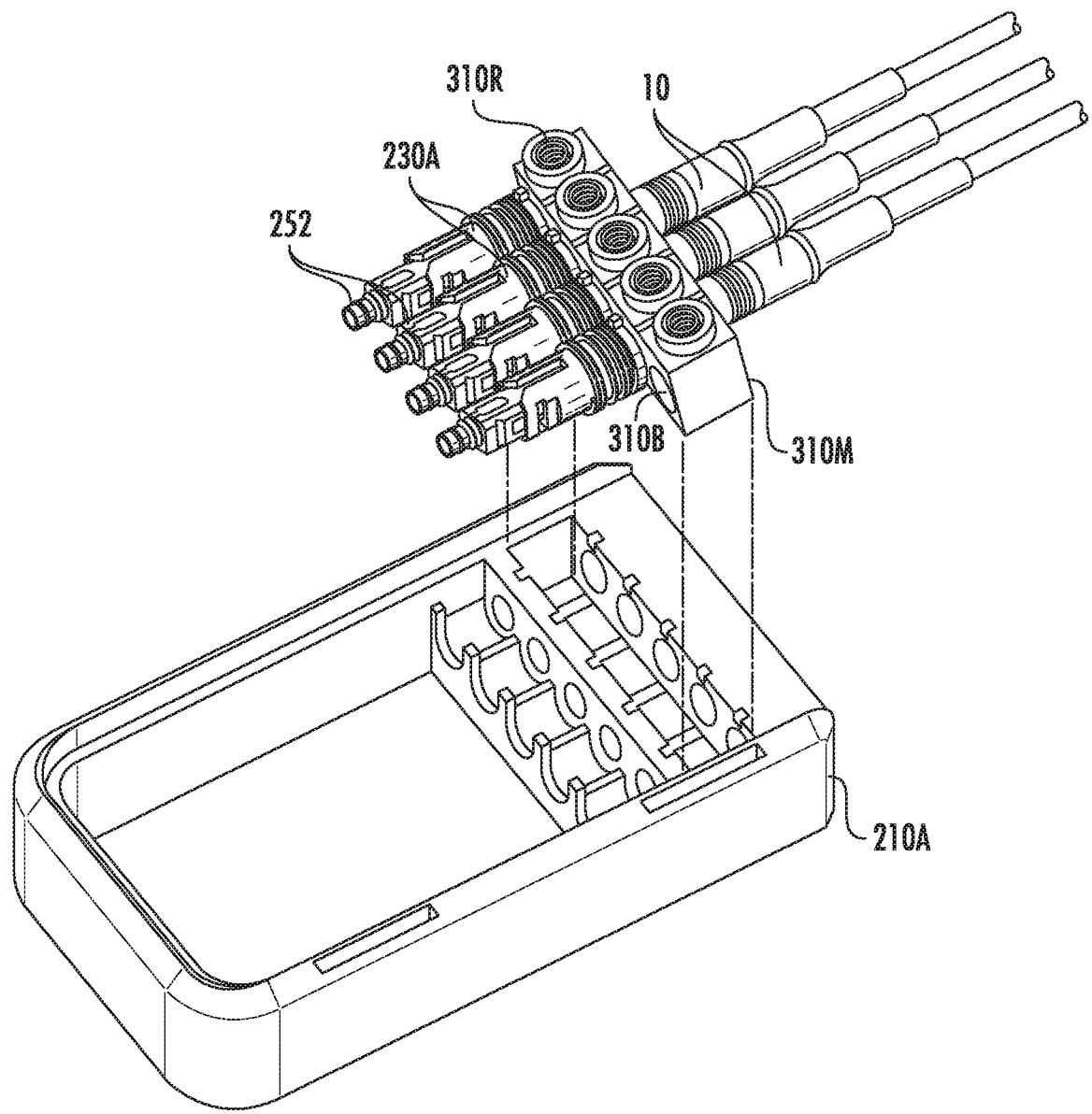
FIG. 74B are perspective views of the securing feature of FIG. 74A being placed into a device.

Other variations are also possible for securing features. FIG. 74 depicts a device 200 comprising the actuator 310A of the securing feature 310 disposed in a horizontal direction with respect to the longitudinal axis LA of the connection port 236. FIG. 74A is a perspective views showing a securing feature construction without the multiport and securing connector 10. This securing feature 310 comprises actuator 310A and securing member 310M. This securing member 310 comprises bore 310B for receiving the connector 10 therethrough. Bore 310B may have any suitable locking feature 310L (not visible) for cooperating with connector 10. Securing member 310M comprises a securing member push 310P. Securing member push 310P is configured as a ramp for translating the securing member 310M as the actuator 310A is translated toward the securing member 310M. Actuator 310A comprises a complimentary surface that cooperates with securing member push 310P. Securing feature resilient member 310RM may bias the actuator. Consequently, the securing member 310M may translate from a secure position to an open position. This securing feature 310 may have other features as disclosed herein as well. FIG. 74B depicts the securing feature 310 of FIG. 74A being placed into the device.

FIGS. 75-82 depict another device such as a multiport 200 similar to FIG. 74 the actuator 310A of the securing feature 310 arranged in a direction that is generally aligned and offset from the longitudinal axis of the connector port 236. This multiport 200 of FIGS. 75-82 is also similar to the embodiment of FIGS. 27 and 28 and shown in cross-section of the connection port 236 at FIG. 33 since the securing members 310M are disposed in a sub-assembly 310SA. Since the actuator 310A is generally positioned horizontal with the connection port 236 the securing member 310M is modified for cooperating with the different translation direction of the actuator 310A.

Figure 75:
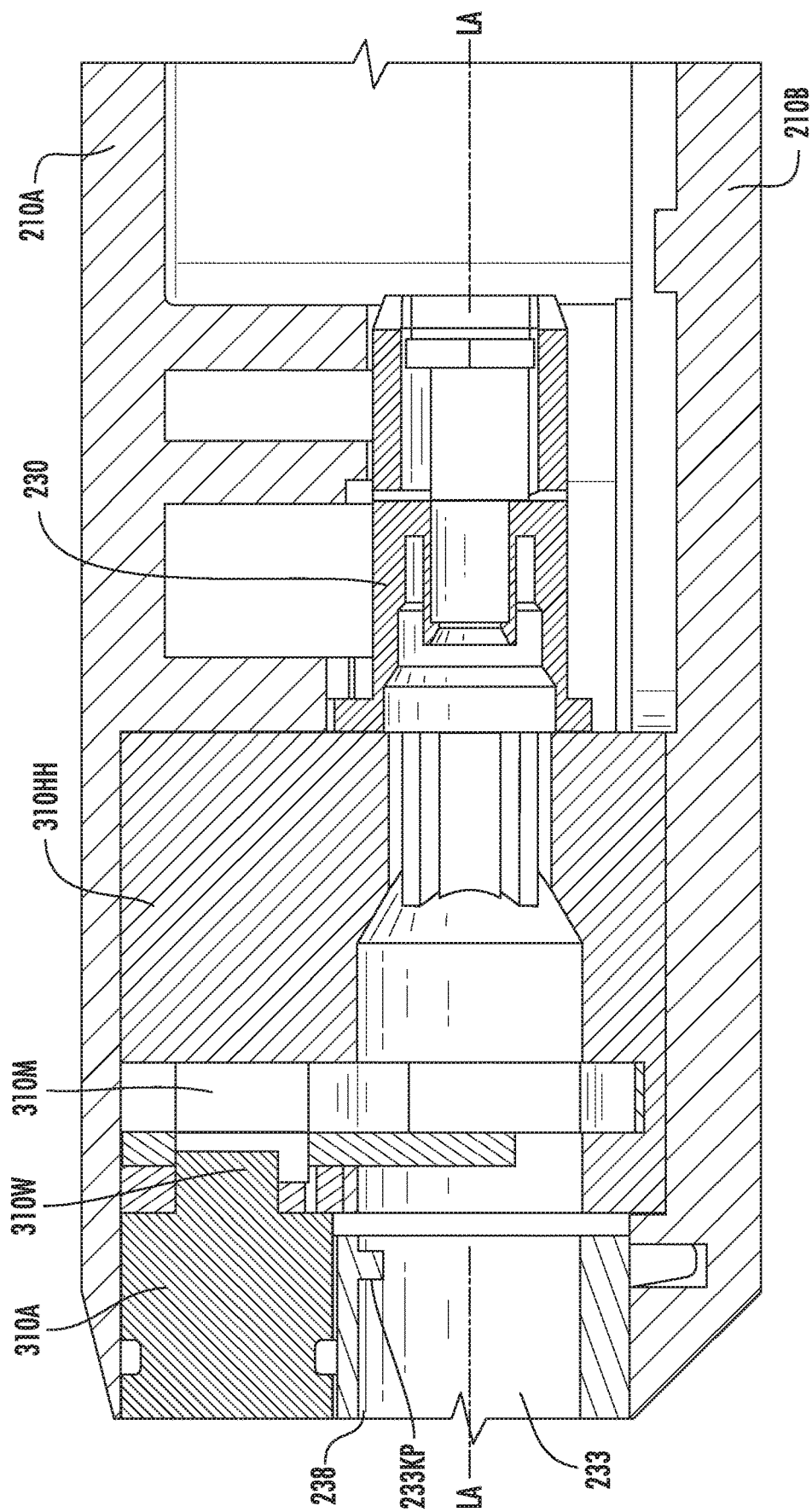
FIGS. 75-82 are various views depicting the device of FIG. 74 with the actuator of the securing feature arranged in a direction that is generally aligned with the longitudinal axis of the connector port.
Figure 76:
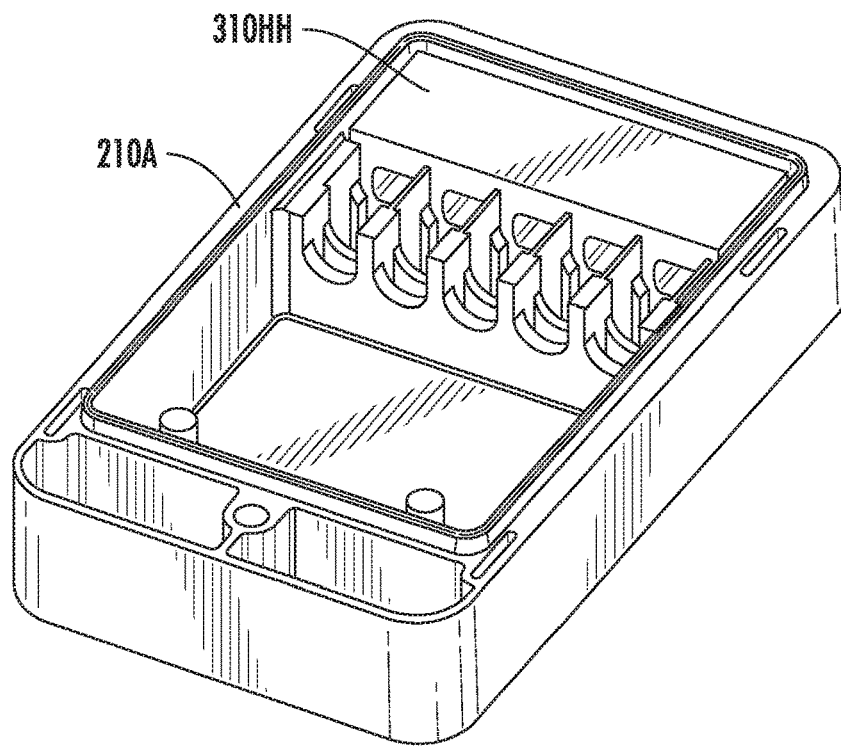
Figure 77:
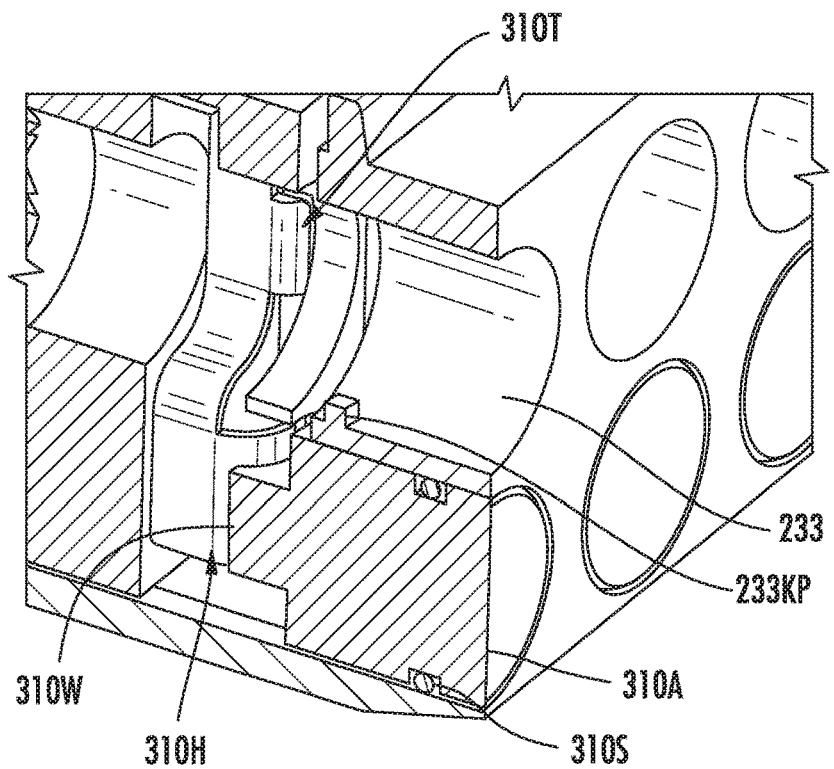
Figure 78:
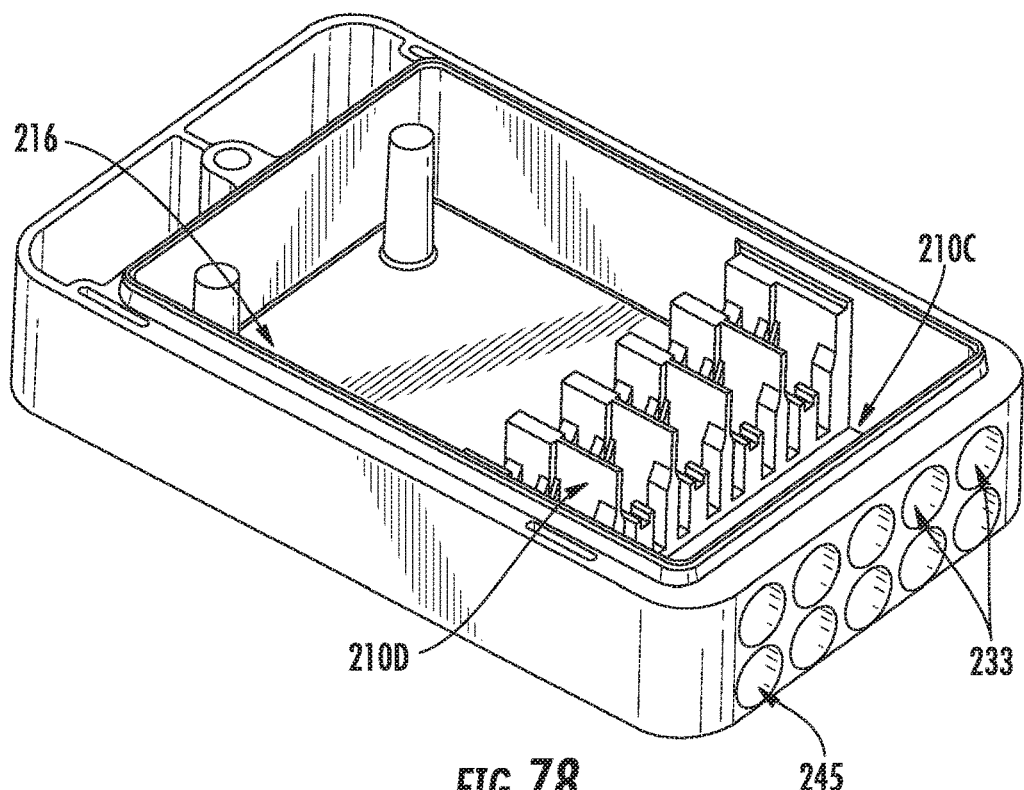
Figure 79:
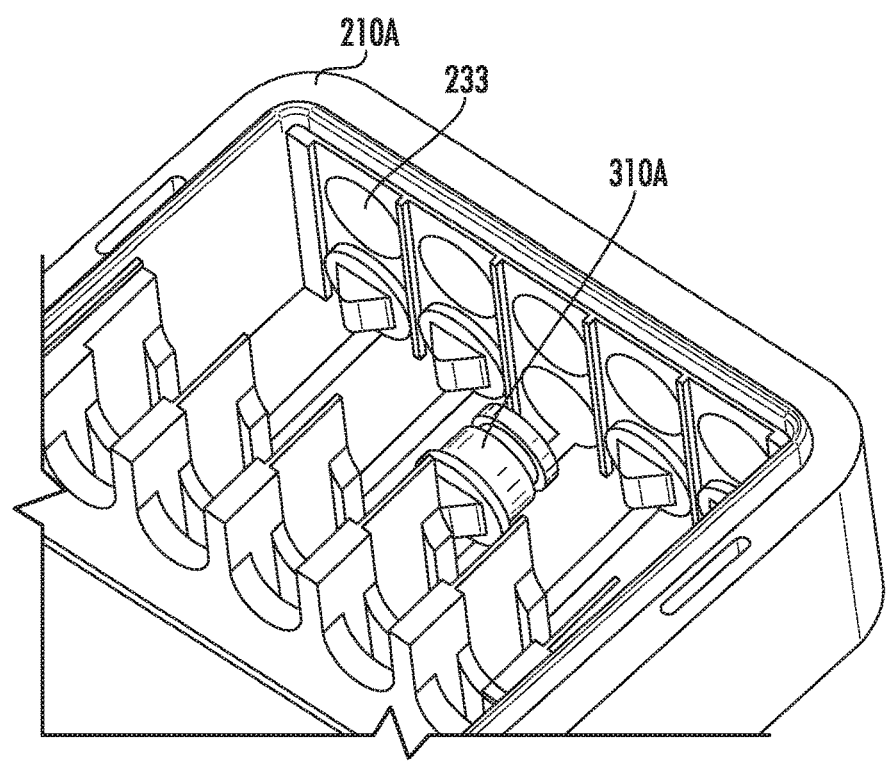
Figure 80:
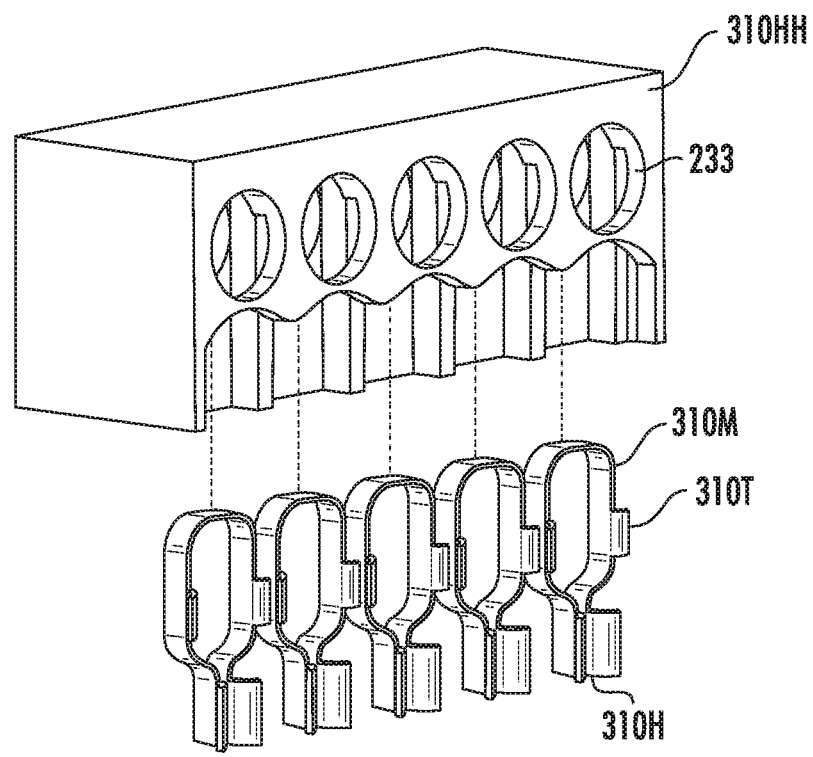
Figure 81:
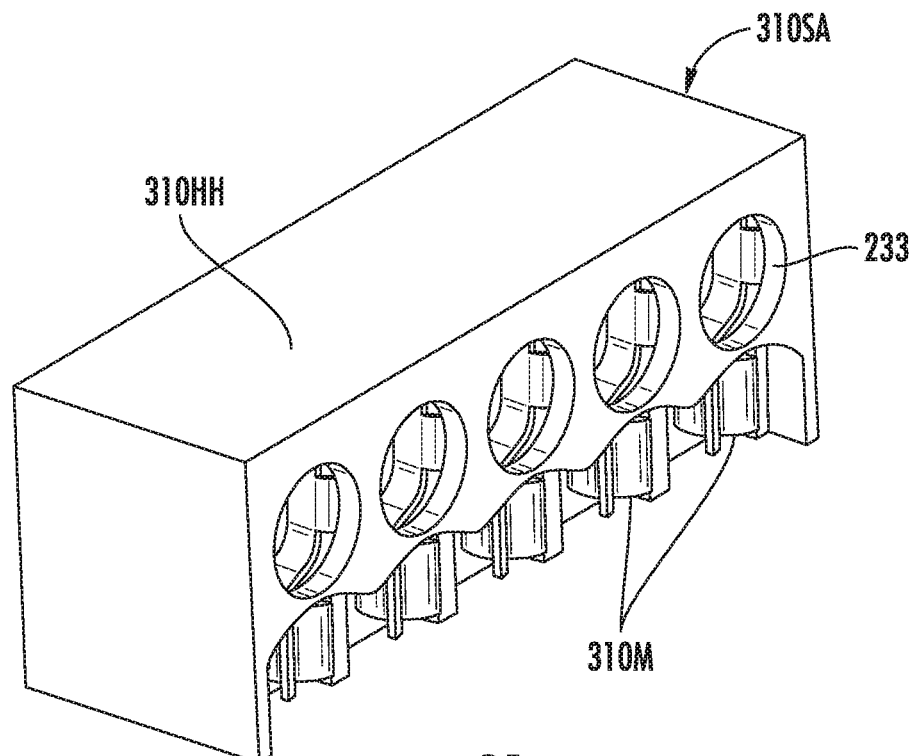
Figure 82:
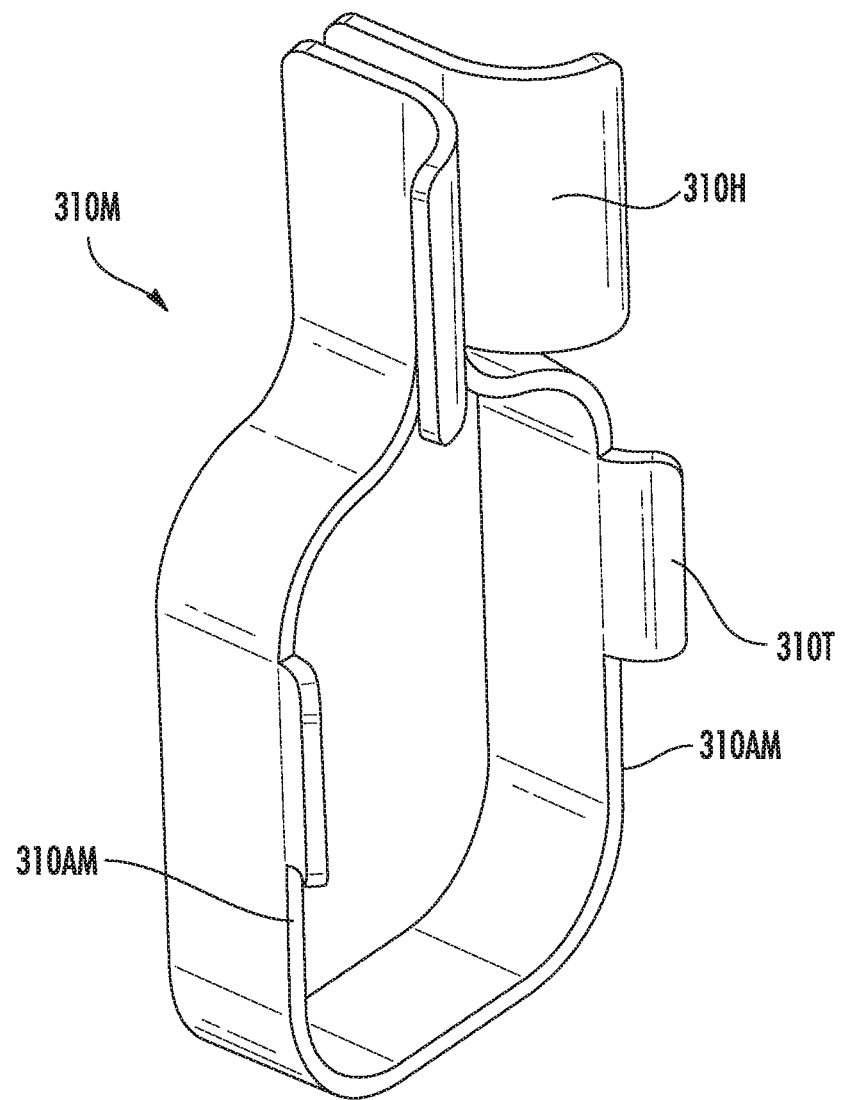

Specifically, the wedge 310W of actuator 310A moves in a horizontal direction as depicted in FIGS. 75 and 77 and the head end 310H moves to the optical connector opening 238 side of the securing member 310M. This embodiment shows the securing members 310M disposed in a securing feature sub-assembly 310SA that is positioned in a cavity 210C of the securing feature passageway 245 formed within shell 210A as shown in FIG. 76. FIGS. 75 and 77 show that the connection port passageway 233 comprises keying portion 233KP disposed forward of the securing feature 310 in connection port passageway 233. FIG. 78 depicts first portion 210A of shell 210 from the inside without components installed and FIG. 79 depicts actuators 310A placed into a portion of the securing feature passageway 245 of first portion 210A of shell 210. Actuators 310A may have features as disclosed herein. FIGS. 80 and 81 depict that this embodiment has the securing member housing 310HH is formed as a single component but may the securing member housing 310HH may be formed from multiple components if desired. FIG. 82 depicts a perspective view of the securing member 310M for this embodiment. Arms 310AM may comprise tabs 310T that are curved for aiding the engagement of the connector 10 with the securing member 310M upon insertion and allowing a smoother pushing and translation of the arms 310AM outward as connector 10 is inserted into connection port 236. Likewise, the head end 310H may also be formed with a suitable shape that cooperates with the actuator 310A during translation.

Figure 83:
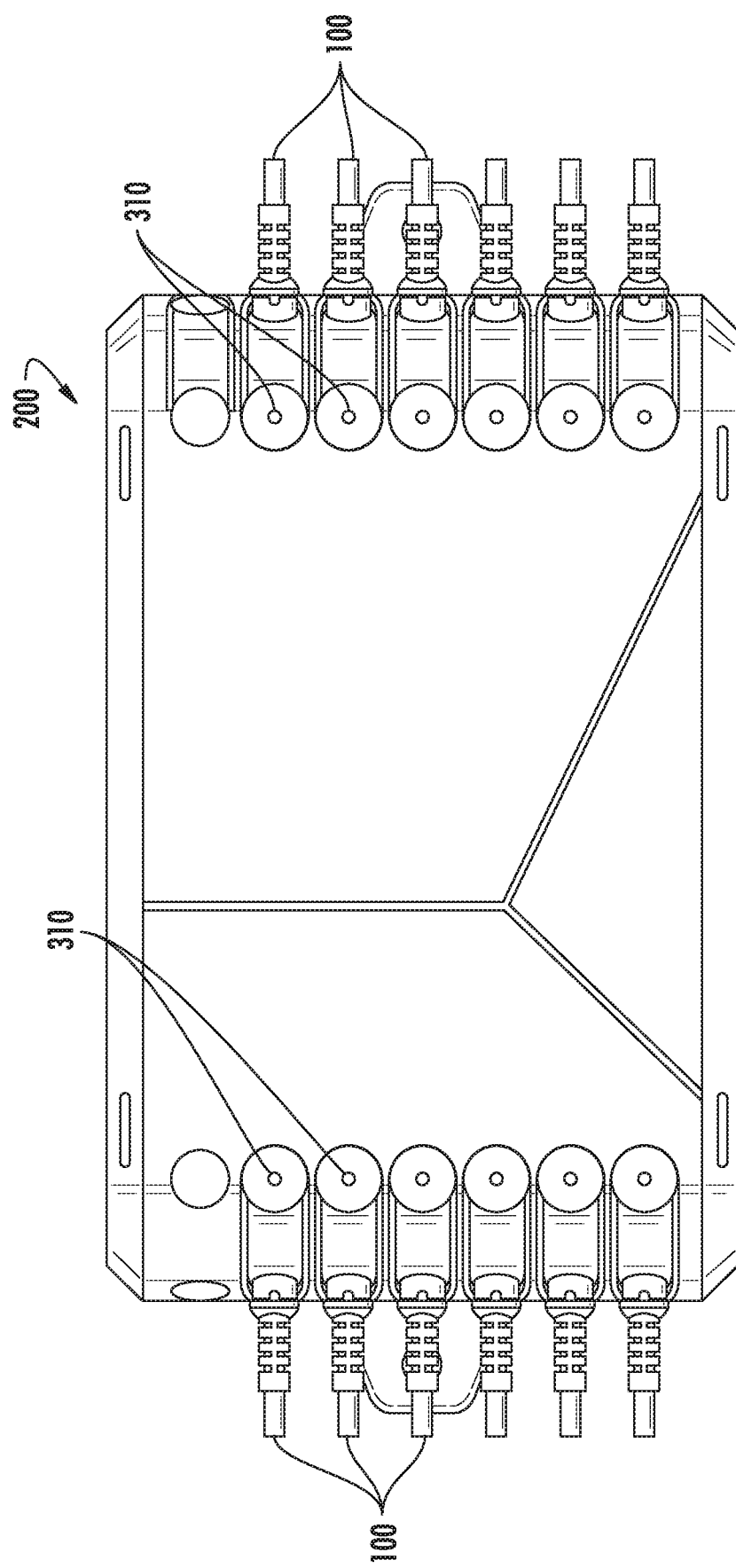
FIG. 83 is a top view of another device such as a multiport having connection ports disposed on both a first end and a second end of the device.
Figure 84:
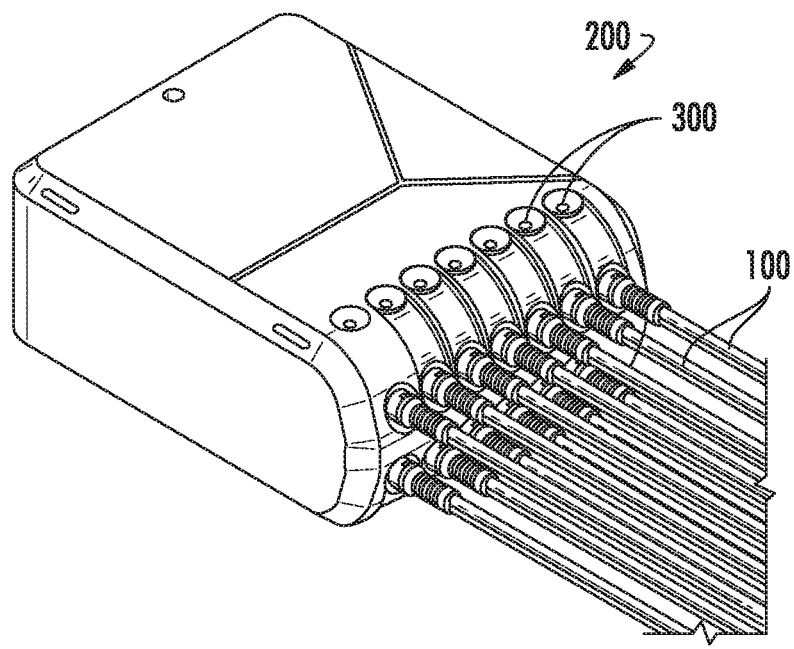
FIGS. 84-88 are various views of another device having connection ports disposed in stacked rows according to the concepts disclosed.
Figure 85:
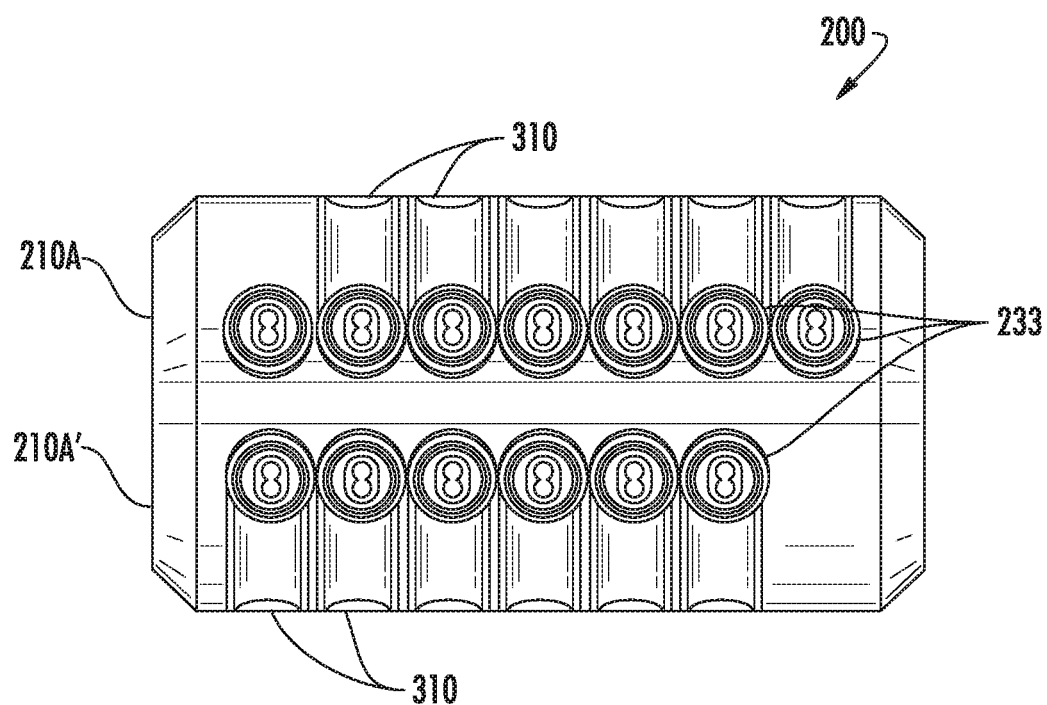
Figure 86:
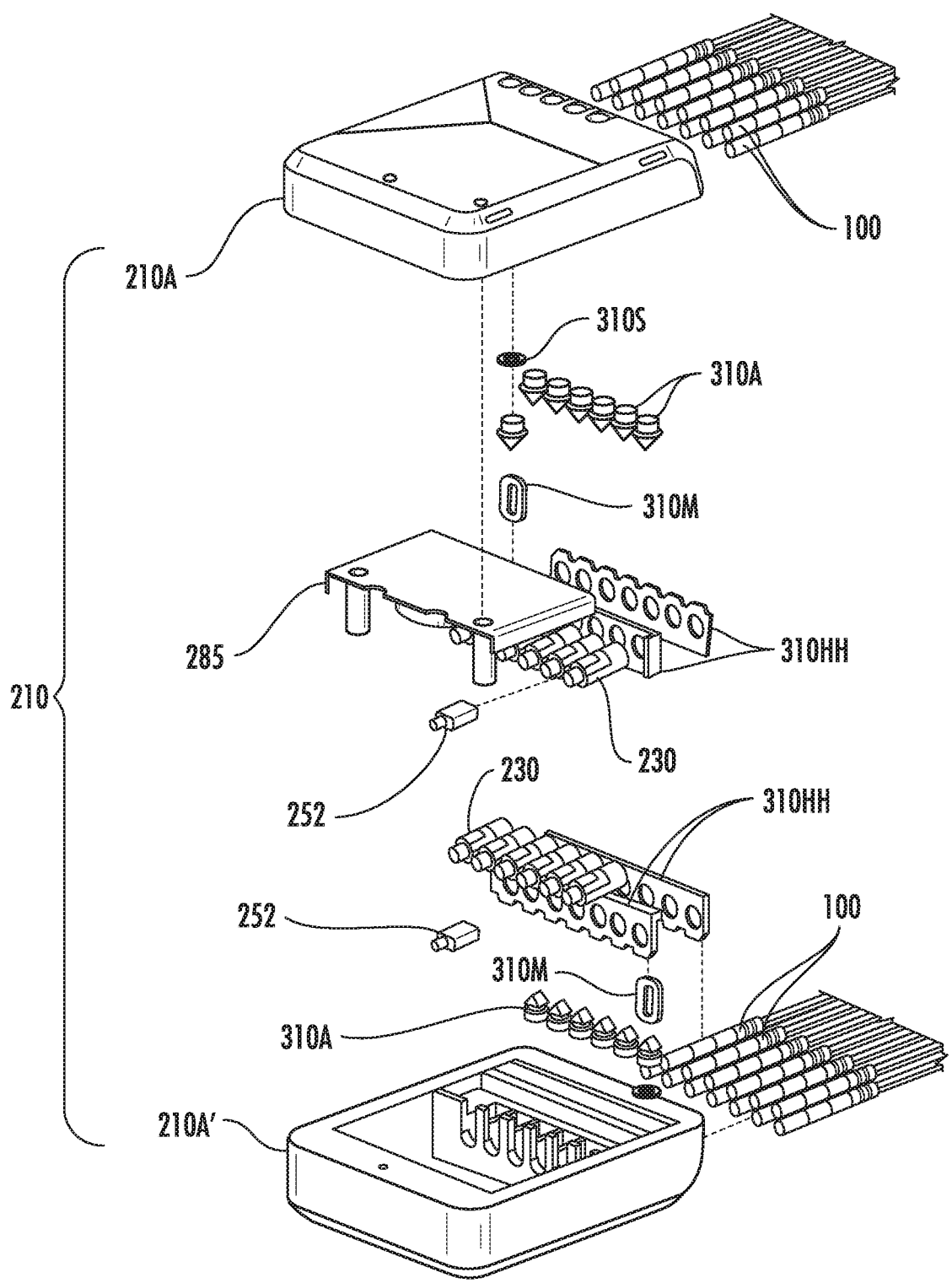
Figure 87:
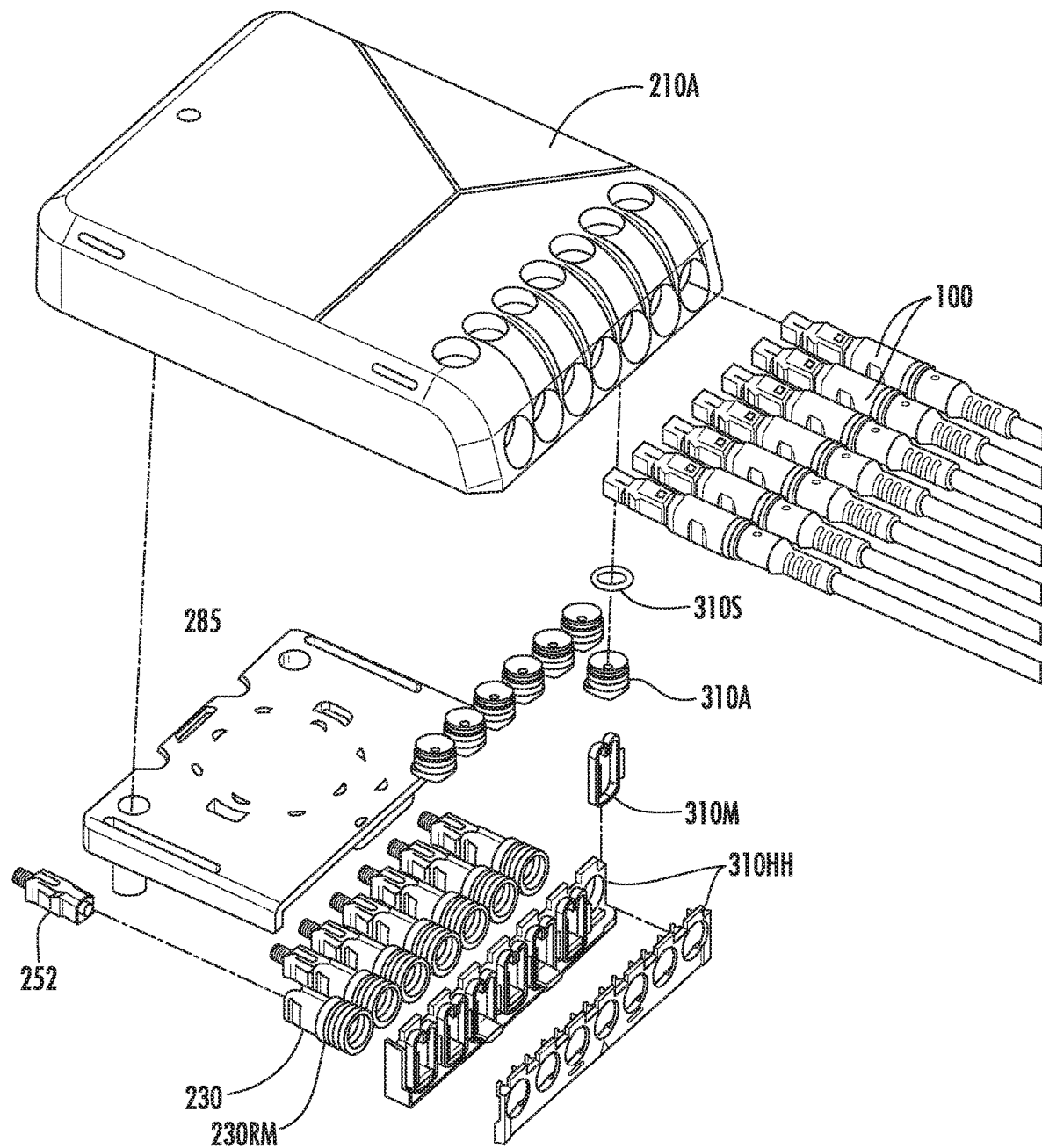
Figure 88:
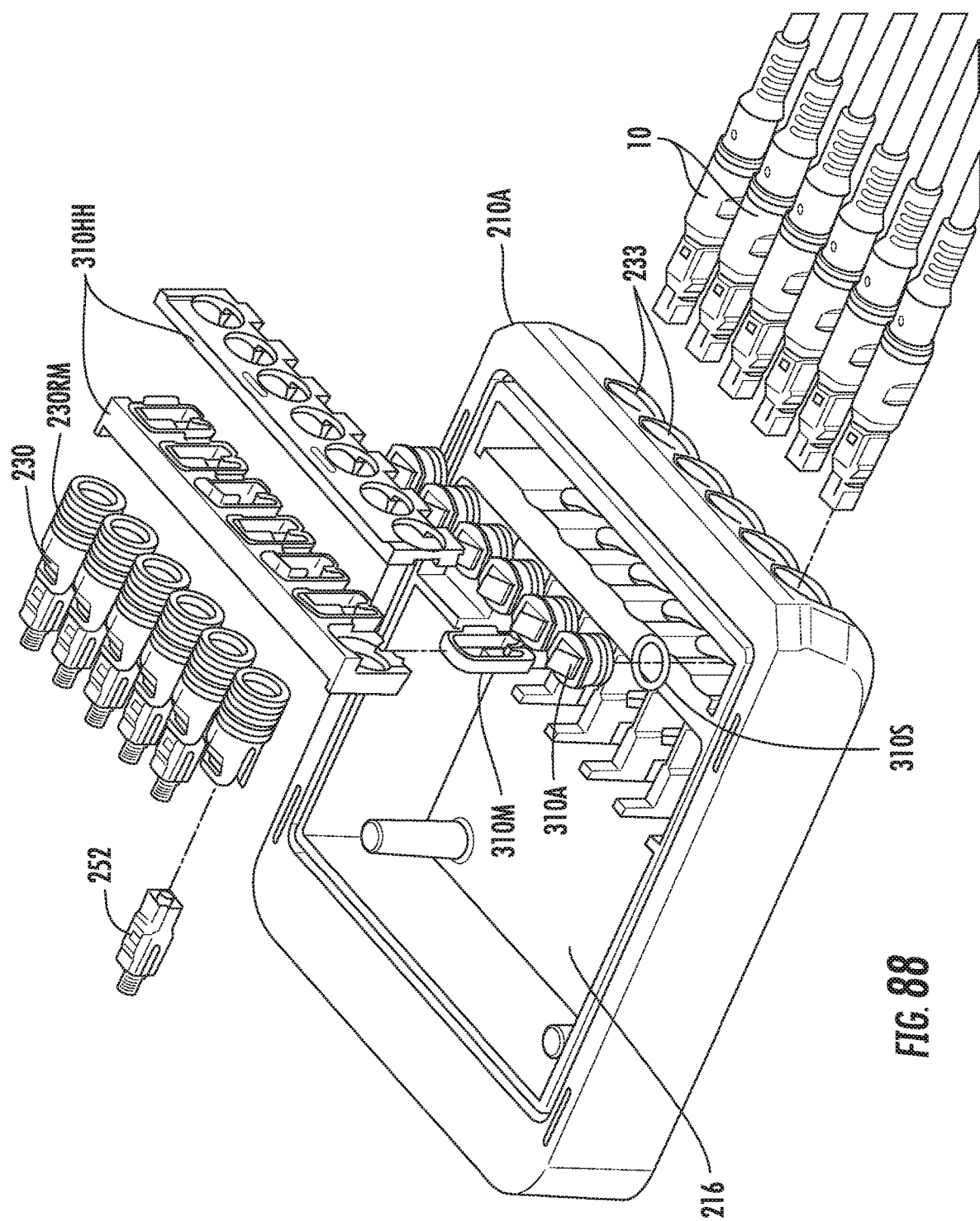

Still other variations of the concepts disclosed are possible to increase the connector port density or count on devices. FIG. 83 is a top view of another multiport 200 having connection ports 236 (or connection port passageways 238) associated with securing features that are disposed on both a first (or portion) end and a second (or portion) end of the device. This concept may be used with devices that use a connection port insert 230 or connection ports that are formed as a portion of the shell.

Other embodiments with multiple components comprising connection ports 236 and associated securing features 310 are also possible according to the concepts disclosed. FIGS. 84-88 are various views of another multiport 200 having connection ports 236 disposed in more than one row according to the concepts disclosed. This multiport 200 comprises twelve connection ports 236 and one input connection port 260 in a relatively dense arrangement and is advantageous for use where space is at a premium such as in a pedestal. This multiport 200 comprises shell 210 comprising two portions 210A,210A' with portion 210A comprising an input connection port 260. Both portions of shell 210 comprise connection ports 236 and features for securing features 310 as disclosed herein. The portions 210A,210A' of shell 210 comprise a construction similar to the construction of the multiport 200 of FIGS. 27 and 28, and which is shown partially exploded in FIG. 30 so details of the construction will not be repeated for brevity. The portions 210A, 210A' of shell 210 are configured to be secured back-to-back so the open portions of the portions align, thereby forming a common cavity 216 between the portions 210A,210A' of shell 210.

Figure 89:
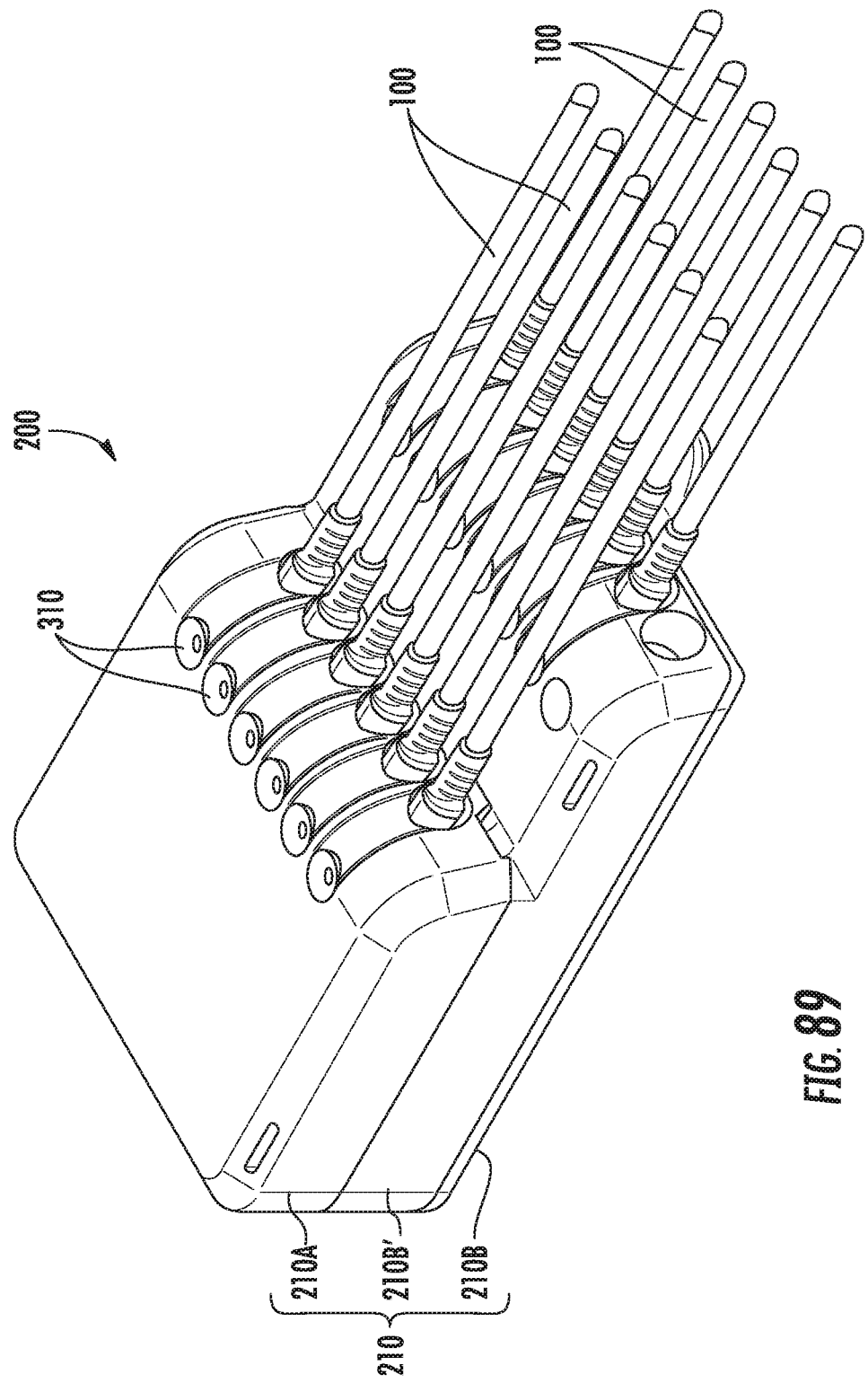
FIGS. 89-91 are various views of still another device having connection ports disposed in stacked rows that are offset according to the concepts disclosed.
Figure 90:
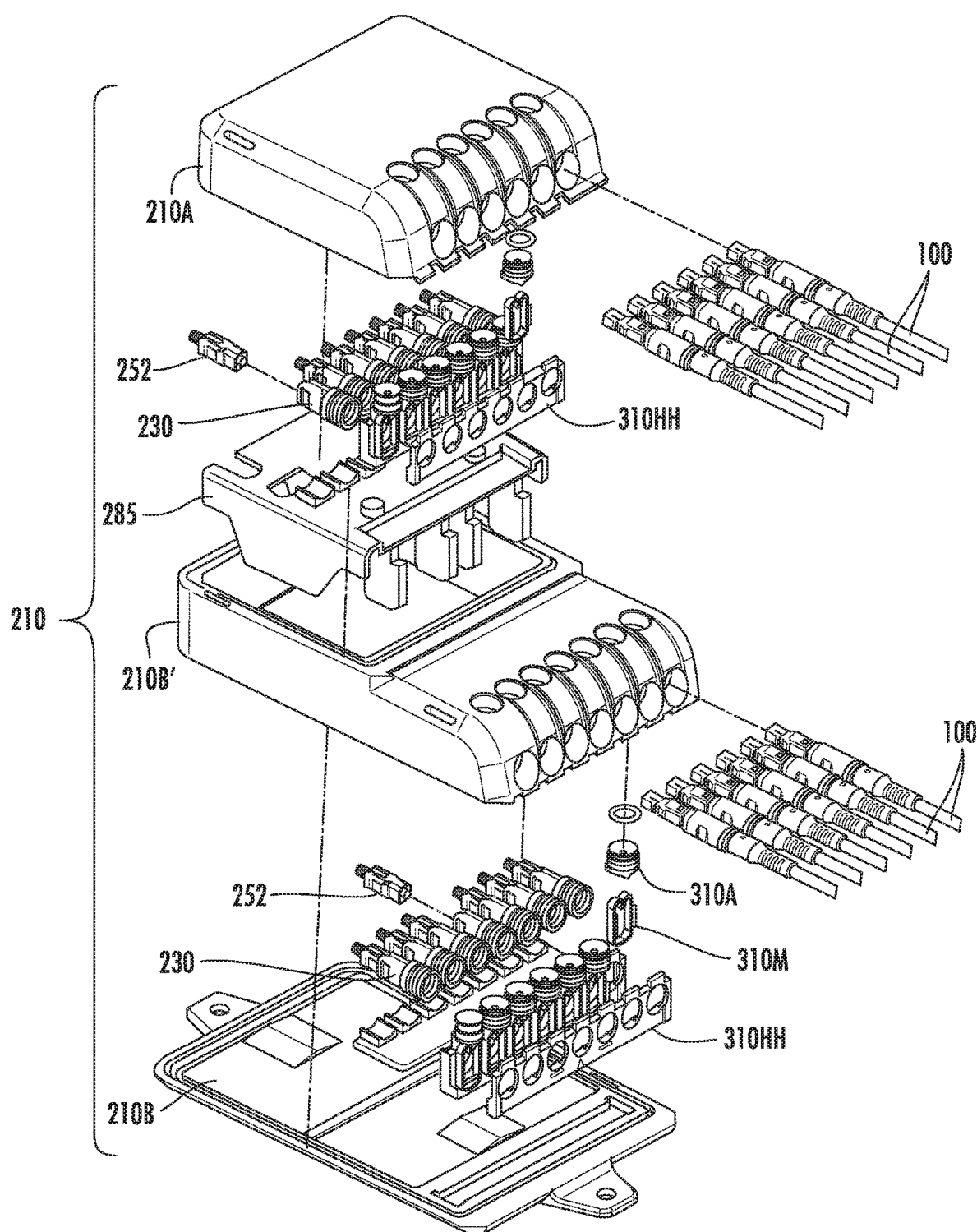
Figure 91:
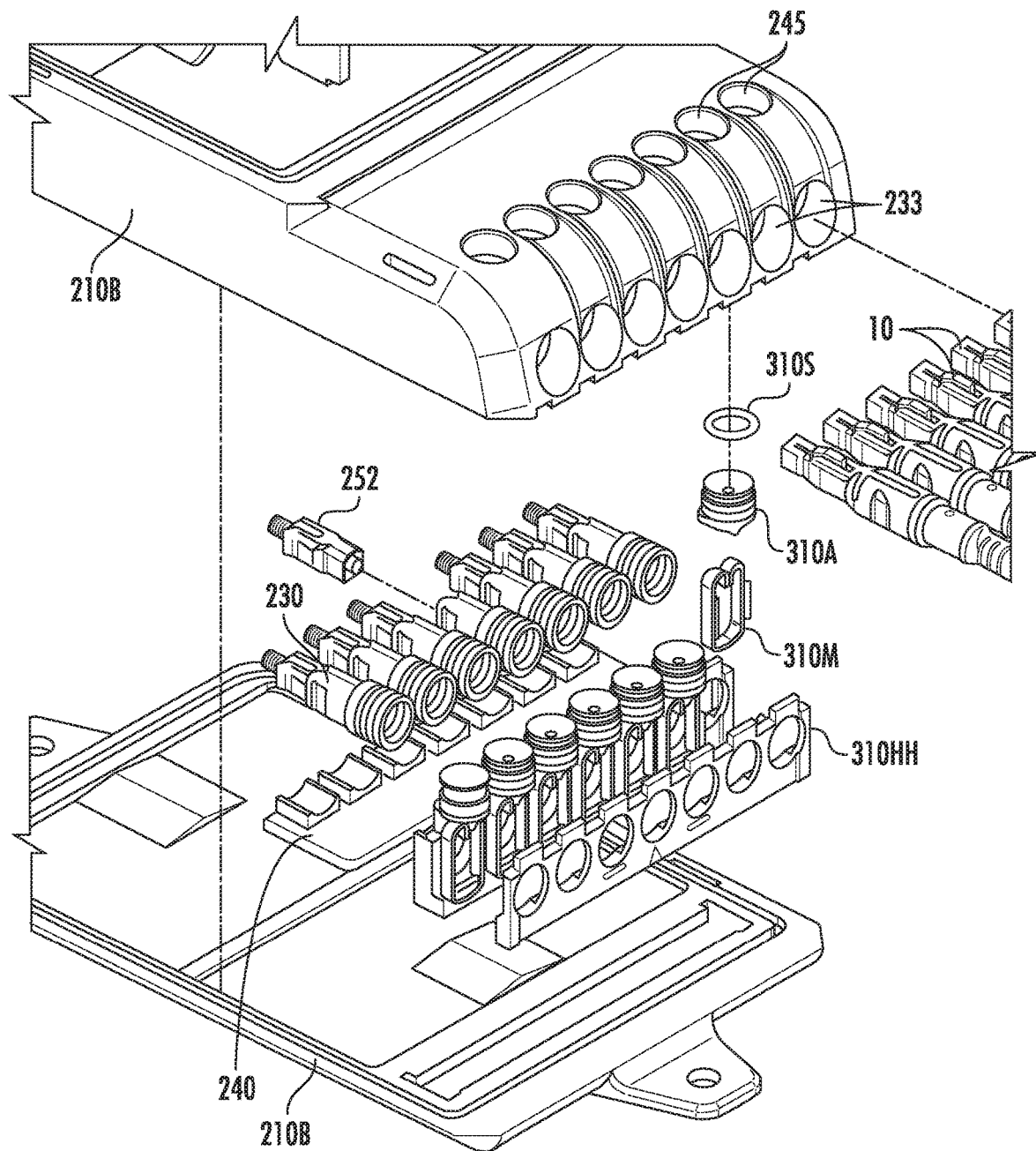
Figure 92:
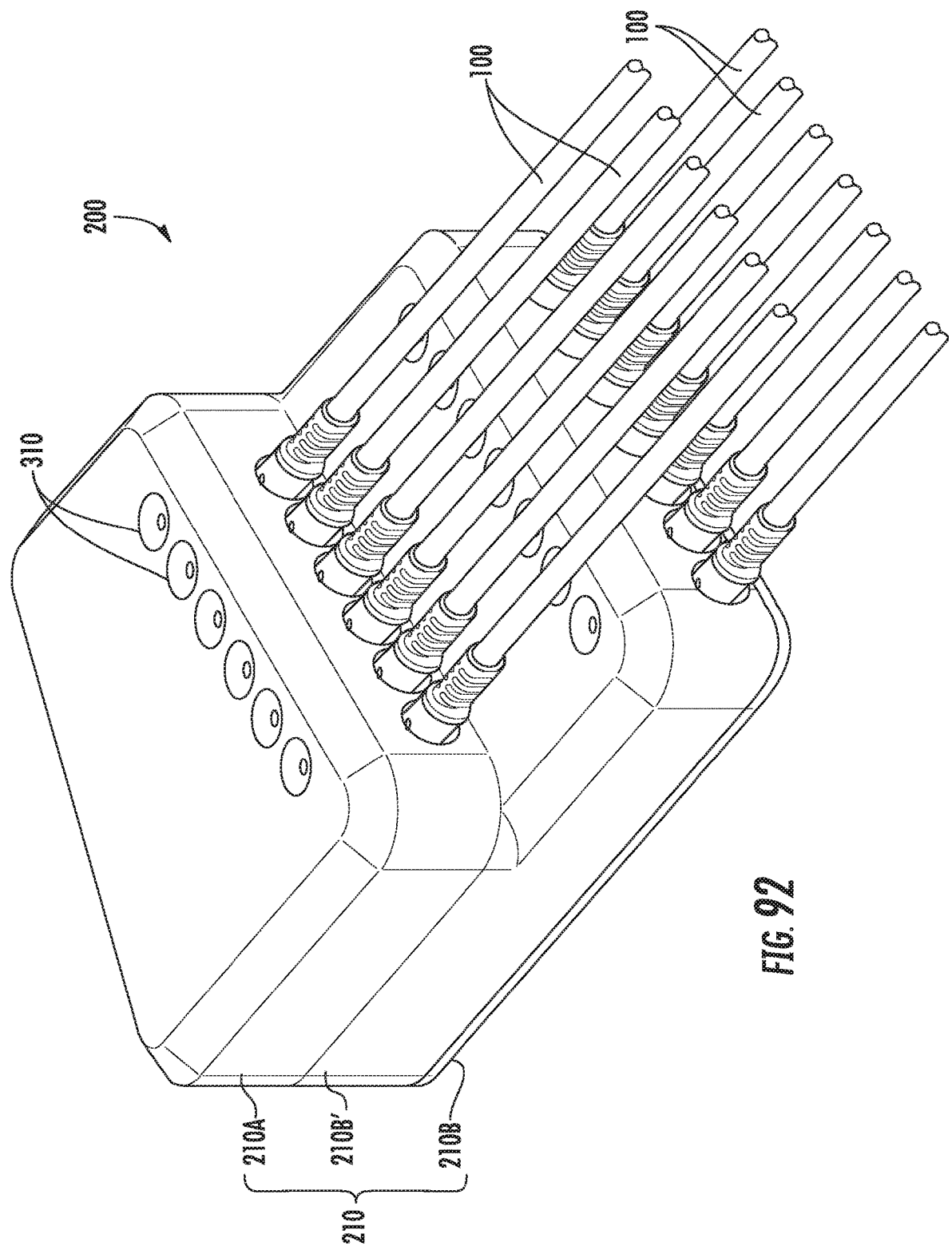
FIGS. 92-96 are various views of still another device having connection ports disposed in stacked rows that are offset and arranged on an angled surface according to the concepts disclosed.

Still other devices and embodiments having multiple components comprising connection ports 236 and associated securing features 310 are also possible according to the concepts disclosed. Illustratively, FIGS. 89-91 are various views of multiport 200 comprising connection ports 236 disposed in stacked rows and laterally offset in a stair-step fashion. This multiport 200 also comprises twelve connection ports 236 and one input connection port 260 in a relatively dense arrangement. This multiport 200 has shell 210 comprising first portion 210A, second portion 210B', and third portion 210B. Although, the first portion 210A of shell comprises the input connection port 260, other portions could comprise an input connection port as well. Both portions 210A, 210B' of shell 210 comprise a connection ports 236 and features for securing features 310 as disclosed herein. First portion 210A and third portion 210B sandwich second portion 210B' of shell 210 therebetween. The portion 210B' of shell 210 has a cavity that is open to both first shell 210A and third shell 210B. Fiber tray 285 may be used to arrange optical fibers 250 on both sides for aiding assembly and simplicity. The portions 210A,210B' of shell 210 comprise a construction similar to the construction of the multiport 200 of FIGS. 27 and 28 for the securing features 310 and connection ports 236 so details of the construction will not be repeated again for the sake of brevity.

Figure 93:
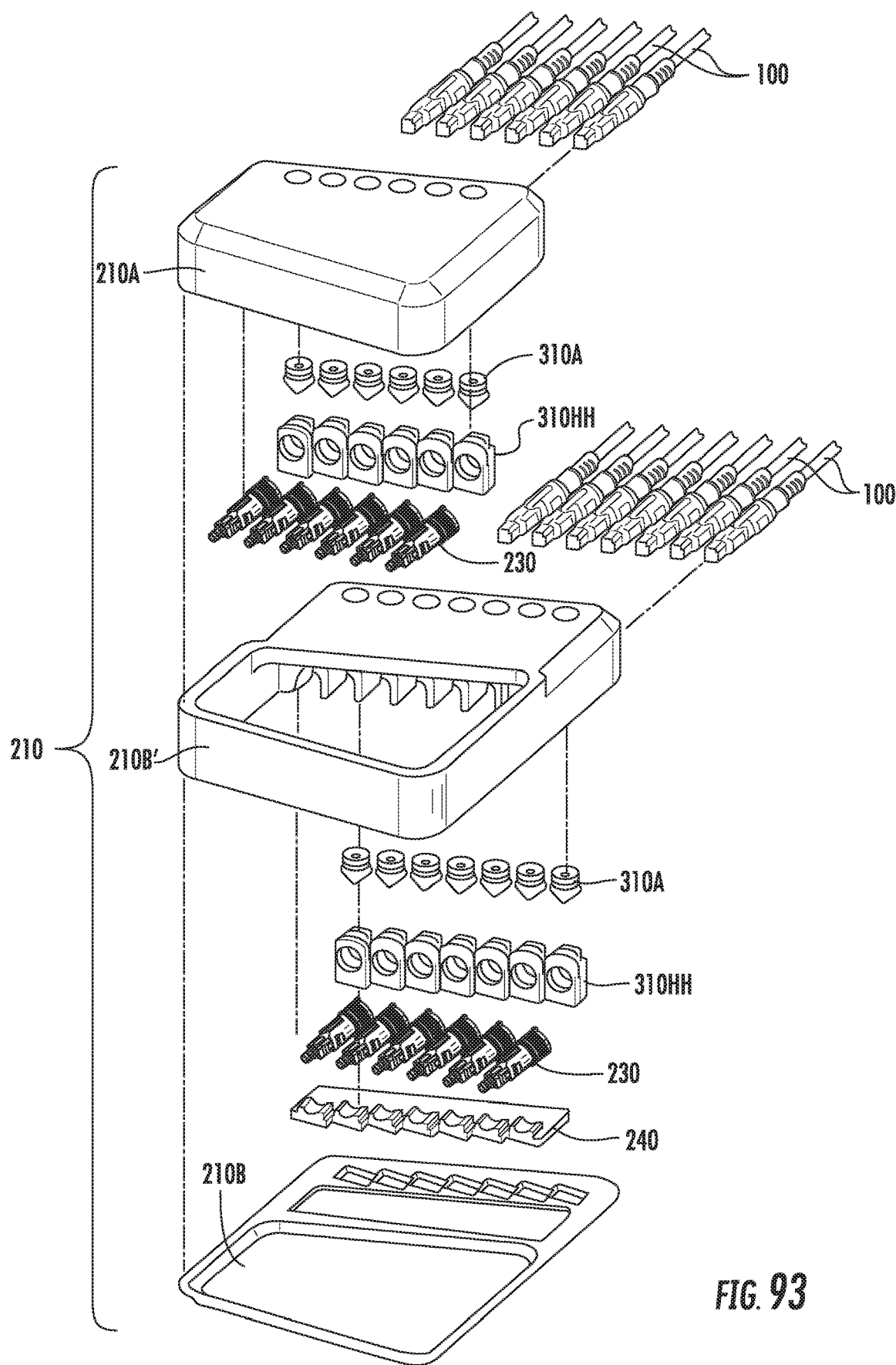
Figure 94:
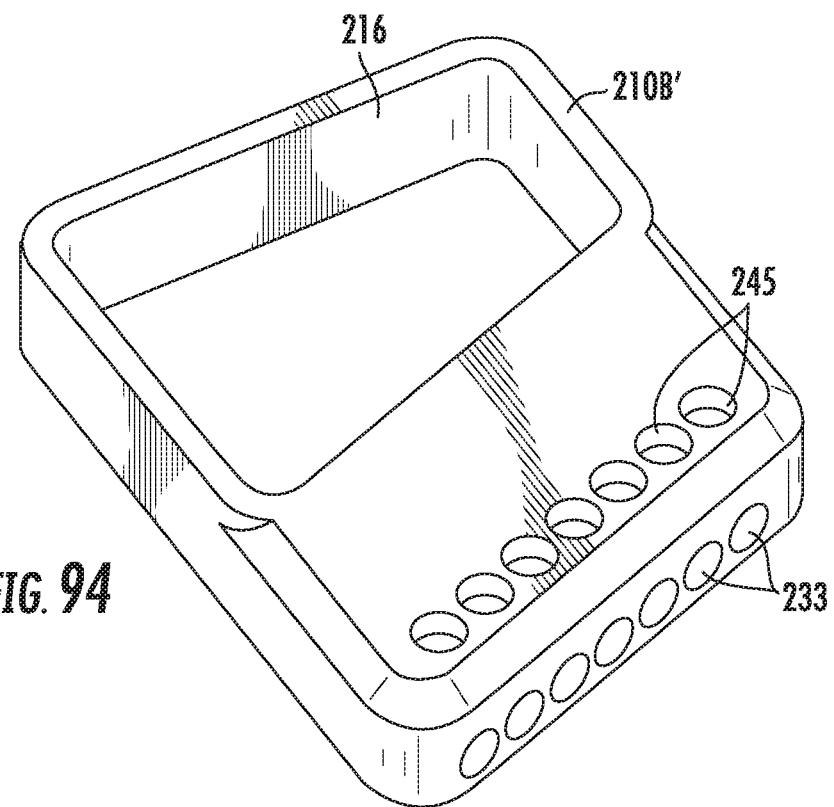
Figure 95:
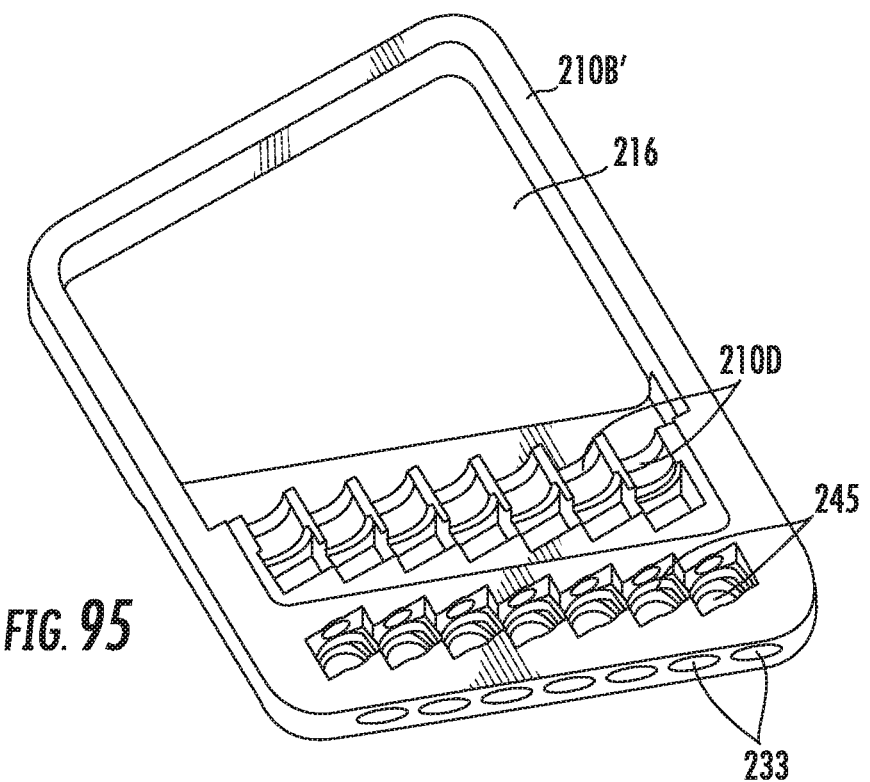
Figure 96:
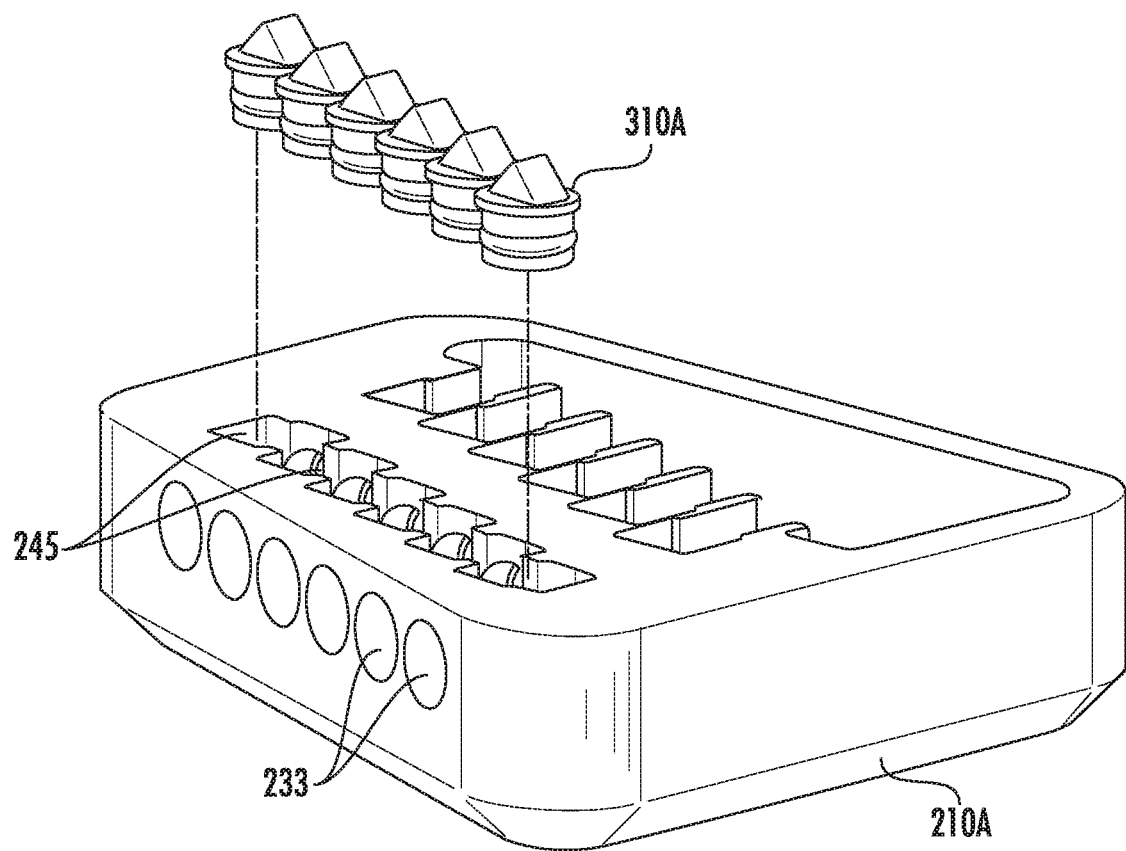

FIGS. 92-96 are various views of still another device having connection ports 236 disposed in stacked rows that are offset and arranged on an angled surface in a stair-step fashion similar to the device of FIGS. 89-91. This multiport 200 also comprises twelve connection ports 236 and one input connection port 260 in a relatively dense arrangement. This multiport 200 has shell 210 comprising first portion 210A, second portion 210B', and third portion 210B similar to the shell of FIGS. 89-91. In this embodiment, first portion 210A and second portion 210B' arrange the connection ports 236 on an angled surface. First portion 210A and third portion 210B sandwich second portion 210B' of shell 210 therebetween. The portion 210B' of shell 210 has a cavity that is open to both first shell 210A and third shell 210B as shown in FIG. 93. FIGS. 94-96 depict perspective views of the first portion 210A and the second portion 210B' of shell 210. The portions 210A,210B' of shell 210 comprise a construction similar to the construction of the multiport 200 of FIGS. 27 and 28 for the securing features 310 and connection ports 236 so details of the construction will not be repeated again for the sake of brevity.

Figure 98:
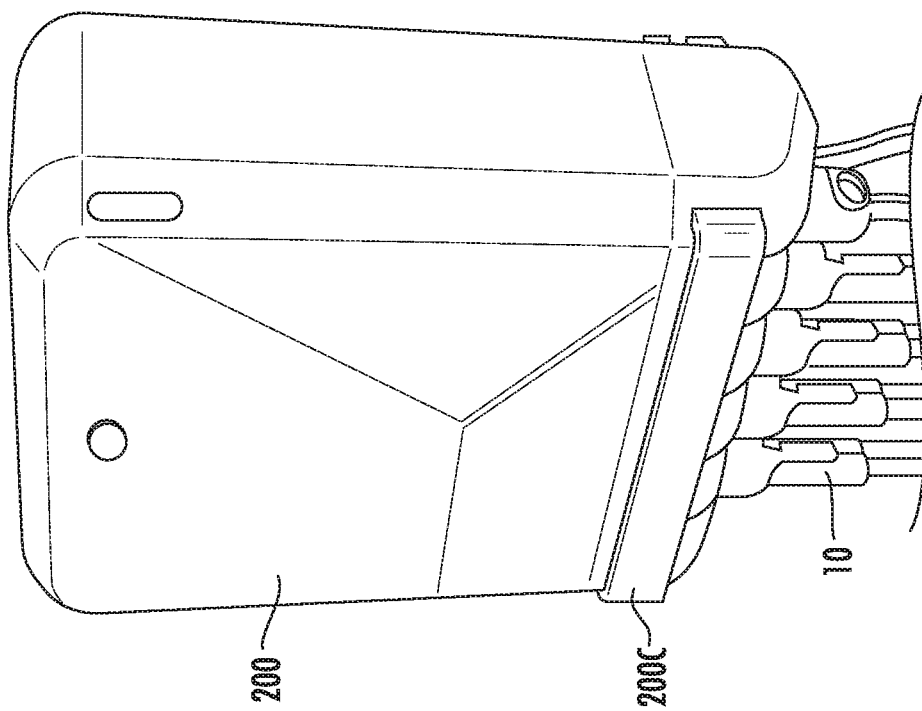
FIGS. 97 and 98 are perspective views of a first cover that may be used with the devices disclosed herein.
Figure 97:
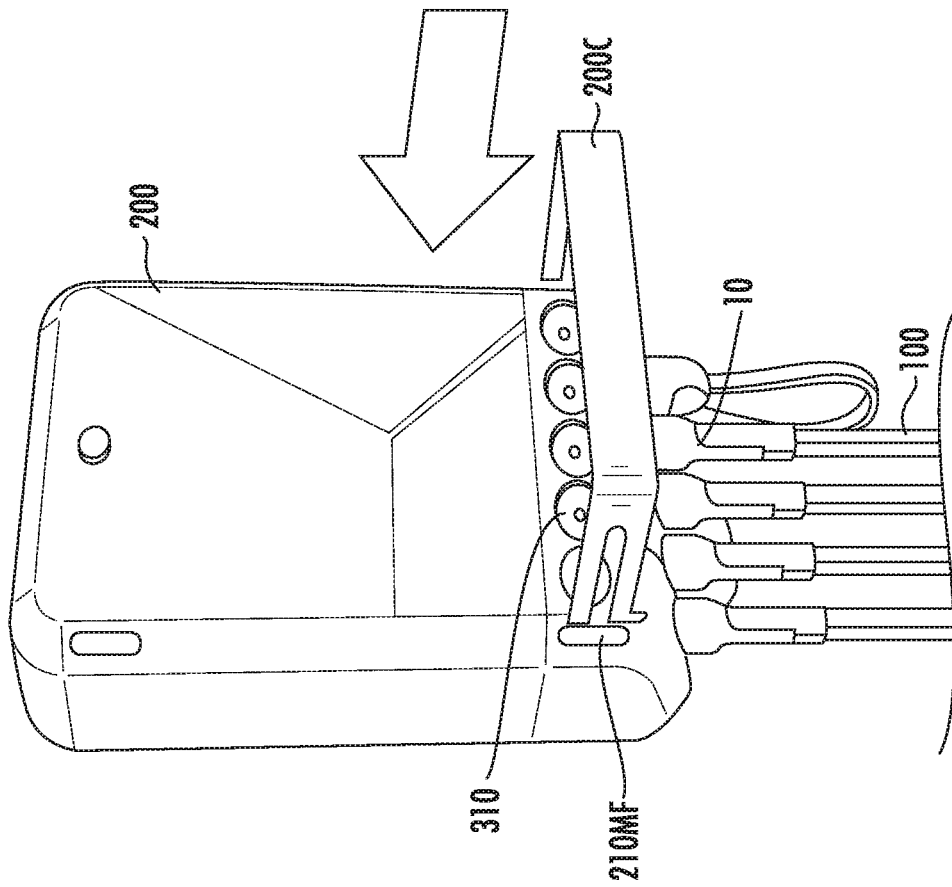

Devices may include other components such as protectors or covers 200C for security purposes or keeping dirt, debris and other contaminants away from securing features 310. For instance, the service provider may desire a security cover for deterring tampering with the multiport 200. Covers may use security fasteners, a locking device that requires a security key, or other means for securing the cover. FIGS. 97 and 98 are perspective views of a first cover 200C that may be used with multiports 200. This cover 200C cooperates with mounting features 210MF formed on multiport 200. Specifically, arms (not numbered) of cover 200C engage the respective mounting features 210MF disposed on the multiport as shown in FIG. 97. FIG. 98 shows that cover 200C essentially hides the securing features 310 when installed. Cover 200C may be secured in any suitable fashion.

Figure 100:
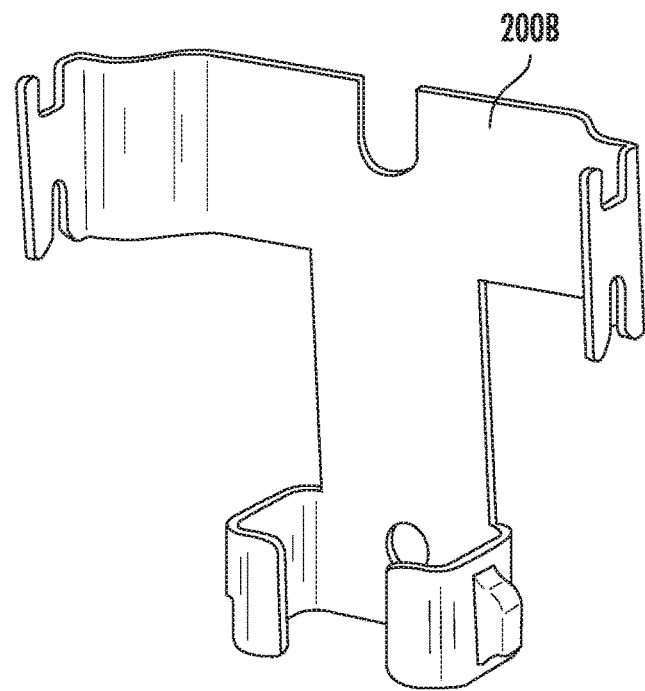
Figure 101:
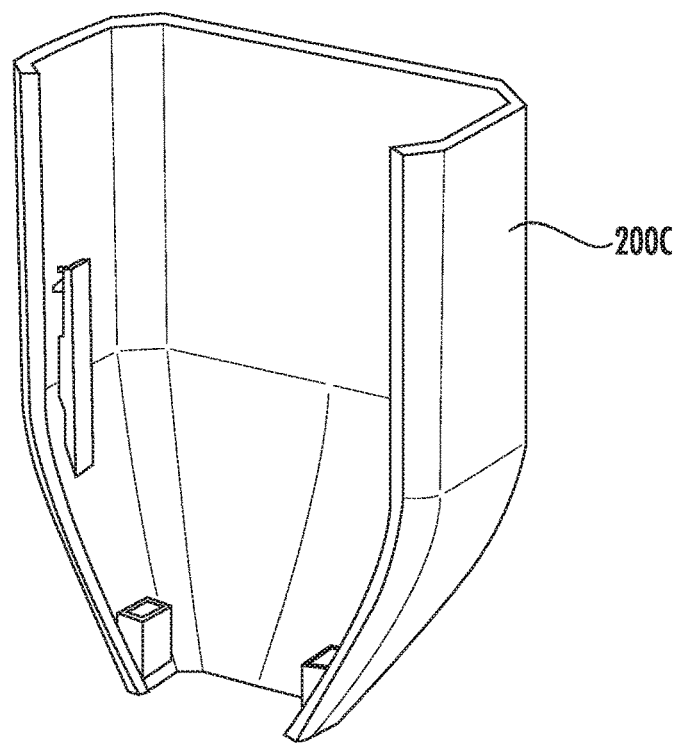

Other cover variations are also possible for multiports 200. FIGS. 99-101 are perspective views of a second cover 200C that cooperates with a bracket 200B that may be used multiports 200. This cover 200C cooperates with bracket 200B as shown in FIG. 99. FIG. 98 shows bracket 200B and when cover 200C is attached to bracket 200B its essentially hides the securing features 310. FIG. 101 shows the features on the inside portion of cover 200C that cooperate with the bracket 200B for securing the same.

Figure 102:
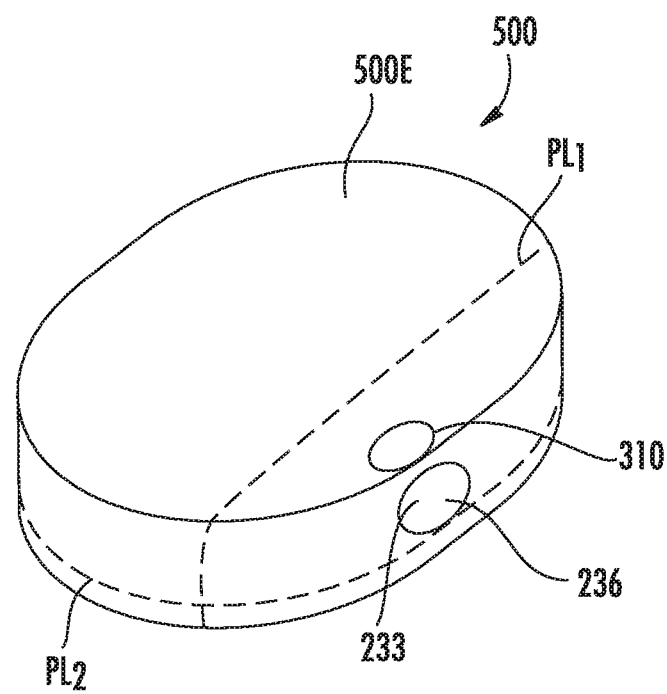
FIG. 102 is a perspective view of a wireless device comprising at least one connector port and a securing member according to the concepts disclosed herein.

FIG. 102 is a perspective view of a wireless device 500 having a similar construction to the concepts disclosed herein and comprising at least one connector port 236 associated with securing member 310. Wireless device 500 may comprise one or more connection ports 236 disposed on connection port insert as represented by parting line PL1 or one or more connection ports 236 disposed on the portion of shell 210 as represented by parting line 2. Wireless device 500 may have an input port that includes power and may have electronics 500E (not visible) disposed with in the cavity (not visible) of the device.

Figure 103:
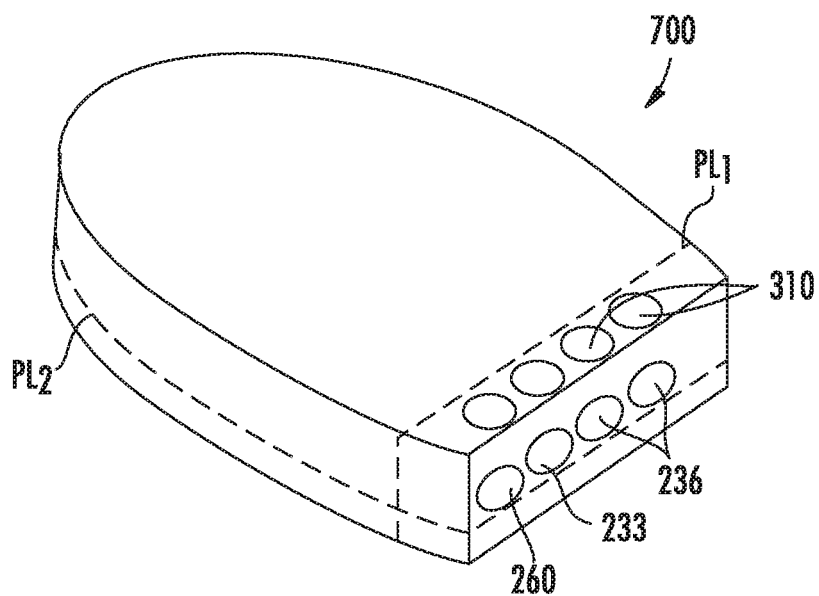
FIG. 103 is a perspective view of a closure comprising at least one connector port and a securing member according to the concepts disclosed herein.

Still other devices are possible according to the concepts disclosed. FIG. 103 is a perspective view of a closure 700 comprising at least one connector port 236 and associated securing member 310. Like wireless device 500, closure 700 may comprise one or more connection ports 236 disposed on connection port insert as represented by parting line PL1 or one or more connection ports 236 disposed on the portion of shell 210 as represented by parting line 2. Closure 700 may have one or more input ports or include other components disposed with in the cavity (not visible) of the device.

The present application also discloses methods for making a device. One method comprises inserting a connection port insert 230 into an opening 214 disposed in a first end 212 of an shell 210 so that at least a portion of the connection port insert 230 fits into the opening 212 and is disposed within a cavity 216 of the shell 210; and wherein the connection port insert 230 comprises a body 232 having a front face 234 and at least one connection ports 236 with the connection port 236 having an optical connector opening 238 extending from the front face 234 into the connection port insert 230 with a connection port passageway 233 extending through part of the connection port insert to a rear portion 237.

Other methods for making devices such as multiports 200 as disclosed herein are also contemplated. One method comprises routing a plurality of optical fibers 250 from one or more rear portions 237 of a plurality of connection ports 236 of a connection port insert 230 so that the plurality of optical fibers 250 are available for optical communication at an input connection port 260 of the connection port insert 230. Then inserting the connection port insert 230 into an opening 214 disposed in a first end 212 of a shell 210 so that at least a portion of the connection port insert 230 fits into the opening 212 and is disposed within a cavity 216 of the shell 210; and wherein the connection port insert 230 comprises a body 232 having a front face 234 and a plurality of connection ports 236 with each connector port 236 having an optical connector opening 238 extending from the front face 234 into the connection port insert 230 with a connection port passageway 233 extending through part of the connection port insert to the rear portion 237.

The methods disclosed may further include installing at least one securing feature 310 into a multiport 200 so that the at least one securing feature 310 is associated with connection port 236. The securing feature 310 may translate between an open position OP and a closed position CP. The method may include translating the securing feature 310 for moving the securing feature 310 to the open position OP and the securing feature 310 is biased to closed position CP.

Although the disclosure has been illustrated and described herein with reference to explanatory embodiments and specific examples thereof, it will be readily apparent to those of ordinary skill in the art that other embodiments and examples can perform similar functions and/or achieve like results. For instance, the connection port insert may be configured as individual sleeves that are inserted into a passageway of a device, thereby allowing the selection of different configurations of connector ports for a device to tailor the device to the desired external connector. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

We claim:

1. A multiport for making optical connections, comprising:
   a shell comprising a cavity;
   at least one connection port comprising an optical connector opening extending from an outer surface of the multiport into the cavity and defining a connection port passageway, the connection port passageway comprising a keying portion;
   a securing feature passageway; and
   at least one securing feature disposed within the multiport and associated with the at least one connection port passageway, and the at least one securing feature comprises a locking member and an actuator, wherein the at least one securing feature is disposed within a portion of the securing feature passageway, and the at least one securing feature is capable of translating within a portion of the at least one securing feature passageway wherein the at least one securing feature translates from a retain position to an open position as a suitable fiber optic connector is inserted into the at least one connection port.

2. The multiport of claim 1, wherein the locking member is a portion of a securing feature sub-assembly.

3. The multiport of claim 1, wherein the at least one connection port and the at least one securing feature passageway are a portion of the shell.

4. The multiport of claim 3, the shell comprises at least a first portion and a second portion.

5. The multiport of claim 3, wherein the shell is formed from a plurality of components.

6. The multiport of claim 1, at least one optical fiber routed from the at least one connection port toward an input connection port of the multiport.

7. The multiport of claim 1, further comprising at least one adapter aligned with the at least one connection port.

8. The multiport of claim 1, wherein the at least one securing feature translates from a retain position to an open position as a suitable fiber optic connector is inserted into the at least one connection port.

9. The multiport of claim 1, wherein the keying portion comprises a male key.

10. The multiport of claim 1, further comprising a sealing feature disposed on the at least one securing feature.

11. The multiport of claim 1, wherein at least a portion of the one securing feature passageway is arranged transversely to a longitudinal axis of the connector port passageway.

12. The multiport of claim 1, wherein at least a portion of the one securing feature passageway aligned with and offset from a longitudinal axis of the connector port passageway.

13. The multiport of claim 1, further comprising at least one adapter aligned with the at least one connector port passageway.

14. The multiport of claim 1, further comprising at least one adapter is capable of floating relative to the at least one connection ports passageway.

15. The multiport claim 14, further comprising a retainer for securing the at least one adapter to the shell.

16. The multiport of claim 1, further comprising at least one adapter biased by a resilient member.

17. The multiport of claim 1, further comprising at least one rear connector comprising a rear connector ferrule.

18. The multiport of claim 17, the at least one rear connector further comprising a resilient member for biasing the rear connector ferrule.

19. The multiport of claim 1, further comprising at least one rear connector further comprising a keying feature.

20. The multiport of claim 1, further comprising at least one rear connector having a SC footprint.

21. The multiport of claim 1, wherein the multiport is weatherproof and further comprises an optical splitter disposed within the cavity.

22. The multiport of claim 1, further comprising at least one mounting feature for the multiport.

23. The multiport of claim 1, the multiport comprising at least one pass-through port.

24. The multiport of claim 1, further comprising an input connection port configured as a single-fiber input connection or a multi-fiber input connection.

25. The multiport of claim 1, further comprising an input connection port configured as an input tether.

26. The multiport of claim 25, wherein the input tether further comprises a furcation body.

27. The multiport of claim 25, wherein the input tether is terminated with a fiber optic connector.

28. The multiport of claim 1, further comprising at least one fiber routing guide or support.

29. The multiport of claim 1, wherein the shell defines a volume of 800 cubic centimeters or less.

30. The multiport of claim 1, wherein the shell defines a volume of 400 cubic centimeters or less.

31. The multiport of claim 1, wherein the shell defines a volume of 100 cubic centimeters or less.

32. The multiport of claim 1, wherein the multiport has a port width density of at least one connection port per each 20 millimeters of width.

33. The multiport of claim 1, further comprising a sealing element.

34. The multiport of claim 1, further comprising a dust cap sized for cooperating with the at least one optical connector opening.

35. The multiport of claim 1, wherein the multiport comprises a marking indicia for the at least one connection port passageway.

36. The multiport of claim 1, wherein at least one connection port is suitable for retaining a suitable fiber optic connector when the fiber optic connector is fully-seated within the at least one connection port.

37. The multiport of claim 1, further comprising a cover.

38. The multiport of claim 37, further comprising a bracket for the cover.

39. A multiport for making optical connections, comprising:
- a shell comprising a cavity;
- at least one connection port comprising an optical connector opening extending from an outer surface of the multiport into the cavity and defining a connection port passageway, the connection port passageway comprising a keying portion;
- a securing feature passageway; and
- at least one securing feature disposed within the multiport and associated with the at least one connection port passageway, and the at least one securing feature comprises a locking member and an actuator, wherein the at least one securing feature is disposed within a portion of the securing feature passageway, and the at least one securing feature is capable of translating within a portion of the at least one securing feature passageway wherein the at least one securing feature translates from a retain position to an open position as a suitable fiber optic connector is inserted into the at least one connection port; and
- an optical splitter disposed within the cavity.

40. The multiport of claim 39, wherein the locking member is a portion of a securing feature sub-assembly.

41. The multiport of claim 39, wherein the at least one connection port and the at least one securing feature passageway are a portion of the shell.

42. The multiport of claim 41, the shell comprises at least a first portion and a second portion.

43. The multiport of claim 39, further comprising at least one adapter aligned with the at least one connection port.

44. The multiport of claim 39, wherein the keying portion comprises a male key.

45. The multiport of claim 39, further comprising a sealing feature disposed on the at least one securing feature.

46. The multiport of claim 39, wherein at least a portion of the one securing feature passageway is arranged transversely to a longitudinal axis of the connector port passageway.

47. The multiport of claim 39, the multiport comprising at least one pass-through port.

48. The multiport of claim 39, wherein the multiport has a port width density of at least one connection port per each 20 millimeters of width.

49. The multiport of claim 39, further comprising a sealing element.

50. A multiport for making optical connections, comprising:
- a shell comprising a cavity;
- at least one connection port comprising an optical connector opening extending from an outer surface of the multiport into the cavity and defining a connection port passageway, the connection port passageway comprising a keying portion;
- a securing feature passageway; and
- at least one securing feature disposed within the multiport and associated with the at least one connection port passageway, and the at least one securing feature comprises a locking member and an actuator, wherein the at least one securing feature is disposed within a portion of the securing feature passageway, and the at least one securing feature is capable of translating within a portion of the at least one securing feature passageway wherein the at least one securing feature translates from a retain position to an open position as a suitable fiber optic connector is inserted into the at least one connection port, and wherein the multiport is weatherproof.

51. The multiport of claim 50, wherein the locking member is a portion of a securing feature sub-assembly.

52. The multiport of claim 50, wherein the at least one connection port and the at least one securing feature passageway are a portion of the shell.

53. The multiport of claim 52, the shell comprises at least a first portion and a second portion.

54. The multiport of claim 50, further comprising at least one adapter aligned with the at least one connection port.

55. The multiport of claim 50, wherein the keying portion comprises a male key.

56. The multiport of claim 50, further comprising a sealing feature disposed on the at least one securing feature.

57. The multiport of claim 50, wherein at least a portion of the one securing feature passageway is arranged transversely to a longitudinal axis of the connector port passageway.

58. The multiport of claim 50, further comprising an optical splitter disposed within the cavity and further comprises a sealing element for sealing the cavity of the shell.

59. The multiport of claim 50, the multiport comprising at least one pass-through port.

60. The multiport of claim 50, wherein the multiport has a port width density of at least one connection port per each 20 millimeters of width.

61. The multiport of claim 50, further comprising a sealing element.

* * * * *

UNITED STATES PATENT AND TRADEMARK OFFICE
CERTIFICATE OF CORRECTION

| | |
|---|---|
| PATENT NO. | : 11,789,214 B2 |
| APPLICATION NO. | : 16/664198 |
| DATED | : October 17, 2023 |
| INVENTOR(S) | : Thierry Luc Alain Dannoux et al. |

It is certified that error appears in the above-identified patent and that said Letters Patent is hereby corrected as shown below:

On the Title Page

In item (56), in Column 2, under "Other Publications", Line 1, delete "lopp" and insert -- loop --.

On the page 9, in item (56), in Column 1, under "Other Publications", Line 5, delete "Poeceedings" and insert -- Proceedings --.

In the Claims

In Column 36, Line 33, in Claim 15, after "multiport" insert -- of --.

Signed and Sealed this
Thirty-first Day of December, 2024

Derrick Brent
*Acting Director of the United States Patent and Trademark Office*